United States Patent [19]
Uno et al.

[11] Patent Number: 5,907,724
[45] Date of Patent: May 25, 1999

[54] LENS BARREL AND CAMERA PROVIDED WITH A LENS BARREL

[75] Inventors: Tetsuya Uno, Sakai; Hiroyuki Ogura, Nishinomiya; Toshihiro Hamamura, Osaka; Hiroshi Ootsuka, Toyokawa; Hideki Nagata, Sakai; Taro Shibuya, Takatsuki; Takashi Okada, Sakai, all of Japan

[73] Assignee: Minolta Co. Ltd., Osaka, Japan

[21] Appl. No.: 08/768,123

[22] Filed: Dec. 17, 1996

[30] Foreign Application Priority Data

Dec. 18, 1995 [JP] Japan .................................. 7-327765

[51] Int. Cl.⁶ .................................................. G03B 17/00
[52] U.S. Cl. ................................................. 396/82; 396/72
[58] Field of Search ................................ 396/72, 79, 80, 396/81, 82

[56] References Cited

U.S. PATENT DOCUMENTS

| | | | |
|---|---|---|---|
| 3,972,056 | 7/1976 | Tsujimoto et al. | 396/80 |
| 4,639,111 | 1/1987 | Harvey . | |
| 4,825,237 | 4/1989 | Hatase et al. | 396/79 |
| 4,885,600 | 12/1989 | Iwasa et al. | 354/400 |
| 5,016,993 | 5/1991 | Akitake | 396/79 |
| 5,028,773 | 7/1991 | Hata | 396/79 |
| 5,144,494 | 9/1992 | Sekiguchi . | |
| 5,153,626 | 10/1992 | Yamamoto | 354/187 |
| 5,170,201 | 12/1992 | Akiyama et al. | 354/400 |
| 5,196,879 | 3/1993 | Hata | 396/82 |
| 5,267,085 | 11/1993 | Sasaki et al. | 396/82 |

FOREIGN PATENT DOCUMENTS

| | | |
|---|---|---|
| 3-200907 | 9/1991 | Japan . |
| 04005607 | 1/1992 | Japan . |
| 7-49448 | 2/1995 | Japan . |

*Primary Examiner*—Russell E. Adams
*Attorney, Agent, or Firm*—Burns, Doane, Swecker & Mathis, LLP

[57] ABSTRACT

In a lens barrel of a zoom lens, a luminous flux is divided or its path is switched so that the same luminous flux is directed to both a taking optical system and a finer optical system. Focusing and camera shake compensation are performed before division of the luminous flux or switching of its path so that images observed through a finder are already in focus and compensated for camera shakes. The lens barrel has multiple movable segments to allow the taking optical system and the finder optical system to be moved out simultaneously. To achieve zooming, a holding member for holding both a focusing lens unit and other lens units is moved so that all these lens units are moved simultaneously. Adjustment of the focusing lens unit, necessitated as a result of zooming, is achieved by moving a part of the focusing lens unit within the holding member.

11 Claims, 75 Drawing Sheets

32　32　32　30

32    32    32    30

P1a

P1b

FIG.104
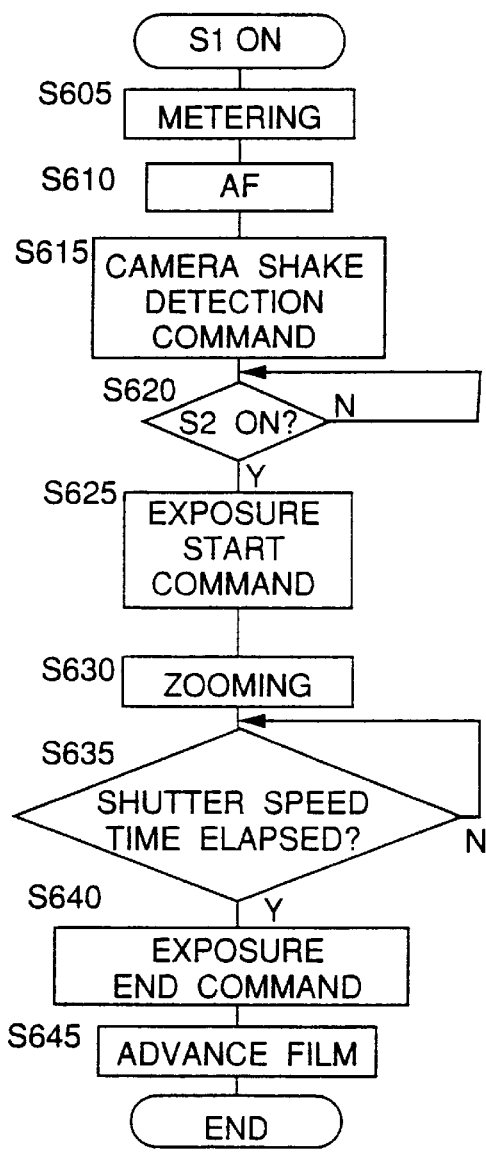
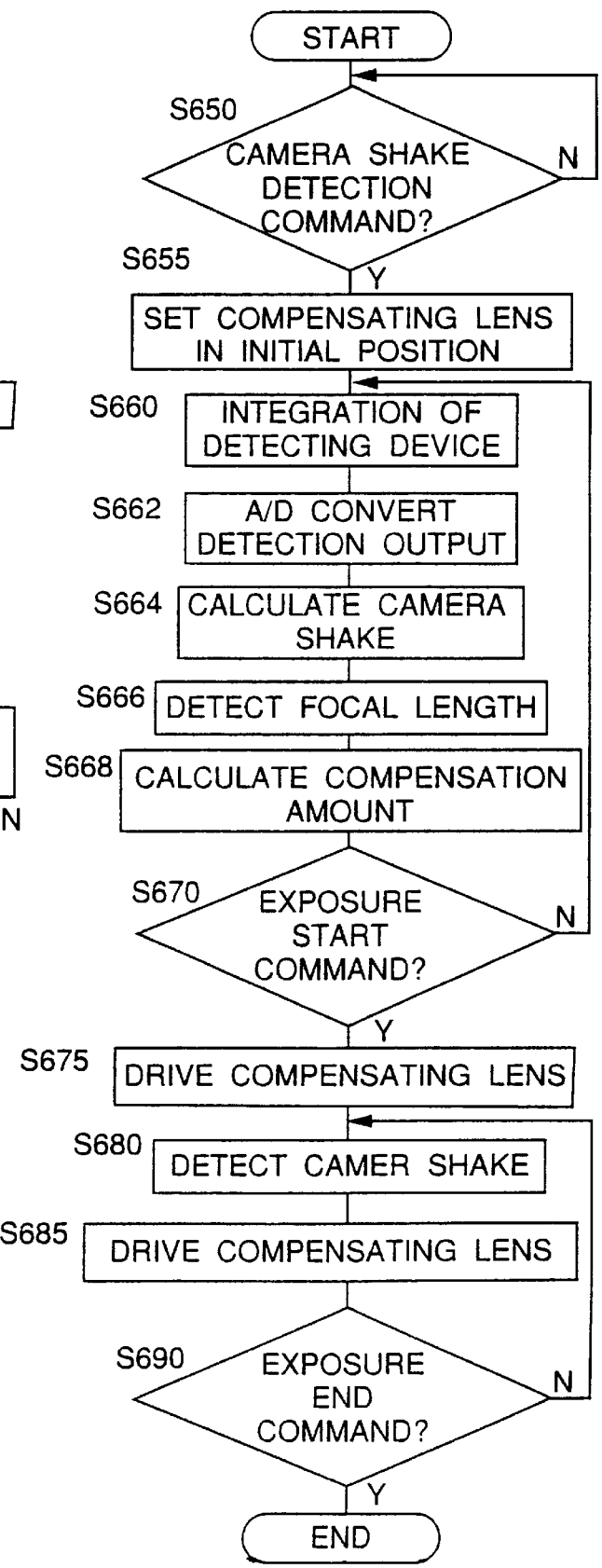

LENS BARREL AND CAMERA PROVIDED WITH A LENS BARREL

BACKGROUND OF THE INVENTION

1. Field of the Invention

The present invention relates to a lens barrel and a camera provided with a lens barrel, and more particularly to a camera provided with a lens barrel that is capable of both zooming and focusing. Alternatively, the present invention relates to a camera provided with a taking optical system and a finder optical system, or to a lens barrel for use in such a camera. Alternatively, the present invention relates to a camera provided with a lens barrel having two or more movable segments.

2. Description of the Prior Art

Conventionally, a lens barrel that is designed to be capable of both zooming and focusing is provided with separate zooming and focusing mechanisms. For this reason, in order to allow the two mechanisms to operate independently, it is essential to design a construction in which the two mechanisms do not interfere with each other. Moreover, since the two mechanisms each require separate components, such a lens barrel inevitably requires a larger number of components. Furthermore, since the two mechanisms need to be accommodated, there is a limit to the reduction of the size of such a lens barrel.

On the other hand, in a camera, a taking optical system and a finder optical system are conventionally provided separately. Alternatively, the finder optical system is formed by splitting, in the camera main body, a luminous flux passing through the taking optical system and directing a portion of the luminous flux toward the finder optical system. For these reasons, in the former case, a large parallax arises between the taking optical system and the finder optical system, and, in the latter case, a mechanism for splitting the luminous flux is additionally necessary inside the camera main body.

Furthermore, in a lens barrel having two or more movable segments or in a camera provided with such a lens barrel, great care needs to be taken, when the lens barrel is moved out, not to cause camera shakes due to unstable weight balance of the camera.

SUMMARY OF THE INVENTION

An object of the present invention is to provide a construction which, despite being capable of both zooming and focusing, can be realized in a simple construction. Another object of the present invention is to provide a construction which, despite being capable of both zooming and focusing, allows reduction of the number of components. A still another object of the present invention is to provide a construction which, despite being capable of both zooming and focusing, allows more effective reduction of the size.

A further object of the present invention is to provide a construction which can reduce parallax to a minimum without using a mechanism for splitting a luminous flux in a camera main body.

A still further object of the present invention is to provide a construction which, despite having two or more movable segments, can reduce camera shakes to a minimum.

To achieve the above objects, according to one aspect of the present invention, a camera is provided with a first lens unit used for focusing; a focusing mechanism for driving the first lens unit; a second lens unit; a holding member for holding the first and second lens units; a zooming mechanism for driving the holding member; and a controller for performing zooming by controlling the zooming mechanism to drive the holding member and by controlling the focusing mechanism to move the first lens unit relative to the second lens unit.

According to another aspect of the present invention, a camera is provided with a first lens unit; a second lens unit; a first driving mechanism for driving both of the first and second lens units; a second driving mechanism for moving the first lens unit relative to the second lens unit; and a controller for performing zooming by actuating the first and second driving mechanisms simultaneously and for performing focusing by actuating the second driving mechanism independently.

BRIEF DESCRIPTION OF THE DRAWINGS

This and other objects and features of this invention will become clear from the following description, taken in conjunction with the preferred embodiments with reference to the accompanied drawings in which:

FIG. 104 is a flowchart of a processing of camera shake compensation in during-exposure zooming.

DESCRIPTION OF THE PREFERRED EMBODIMENTS

Hereinafter, a camera embodying the present invention will be described with reference to the drawings. While examples of the luminous flux splitter include a semi-transparent mirror such as a pellicle mirror and a half mirror, and a prism having a semi-transparent reflecting surface (see FIG. 32), the luminous flux splitter of the present invention is not limited thereto. Any types of luminous flux splitter capable of splitting the luminous flux may be used. In the subsequent description, a half mirror will be taken as an example of the luminous flux splitter. While examples of the optical path switcher include an up-down total reflecting mirror, the optical path switcher of the present invention is not limited thereto. Any types of optical path switcher capable of switching the optical path may be used. In the subsequent description, an up-down total reflecting mirror will be taken as an example of the optical path switcher.

<<Optical Arrangement of Camera>>

The optical arrangement of the camera embodying the present invention will be described with reference to the schematic views of FIGS. 1 to 22. In the embodiments described below, the same and corresponding elements are denoted by the same reference designations and each element will be described only once to avoid duplication.
<Basic Arrangement of Luminous Flux Splitting Type (FIG. 1)>

Figure 1:
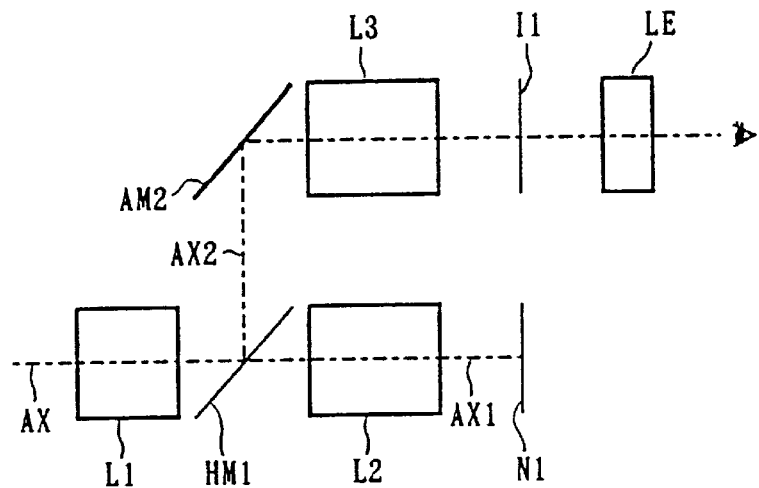
FIG. 1 schematically shows an embodiment of a camera having a basic arrangement of a luminous flux spitting type.

The optical system of the camera shown in FIG. 1 includes: a taking optical system comprising from the subject side a front lens unit L1, a half mirror HM1 and a taking optical system rear lens unit L2; and a finder optical system comprising the front lens unit L1, the half mirror HM1, a total reflecting mirror AM2, a finder optical system rear lens unit L3 and an eyepiece LE. The front lens unit L1 is common to the taking optical system and to the finder optical system. The taking optical system forms a subject image on a film surface N1, whereas the finder optical system forms a primary image in the position of a primary image plane I1. In FIG. 1, AX represents the optical axis of the front lens unit L1, AX1 represents the optical axis of the taking optical system rear lens unit L2, and AX2 represents the optical axis of the finder optical system from the half mirror HM1.

The half mirror HM1 disposed between the front lens unit L1 and the taking optical system rear lens unit L2 splits the luminous flux incident on the taking optical system into a taking luminous flux which is a transmitted luminous flux and a finder luminous flux which is a reflected luminous flux in the middle of the taking optical system (i.e. between the front lens unit L1 and the taking optical system rear lens unit L2). The taking luminous flux and the finder luminous flux thus obtained are optically equivalent. The luminous flux split into the two luminous fluxes by the half mirror HM1 is a luminous flux having been incident on the taking optical system (i.e. a luminous flux having passed through the front lens unit L1). Therefore, no parallax is caused between the taking optical system and the finder optical system. Furthermore, since the finder image never blacks out even during film exposure, an image equivalent to the image formed on the film surface N1 is always viewed through the finder. Moreover, since the luminous flux is split in the middle of the taking optical system, the back focus is reduced, so that the internal arrangement of the camera is made compact. As a result, the size of the camera is reduced.

The taking optical system and the finder optical system are zoom optical systems. Zooming of the taking optical system is performed by moving the front lens unit L1, the half mirror HM1 and the taking lens system rear lens unit L2. Zooming of the finder optical system is performed by moving the finder optical system rear lens unit L3 (i.e. by the movement equivalent to that of the taking optical system rear lens unit L2).

The half mirror HM1 is disposed so as to be movable along the optical axes AX and AX1 of the taking optical system. As described above, the elements L1, HM1 and L2 are moved along the optical axes AX and AX1 during zooming. If a stationary half mirror HM1 is provided in the middle of the taking optical system, the zooming movement of the front lens unit L1 and the taking optical system rear lens unit L2 is limited. In this embodiment, however, since the half mirror HM1 is moved during zooming as described above, the zooming movement of the taking optical system is never limited.

Focusing is performed by moving the front lens unit L1. Since focusing is performed before the luminous flux is split, focus condition can be confirmed through the finder without the finder optical system rear lens unit L3 being moved for focusing. If the front lens unit L1 is used as a camera shake compensating optical system, the luminous flux is split after camera shake compensation has been made, so that the results of the camera shake compensation can be confirmed through the finder. Since the finder image never blacks out even during zooming as described above, the focus condition and the compensation results can continuously be confirmed through the finder. Thus, since camera shake compensation is continuously made after automatic focusing is performed, the user can go on to a release operation while confirming the results of the camera shake compensation to find that a picture without any blur has been taken.

While focusing is performed by moving the front lens unit L1 as described above in this embodiment, a focusing method such as internal focusing and rear focusing may be employed for this arrangement. If a stationary half mirror HM1 is provided in the middle of the taking optical system, the focusing movement of the taking optical system is limited. In this embodiment, however, since the half mirror HM1 is movable as described above, the luminous flux is split while the half mirror HM1 is being moved along the optical axes AX and AX1 without interrupting the focusing movement of the taking optical system. Thus, the focusing movement of the taking optical system is never limited.

The surface of the half mirror HM1 for splitting the luminous flux must be of a size corresponding to the greatest diameter of the luminous flux during focusing and zooming. According to the embodiment shown in FIG. 1, however, the luminous flux can be split at a point where its diameter is smallest (for example, in the vicinity of the aperture stop) by moving the half mirror HM1 along the optical axes AX and AX1. By thus reducing the size of the surface for splitting the luminous flux, the size of the half mirror HM1 is reduced. For example, when the front lens unit L1 is a diverging optical system, the diameter of the luminous flux incident on the half mirror HM1 increases as the front lens unit L1 moves away from the half mirror HM1. However, by providing the movable half mirror HM1 as described above, the luminous flux can be split at a point where its diameter is smallest. By thus reducing the size of the surface for splitting the luminous flux to reduce the size of the half mirror HM1, the internal arrangement of the camera is made compact, so that the size of the camera is reduced.

When a shutter which also serves as the aperture stop is used in the embodiment shown in FIG. 1, it is preferable to dispose the half mirror HM1 in the front vicinity of the shutter so as to be movable together with the shutter along the optical axes AX and AX1 of the taking optical system. With this arrangement, the luminous flux is split while the half mirror HM1 and the shutter are being moved along the optical axes AX and AX1 without interrupting the movement of the taking optical system, so that a camera is realized where the focusing and zooming movements of the taking optical system are not limited. Moreover, since the luminous flux is split by the half mirror HM1 after having been incident on the taking optical system, no parallax is caused. Further, since the back focus and the size of the surface for splitting the luminous flux are reduced, the size of the camera is reduced.

<Luminous Flux Splitting Type Having Relay Lens in Finder Optical System (FIG. 2)>

Figure 2:
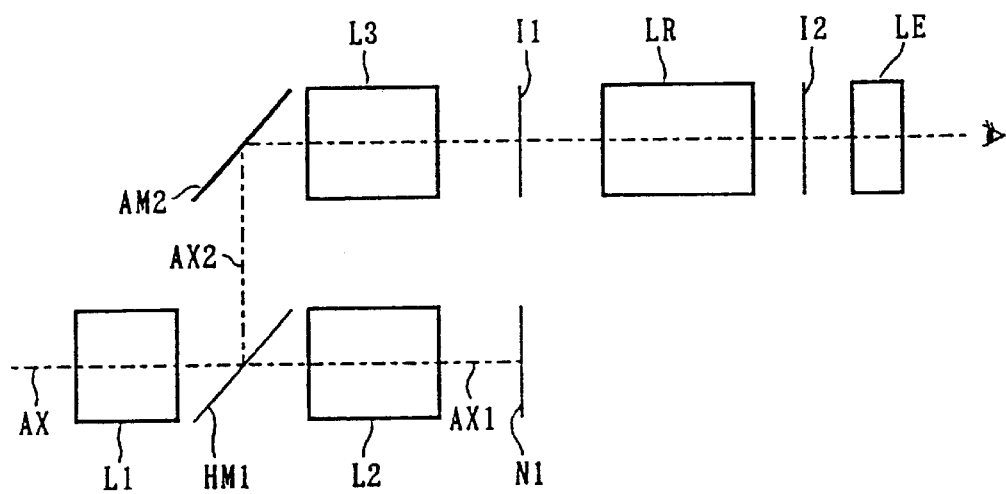
FIG. 2 schematically shows an embodiment of a luminous flux splitting type camera having a relay lens in a finder optical system.

The optical system of the camera shown in FIG. 2 includes, in addition to the elements of the above-described optical system of FIG. 1, a relay lens LR disposed between the finder optical system rear lens unit L3 and the eyepiece LE. The relay lens LR re-forms the primary image formed in the position of the primary image plane I1 to form a secondary image in the position of a secondary image plane I2. The secondary image is viewed through the eyepiece LE. Thus, since the relay lens LR effectively directs the luminous flux to the eyepiece LE, a bright image equivalent to the image formed on the film surface N1 by the taking luminous flux is viewed through the finder.

<Basic Arrangement of Optical Path Switching Type (FIG. 3)>

Figure 3:
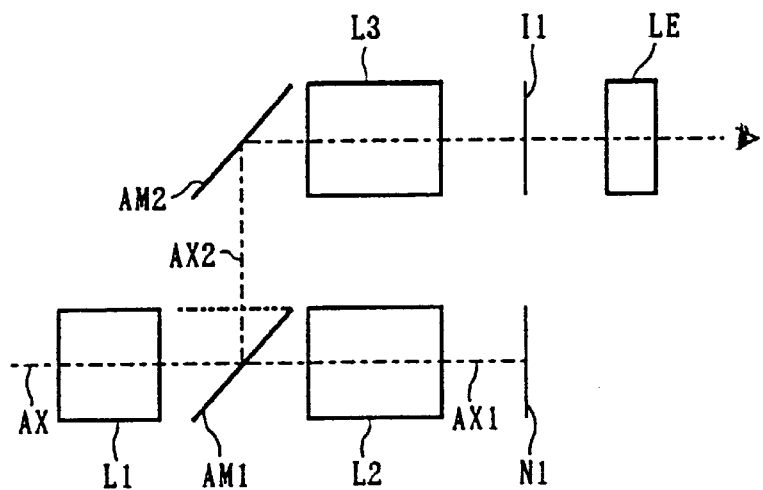
FIG. 3 schematically shows an embodiment of a camera having a basic arrangement of an optical path switching type.

The optical system of the camera shown in FIG. 3 has the same arrangement as that of the optical system shown in FIG. 1 except that an up-down total reflecting mirror AM1 is used instead of the half mirror HM1. Specifically, the optical system includes: a taking optical system comprising from the subject side the front lens unit L1, the total reflecting mirror AM1 and the taking optical system rear lens unit L2; and the finder optical system comprising the front lens unit L1, the total reflecting mirror AM1, a total reflecting mirror AM2, the finder optical system rear lens unit L3 and the eyepiece LE. The front lens unit L1 is common to the taking optical system and to the finder optical system. When the total reflecting mirror AM1 is in its raised position, a subject image is formed on the film surface N1 by the taking optical system. When the total reflecting mirror AM1 is in its lowered position, a primary image is formed in the position of the primary image plane I1 by the finder optical system.

The total reflecting mirror AM1 disposed between the front lens unit L1 and the taking optical system rear lens unit L2 switches the optical path of the luminous flux incident on the taking optical system between the optical path of the taking luminous flux and the optical path of the finder luminous flux (reflected luminous flux) in the middle of the taking optical system (i.e. between the front lens unit L1 and the taking optical system rear lens unit L2). The taking luminous flux and the finder luminous flux thus obtained are optically equivalent. The luminous flux whose optical path is switched between the two optical paths by the total reflecting mirror AM1 is a luminous flux having been incident on the taking optical system (i.e. luminous flux having passed through the front lens unit L1). Therefore, no parallax is caused between the taking optical system and the finder optical system. Moreover, since the optical path is switched in the middle of the taking optical system, the back focus is reduced, so that the internal arrangement of the camera is made compact. As a result, the size of the camera is reduced.

The taking optical system and the finder optical system are zoom optical systems. Zooming of the taking optical system is performed by moving the front lens unit L1, the total reflecting mirror AM1 and the taking lens system rear lens unit L2. Zooming of the finder optical system is performed by moving the finder optical system rear lens unit L3 (i.e. by the movement equivalent to that of the taking optical system rear lens unit L2).

The total reflecting mirror AM1 is disposed so as to be movable along the optical axes AX and AX1 of the taking optical system. As described above, the elements L1, AM1 and L2 are moved along the optical axes AX and AX1 during zooming. If a stationary total reflecting mirror AM1 is provided in the middle of the taking optical system, the zooming movement of the front lens unit L1 and the taking optical system rear lens unit L2 is limited. In this embodiment, however, since the total reflecting mirror AM1 is moved during zooming as described above, the zooming movement of the taking optical system is never limited.

Focusing is performed by moving the front lens unit L1. Since focusing is performed before the optical path is switched, focus condition can be confirmed through the finder without the finder optical system rear lens unit L3 being moved for focusing. If the front lens unit L1 is used as a camera shake compensating optical system, the optical path is switched after camera shake compensation has been made, so that the results of the camera shake compensation can be confirmed through the finder.

While focusing is performed by moving the front lens unit L1 as described above in this embodiment, a focusing method such as internal focusing and rear focusing may be employed for this arrangement. If a stationary total reflecting mirror AM1 is provided in the middle of the taking optical system, the focusing movement of the taking optical system is limited. In this embodiment, however, since the total reflecting mirror AM1 is movable as described above, the optical path is switched while the total reflecting mirror AM1 is being moved along the optical axes AX and AX1 without interrupting the focusing movement of the taking optical system. Thus, the focusing movement of the taking optical system is never limited.

The surface of the total reflecting mirror AM1 for switching the optical path must be of a size corresponding to the greatest diameter of the luminous flux during focusing and zooming. According to the embodiment shown in FIG. 3, however, the optical path can be switched at a point where the diameter of the luminous flux is smallest (for example, in the vicinity of the aperture stop) by moving the total reflecting mirror AM1 along the optical axes AX and AX1. By thus reducing the size of the surface for switching the optical path, the size of the total reflecting mirror AM1 is reduced. For example, when the front lens unit L1 is a diverging optical system, the diameter of the luminous flux incident on the total reflecting mirror AM1 increases as the front lens unit L1 moves away from the total reflecting mirror AM1. However, by providing the movable total reflecting mirror AM1 as described above, the optical path can be switched at a point where the diameter of the luminous flux is smallest. By thus reducing the size of the surface for switching the optical path to reduce the size of the total reflecting mirror AM1, the size of the camera is reduced.

When a shutter which also serves as the aperture stop is used in the embodiment shown in FIG. 3, it is preferable to dispose the total reflecting mirror AM1 in the front vicinity of the shutter so as to be movable together with the shutter along the optical axes AX and AX1 of the taking optical system. With this arrangement, the optical path is switched while the total reflecting mirror AM1 and the shutter are being moved along the optical axes AX and AX1 without interrupting the movement of the taking optical system, so that a camera is realized where the focusing and zooming movements of the taking optical system are not limited. Moreover, since the optical path of the luminous flux is switched by the total reflecting mirror AM1 after the luminous flux has been incident on the taking optical system also, no parallax is caused. Further, since the back focus and the size of the surface for switching the optical path are reduced, the size of the camera is reduced.

<Optical Path Switching Type Having Relay Lens in Finder Optical System (FIG. 4)>

Figure 4:
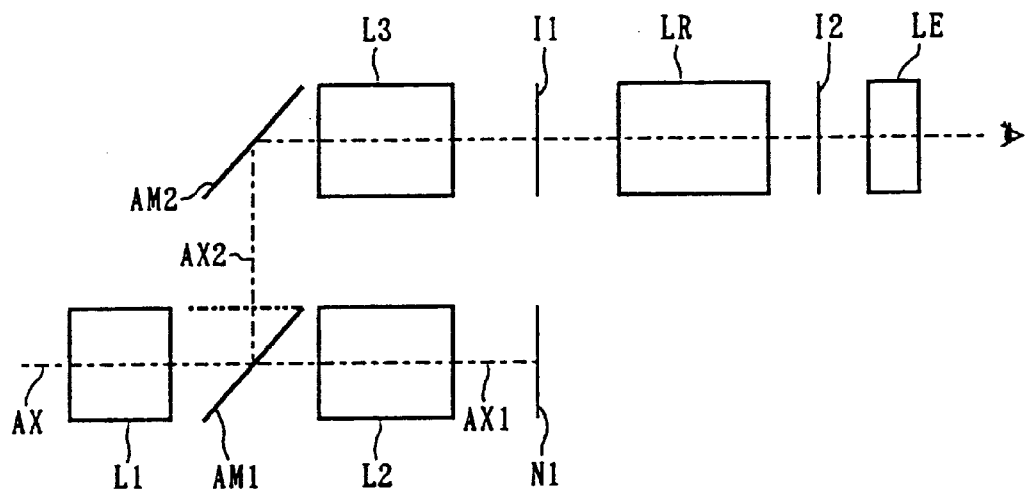
FIG. 4 schematically shows an embodiment of an optical path switching type camera having a relay lens in a finder optical system.

The optical system of the camera shown in FIG. 4 includes, in addition to the elements of the above-described optical system of FIG. 3, the relay lens LR disposed between the finder optical system rear lens unit L3 and the eyepiece LE. The relay lens LR re-forms the primary image formed in the position of the primary image plane I1 to form a secondary image in the position of the secondary image plane I2. The secondary image is viewed through the eyepiece LE. Thus, since the relay lens LR effectively directs the luminous flux to the eyepiece LE, a bright image equivalent to the image formed on the film surface N1 by the taking luminous flux is viewed through the finder.

<Luminous Flux Splitting Type Having Diffusing Plate and Photometric Device (FIG. 5)>

Figure 5:
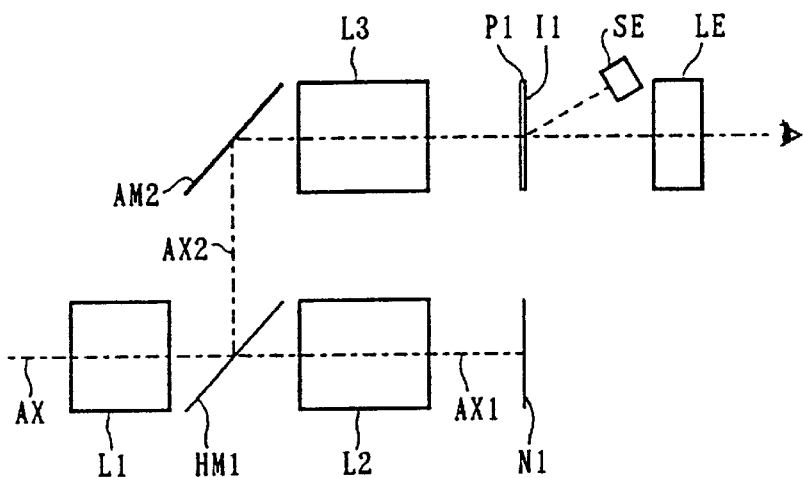
FIG. 5 schematically shows an embodiment of a luminous flux splitting type camera having a diffusing plate and a metering device.

The optical system of the camera shown in FIG. 5 includes, in addition to the elements of the optical system shown in FIG. 1, a diffusing plate P1 disposed in the position of the primary image plane I1 (P1 may be disposed in the vicinity of the primary image plane I1) and a photometric device SE for performing photometry by use of light from the diffusing plate P1. Since a primary image equivalent to an image formed by the taking luminous flux is formed on the diffusing plate P1, focus condition of the taking optical system can be confirmed through the finder. Since the diffusing plate P1 is used, focus condition of the taking optical system can be confirmed. Moreover, since photometry is performed by use of light from the diffusing plate P1, the photometric luminous flux is more flexibly taken out, so that the flexibility of position of the photometric device SE increases.

<Luminous Flux Splitting Type Having Diffusing Plate, Photometric Device and Relay Lens (FIG. 6)>

Figure 6:
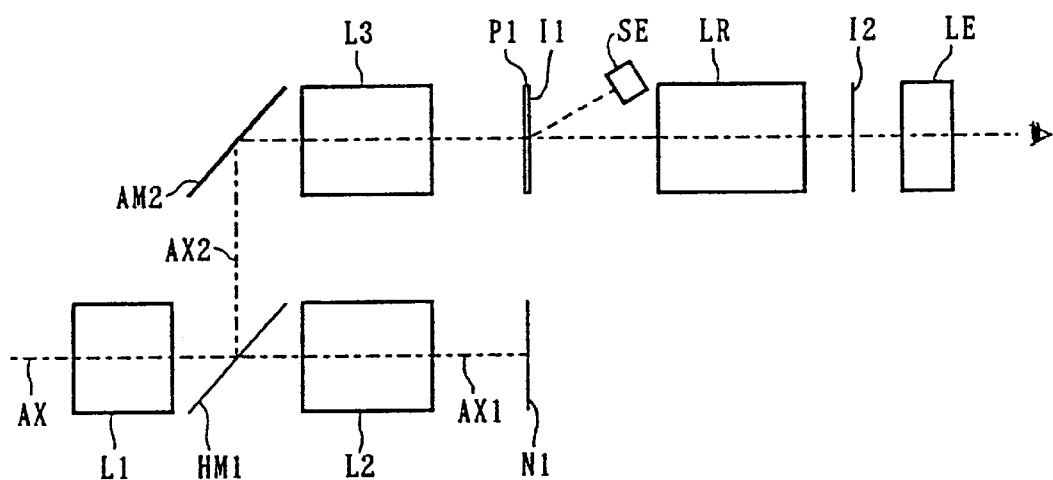
FIG. 6 schematically shows an embodiment of a luminous flux splitting type camera having a diffusing plate, a metering device and a relay lens.

The optical system of the camera shown in FIG. 6 includes, in addition to the elements of the above-described optical system of FIG. 5, the relay lens LR disposed between the diffusing plate P1 and the eyepiece LE. The relay lens LR re-forms the primary image formed in the position of the primary image plane I1 to form a secondary image in the position of the secondary image plane I2. Since the secondary image formed by the relay lens LR is viewed through the eyepiece LE, light from the diffusing plate P1 is effectively directed to the eyepiece LE. Consequently, a bright image equivalent to the image formed on the film surface N1 by the taking luminous flux is viewed through the finder.

<Optical Path Switching Type Having Diffusing Plate and Photometric Device (FIG. 7)>

Figure 7:
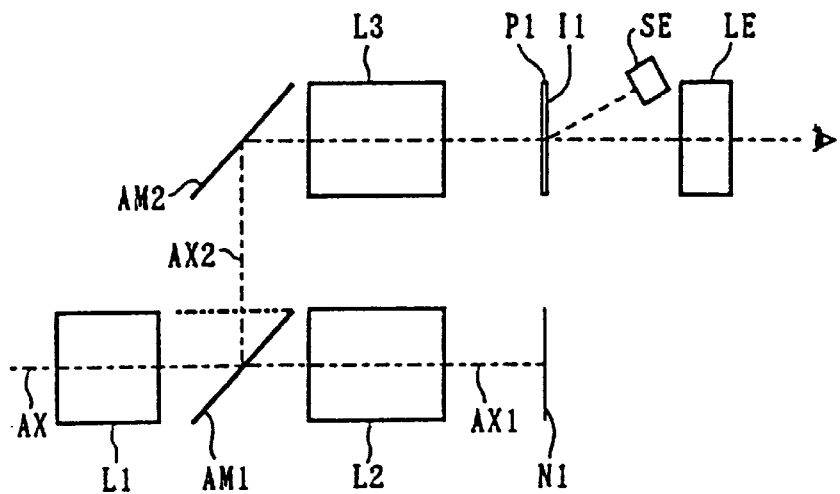
FIG. 7 schematically shows an embodiment of an optical path switching type camera having a diffusing plate and a metering device.

The optical system of the camera shown in FIG. 7 has the same arrangement as that of the above-described optical system shown in FIG. 5 except that the up-down total reflecting mirror AM1 is used instead of the half mirror HM1. Therefore, the workings and advantages according to the modification in arrangement are similar to those of the above-described optical system shown in FIG. 3.

<Optical Path Switching Type Having Diffusing Plate, Photometric Device and Relay Lens (FIG. 8)>

Figure 8:
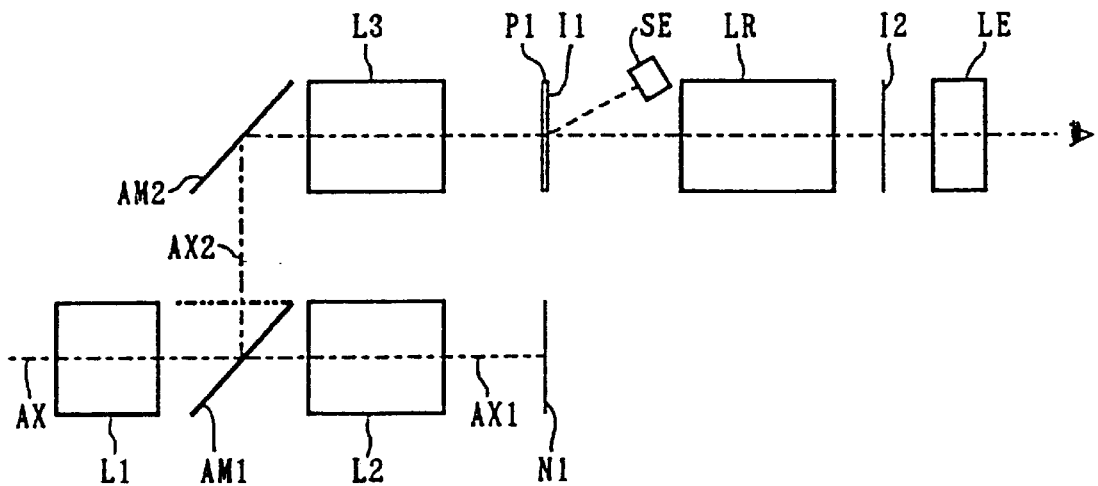
FIG. 8 schematically shows an embodiment of an optical path switching type camera having a diffusing plate, a metering device and a relay lens.

The optical system of the camera shown in FIG. 8 has the same arrangement as that of the above-described optical system shown in FIG. 6 except that the up-down total reflecting mirror AM1 is used instead of the half mirror HM1. Therefore, the workings and advantages according to the modification in arrangement are similar to those of the above-described optical system shown in FIG. 4.

<Luminous Flux Splitting Type Having Focus Condition Detecting Device (FIG. 9)>

Figure 9:
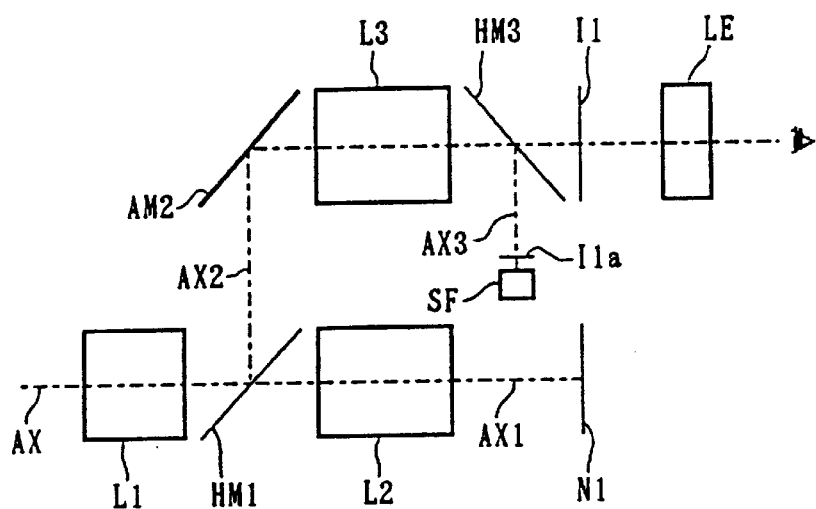
FIG. 9 schematically shows an embodiment of a luminous flux splitting type camera having a focus condition detecting device.

The optical system of the camera shown in FIG. 9 includes, in addition to the elements of the above-described optical system shown in FIG. 1, a half mirror HM3 disposed between the finder optical system rear lens unit L3 and the primary image plane I1, and a focus condition detecting device SF for detecting focus condition by use of a focus condition detecting luminous flux taken out by the half mirror HM3. In FIG. 9, AX3 represents the optical axis of the focus condition detecting system, and I1a represents a primary image plane equivalent to the primary image plane I1.

By disposing the focus condition detecting device SF in the finder optical system in the luminous flux splitting type optical system as described above, focus detection is enabled even during film exposure, so that the subject is always in focus. Moreover, an autofocus (AF) mirror is unnecessary which is typically disposed at the bottom of a mirror box to direct the focus condition detecting luminous flux to the focus condition detecting device SF in conventional arrangements, so that a mechanism for retracting the AF mirror is also unnecessary. Since the AF mirror retracting mechanism is unnecessary, the internal mechanism of the camera is simplified, and by the focus condition detecting device SF, focus condition is detected with high accuracy.

By using the focus condition detecting device SF also as the photometric device, space is saved. For example, by detecting focus condition according to the contrast detection method or the phase difference detection method by use of a charge coupled device (CCD), the focus condition detecting system and the photometric system are realized as one device, so that the internal arrangement of the camera is made compact. As a result, the size and cost of the camera is reduced.

\<Luminous Flux Splitting Type Having Focus Condition Detecting Device and Relay Lens (FIG. 10)\>

Figure 10:
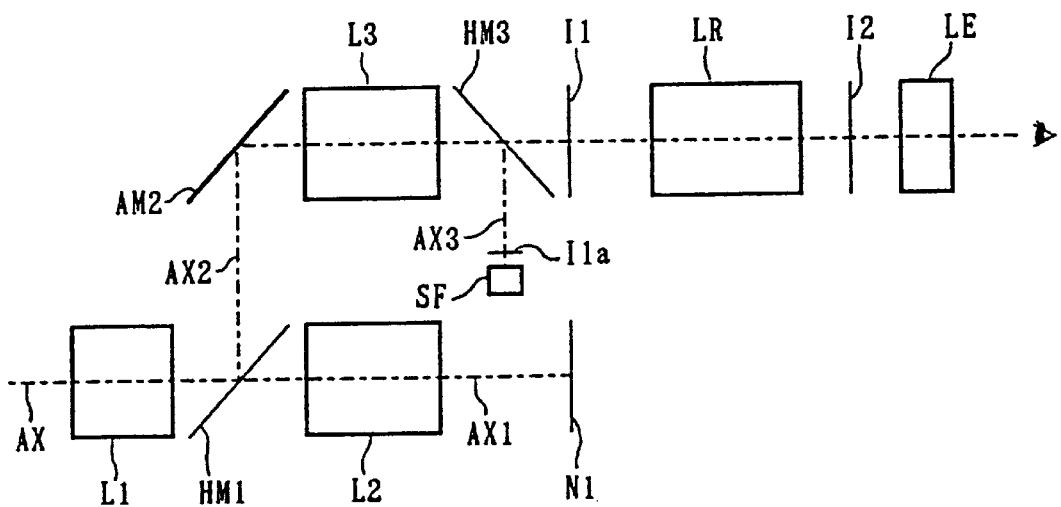
FIG. 10 schematically shows an embodiment of a luminous flux splitting type camera having a focus condition detecting device and a relay lens.

The optical system of the camera shown in FIG. 10 includes, in addition to the elements of the above-described optical system of FIG. 9, the relay lens LR disposed between the primary image plane I1 and the eyepiece LE. The relay lens LR re-forms the primary image formed in the position of the primary image plane I1 to form a secondary image in the position of the secondary image plane I2. The secondary image is viewed through the eyepiece LE. Thus, since the relay lens LR effectively directs the luminous flux to the eyepiece LE, a bright image equivalent to the image formed on the film surface N1 by the taking luminous flux is viewed through the finder.

The arrangement in which the focus condition detecting device SF is disposed in the vicinity of the primary image plane I1a equivalent to the primary image plane I1 is advantageous over an arrangement in which the focus condition detecting device SF is disposed in the vicinity of the secondary image plane I2 in that the accuracy of the focus condition detection is not readily affected by errors such as mounting errors. Thus, in this arrangement, focus condition is detected with higher accuracy than in the arrangement in which the focus condition detecting device SF is disposed in the vicinity of the secondary image plane I2. Further, the focus condition detecting device SF is easily correlated with the taking optical system in this arrangement.

\<Optical Path Switching Type Having Focus Condition Detecting Device (FIG. 11)\>

Figure 11:
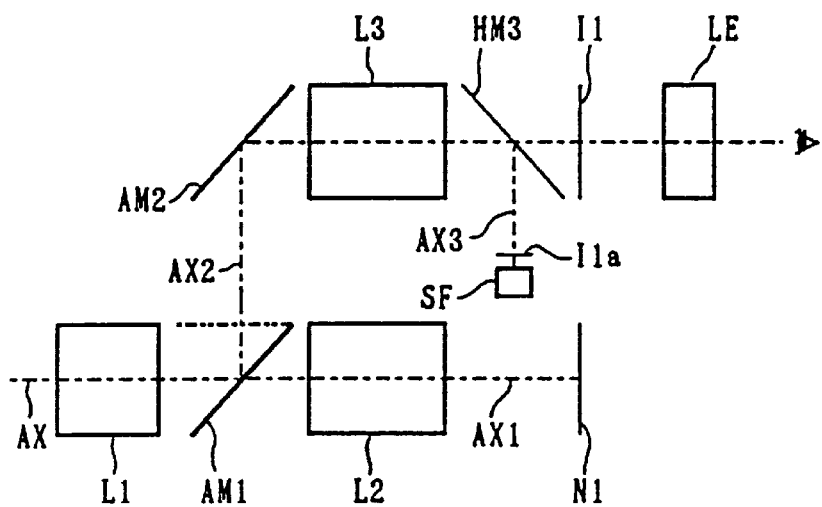
FIG. 11 schematically shows an embodiment of an optical path switching type camera having a focus condition detecting device.

The optical system of the camera shown in FIG. 11 has the same arrangement as that of the above-described optical system shown in FIG. 9 except that the up-down total reflecting mirror AM1 is used instead of the half mirror HM1. Therefore, the workings and advantages according to the modification in arrangement are similar to those of the above-described optical system shown in FIG. 3.

\<Optical Path Switching Type Having Focus Condition Detecting Device and Relay Lens (FIG. 12)\>

Figure 12:
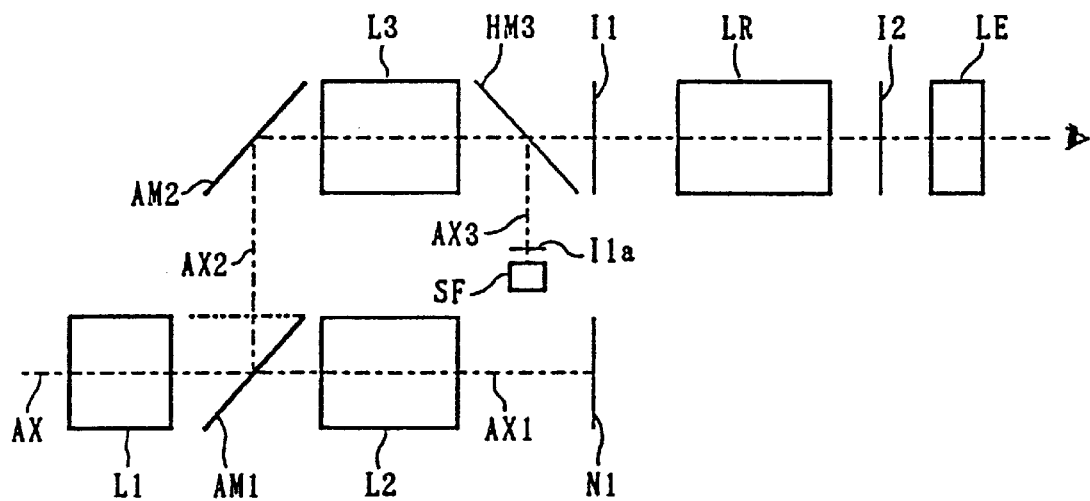
FIG. 12 schematically shows an embodiment of an optical path switching type camera having a focus condition detecting device and a relay lens.

The optical system of the camera shown in FIG. 12 has the same arrangement as that of the above-described optical system shown in FIG. 10 except that the up-down total reflecting mirror AM1 is used instead of the half mirror HM1. Therefore, the workings and advantages according to the modification in arrangement are similar to those of the above-described optical system shown in FIG. 4.

\<Luminous Flux Splitting Type Having Area Sensor (FIG. 13)\>

Figure 13:
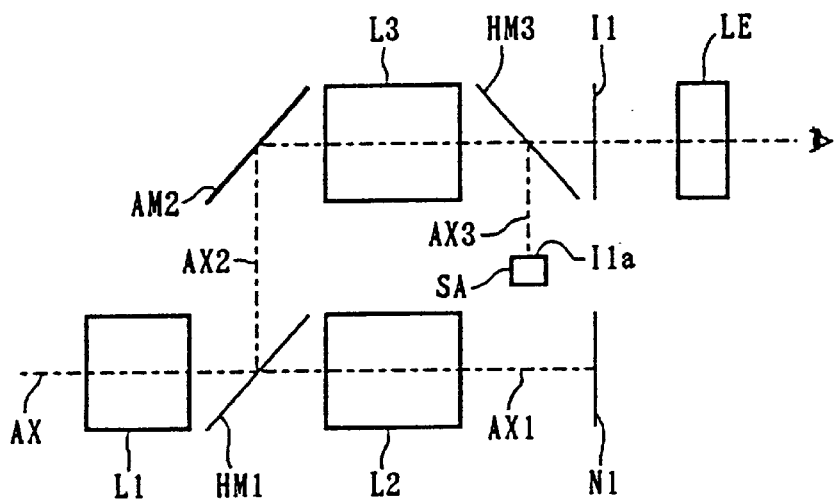
FIG. 13 schematically shows an embodiment of a luminous flux splitting type camera having an area sensor.

The optical system of the camera shown in FIG. 13 includes, in addition to the elements of the above-described optical system shown in FIG. 1, the half mirror HM3 disposed between the finder optical system rear lens unit L3 and the primary image plane I1, and an area sensor SA for detecting focus condition and camera shake by use of a sensor luminous flux taken out by the half mirror HM3. In FIG. 13, AX3 represents the optical axis of the area sensor system, and I1a represents a primary image plane equivalent to the primary image plane I1.

As described above, in the luminous flux splitting type optical system, for example, by disposing the area sensor SA comprising a CCD in the finder optical system, focus condition can be detected according to the contrast detection method or the phase difference detection method and camera shake (i.e. image blur) can be optically detected. Therefore, focus condition and camera shake can be continuously detected even during film exposure. Further, by using the output of the CCD for photometry, the area sensor can be used also as the photometric device. Thus, the number of functions of the camera is increased while the size and cost are decreased. Instead of the area sensor, a crosswise line sensor (i.e. cross sensor) may be used.

\<Luminous Flux Splitting Type Having Area Sensor and Relay Lens (FIG. 14)\>

Figure 14:
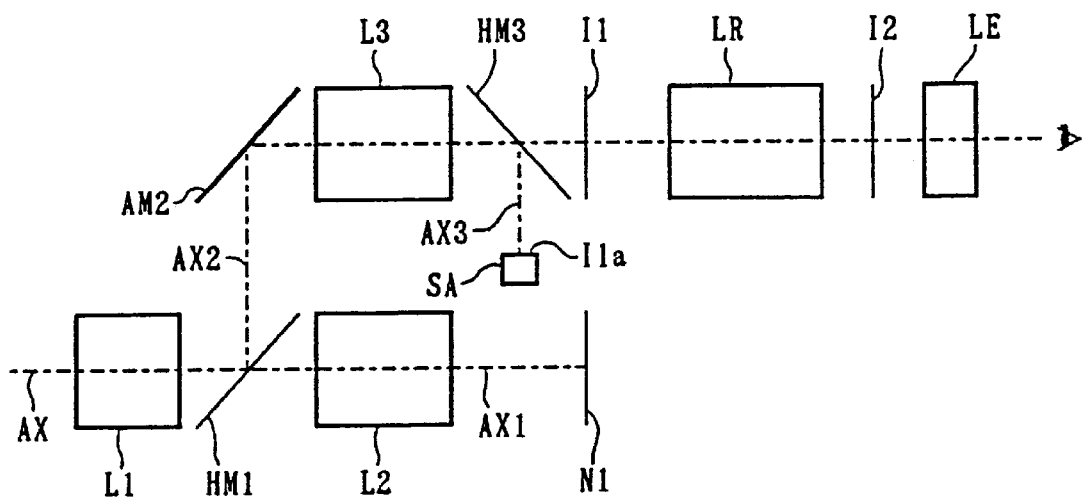
FIG. 14 schematically shows an embodiment of a luminous flux splitting type camera having an area sensor and a relay lens.

The optical system of the camera shown in FIG. 14 includes, in addition to the elements of the above-described optical system of FIG. 13, the relay lens LR disposed between the primary image plane I1 and the eyepiece LE. The relay lens LR re-forms the primary image formed in the position of the primary image plane I1 to form a secondary image in the position of the secondary image plane I2. The secondary image is viewed through the eyepiece LE. Thus, since the relay lens LR effectively directs the luminous flux to the eyepiece LE, a bright image equivalent to the image formed on the film surface N1 by the taking luminous flux is viewed through the finder.

The arrangement in which the area sensor SA is disposed in the vicinity of the primary image plane I1a equivalent to the primary image plane I1 is advantageous over an arrangement in which the area sensor SA is disposed in the vicinity of the secondary image plane I2 in that the accuracy of the focus condition detection and the camera shake detection is not readily affected by errors such as mounting errors. Thus, in this arrangement, focus condition and camera shake are detected with higher accuracy than in the arrangement in which the area sensor SA is disposed in the vicinity of the secondary image plane I2. Further, the area sensor SA is easily correlated with the taking optical system in this arrangement.

\<Luminous Flux Splitting Type Having Diffusing Plate, Light Receiving Device and Photometric Device (FIG. 15)\>

Figure 15:
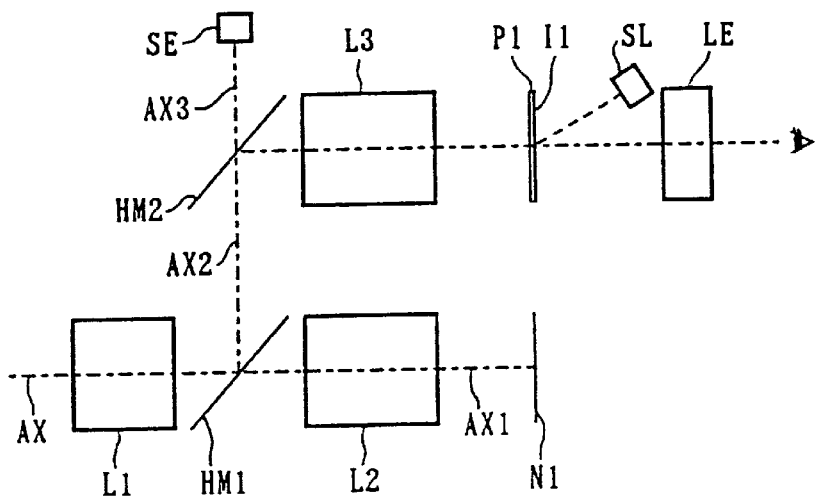
FIG. 15 schematically shows an embodiment of a luminous flux splitting type camera having a diffusing plate, a light receiving device and a metering device.

The optical system of the camera shown in FIG. 15 includes, in addition to the elements of the above-described optical system shown in FIG. 1, the diffusing plate P1 disposed in the position of the primary image plane I1 (P1 may be disposed in the vicinity of the primary image plane I1) and a light receiving device SL for performing photometry to obtain light adjustment data by use of light from the diffusing plate P1 at the time of flash light photography. Further, a half mirror HM2 is disposed instead of the total reflecting mirror AM2, and the photometric device SE is provided for performing steady light photometry by use of available light photometric luminous flux taken out from the finder luminous flux by the half mirror HM2.

Since a primary image equivalent to an image formed by the taking luminous flux is formed on the diffusing plate P1, focus condition of the taking optical system can be confirmed through the finder. Since the diffusing plate P1 is used, focus condition of the taking optical system can be confirmed. Moreover, since photometry for light adjustment is performed by use of light from the diffusing plate P1, the light adjustment luminous flux is more flexibly taken out, so that the flexibility of position of the light receiving device SL increases.

In accordance with a conventional method to perform light adjustment by use of light reflected from the film surface N1, since the reflectance of the film differs according to the types of the film, it is necessary to make delicate compensation according to the types of the film. In accordance with the arrangement of this embodiment, however, since the light reflected from the film surface N1 is not used, the compensation according to the types of the film is unnecessary. Consequently, in flash photography, it is possible to perform light adjustment independently of the reflectance of the film. Since the light receiving device SL continuously receives the finder luminous flux, light adjustment can be performed during film exposure in flash photography.

Since the light receiving device SL for light adjustment of flash photography and the photometric device SE for available light photometry are independent of each other, photometry can be performed which is most desirable for photography for which the device SL or SE is used. This arrangement may be modified so that either the light receiving device SL or the available light photometric device SE is used both for flash light adjustment and for available light photometry to thereby reduce the size and cost of the camera.

<Luminous Flux Splitting Type Having Diffusing Plate, Light Receiving Device, Photometric Device and Relay Lens (FIG. 16)>

Figure 16:
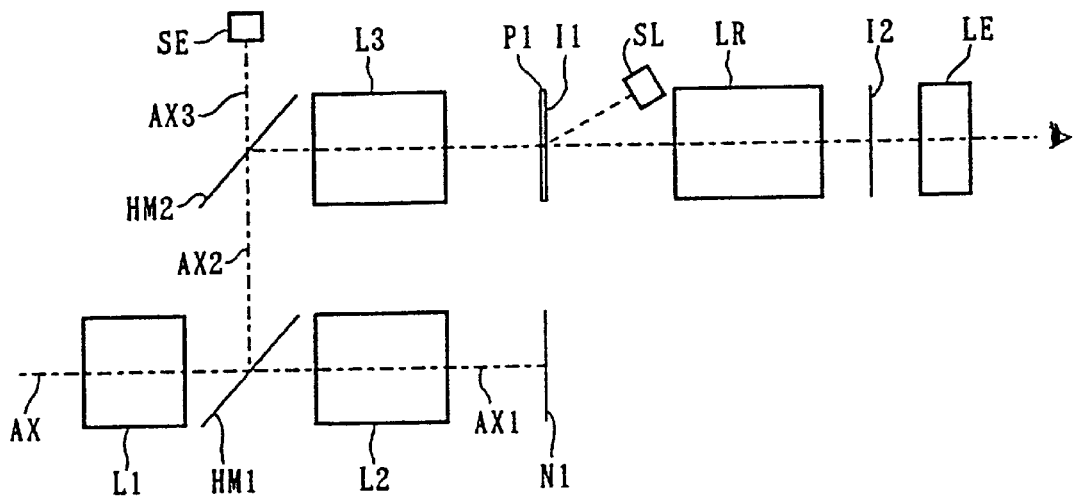
FIG. 16 schematically shows an embodiment of a luminous flux splitting type camera having a diffusing plate, a light receiving device, a metering device and a relay lens.

The optical system of the camera shown in FIG. 16 includes, in addition to the elements of the above-described optical system of FIG. 15, a relay lens LR disposed between the diffusing plate P1 and the eyepiece LE. The relay lens LR re-forms the primary image formed in the position of the primary image plane I1 to form a secondary image in the position of the secondary image plane I2. The secondary image is viewed through the eyepiece LE. Since the secondary image formed by the relay lens LR is viewed through the eyepiece LE, light from the diffusing plate P1 is effectively directed to the eyepiece LE. Consequently, a bright image equivalent to the image formed on the film surface N1 by the taking luminous flux is viewed through the finder.

<Optical Path Switching Type Having Diffusing Plate, Light Receiving Device and Photometric Device (FIG. 17)>

Figure 17:
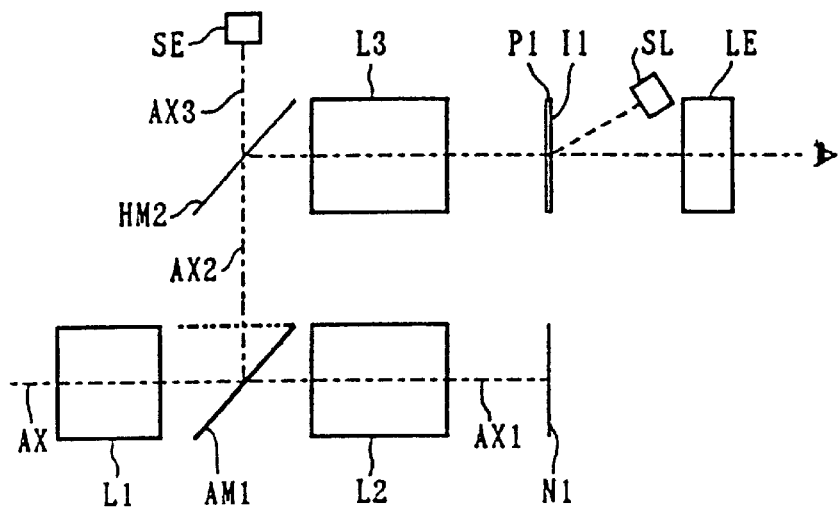
FIG. 17 schematically shows an embodiment of an optical path switching type camera having a diffusing plate, a light receiving device and a metering device.

The optical system of the camera shown in FIG. 17 has the same arrangement as that of the above-described optical system shown in FIG. 15 except that the up-down total reflecting mirror AM1 is used instead of the half mirror HM1. Therefore, the workings and advantages according to the modification in arrangement are similar to those of the above-described optical system shown in FIG. 3.

In this type of camera, however, since the light is all directed to the film surface N1 during film exposure, no light is incident on the finder, so that the finder image completely blacks out. Therefore, it is preferable that pre-emission of the flash be performed before the total reflecting mirror AM1 is raised and that the light reflected from the subject be monitored by the light receiving device SL to adjust the amount of emission necessary for film exposure based on the obtained data. This process will be described later.

<Optical Path Switching Type Having Diffusing Plate, Light Receiving Device, Photometric Device and Relay Lens (FIG. 18)>

Figure 18:
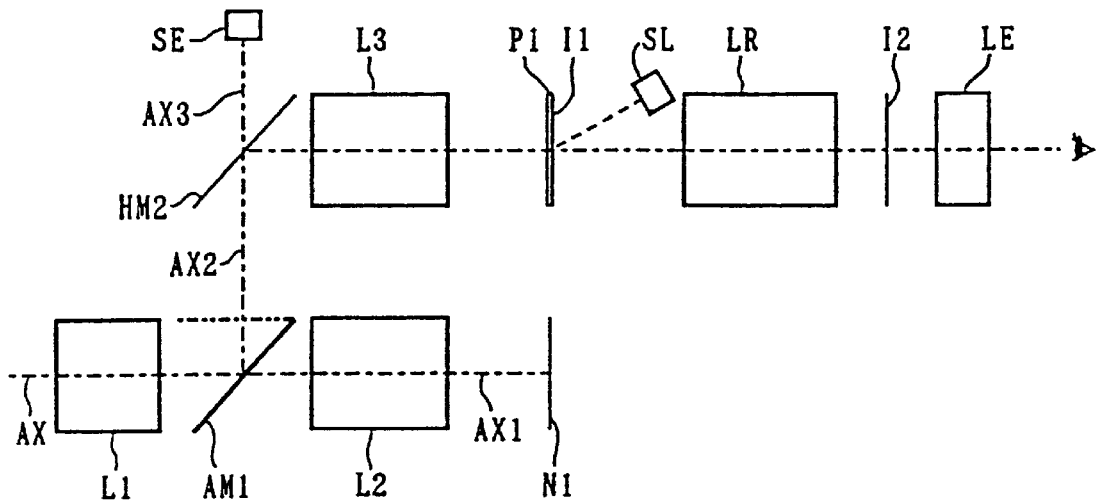
FIG. 18 schematically shows an embodiment of an optical path switching type camera having a diffusing plate, a light receiving device, a metering device and a relay lens.

The optical system of the camera shown in FIG. 18 has the same arrangement as that of the above-described optical system shown in FIG. 16 except that the up-down total reflecting mirror AM1 is used instead of the half mirror HM1. Therefore, the workings and advantages according to the modification in arrangement are similar to those of the above-described optical system shown in FIG. 4. The necessity of the pre-emission is as described above.

<Luminous Flux Splitting Type Having Photometric Device Above Half Mirror (FIG. 19)>

Figure 19:
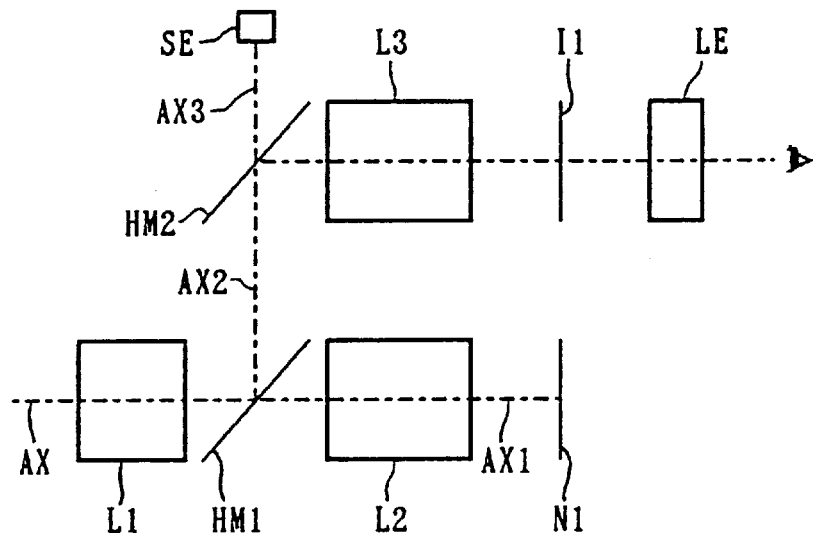
FIG. 19 schematically shows an embodiment of a luminous flux splitting type camera having a metering device above a half mirror.

The optical system of the camera shown in FIG. 19 includes, in addition to the elements of the above-described optical system shown in FIG. 1, the half mirror HM2 instead of the total reflecting mirror AM2, and the photometric device SE for performing photometry by use of the photometric luminous flux taken out by the half mirror HM2. The photometric device SE is disposed above the half mirrors HM1 and HM2. The half mirror HM2 is moved during zooming of the taking optical system. In FIG. 19, AX3 represents the optical axis of the photometric system.

As described above, by disposing the photometric device SE at a position above the half mirrors HM1 and HM2, where space is easily secured for an element, space can be saved. By this space-saving arrangement of the photometric device, the internal arrangement of the camera is made compact, so that the size of the camera is reduced. Since the photometric luminous flux taken out by the half mirror HM2 is part of the finder luminous flux, no parallax is caused between the finder optical system and the photometric system.

For example, when the front lens unit L1 is a diverging optical system, the diameter of the luminous flux incident on the half mirror HM2 increases as the front lens unit L1 moves away from the half mirror HM2. However, by providing the movable half mirror HM2 as described above, the luminous flux can be split at a point where its diameter is smallest. By thus reducing the size of the surface for splitting the luminous flux, the internal arrangement of the camera is made compact, so that the size of the camera is reduced.

Figure 23:
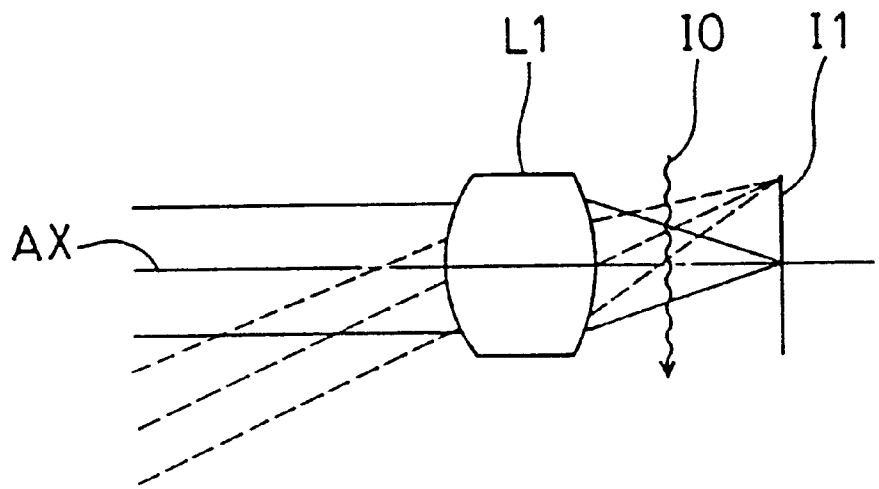
FIG. 23 is a view of assistance in explaining the light receiving position of the metering device in the embodiment of the camera shown in FIG. 19.
Figure 24:
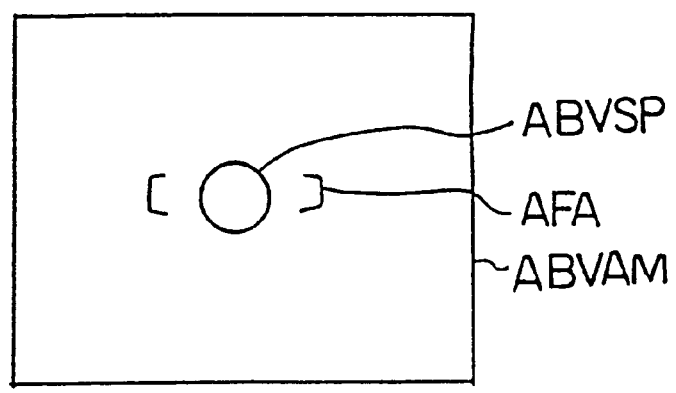
FIG. 24 schematically shows metering and focus condition detection areas of a camera embodying the present invention.

The photometric device SE does not monitor the image plane. That is, as shown in FIG. 23, photometric luminous flux which has not been imaged yet is received at a position I0 just in front of the position corresponding to the primary image plane I1. With this arrangement not designed so that the light is forcibly received at the image plane, the flexibility of position of the photometric device SE increases. However, the photometric method is limited to the averaging metering and the centerweighted averaging metering. That is, the photometric device SE performs photometry according to the averaging metering with respect to an averaging metering area ABVAM shown in FIG. 24 substantially equivalent to the taking area of the film, and performs photometry according to the centerweighted averaging metering with respect to a circular spot metering area ABVSP (φ=approximately 5 mm) also shown in FIG. 24 located in the center of the image plane. In FIG. 24, AFA represents an AF area.

<Luminous Flux Splitting Type Having Photometric Device Above Front Lens Unit (FIG. 20)>

Figure 20:
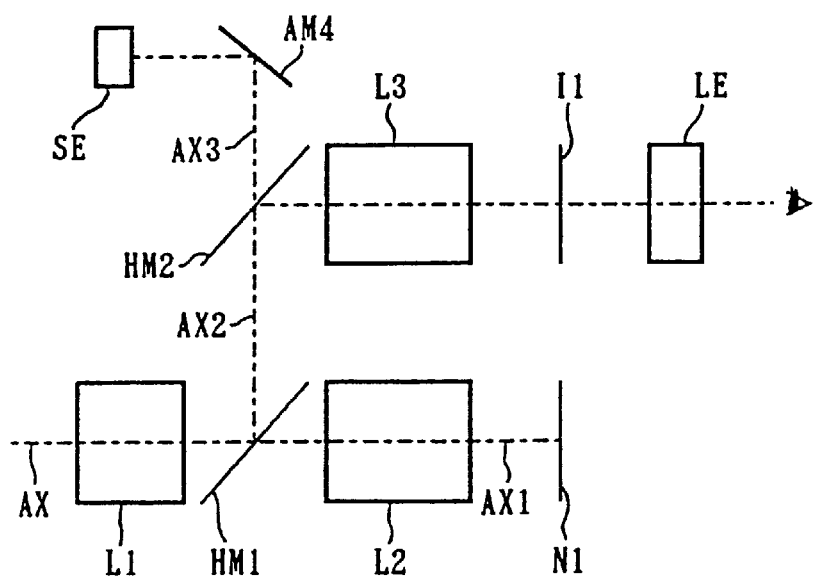
FIG. 20 schematically shows an embodiment of a luminous flux splitting type camera having a metering device above a front lens unit.

The optical system of the camera shown in FIG. 20 has the same arrangement as that of the above-described optical system shown in FIG. 19 except that a total reflecting mirror AM4 for reflecting frontward the luminous flux having passed through the half mirror HM2 is disposed above the half mirrors HM1 and HM2 instead of the photometric device SE, and that the photometric device SE for receiving the luminous flux reflected from the total reflecting mirror AM4 is disposed above the front lens unit L1. The advantages produced by the zooming movement of the half mirror HM2 are also the same as those of the optical system of FIG. 19.

As described above, by disposing the photometric device SE at a position above the front lens unit L1, where space is easily secured for an element, the space in the front half of the lens barrel is effectively used to reduce the vertical size of the lens barrel. Thus, by this space-saving arrangement of the photometric device, the size of the camera is reduced. Since the photometric luminous flux taken out by the half mirror HM2 is part of the finder luminous flux, no parallax is caused between the finder optical system and the photometric system.

<Optical Path Switching Type Having Photometric Device Above Half Mirror (FIG. 21)>

Figure 21:
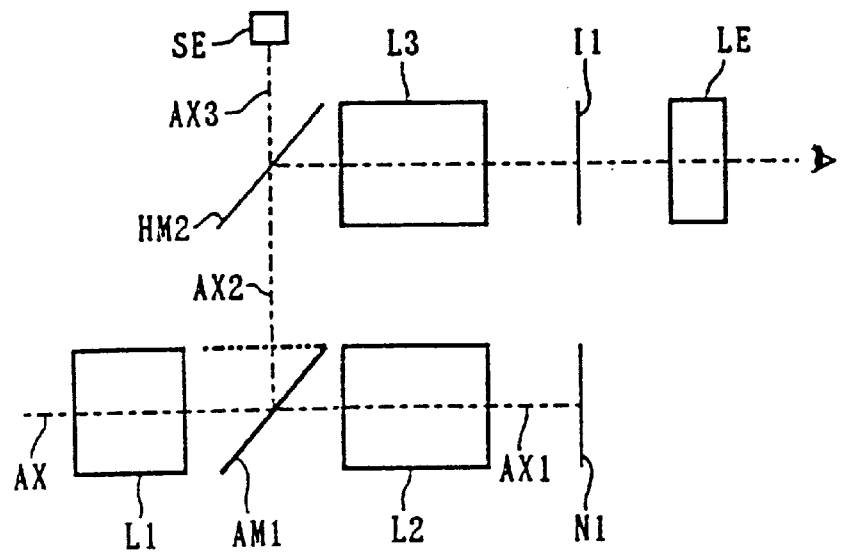
FIG. 21 schematically shows an embodiment of an optical path switching type camera having a metering device above a half mirror.

The optical system of the camera shown in FIG. 21 has the same arrangement as that of the above-described optical system shown in FIG. 19 except that the up-down total reflecting mirror AM1 is used instead of the half mirror HM1. Therefore, the workings and advantages according to the modification in arrangement are similar to those of the above-described optical system shown in FIG. 3.

<Optical Path Switching Type Having Photometric Device Above Front Lens Unit (FIG. 22)>

Figure 22:
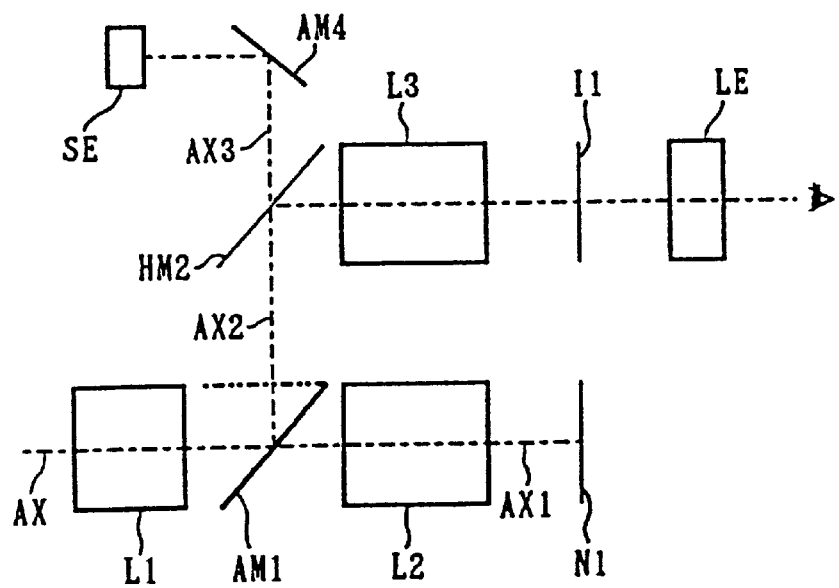
FIG. 22 schematically shows an embodiment of an optical path switching type camera having a metering device above a front lens unit.

The optical system of the camera shown in FIG. 22 has the same arrangement as that of the above-described optical system shown in FIG. 20 except that the up-down total reflecting mirror AM1 is used instead of the half mirror HM1. Therefore, the workings and advantages according to the modification in arrangement are similar to those of the above-described optical system shown in FIG. 3.

<<External and Internal Arrangements of the Entire Camera>>

Figure 25:
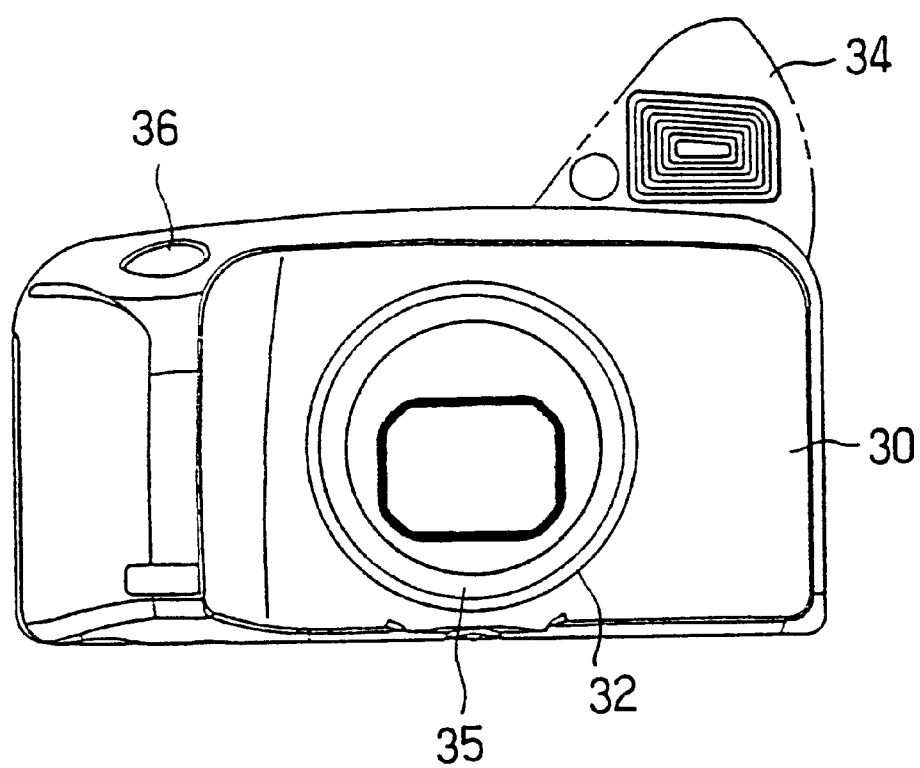
FIG. 25 is an external front view of an embodiment of a camera having a multi movable segment type lens barrel.
Figure 26A:
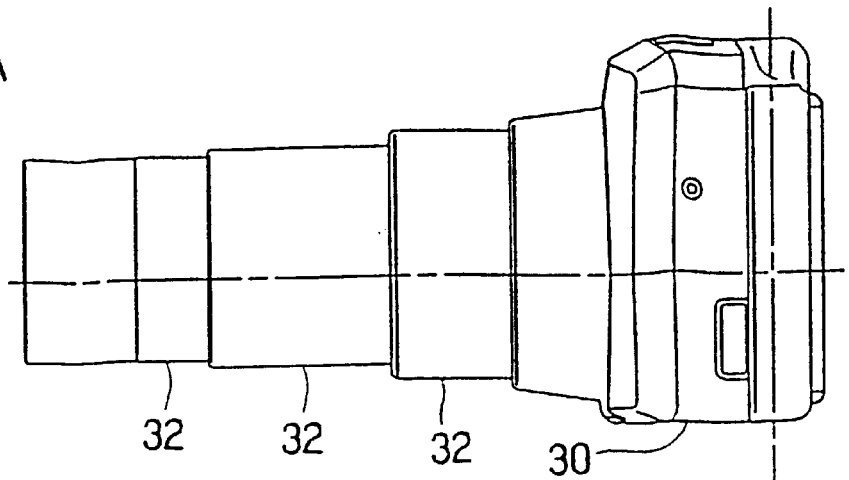
FIGS. 26A to 26C are external side views showing the telephoto condition, the wide angle condition and the lens barrel collapsed condition of the camera of FIG. 25.
Figure 26B:
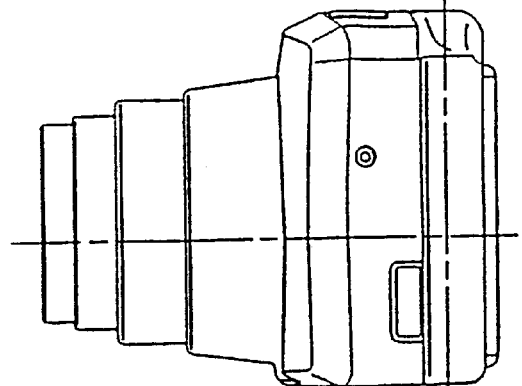
Figure 26C:
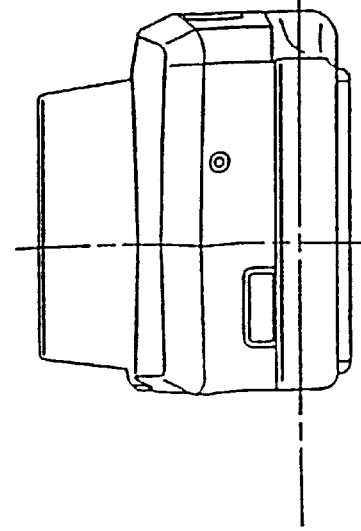
Figure 27A:
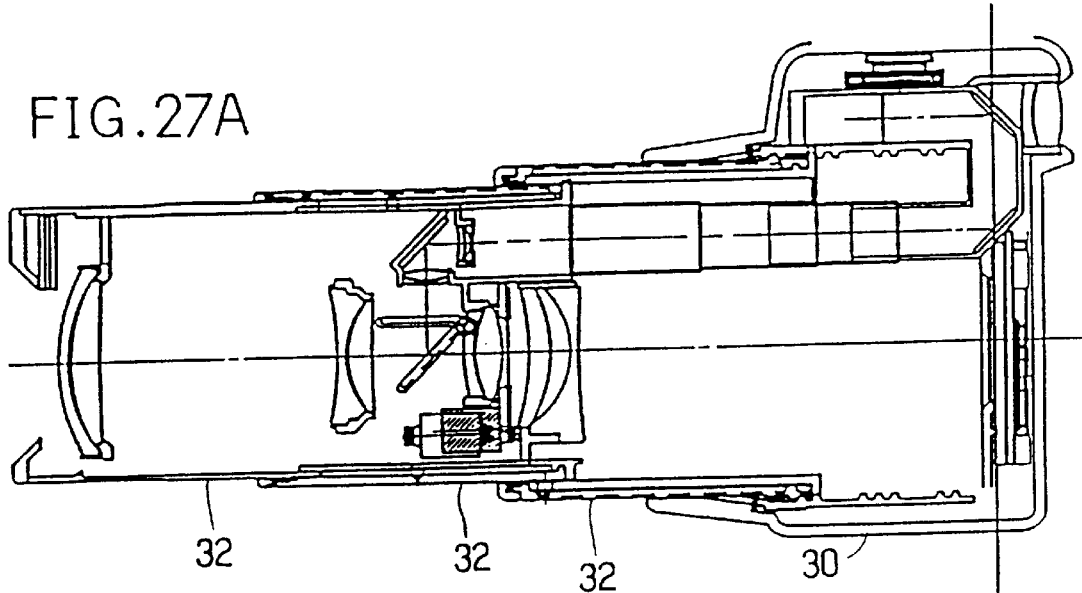
FIGS. 27A to 27C are longitudinal cross-sectional views showing the telephoto condition, the wide angle condition and the lens barrel collapsed condition of the camera of FIG. 25.
Figure 27B:
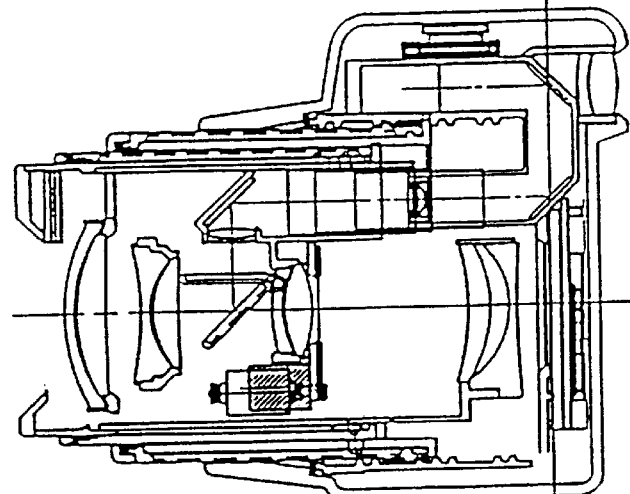
Figure 27C:
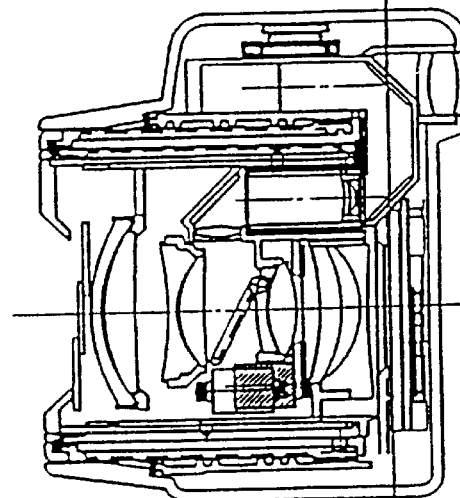
Figure 80:
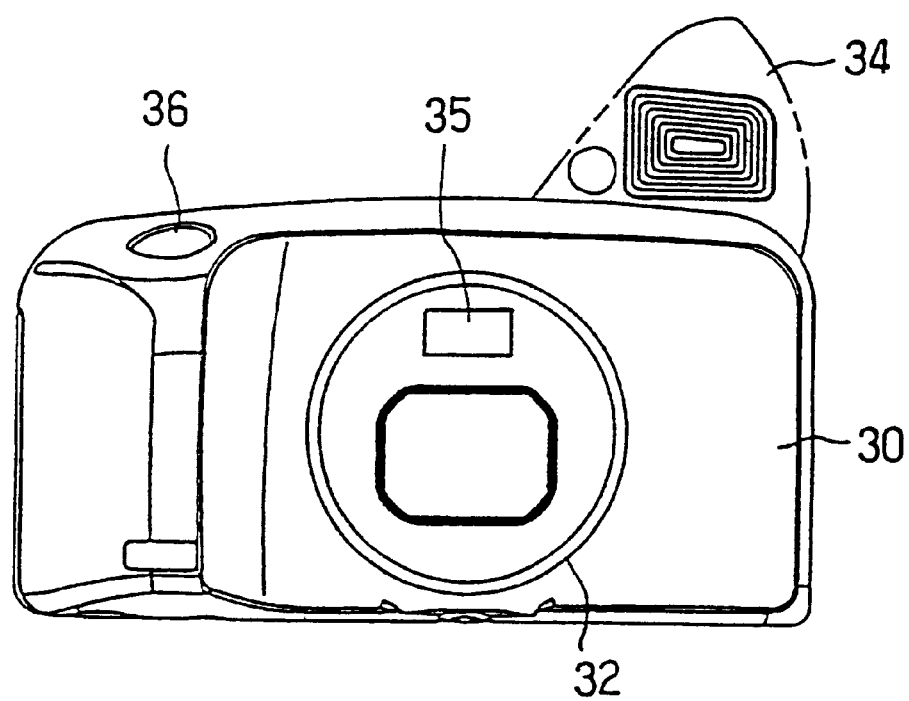
FIG. 80 is an external front view showing an embodiment of a camera having a macro flash portion at an upper front of the lens barrel.

FIG. 25 is a front view of a camera embodying the present invention. A lens barrel 32 is provided in the center of the front surface of a camera body 30. At the front of the lens barrel 32 is provided a macro flash portion 35 which emits light at the time of flash photography in macro photography. While the macro flash portion 35 is a ring flash, a rectangular macro flash portion 35 as shown in FIG. 80 may be provided at an upper part of the front of the lens barrel 32 instead. On the left side of the upper surface of the camera body 30 is provided a pop-up flash portion 34 which emits light in normal flash photography. On the right side of the upper surface of the camera body 30 is provided a shutter release button 36. FIGS. 26A to 26C and FIGS. 27A to 27C are external side views and longitudinal sectional views of the camera shown in FIG. 25. FIGS. 26A and 27A show a telephoto condition. FIGS. 26B and 27B show a wide angle condition. FIGS. 26C and 27C show a lens barrel collapsed condition.

This camera is a single-lens reflex camera which includes a lens-shutter and a decentered lens barrel having a plurality of advancing barrels. The taking optical system and the circular movable lens barrels 32 in the decentered lens barrel are not co-axial, that is, decentered. The decentered lens barrel is used because the optical axis of the taking optical system and the optical axis of the finder optical system are both included in one lens barrel 32. The arrangement of the lens barrel of the camera will be described later in detail.

Figure 28:
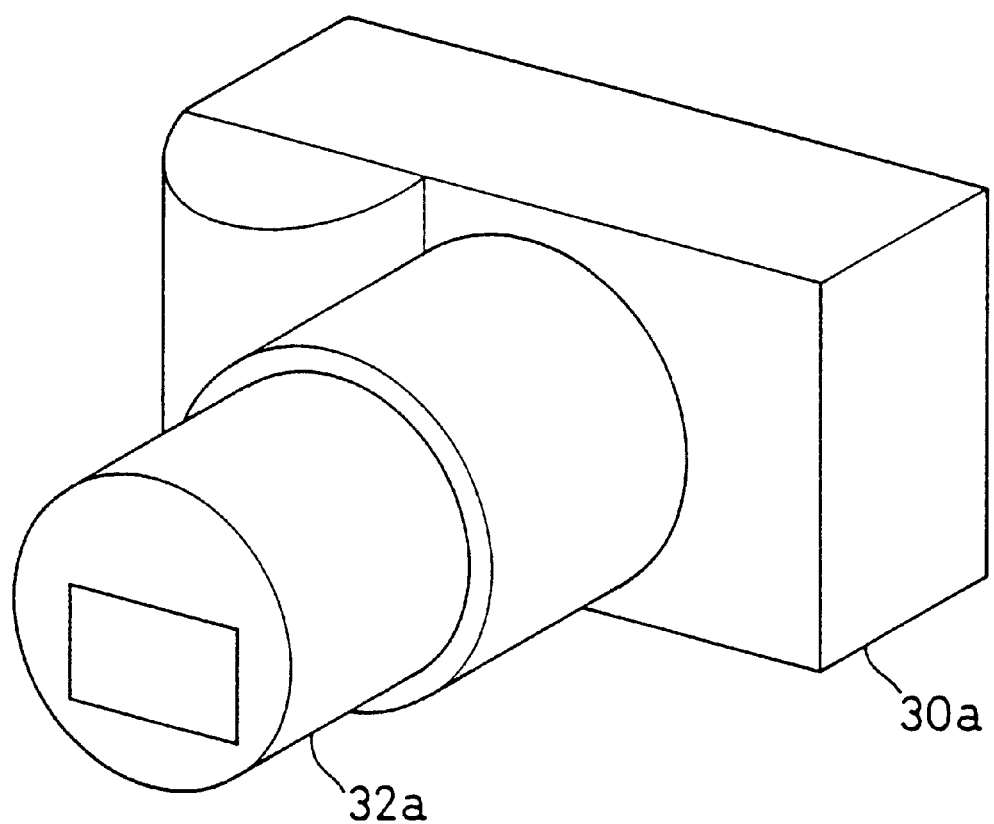
FIG. 28 is an external perspective view of an embodiment of a camera having a single movable segment type lens barrel.
Figure 29:
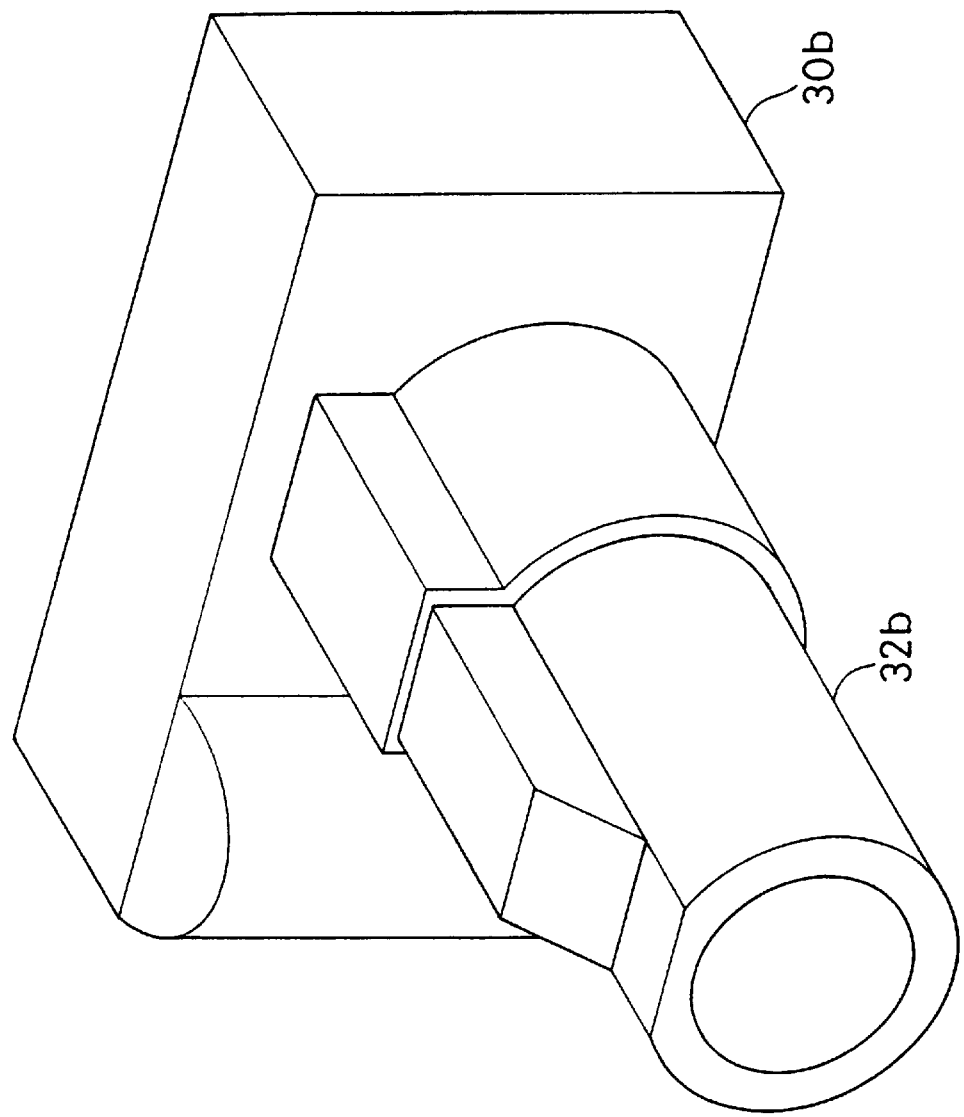
FIG. 29 is an external perspective view of another embodiment of a camera having a single movable segment type lens barrel.
Figure 30:
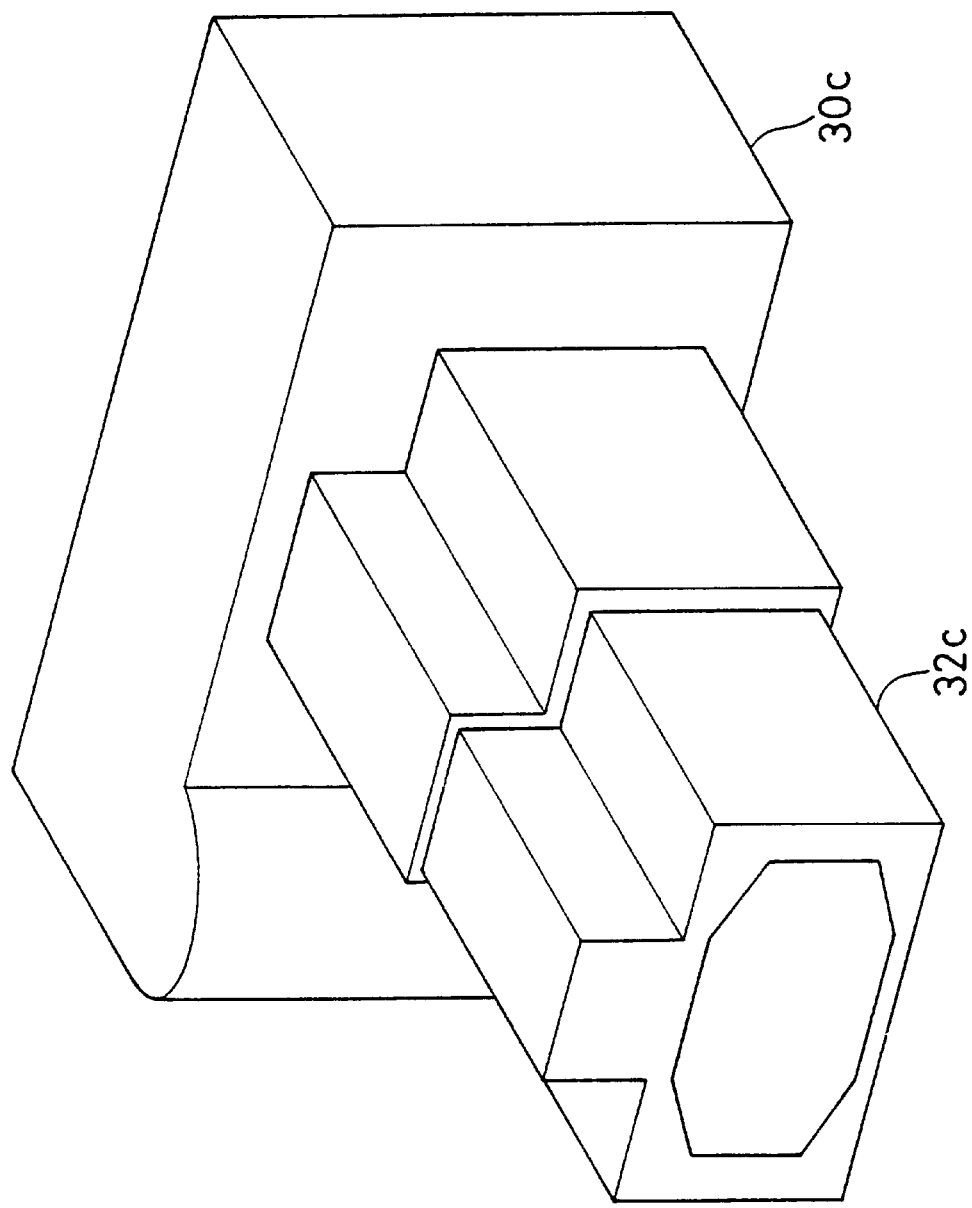
FIG. 30 is an external perspective view of still another embodiment of a camera having a single movable segment type lens barrel.

FIGS. 28 to 30 are perspective views schematically showing the external arrangements of other types of cameras. The cameras comprise camera bodies 30a, 30b and 30c and lens barrels 32a, 32b and 32c each having a single advancing barrel, respectively. The camera shown in FIG. 28 is of the decentered lens barrel type similar to the above-described camera (FIGS. 25, 26A to 26C and 27A to 27C). The camera shown in FIG. 29 has a projecting portion on upper part of a lens barrel. The camera shown in FIG. 30 has an angular lens barrel. The lens barrels 32a, 32b and 32c have distinctive external arrangements since the optical axis of the taking optical system and the optical axis of the finder optical system are both included in one lens barrel.

<<Lens Barrel Arrangement of Decentered Lens Barrel Type Camera>>

Figure 31:
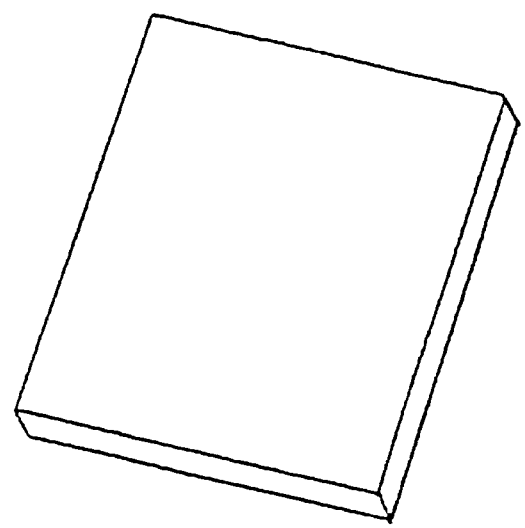
FIG. 31 is an external perspective view of a half mirror and a total reflecting mirror provided in the lens barrel of a camera embodying the present invention.
Figure 32:
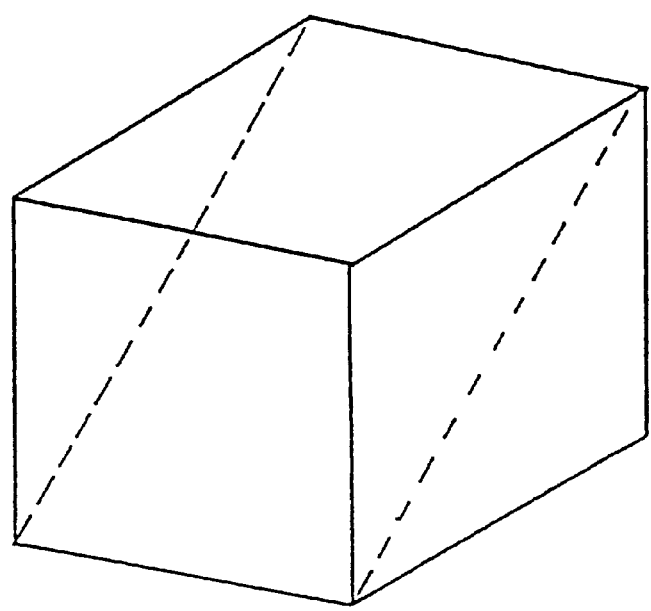
FIG. 32 is an external perspective view of a prism having a semi-transparent reflecting surface provided in the lens barrel of a camera embodying the present invention.

The lens barrel arrangement of a decentered lens barrel type camera embodying the present invention will be described with respect to two embodiments. While in the subsequently-described embodiments, an optical path switching type optical system is used which has an up-down total reflecting mirror, a luminous flux splitting type optical system may be used instead which has a semi-transparent mirror such as a pellicle mirror and a half mirror, or a luminous flux splitter such as a prism having a semi-transparent reflecting surface. FIG. 31 is an external view of the total reflecting mirror and the half mirror. FIG. 32 is an external view of the prism.

<Arrangement of Lens Barrel Having Independent Blocks (FIGS. 33 to 46)>

Figure 33:
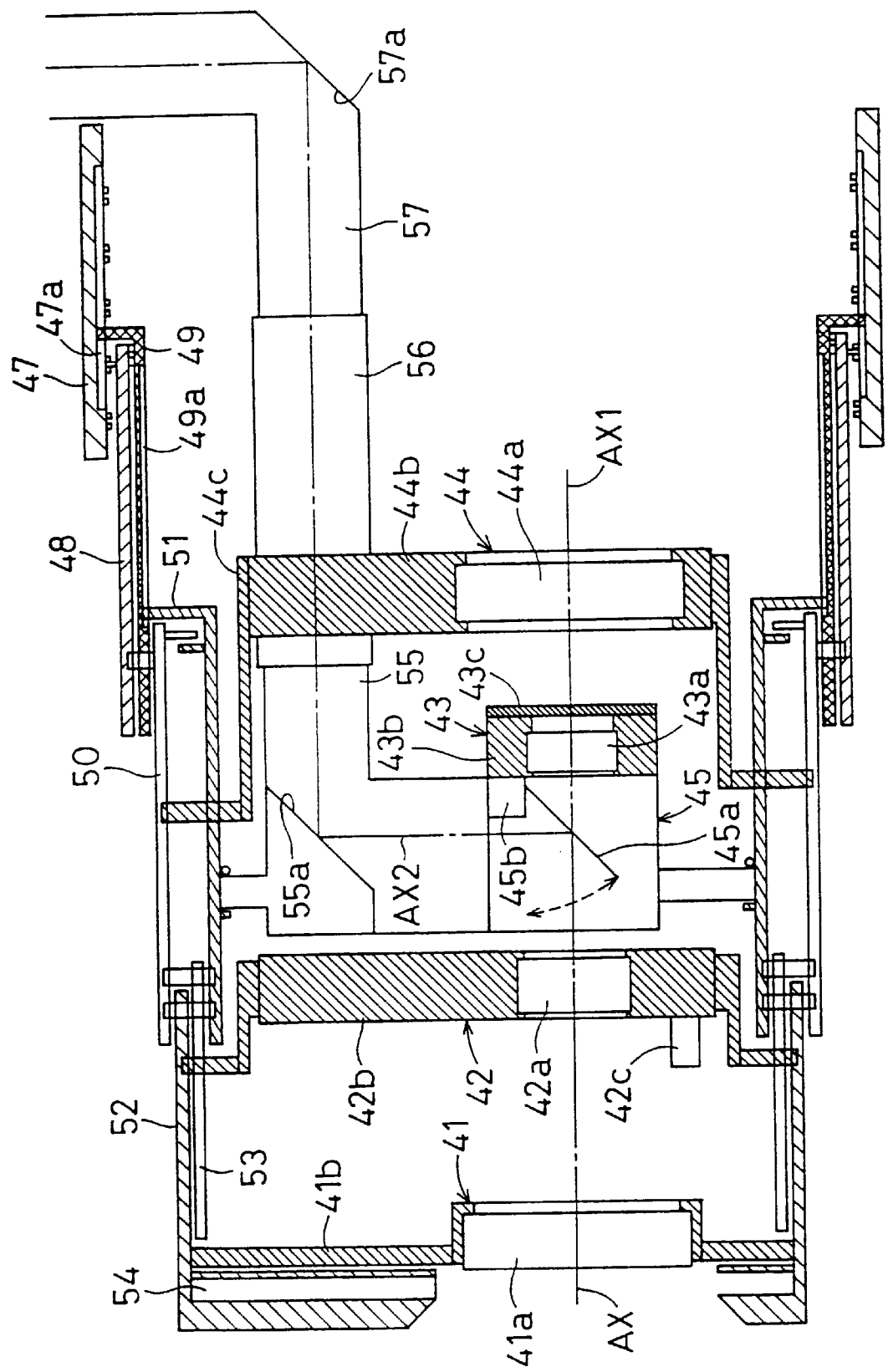
FIG. 33 is a longitudinal cross-sectional view schematically showing a lens barrel which has independent blocks and constitutes a part of a camera embodying the present invention.
Figure 34:
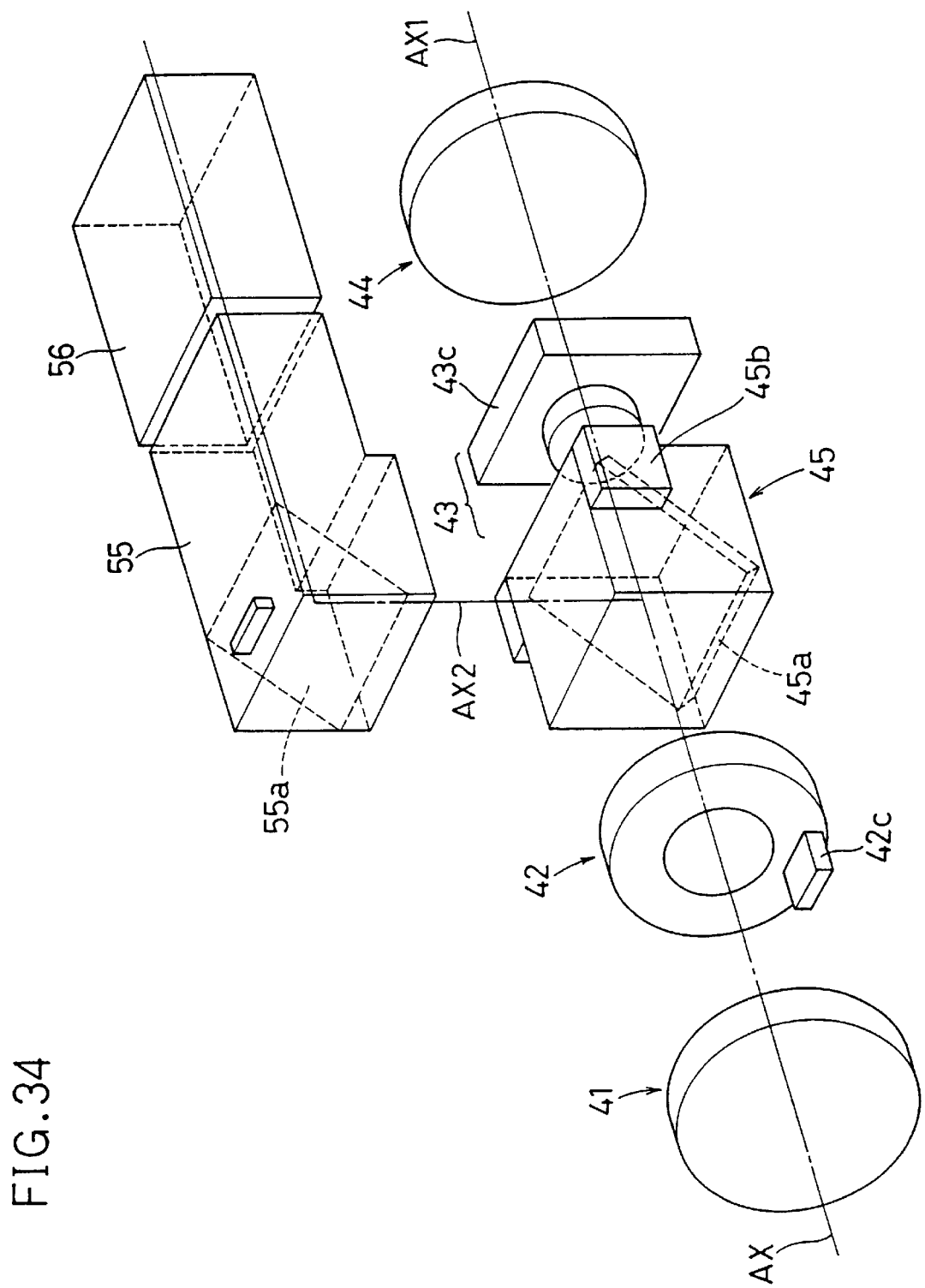
FIG. 34 is an exploded perspective view schematically showing the external structures of elements constituting the lens barrel of FIG. 33.

FIG. 33 schematically shows the longitudinal cross section of a lens barrel having independent blocks, and FIG. 34 shows appearance of each elements thereof. This lens barrel basically has a similar arrangement to that of the lens barrel 32 having a plurality of advancing barrels used in the above-described lens-shutter single-lens reflex camera of the decentered lens barrel type (FIGS. 25, 26A to 26C and 27A to 27C). The lens barrel includes a stationary barrel 47, a first rotatively movable barrel 48, a first non-rotatively movable barrel 49, a second rotatively movable barrel 50, a second non-rotatively movable barrel 51, a third non-rotatively movable barrel 52 and a third rotatively movable barrel 53. At the front of the third non-rotatively movable barrel 52 is provided a lens barrier unit 54 (incorporating a non-illustrated lens barrier).

Within the lens barrel are provided a first lens unit block 41, a second lens unit block 42, a mirror unit 45, a third lens unit block 43 and a fourth lens unit block 44. The first lens unit block 41 includes a first lens unit 41a and a first lens unit holder 41b. The second lens unit block 42 includes a second lens unit 42a, a second lens unit holder 42b and a focusing unit 42c. The mirror unit 45 includes an up-down total reflecting mirror 45a and a mechanism 45b for raising the total reflecting mirror 45a. To the mirror unit 45, the third lens unit block 43 is secured at a rear portion and a subsequently-described finder block 55 is secured at an upper portion. The third lens unit block 43 includes a third lens unit 43a, a third lens unit holder 43b and a shutter unit 43c. The fourth lens unit block 44 includes a fourth lens unit 44a, a fourth lens unit holder 44b and an arm 44c having a cam follower for moving the fourth lens unit 44a. While the shutter unit 43c is disposed in the rear of the third lens unit 43a in this embodiment, it may be disposed between the total reflecting mirror 45a and the third lens unit 43a. In this case, since the distance between the total reflecting mirror 45a and the shutter of the shutter unit 43c also serving as the aperture stop is smaller, the size of the total reflecting mirror 45a can be reduced.

Figure 35:
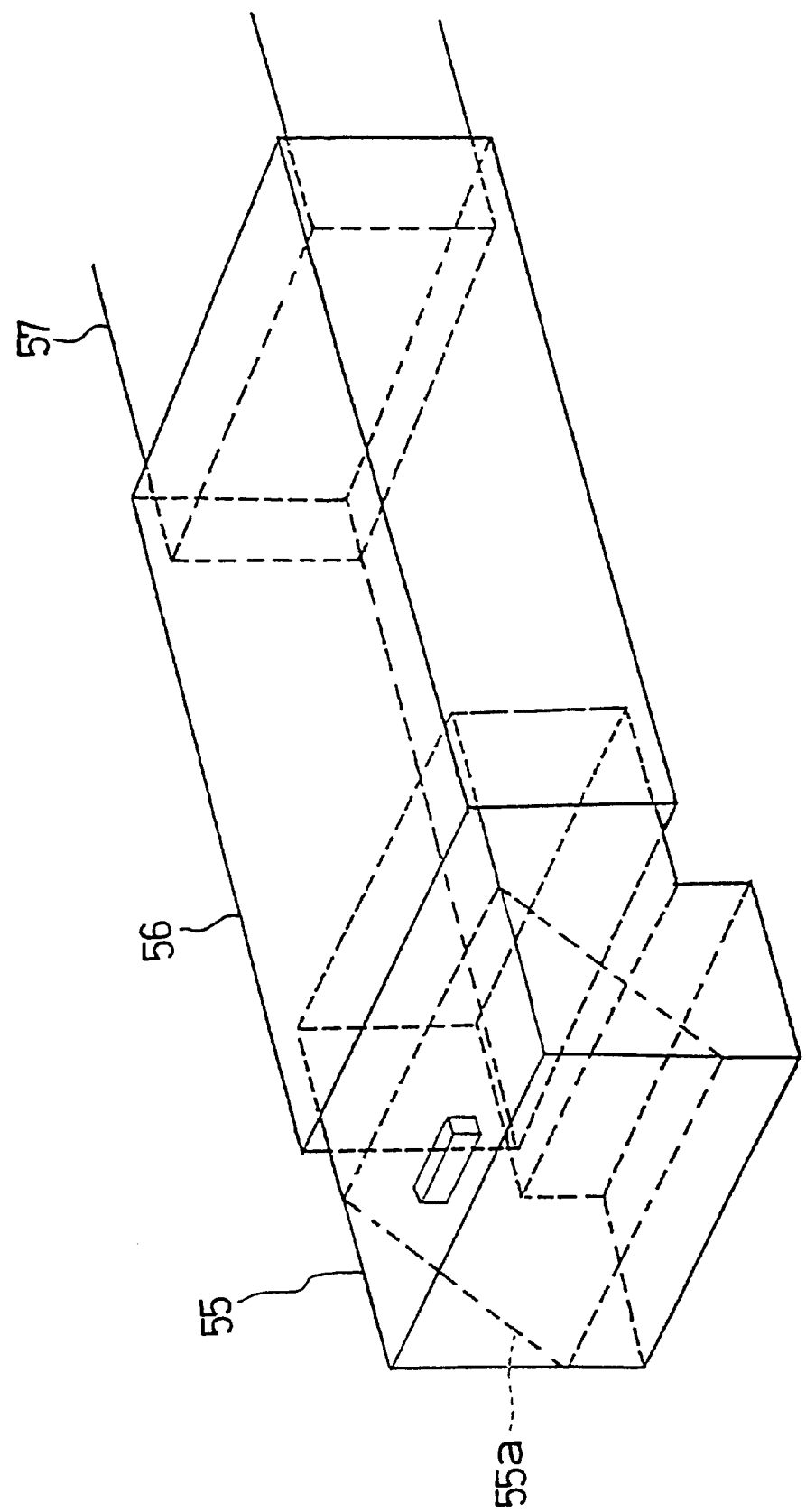
FIG. 35 is a perspective view showing an assembled condition of finder blocks provided in the lens barrel of FIG. 33.
Figure 36:
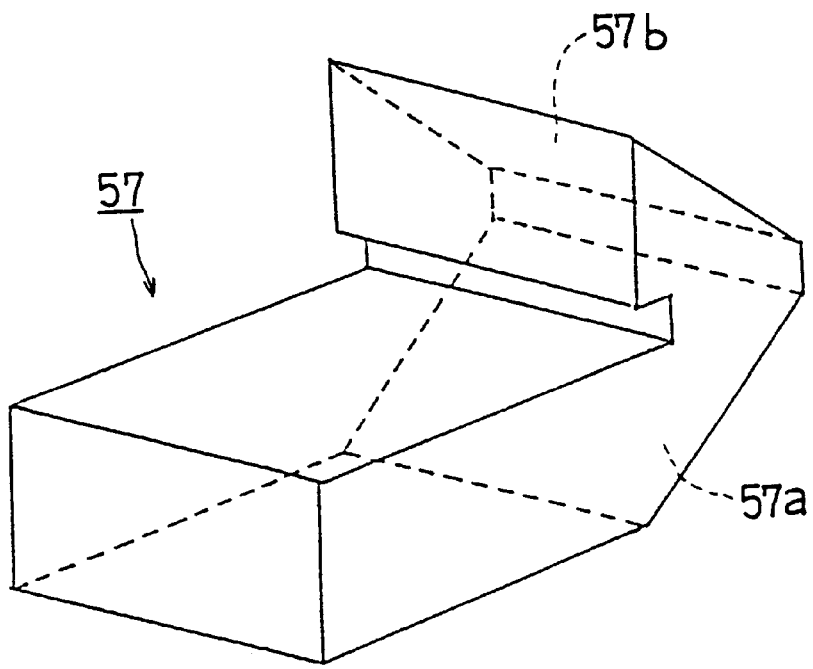
FIG. 36 is an external perspective view of a third finder block provided in the lens barrel of FIG. 33.
Figure 37:
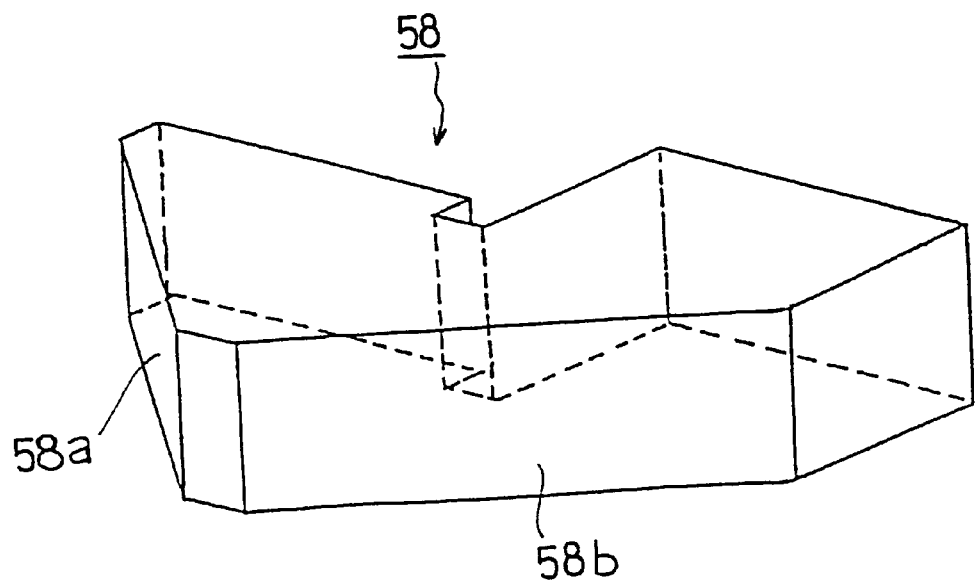
FIG. 37 is an external perspective view of a fourth finder block disposed at an upper part of a camera body to which the lens barrel of FIG. 33 is attached.

Within the lens barrel are also provided, as shown in FIG. 35, the first finder block 55 having a total reflecting mirror 55a, a second finder block 56 and a third finder block 57 having total reflecting mirrors 57a and 57b (see FIG. 36). In an upper part of the camera body 30 is provided a fourth finder block 58 having total reflecting mirrors 58a and 58b as shown in FIG. 37.

The optical system of this camera corresponds to the optical system of the camera of the "optical path switching type having a relay lens in the finder optical system" described with reference to FIG. 4. The taking optical system provided in the lens barrel is a four unit zoom optical system having positive, negative, positive and negative refractive power from the front side in which focusing is performed with the second lens unit 42a. The first lens unit 41a of positive refractive power and the second lens unit 42a of negative refractive power constitute the front lens unit L1. The third lens unit 43a of positive refractive power and the fourth lens unit 44a of negative refractive power constitute the taking optical system rear lens unit L2.

Zooming of the taking optical system is performed by moving the first lens unit block 41, the second lens unit block 42, the mirror unit 45 and the third lens unit block 43, and the fourth lens unit block 44 along the optical axes AX and AX1. Zooming of the finder optical system is performed by moving a finder optical system rear lens unit block (not shown) provided in the second finder block 56 along the optical axis AX2 (and parallel to the optical axes AX and AX1). That is, zooming of the finder optical system is performed by moving the finder optical system rear lens unit L3 (FIG. 4) held in the finder optical system rear lens unit block or moving some of the lens elements of the lens unit L3.

For focusing, the second lens unit 42a is driven by the focusing unit 42c in the second lens unit block 42 located in front of the mirror unit 45. Since focusing driving is thus performed within the second lens unit block 42, no cam mechanism is necessary for focusing, so that the arrangement of the lens barrel is simplified. As a result, the size and cost of the camera is reduced.

The total reflecting mirror 45a disposed between the second lens unit block 42 and the third lens unit block 43 switches the optical path of the luminous flux incident on the taking optical system between the optical path of the taking luminous flux and the optical path of the finder luminous flux (reflected luminous flux) in the middle of the taking optical system. The taking luminous flux and the finder luminous flux thus obtained are optically equivalent. The luminous flux whose optical path is switched between the two optical paths by the total reflecting mirror 45a is a luminous flux having been incident on the taking optical system (i.e. luminous flux having passed through the first and second lens units 41a and 42a). Therefore, no parallax is caused between the taking optical system and the finder optical system. Moreover, since the optical path is switched in the middle of the taking optical system, the back focus is reduced, so that the internal arrangement of the camera is made compact. As a result, the size of the camera is reduced.

Since focusing is performed before the optical path is switched by the total reflecting mirror 45a, by disposing a diffusing plate on a focal plane as shown in subsequently-described FIGS. 40 and 41, focus condition can be confirmed through the finder without the elements of the finder optical system being moved for focusing. If the second lens unit 42a is used as a camera shake compensating optical system driven for camera shake compensation, the results of the camera shake compensation can be confirmed through the finder since the optical path is switched by the total reflecting mirror 45a after camera shake compensation has been made.

The total reflecting mirror 45a, included in the mirror unit 45, is movable along the optical axes AX and AX1 of the taking optical system and is moved along the optical axes AX and AX1 during zooming as described above. Since the total reflecting mirror 45a is moved during zooming, the zooming movement of the taking optical system is not limited. On the other hand, since focusing is performed by the focusing unit 42c driving the second lens unit 42a in the second lens unit block 42 as described above, the focusing movement of the taking optical system is not limited.

Focusing may be performed by other focusing methods such as internal focusing, rear focusing and entire/front lens moving-out focusing as well as by moving the second lens unit 42a as described above. This is because the total reflecting mirror 45a is movable as described above and therefore the optical path is switched while the total reflecting mirror 45a is being moved along the optical axes AX and AX1 without interrupting the focusing movement of the taking optical system.

The shutter unit 43c incorporated in the third lens unit block 43 has a shutter which also serves as the aperture stop. Since the mirror unit 45 disposed in the front vicinity of the shutter unit 43c is moved together with the shutter unit 43c along the optical axes AX and AX1 of the taking optical system during zooming, the total reflecting mirror 45a is moved together with the aperture stop in the vicinity of the aperture stop whenever it is moved during zooming. Consequently, the optical path is always switched at a point where the diameter of the luminous flux is constant and smallest. By thus reducing the size of the surface for switching the optical path, the size of the total reflecting mirror 45a is reduced. As a result, the size of the camera is reduced.

The optical path of the finder luminous flux passes through the finder blocks 55 to 58. The optical path of the finder luminous flux will be described with reference to FIGS. 33 and 42 to 46. Referring first to FIG. 33, the luminous flux reflected upward by the total reflecting mirror 45a is reflected rearward by the total reflecting mirror 55a of the first finder block 55 as the finder luminous flux. Then, as shown in FIGS. 33 and 43, the luminous flux passes through the second finder block 56 to be incident on the third finder block 57.

Figure 42:
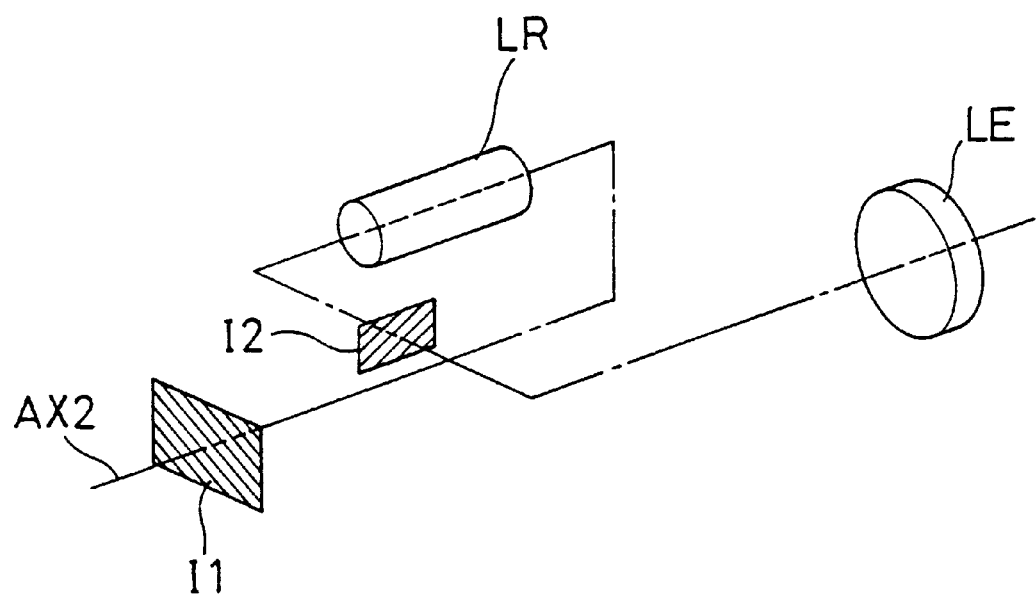
FIG. 42 shows the optical path of the finder optical system in the lens barrel of FIG. 33 and in the camera body to which the lens barrel is attached.
Figure 43:
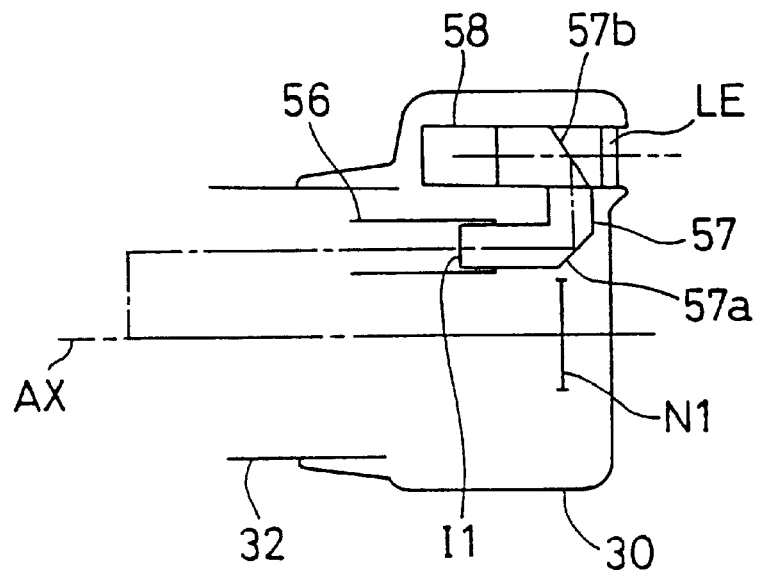
FIG. 43 is a perspective diagram of the lens barrel of FIG. 33 and the camera body to which the lens barrel is attached, to schematically show the arrangement of the finder optical system.
Figure 44:
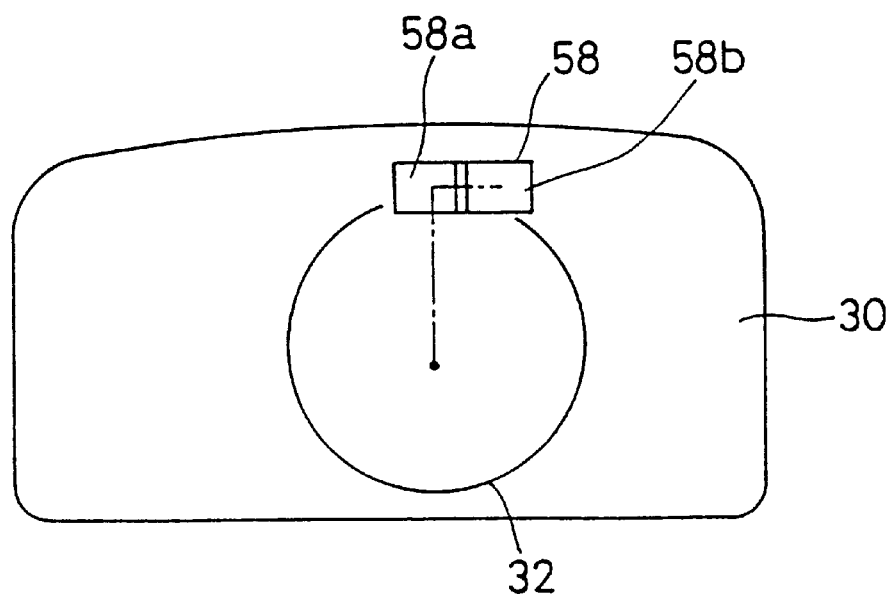
FIG. 44 is a perspective diagram schematically showing the optical path of the finder optical system when the camera body to which the lens barrel of FIG. 33 is attached is viewed from the front.
Figure 45:
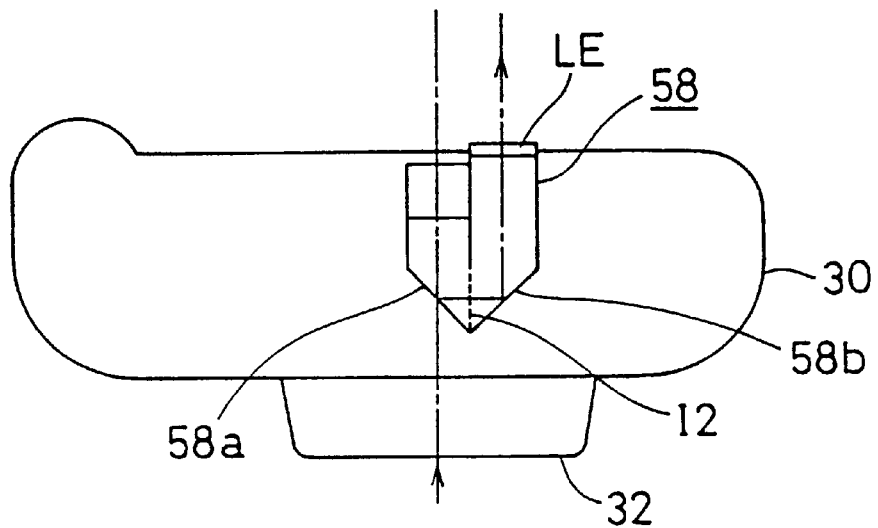
FIG. 45 is a perspective diagram schematically showing the optical path of the finder optical system when the camera body to which the lens barrel of FIG. 33 is attached is viewed from above.

On the luminous flux incident side of the third finder block 57, a primary image is formed in the position of the primary image plane I1 shown in FIGS. 42 and 43. The finder luminous flux thus imaged is, as shown in FIGS. 33 and 43, reflected upward by the total reflecting mirror 57a and forward by the total reflecting mirror 57b in the third finder block 57. The finder luminous flux reflected forward passes through the relay lens LR as shown in FIG. 42 and then is reflected leftward by the total reflecting mirror 58a of the fourth finder block 58 as shown in FIGS. 44 and 45. Then, the luminous flux is re-imaged in the position of the secondary image plane I2 as shown in FIGS. 42 and 45 and is reflected rearward by the total reflecting mirror 58b to reach the eyepiece LE.

Figure 46:
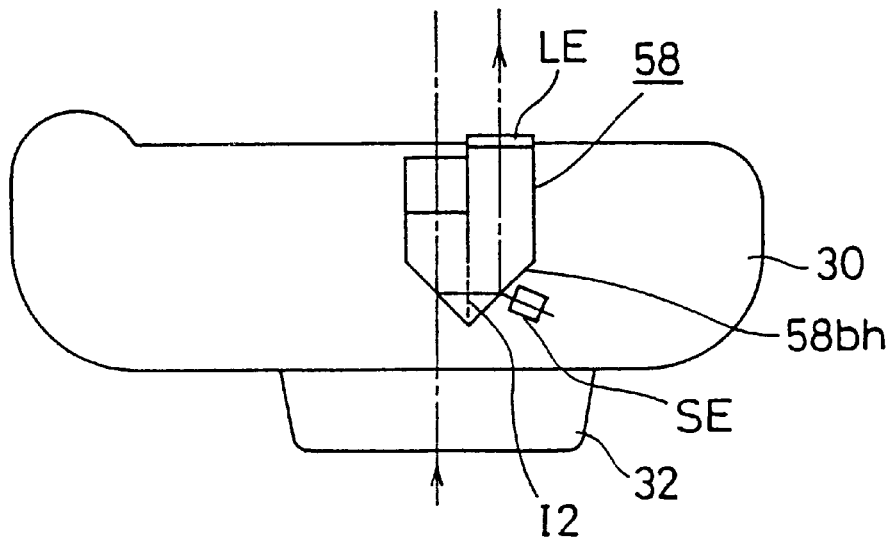
FIG. 46 is a perspective diagram schematically showing the optical path of the finder optical system with the metering device disposed in the camera body of FIG. 45.

The second reflecting surface of the fourth finder block 58 may be a half mirror 58bh and the photometric device SE may be disposed in the rear of the half mirror 58*bh* as shown in FIG. 46 so that photometry may be performed with the luminous flux having passed through the half mirror 58*bh*.

Figure 38:
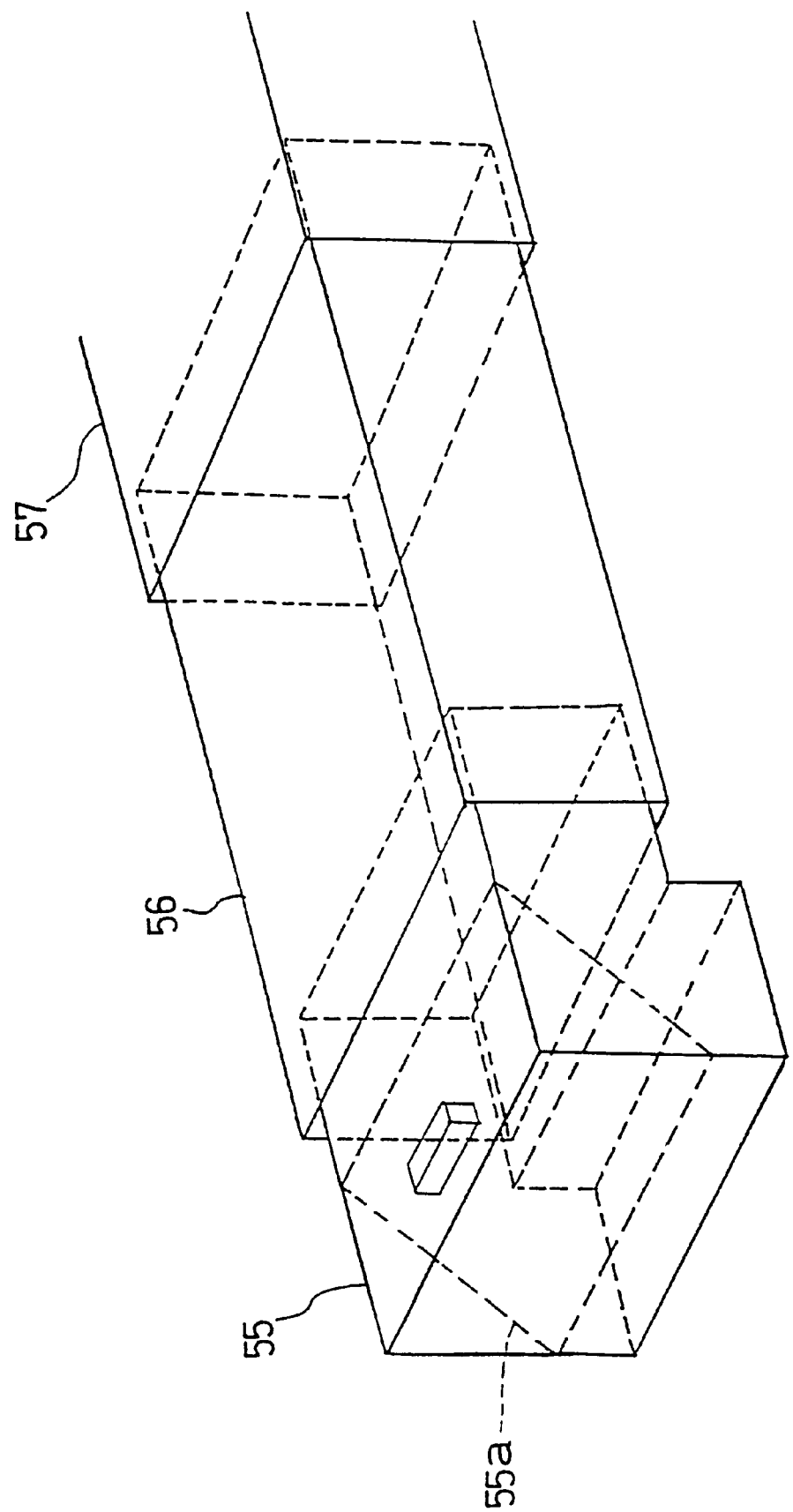
FIG. 38 is a perspective view showing another assembled condition of finder blocks provided in the lens barrel of FIG. 33.

According to the arrangement of the finder blocks 55 to 57 shown in FIGS. 33 and 35, the first and third finder blocks 55 and 57 are movable into the second finder block 56, so that the length of the optical path of the finder luminous flux is variable according to the extension and contraction of the lens barrel. The arrangement of the finder blocks 55 to 57 is not limited thereto. Any arrangement may be used as long as the length of the optical path is variable and the optical path is isolated from external light. For example, the finder blocks 55 to 57 may be arranged so that the front finder block is movable into the rear finder block as shown in FIG. 38, or so that the rear finder block is movable into the front finder block (see FIGS. 27A to 27C).

The first finder block 55 is secured to the mirror unit 45 as described above. The third finder block 57 and the fourth finder block 58 are secured to the camera body 30. The second finder block 56 interlocks with the fourth lens unit block 44. The interlock is realized by using the arm 44*c* having the cam follower for driving the fourth lens unit 44*a*.

Figure 39:
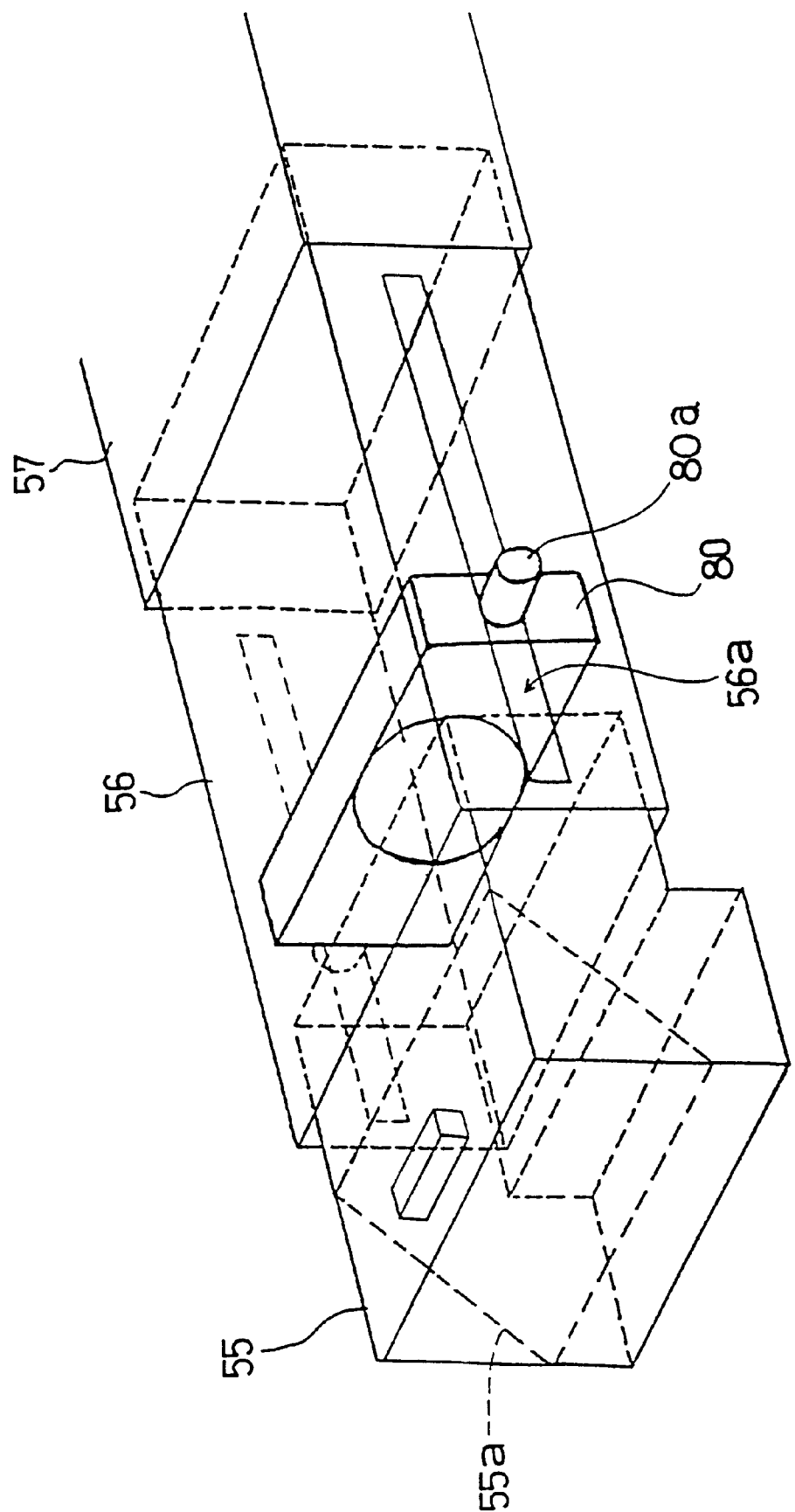
FIG. 39 is a perspective view showing an attachment condition of a finder optical system rear lens unit block provided in the lens barrel of FIG. 33.

For example, the arm 44*c* is secured to the second finder block 56 so that the second finder block 56 is movable integrally with the fourth lens unit block 44. Moreover, as shown in FIG. 39, a finder optical system rear lens unit block 80 including the finder optical system rear lens unit L3 (FIG. 4) or a part thereof is provided in the second finder block 56, and a guide pin 80*a* provided on each side surface of the finder optical system rear lens unit block 80 is secured to the arm 44*c* (or to the fourth lens unit holder 44*b*) so that the finder optical system rear lens unit block 80 is movable together with the fourth lens unit block 44 along a slit 56*a*.

In this embodiment, when the diffusing plate P1 (FIGS. 5 to 8, FIGS. 15 to 18) is provided in the finder optical system, the diffusing plate P1 is disposed at the luminous flux incident side opening of the third finder block 57. For example, when the finder blocks 55 to 57 are arranged as shown in FIG. 35, it is preferable to dispose a diffusing plate P1*a* to close the luminous flux incident side opening of the third finder block 57 as shown in FIG. 40. When the finder blocks 55 to 57 are arranged as shown in FIG. 38, it is preferable to dispose a diffusing plate P1*b* to be inserted into the luminous flux incident side opening of the third finder block 57 as shown in FIG. 41. Since a protrusion 82 is formed on each side of the diffusing plate P1*b* for accurate positioning, it is necessary to form grooves in corresponding positions of the luminous flux exiting side of the second finder block 56.

The photometric device SE (e.g. FIG. 8) may be provided for photometry by use of the light from the diffusing plate P1*a* or P1*b*. The light receiving device SL (e.g. FIG. 18) may be provided for photometry to obtain light adjustment data for flash photography by use of the light from the diffusing plate P1*a* or P1*b*. By using the light from the diffusing plates P1*a* and P1*b*, the flexibility of positions of the devices SE and SL increases. Further, since the diffusing plates P1*a* and P1*b* are not moved during zooming or focusing, their arrangement is advantageous in the light of the arrangement of the devices SE and SL.

Next, the movement of the lens barrel will be described which is necessary for collapsing the lens barrel and for moving during zooming the first lens unit block 41; the second lens unit block 42; the mirror unit 45, the first finder block 55 and the third lens unit block 43; and the fourth lens unit block 44 and the finder optical system rear lens unit block 80 (the block 80 may be replaced by the finder block 56 as described above). The movement for focusing will not be described since it is made within the second lens unit block 42.

The stationary barrel 47 is secured to the camera body 30 (FIGS. 25 to 27C) and has an opening (not shown) formed in its periphery. First, an external rotation driving force (driving source such as a motor is not shown) is transmitted through the opening to the first rotatively movable barrel 48, so that the first rotatively movable barrel 48 is moved backward or forward while being rotated. The first rotatively movable barrel 48 is interlocked with the first non-rotatively movable barrel 49 by a bayonet. Further, a straight groove 47*a* into which a rearward portion of the barrel 49 is inserted is formed in the stationary barrel 47. Consequently, by the movement of the first rotatively movable barrel 48, the first non-rotatively movable barrel 49 is moved, with its rotation inhibited, together with the first rotatively movable barrel 48 along the optical axis AX.

When the first rotatively movable barrel 48 and the first non-rotatively movable barrel 49 are moved backward or forward as described above, the second rotatively movable barrel 50 is rotatively moved backward or forward by a cam mechanism comprised of the first rotatively movable barrel 48 and the first non-rotatively movable barrel 49. At this time, along a straight groove 49*a* formed in the first non-rotatively movable barrel 49, the second non-rotatively movable barrel 51 is non-rotatively moved along the optical axis together with the second rotatively movable barrel 50 bayonet-connected thereto. At this time, the first finder block 55 fixedly connected by a C shaped spring to the second non-rotatively movable barrel 51 is moved. The spring is fitted in a groove formed inside periphery of the barrel 51 although the groove is not shown in the drawing. Since the first finder block 55 is secured to the mirror unit 45 and the mirror unit 45 is secured to the third lens unit block 43 as described earlier, the third lens unit block 43, the mirror unit 45 and the first finder block 55 are moved integrally with the second non-rotatively movable barrel 51.

When the second rotatively movable barrel 50 and the second non-rotatively movable barrel 51 are moved backward or forward as described above, the third non-rotatively movable barrel 52 is non-rotatively moved by a cam mechanism comprised of the second rotatively movable barrel 50 and the second non-rotatively movable barrel 51. By the non-rotative movement of the third non-rotatively movable barrel 52, the first lens unit block 41 secured to the third non-rotatively movable barrel 52 is moved.

Moreover, when the second rotatively movable barrel 50 and the second non-rotatively movable barrel 51 are moved backward or forward as described above, the fourth lens unit block 44 is moved through the arm 44*c* by the cam mechanism comprised of the second rotatively movable barrel 50 and the second non-rotatively movable barrel 51. Then, the finder optical system rear lens unit block 80 (FIG. 39) is moved backward or forward to interlock with the movement of the fourth lens unit block 44.

By the non-rotative movement of the third non-rotatively movable barrel 52, the third rotatively movable barrel 53 is rotatively moved backward or forward together with the third non-rotatively movable barrel 52 bayonet-connected thereto. Then, the second lens unit block 42 is moved by a cam mechanism comprised of the third non-rotatively movable barrel 52 and the third rotatively movable barrel 53. Furthermore, as the third non-rotatively movable barrel 52 is non-rotatively moved, the lens barrier unit 54 provided at the front of the third non-rotatively movable barrel 52 opens and closes the lens barrier in front of the first lens unit 41a.

In collapsing the lens barrel (FIG. 33), the first to fourth lens unit blocks 41 to 44 and the mirror unit 45 are moved toward the camera body 30 (e.g. FIG. 25) as described above, the first finder block 55 is moved toward the camera body 30 integrally with the third lens unit block 43 and the mirror unit 45, and the second finder block 56 is moved toward the camera body 30 in conjunction with the fourth lens unit block 44. Therefore, the movements of the first to fourth lens unit blocks 41 to 44 and the mirror unit 45 are not limited by the first and second finder blocks 55 and 56.

Since the lens barrel is collapsed by moving the first to fourth lens unit blocks 41 to 44, and the mirror unit 45 and the first and second finder blocks 55 and 56 toward the camera body 30 as described above, the camera becomes more compact when not in use by collapsing the lens barrel into the camera body 30 as shown in FIGS. 26C and 27C. Thus, a camera having this type of lens barrel is very convenient for carrying around.

<Arrangement of Lens Barrel Having Block Including Both Second and Third Lens Units (FIGS. 47 to 49)>

Figure 47:
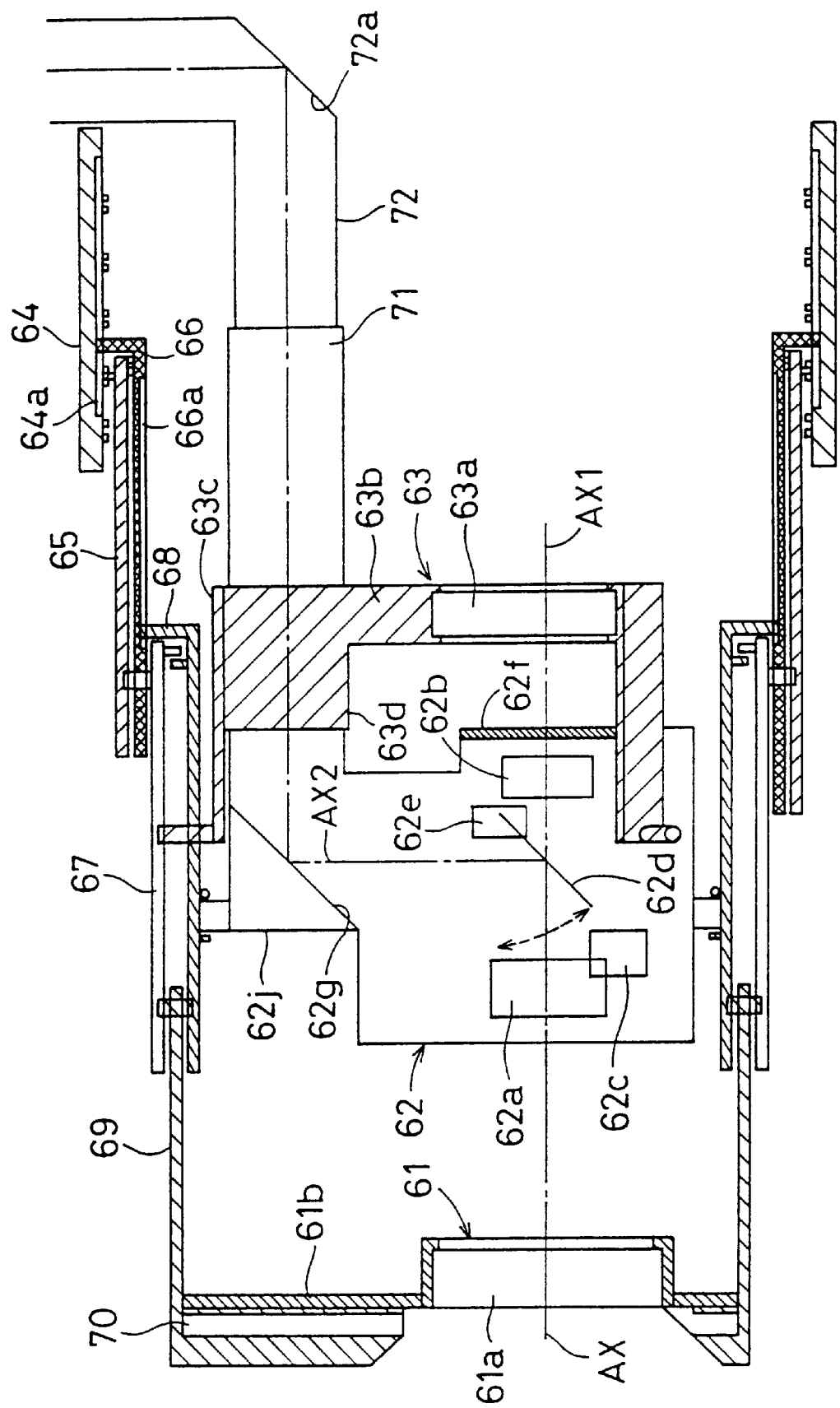
FIG. 47 is a longitudinal cross-sectional view schematically showing a lens barrel which has a block including both second and third lens units and constitutes a part of the camera embodying the present invention.
Figure 48:
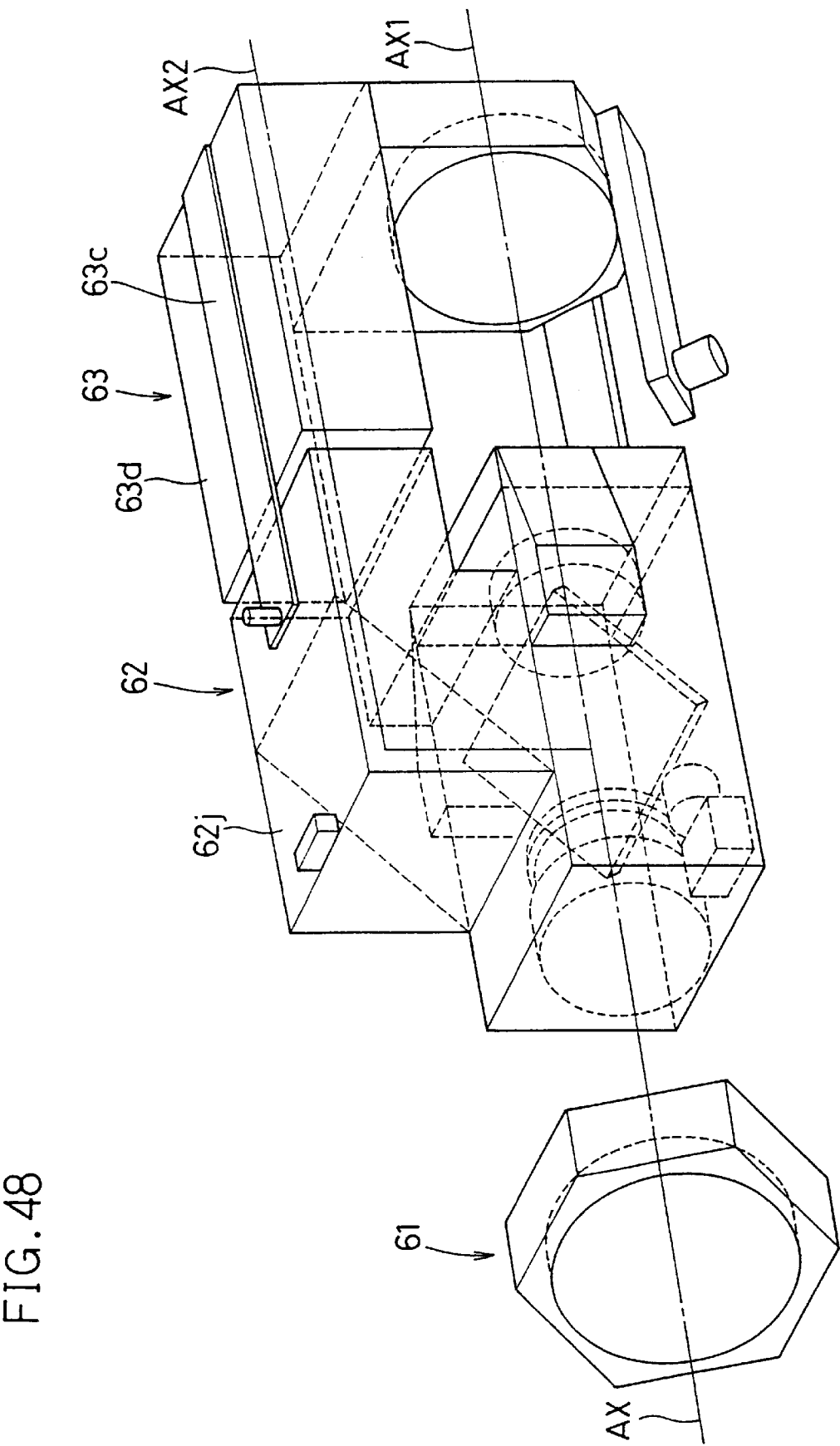
FIG. 48 is an exploded perspective view schematically showing the external structures of elements constituting the lens barrel of FIG. 47.
Figure 49:
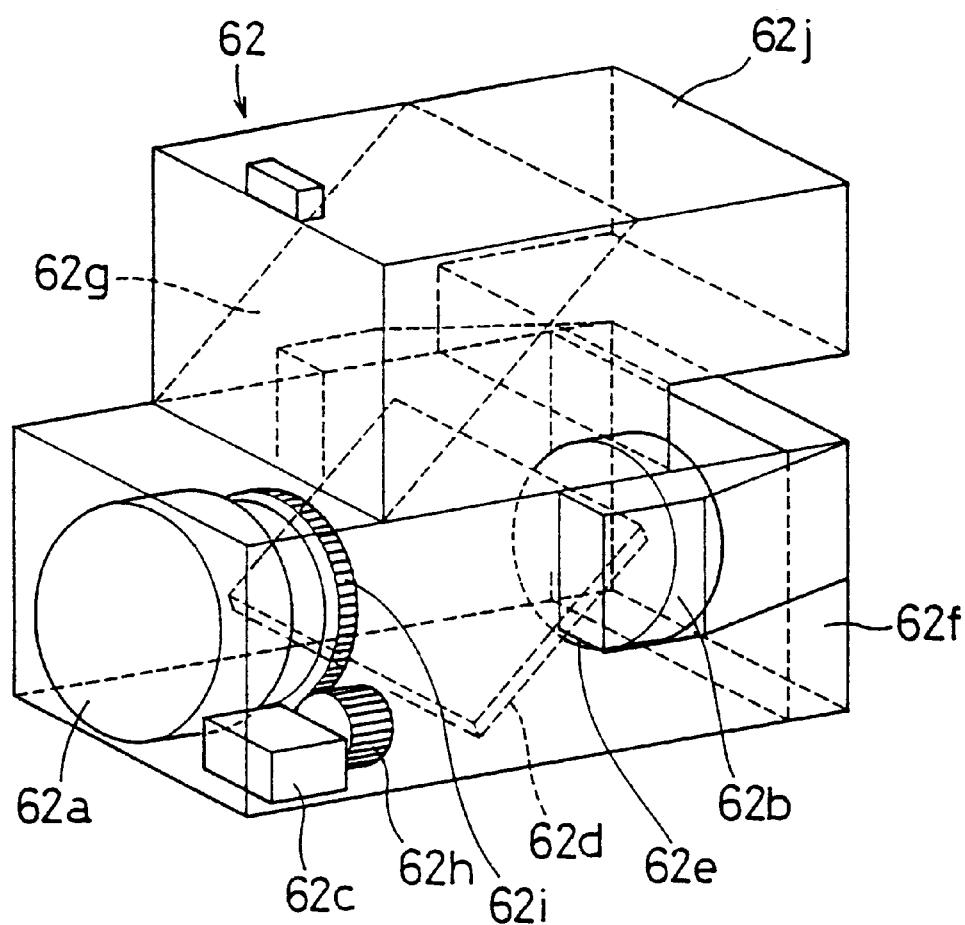
FIG. 49 is a perspective view showing the external and internal structures of a second-third lens unit block provided in the lens barrel of FIG. 47.

FIG. 47 schematically shows the longitudinal cross section of a lens barrel having a block including both the second and third lens units. FIG. 48 is an external view of elements of the lens barrel. FIG. 49 shows the external and internal arrangement of a second-third lens unit block 62. This lens barrel basically has the same arrangement as that of the above-described lens barrel 32 having a plurality of advancing barrels used in the lens-shutter single-lens reflex camera of the decentered lens barrel type (FIGS. 25 to 27C). The lens barrel includes a stationary barrel 64, a first rotatively movable barrel 65, a first non-rotatively movable barrel 66, a second rotatively movable barrel 67, a second non-rotatively movable barrel 68 and a third non-rotatively movable barrel 69. At the front of the third non-rotatively movable barrel 69 is provided a lens barrier unit 70 (incorporating a non-illustrated lens barrier).

Within the lens barrel are provided a first lens unit block 61, a second-third lens unit block 62 and a fourth lens unit block 63. The first lens unit block 61 includes a first lens unit 61a and a first lens unit holder 61b. The second-third lens unit block 62 includes a second lens unit 62a, a third lens unit 62b, a focusing unit 62c, an up-down total reflecting mirror 62d, a mechanism 62e for raising the total reflecting mirror 62d, a shutter unit 62f, a total reflecting mirror 62g, gears 62h and 62i for transmitting the driving force from the focusing unit 62c to the second lens unit 62a, and a finder portion 62j. The fourth lens unit block 63 includes a fourth lens unit 63a, a fourth lens unit holder 63b, an arm 63c having a cam follower for moving the fourth lens unit 63a, and a finder portion 63d.

Within the lens barrel are also provided finder blocks 71 and 72 as shown in FIG. 47. In an upper part of the camera body 30 is provided a finder block which is the same as the above-described fourth finder block 58 (FIG. 37). The finder block 72 has a similar arrangement to that of the above-described finder block 57 and includes a total reflecting mirror 72a for reflecting the finder luminous flux upward and a total reflecting mirror (not shown) for reflecting the finder luminous flux forward. When the diffusing plate P1 (FIGS. 5 to 8, FIGS. 15 to 18) is provided in the finder optical system in this embodiment, the diffusing plate P1 is disposed at the luminous flux incident side opening of the finder block 72 (see FIGS. 40 and 41) like in the above-described "lens barrel having independent lens barrels."

The optical system of this camera corresponds to the optical system of the camera of the "optical path switching type having a relay lens in the finder optical system" described with reference to FIG. 4. The taking optical system provided in the lens barrel is a four unit zoom optical system having positive, negative, positive and negative refractive power from the front side in which focusing is performed with the second lens unit 62a. The first lens unit 61a of positive refractive power and the second lens unit 62a of negative refractive power constitute the front lens unit L1. The third lens unit 62b of positive refractive power and the fourth lens unit 63a of negative refractive power constitute the taking optical system rear lens unit L2.

Zooming of the taking optical system is performed by moving the first lens unit block 61, the second-third lens unit block 62 and the fourth lens unit block 63 along the optical axes AX and AX1 and by moving the second lens unit 62a by means of the focusing unit 62c. That is, the focusing unit 62c functions as a driving unit for the second lens unit 62a used for both zooming and focusing.

Zooming of the finder optical system is performed by moving along the optical axis AX2 the finder portion 63d included in the fourth lens unit block 63. In the finder portion 63d, a finder optical system rear lens unit block (not shown) is secured which is the same as the above-described finder optical system rear lens unit block 80. Therefore, the finder optical system rear lens unit L3 (FIG. 4) held in the finder optical system rear lens unit block, or some of the lens elements thereof are moved for zooming by the zooming movement of the fourth lens unit block 63. Zooming of the finder optical system is thus performed.

For focusing, in the second-third lens unit block 62, the second lens unit 62a is driven by the focusing unit 62c located in front of the total reflecting mirror 62d. Thus, since focusing driving is performed within the second-third lens unit block 62, no cam mechanism is necessary for focusing, so that the arrangement of the lens barrel is simplified. As a result, the size and cost of the camera is reduced.

The total reflecting mirror 62d disposed between the second lens unit 62a and the third lens unit 62b switches the optical path of the luminous flux incident on the taking optical system between the optical path of the taking luminous flux and the optical path of the finder luminous flux (reflected luminous flux) in the middle of the taking optical system. The taking luminous flux and the finder luminous flux thus obtained are optically equivalent. The luminous flux whose optical path is switched between the two optical paths by the total reflecting mirror 62d is a luminous flux having been incident on the taking optical system (i.e. luminous flux having passed through the first and second lens units 62a and 62b). Therefore, no parallax is caused between the taking optical system and the finder optical system. Moreover, since the optical path is switched in the middle of the taking optical system, the back focus is reduced, so that the internal arrangement of the camera is made compact. As a result, the size of the camera is reduced.

Figure 40:
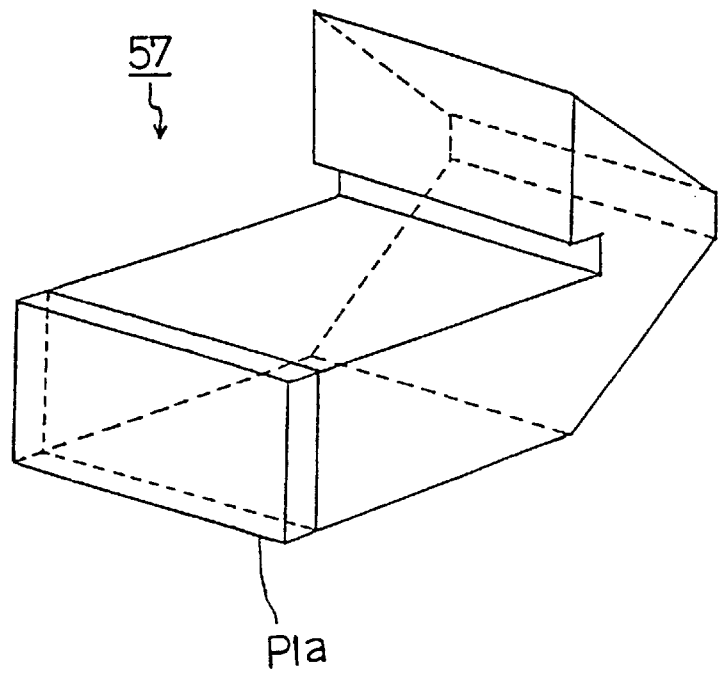
FIG. 40 is a perspective view showing a condition of attachment of a diffusing plate to the third finder block provided in the lens barrel of FIG. 33.
Figure 41:
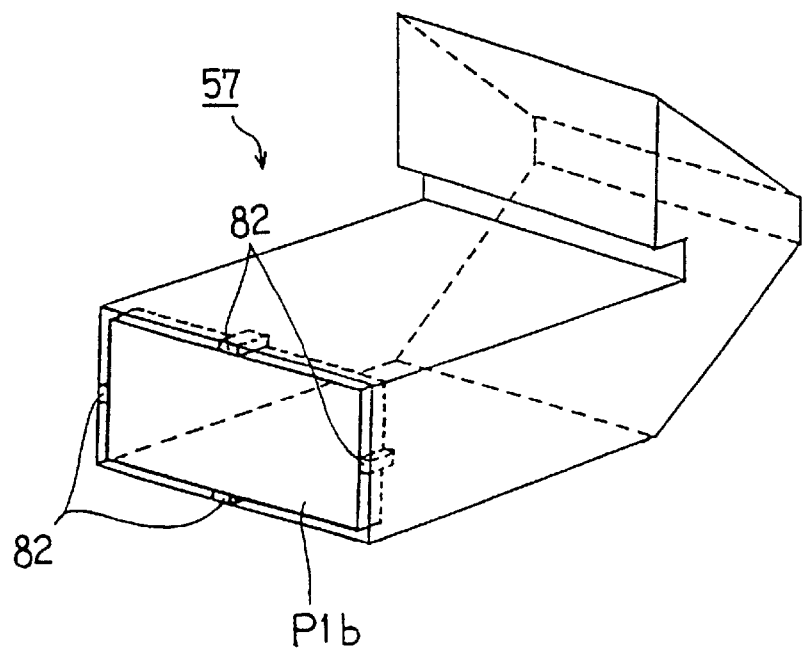
FIG. 41 is a perspective view showing another condition of attachment of the diffusing plate to the third finder block provided in the lens barrel of FIG. 33.

Since focusing is performed before the optical path is switched by the total reflecting mirror 62d, by disposing a diffusing plate on a focal plane as shown in the above-described FIGS. 40 and 41, focus condition can be confirmed through the finder without the elements in the finder optical system being moved for focusing. If the second lens unit 62a is used as a camera shake compensating optical system driven for camera shake compensation, the optical path is switched by the total reflecting mirror 62d after camera shake compensation has been made, so that the results of the camera shake compensation can be confirmed through the finder.

The total reflecting mirror 62d, included in the second-third lens unit block 62, is movable along the optical axes AX and AX1 of the taking optical system and is moved along the optical axes AX and AX1 during zooming as described above. Since the total reflecting mirror 62d is moved during zooming, the zooming movement of the taking optical system is not limited. On the other hand, since focusing is performed by the focusing unit 62c driving the second lens unit 62a in the second-third lens unit block 62 as described above, the focusing movement of the taking optical system is not limited.

Focusing may be performed by other focusing methods such as internal focusing, rear focusing and entire/front lens moving-out focusing as well as by moving the second lens unit 62a as described above. This is because the total reflecting mirror 62d is movable as described above and therefore the optical path is switched while the total reflecting mirror 62d is being moved along the optical axes AX and AX1 without interrupting the focusing movement of the taking optical system.

The shutter unit 62f incorporated in the second-third lens unit block 62 has a shutter which also serves as the aperture stop. The shutter unit 62f and the total reflecting mirror 62d provided in the front vicinity thereof are integrally moved during zooming along the optical axes AX and AX1 of the taking optical system since they are both included in the second-third lens unit block 62. Therefore, the total reflecting mirror 62d is moved together with the aperture stop in the vicinity of the aperture stop whenever it is moved during zooming. Consequently, the optical path is always switched at a point where the diameter of the luminous flux is smallest. By thus reducing the size of the surface for switching the optical path, the size of the total reflecting mirror 62d is reduced, so that the internal arrangement of the camera is made compact. As a result, the size of the camera is reduced.

Because of the size reduction of the total reflecting mirror 62d, there is some room left in the vicinity of the total reflecting mirror 62d. In this lens barrel arrangement, space is effectively used by disposing the focusing unit 62c in the front vicinity of the total reflecting mirror 62d and disposing the mirror raising mechanism 62e in the rear vicinity of the total reflecting mirror 62d. By thus arranging the driving system, the driving mechanism is made compact. Moreover, since the focusing unit 62c and the mirror raising mechanism may be driven by one driving source, the size and cost of the driving mechanism is reduced.

The optical path of the finder luminous flux passes through the finder portions 62j and 63d and the finder blocks 71 and 72, and reaches the eyepiece LE (FIG. 42) via the following route: As shown in FIG. 47, the luminous flux reflected upward by the total reflecting mirror 62d is reflected rearward by the total reflecting mirror 62g of the finder portion 62j as the finder luminous flux. Then, the luminous flux passes through the finder portion 63d to be incident on the finder block 71. On the luminous flux incident side of the finder block 71, a primary image is formed in the position of the primary image plane I1 shown in FIG. 42. The finder luminous flux thus imaged is reflected upward by the total reflecting mirror 72a of the finder block 72 and reaches the eyepiece LE via the same route as that of the above-described "lens barrel having independent blocks."

According to the arrangement of the finder portions 62j and 63d and the finder blocks 71 and 72 shown in FIG. 47, the finder portion 62j and the finder block 71 are movable into the finder portion 63d, and the finder block 72 is movable into the finder block 71, so that the length of the optical path of the finder luminous flux is variable according to the extension and contraction of the lens barrel. The arrangement of the finder portions 62j and 63d and the finder blocks 71 and 72 is not limited thereto. Any arrangement may be used as long as the length of the optical path is variable and the optical path is isolated from external light.

Next, the movement of the lens barrel will be described which is necessary for collapsing the lens barrel and for moving the first lens unit block 61, the second-third lens unit block 62 and the fourth lens unit block 63 during zooming. The focusing movement and a part of the zooming movement of the second lens unit 62a will not be described since they are made within the second-third lens unit block 62.

The stationary barrel 64 is secured to the camera body 30 (FIGS. 25 to 27C) and has an opening (not shown) formed in its periphery. First, an external rotation driving force (driving source such as a motor is not shown) is transmitted through the opening to the first rotatively movable barrel 65, so that the first rotatively movable barrel 65 is moved backward or forward while being rotated. The first rotatively movable barrel 65 is interlocked with the first non-rotatively movable barrel 66 by a bayonet. Further, a groove 64a into which a rearward portion of the barrel 66 is inserted is formed in the stationary barrel 64. Consequently, by the movement of the first rotatively movable barrel 65, the first non-rotatively movable barrel 66 is moved, with its rotation inhibited, together with the first rotatively movable barrel 65 along the optical axis AX.

When the first rotatively movable barrel 65 and the first non-rotatively movable barrel 66 are moved backward or forward as described above, the second rotatively movable barrel 67 is rotatively moved backward or forward by a cam mechanism comprised of the first rotatively movable barrel 65 and the first non-rotatively movable barrel 66. At this time, along a groove 66a formed in the first non-rotatively movable barrel 66, the second non-rotatively movable barrel 68 is non-rotatively moved along the optical axis together with the second rotatively movable barrel 67 bayonet-connected thereto. At this time, the second-third lens unit block 62 fixedly connected by a C shaped spring to the second non-rotatively movable barrel 68 is moved. The spring is fitted in a groove formed inside periphery of the barrel 68 although the groove is not shown in the drawing.

When the second rotatively movable barrel 67 and the second non-rotatively movable barrel 68 are moved backward or forward as described above, the third non-rotatively movable barrel 69 is non-rotatively moved by a cam mechanism comprised of the second rotatively movable barrel 67 and the second non-rotatively movable barrel 68. By the non-rotative movement of the third non-rotatively movable barrel 69, the first lens unit block 61 secured to the third non-rotatively movable barrel 69 is moved. Moreover, when the second rotatively movable barrel 67 and the second non-rotatively movable barrel 68 are moved backward or forward as described above, the fourth lens unit block 63 is moved through the arm 63c by the cam mechanism comprised of the second rotatively movable barrel 67 and the second non-rotatively movable barrel 68. Further, as the third non-rotatively movable barrel 69 is non-rotatively moved, the lens barrier unit 70 provided at the front of the third non-rotatively movable barrel 69 opens and closes the lens barrier in front of the first lens unit 61a.

In collapsing the lens barrel (FIG. 47), the first lens unit block 61, the second-third lens unit block 62 incorporating the total reflecting mirror 62d, and the fourth lens unit block 63 are moved toward the camera body 30 (e.g. FIG. 25) as described above. At this time, the finder portion 62j included in the second-third lens unit block 62, and the finder portion 63d included in the fourth lens unit block 63 are moved integrally with the lens unit blocks 62 and 63, respectively, toward the camera body 30. Moreover, as described above, the finder portion 62j and the finder block 71 is movable into the finder portion 63d, and the finder block 71 is movable so that the finder block 72 is inserted into the finder block 71. Therefore, the movements of the lens unit blocks 61, 62 and 63 are not limited by the finder portions 62j and 63d and the finder blocks 71 and 72.

Since the lens barrel is collapsed by moving the lens unit blocks 61, 62 and 63 and the finder blocks 71 and 72 toward the camera body 30 as described above, the camera becomes more compact when not in use by collapsing the lens barrel into the camera body 30 as shown in FIGS. 26C and 27C. Thus, a camera having this type of lens barrel is very convenient for carrying around.

<<Lens Barrel Arrangement of Upper Portion Projecting Lens Barrel Type Camera (FIG. 81)>>

Next, the lens barrel arrangement will be described of a camera having a projection on upper part of a lens barrel embodying the present invention. While an optical system of a luminous flux splitting type including a half reflection prism (FIG. 32) having a semi-transparent reflecting surface is used in the subsequently-described embodiment, an optical system of a luminous flux splitting type including a luminous flux splitter such as a pellicle mirror or a half mirror may be used instead. Moreover, an optical system of the optical path switching type may be used which includes the above-described up-down total reflecting mirror.

Figure 81:
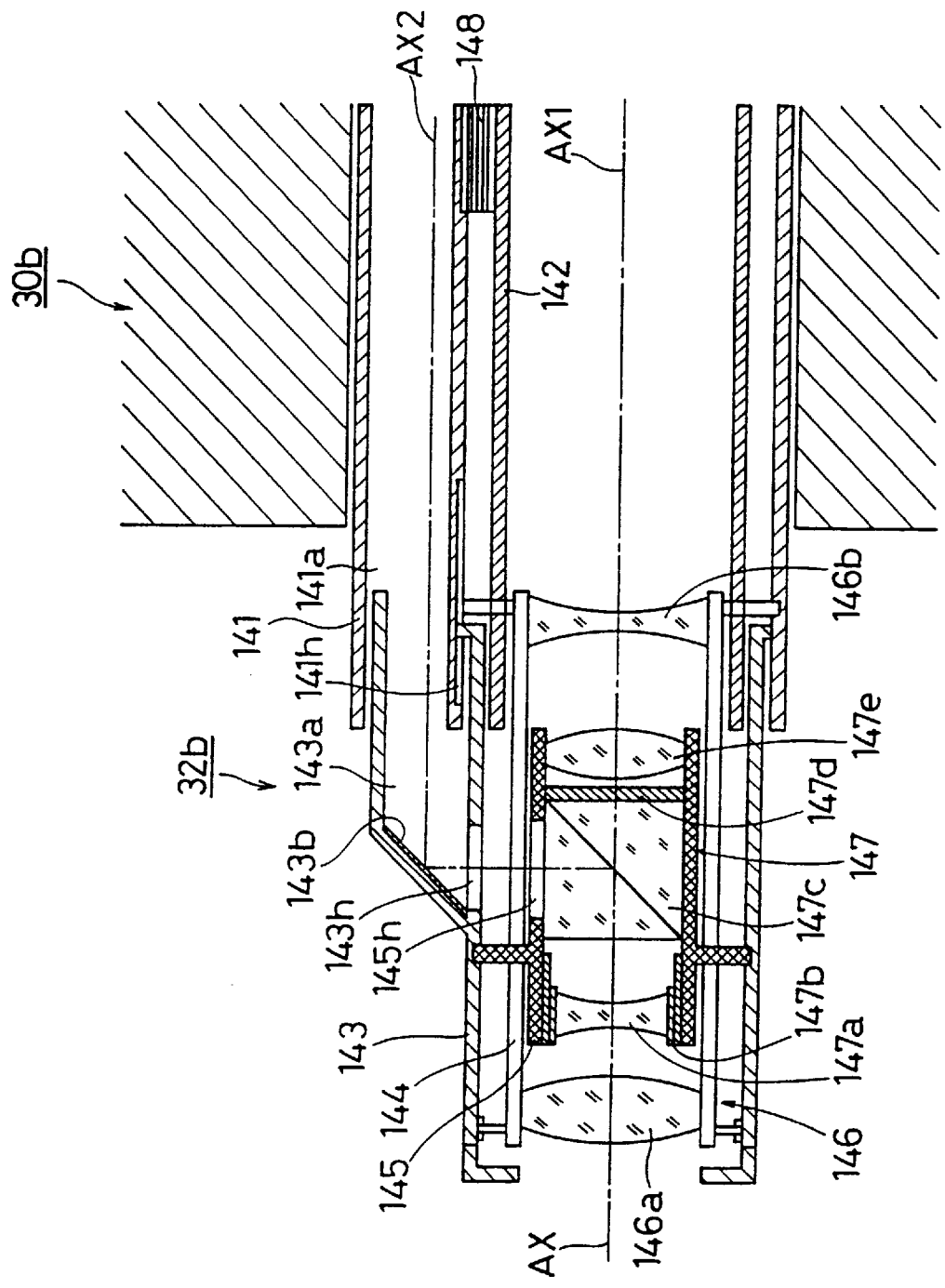
FIG. 81 is a longitudinal cross-sectional view schematically showing a lens barrel which has a block including both the first and fourth lens units and a block including both the second and third lens units, and constitutes a part of the projecting lens barrel type camera embodying the present invention.

FIG. 81 schematically shows the longitudinal cross section of the lens barrel 32b of the above-described projecting lens barrel type camera (FIG. 29) of the single movable segment structure. The lens barrel includes a stationary barrel 141, a rotary barrel 142, a non-rotatively movable barrel 143, a rotatively movable barrel 144 and a non-rotary optical system holder 145. At the front of the non-rotatively movable barrel 143 is provided a lens barrier unit (not shown) incorporating a lens barrier.

In the lens barrel 32b, since the finder optical system and the taking optical system are separately moved out, it is necessary to secure the optical path of the finder luminous flux taken out by a subsequently-described half reflection prism 147c so that the luminous flux is not intercepted by the lens barrel. For this purpose, the non-rotatively movable barrel 143 has a hole 143h in a position where the finder luminous flux passes, the optical system holder 145 has a hole 145h in a position where the finder luminous flux passes, and the rotatively movable barrel 144 which rotates within the lens barrel 32b is formed of a wholly transparent barrel.

If a large hole (or a notch) for passing the finder luminous flux is formed in the rotatively movable barrel 144 which rotates during zooming, the finder luminous flux can be taken out in the middle of the taking optical system. However, such a large hole in the rotatively movable barrel deteriorates the strength of the lens barrel. With the rotatively movable barrel 144 which is wholly transparent as described above, since it is unnecessary to form a large hole, the strength of the lens barrel does not deteriorate, and since the finder luminous flux is transmitted by the rotatively movable barrel 144, the optical path of the finder luminous flux taken out in the middle of the taking optical system is secured.

Within the lens barrel 32b are provided a first-fourth lens unit block 146 and a second-third lens unit block 147. The second and third lens units are provided in the same block and the first and fourth lens units are provided in the same block. The first-fourth lens unit block 146 includes a first lens unit 146a and a fourth lens unit 146b. The second-third lens unit block 147 includes a second lens unit 147a, a second lens unit holder 147b, a half reflection prism 147c having a semi-transparent reflecting surface, a shutter unit 147d and a third lens unit 147e. Although not shown, the second-third lens unit block 147 also includes a focusing unit comprising a focusing motor, and gears and the like for transmitting the driving force from the focusing unit through the second lens unit holder 147b to the second lens unit 147a.

Within the lens barrel 32b are also provided a finder portion 143a included in the non-rotatively movable barrel 143, and a finder portion 141a included in the stationary barrel 141. Within the non-rotatively movable barrel 143 is provided a total reflecting mirror 143b for reflecting rearward the luminous flux taken out from the luminous flux split by the half reflection prism 147c. Within the camera body 30b are provided finder blocks (not shown) the same as the third finder block 57 (FIG. 36) and the fourth finder block 58 (FIG. 37).

The optical system of this camera corresponds to the optical system of the camera of the "luminous flux splitting type having a relay lens in the finder optical system" described with reference to FIG. 2 (however, the half reflection prism 147c is used instead of the half mirror HM1). The taking optical system provided in the lens barrel 32b is a four unit zoom optical system having positive, negative, positive and negative refractive power from its front side in which focusing is performed with the second lens unit 147a. The first lens unit 146a of positive refractive power and the second lens unit 147a of negative refractive power constitute the front lens unit L1. The third lens unit 147e of positive refractive power and the fourth lens unit 146b of negative refractive power constitute the taking optical system rear lens unit L2.

Zooming of the taking optical system is performed by moving the first-fourth lens unit block 146 and the second-third lens unit block 147 along the optical axes AX and AX1 and by moving the second lens unit 147a by means of the focusing unit (not shown). That is, for zooming, the first lens unit 146a and the fourth lens unit 146b are integrally moved and the focusing unit functions as a driving unit for the second lens unit 147a used for both zooming and focusing.

Zooming of the finder optical system is performed by moving the finder portion 143a of the non-rotatively movable barrel 143 along the optical axis AX2. That is, in the finder portion 143a, a finder optical system rear lens unit block (not shown) is provided which is the same as the above-described finder optical system rear lens unit block 80, and by the zooming movement of the non-rotatively movable barrel 143, the finder optical system rear lens unit L3 (FIG. 2) held in the finder optical system rear lens unit block, or some of the lens elements thereof are moved integrally or in conjunction with the non-rotatively movable barrel 143 for zooming. Zooming of the finder optical system is thus performed.

For focusing, the second lens unit 147a is driven by the focusing unit (not shown) in the second-third lens unit block 147. Thus, since focusing driving is performed within the second-third lens unit block 147, no cam mechanism is necessary for focusing, so that the arrangement of the lens barrel is simplified. As a result, the size and cost of the camera is reduced.

The half reflection prism 147c disposed between the second lens unit 147a and the shutter unit 147d splits the luminous flux incident on the taking optical system into the taking luminous flux and the finder luminous flux (reflected luminous flux) in the middle of the taking optical system. The taking luminous flux and the finder luminous flux thus obtained are optically equivalent. The luminous flux split by the half reflection prism 147c is a luminous flux having been incident on the taking optical system (i.e. luminous flux having passed through the first and second lens units 146a and 147a). Therefore, no parallax is caused between the taking optical system and the finder optical system. Moreover, since the luminous flux is split in the middle of the taking optical system, the back focus is reduced, so that the internal arrangement of the camera is made compact. As a result, the size of the camera is reduced.

Since focusing is performed before the luminous flux is split by the half reflection prism 147c, by disposing the diffusing plates P1a and P1b on a focal plane as shown in the above-described FIGS. 40 and 41, focus condition can be confirmed through the finder without the elements in the finder optical system being moved for focusing. If the second lens unit 147a is used as a camera shake compensating optical system driven for camera shake compensation, the luminous flux is split by the half reflection prism 147c after camera shake compensation has been made, so that the results of the camera shake compensation can be confirmed through the finder.

The half reflection prism 147c, included in the second-third lens unit block 147, is movable along the optical axes AX and AX1 of the taking optical system and is moved along the optical axes AX and AX1 during zooming as described above. Since the half reflection prism 147c is moved during zooming as described above, the zooming movement of the taking optical system is not limited. On the other hand, since focusing is performed by the focusing unit driving the second lens unit 147a in the second-third lens unit block 147 as described earlier the focusing movement of the taking optical system is not limited.

Focusing may be performed by other focusing methods such as internal focusing, rear focusing and entire/front lens moving-out focusing as well as by moving the second lens unit 147a as described above. This is because the half reflection prism 147c is movable as mentioned above and therefore the luminous flux is split while the half reflection prism 147c is being moved along the optical axes AX and AX1 without interrupting the focusing movement of the taking optical system.

The shutter unit 147d incorporated in the second-third lens unit block 147 has a shutter which also serves as the aperture stop. The shutter unit 147d and the half reflection prism 147c disposed directly in front thereof are integrally moved along the optical axes AX and AX1 of the taking optical system during zooming since they are both included in the second-third lens unit block 147. Therefore, the half reflection prism 147c is moved together with the aperture stop in the vicinity of the aperture stop whenever it is moved during zooming. Consequently, the luminous flux is always split at a point where its diameter is smallest. By thus reducing the size of the surface for splitting the luminous flux, the size of the half reflection prism 147c is reduced, so that the internal arrangement of the camera is made compact. As a result, the size of the camera is reduced.

Because of the size reduction of the half reflection prism 147c, there is some room left in the vicinity of the half reflection prism 147c. To use the space effectively, it is preferable to dispose the focusing unit in the front vicinity of the half reflection prism 147c. By disposing the driving system such as the focusing unit in the front vicinity of the half reflection prism 147c, the driving mechanism is made compact. Moreover, when an optical path splitter such as a total reflecting mirror is used in this lens barrel, since the focusing unit and the mirror raising mechanism can be driven by one driving source, the size and cost of the driving mechanism is reduced.

The optical path of the finder luminous flux passes through the finder portions 143a and 141a and reaches the eyepiece LE (FIG. 42) via the following route: As shown in FIG. 81, the luminous flux reflected upward by the half reflection prism 147c is reflected rearward by the total reflecting mirror 143b of the finder portion 143a as the finder luminous flux. Then, the luminous flux passes through the finder portions 143a and 141a to be incident on the finder block 57 (FIG. 36). On the luminous flux incident side of the finder block 57, a primary image is formed in the position of the primary image plane I1 shown in FIG. 42. The finder luminous flux thus imaged is reflected upward by the total reflecting mirror 57a of the finder block 57 and reaches the eyepiece LE via the same route as that of the above-described "lens barrel having independent blocks."

Next, the movement of the lens barrel will be described which is necessary for collapsing the lens barrel and for moving the first-fourth lens unit block 146 and the second-third lens unit block 147 during zooming. The focusing movement and a part of the zooming movement of the second lens unit 147a will not be described since they are made within the second-third lens unit block 147.

The stationary barrel 141 is secured to the camera body 30b and has a rotary barrel 142 inside. First, an external rotation driving force (driving source such as a motor is not shown) is transmitted through a gear 148 to the rotary barrel 142, so that the rotary barrel 142 is rotated without being moved along the optical axis (i.e. without being moved backward or forward). When the rotary barrel 142 is rotated, the rotatively movable barrel 144 is rotatively moved backward or forward by a cam mechanism comprised of the stationary barrel 141 and the rotary barrel 142. By the movement of the rotatively movable barrel 144, the first-fourth lens unit block 146 secured to the rotatively movable barrel 144 is moved.

When the rotatively movable barrel 144 is moved backward or forward as described above, the non-rotatively movable barrel 143 bayonet-connected to the rotatively movable barrel 144 is non-rotatively moved backward or forward along the optical axis integrally with the rotatively movable barrel 144 along a groove 141h formed in the stationary barrel 141, and the optical system holder 145 is non-rotatively moved backward or forward by a cam mechanism comprised of the rotatively movable barrel 144 and the non-rotatively movable barrel 143. By the non-rotative backward or forward movement of the optical system holder 145, the second-third lens unit block 147 secured to the optical system holder 145 is moved. Further, as the non-rotatively movable barrel 143 is non-rotatively moved, the lens barrier unit (not shown) provided at the front of the non-rotatively movable barrel 143 opens and closes the lens barrier in front of the first lens unit 146a.

<<Finder Arrangement (FIGS. 50 to 52)>>

Next, the finder arrangement of the camera embodying the present invention will be described with respect to three embodiments. In the camera shown in FIG. 50, the taking optical system includes from the subject side a first lens unit 91, a second lens unit 92, a mirror (such as an up-down total reflecting mirror or a half mirror) 95, a shutter unit 96, a third lens unit 93 and a fourth lens unit 94. The taking optical system forms a subject image on the film surface N1. The finder optical system includes the first lens unit 91, the second lens unit 92 and the mirror 95 which are shared with the taking optical system, and a total reflecting mirror 97, a total reflecting mirror 98, a total reflecting mirror 99 and the eyepieces LE. In front of the total reflecting mirror 98 is present the primary image plane I1.

The finder luminous flux reflected upward by the mirror 95 is reflected rearward by the total reflecting mirror 97 and then rightward by the total reflecting mirror 98. Then, the luminous flux is reflected rearward by the total reflecting mirror 99 to reach the eyepiece LE. This arrangement which uses no inverting optical system or relay lens is simple and is therefore advantageous in reducing the size of the camera.

Figure 50:
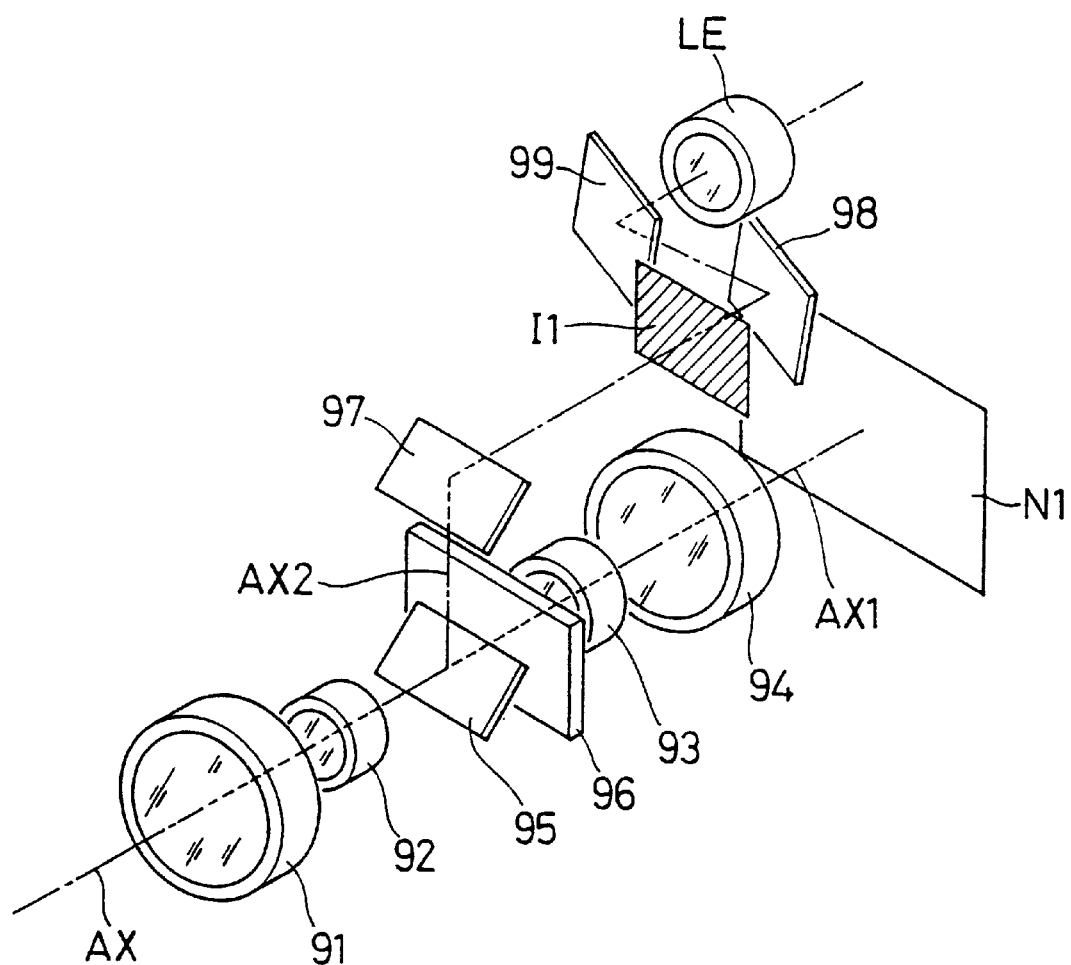
FIG. 50 is a perspective view schematically showing an arrangement of the finder optical system and the taking optical system of the camera embodying the present invention.
Figure 51:
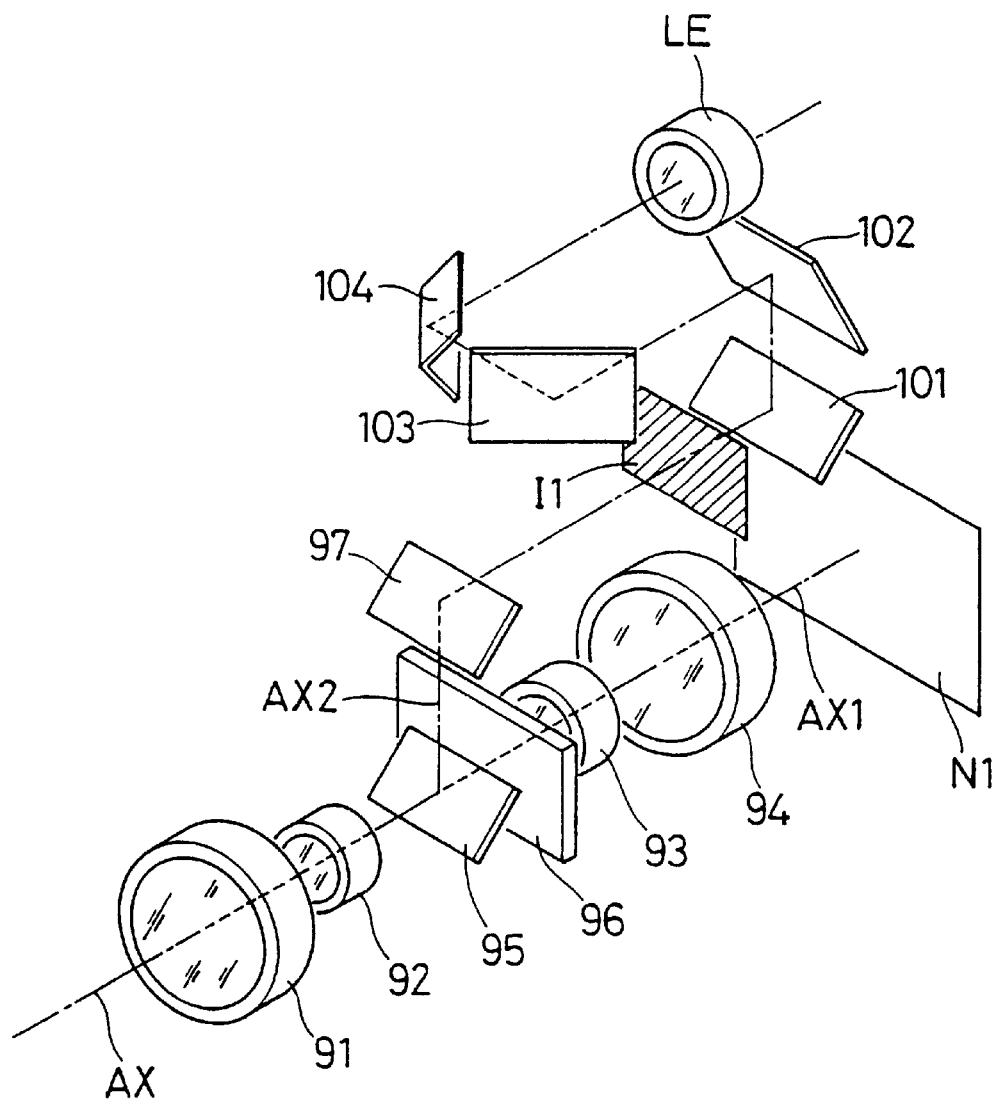
FIG. 51 is a perspective view schematically showing another arrangement of the finder optical system and the taking optical system of the camera embodying the present invention.

The camera shown in FIG. 51 is different from that of FIG. 50 in the arrangement from the primary image plane I1 to the eyepiece LE of the finder optical system. Specifically, the finder luminous flux having been imaged in the position of the primary image plane I1 is reflected upward by a total reflecting mirror 101 and then forward by a total reflecting mirror 102. Then, the luminous flux is reflected rightward by a total reflecting mirror 103 and vertically inverted by a roof mirror 104 to reach the eyepiece LE. In this case, since the optical path of the finder luminous flux is longer than that of the finder optical system shown in FIG. 50, the eyepiece LE having a longer focal length is necessary. Moreover, since no relay lens is used, the roof mirror 104 is used for vertically inverting the finder image.

Figure 52:
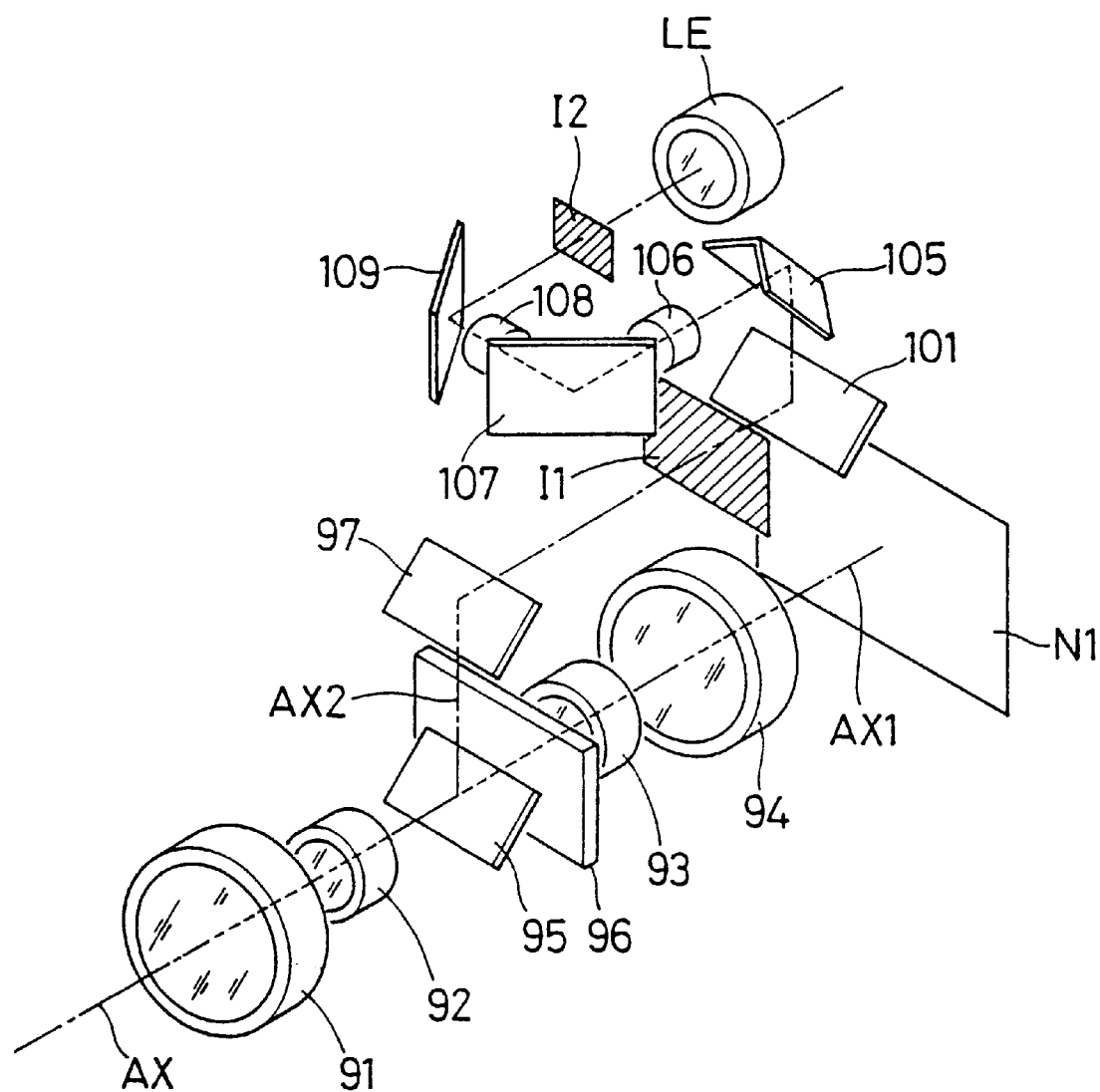
FIG. 52 is a perspective view schematically showing another arrangement of the finder optical system and the taking optical system of the camera embodying the present invention.

The camera shown in FIG. 52 is different from that of FIG. 51 in the arrangement from the total reflecting mirror 101 to the eye pieces LE of the finder optical system. Specifically, the finder luminous flux is reflected upward by the total reflecting mirror 101 and then horizontally inverted by a roof mirror 105 to pass through a first relay lens 106. Then, the luminous flux is reflected rightward by a total reflecting mirror 107 to pass through a second relay lens 108, reflected rearward by a total reflecting mirror 109, and then re-imaged in the position of the secondary image plane I2 to reach the eyepiece LE. Since the first and second relay lenses are provided, the roof mirror 105 is used for horizontally inverting the finder image.

<<Camera Shake Compensating Unit (FIGS. 53 to 55)>>

Figure 53:
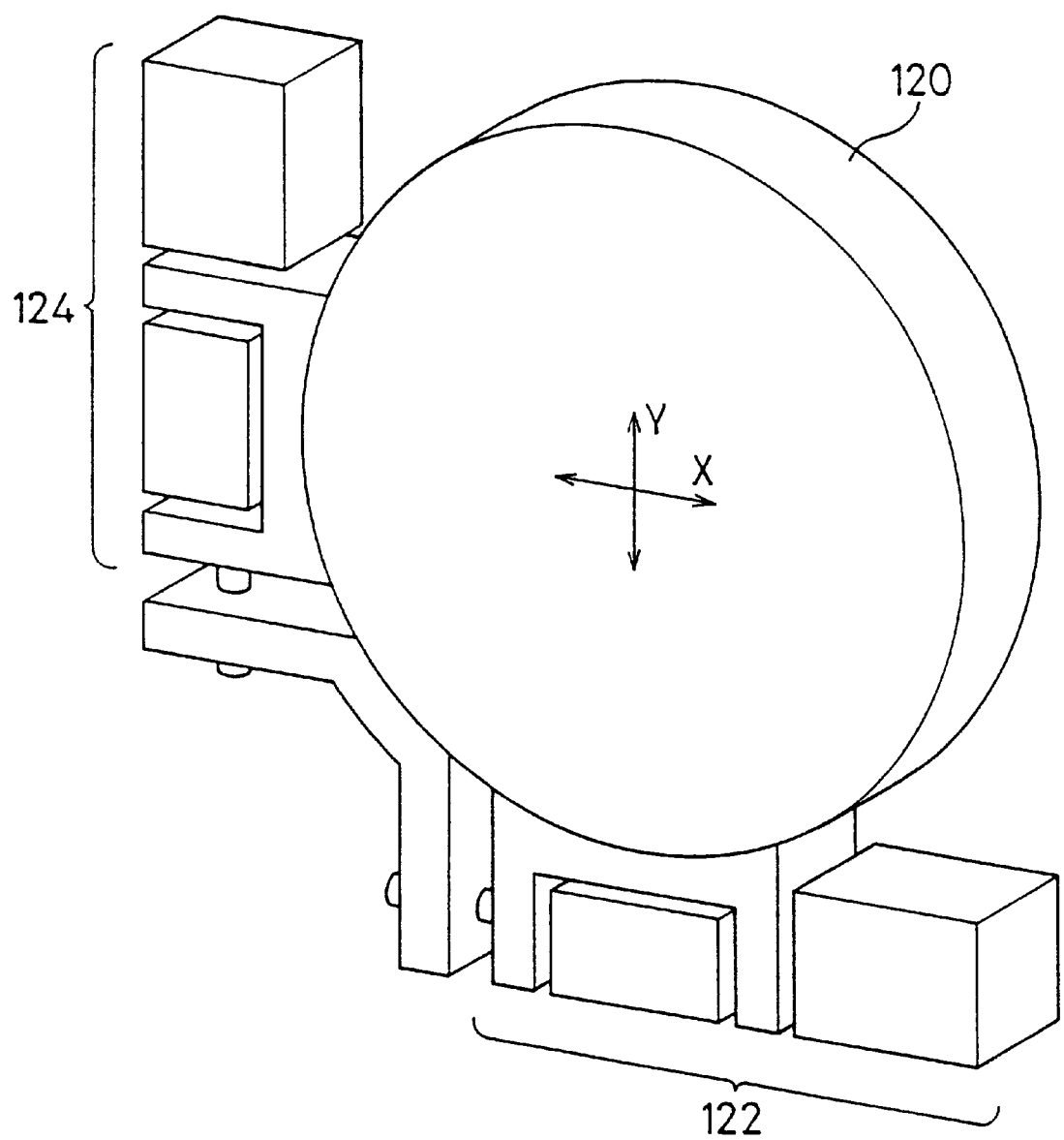
FIG. 53 is an external perspective view showing a camera shake compensating unit suitable for use in the camera embodying the present invention.
Figure 54:
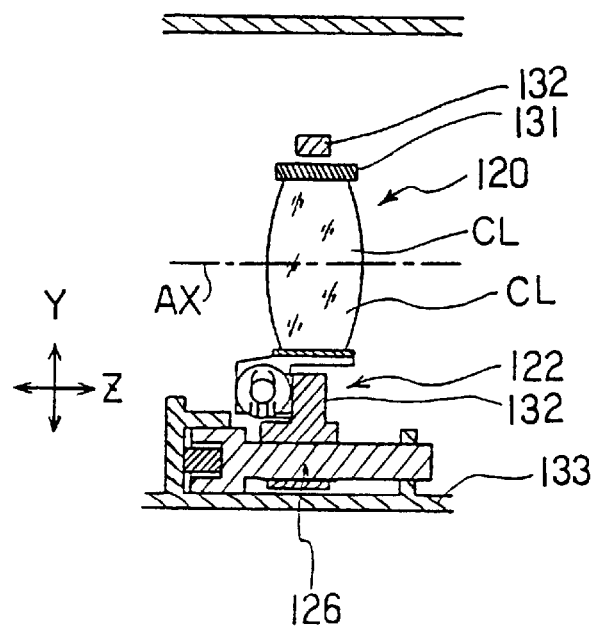
FIG. 54 is a longitudinal cross-sectional view showing the camera shake compensating unit of FIG. 53 mounted in the lens barrel.
Figure 55:
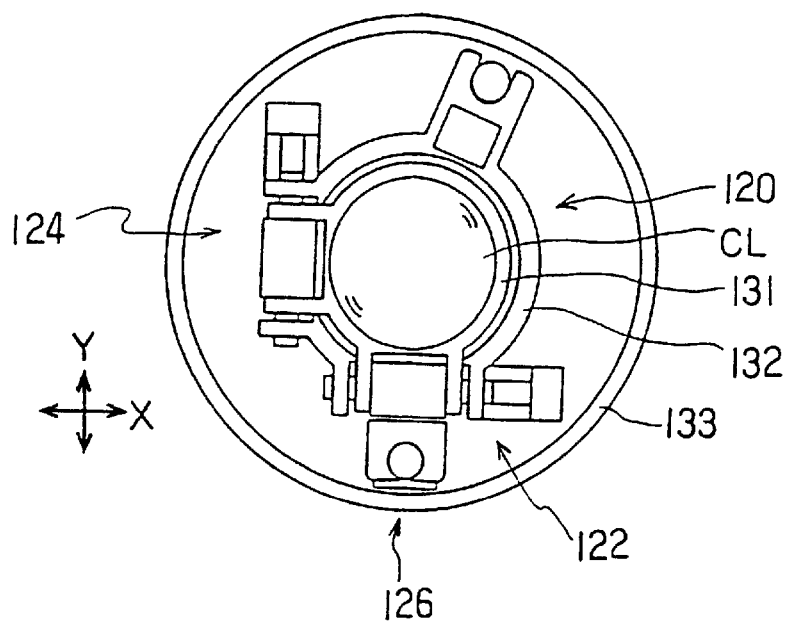
FIG. 55 is a front view showing the camera shake compensating unit of FIG. 53 mounted in the lens barrel.

Next, a camera shake compensating unit suitable for use in the camera embodying the present invention will be described with reference to FIGS. 53 to 55. FIG. 53 is an external perspective view of the camera shake compensating unit. FIG. 54 is a longitudinal cross-sectional view showing the camera shake compensating unit mounted in the lens barrel. FIG. 55 is a front view of the camera shake compensating unit mounted in the lens barrel.

As shown in FIG. 53, an X-direction actuator 122 and a Y-direction actuator 124 are attached to a moving block 120. The X- and Y-directions are directions intersecting at right angles on a plane vertical to the optical axis AX. As shown in FIGS. 54 and 55, the moving block 120 includes a camera shake compensating optical system CL also used as the focusing optical system, and a lens frame 131 for holding the camera shake compensating optical system CL. To the lens frame 131 are attached the X-direction actuator 122 and the Y-direction actuator 124 secured to a base frame 132. The base frame 132 is attached to a Z-direction actuator 126 secured to a lens barrel 133.

Camera shake compensation is made by parallelly decentering the camera shake compensating optical system CL in the X- and Y-directions (i.e. by moving CL vertically to the optical axis AX). For the parallel decentering of the camera shake compensating optical system CL, the X-direction actuator 122 moves the lens frame 131 in the X-direction and the Y-direction actuator 124 moves the lens frame 131 in the Y-direction. For focusing, the Z-direction actuator 126 moves the base frame 132 along the optical axis AX (i.e. in the Z-direction).

In the camera shake compensation unit whose camera shake compensating optical system CL is also used for focusing, the three actuators 122, 124 and 126 are concentrated in one place. Therefore, with the compensating unit, the internal arrangement of the lens barrel is made simple and compact, so that the size of the camera is reduced.

For example, by employing the camera shake compensating unit in the second lens unit block 42 (FIG. 33) or in the second-third lens unit block 62 (FIG. 47), not only the size reduction of the camera is realized but both focusing and camera shake compensation functions are realized. Further, since the second lens units 42a and 62a used as the camera shake compensating optical system CL are disposed on the subject side of the up-down total reflecting mirrors 45a and 62d, the optical path of the luminous flux is switched after camera shake compensation has been made. Consequently, the results of the camera shake compensation can be confirmed through the finder. For example, by continuously making camera shake compensation after automatic focusing has been performed, the user can go on to a release operation while confirming the results of the camera shake compensation. In the camera of the luminous flux splitting type using the half mirror, in addition to the above-described advantages, an advantage is obtained that the results of the camera shake compensation can be confirmed through the finder even during film exposure.

The camera shake compensating unit makes the camera shake compensation based on data obtained by a camera shake sensor. Among known camera shake sensors are a dynamic sensor (e.g. angular velocity sensor) which dynamically detects camera shake and an optical sensor (e.g. CCD sensor) which optically detects camera shake.

The dynamic sensor is usable for cameras of any optical arrangements since it detects the actual camera shake. Therefore, the dynamic sensor is usable for either of the above-described optical path switching type and luminous flux splitting type cameras. On the contrary, the optical sensor may have a positional limitation according to the optical arrangement. For example, if the optical sensor is disposed within the finder optical system of the optical path switching type camera, since the optical path is switched from the optical path of the finder luminous flux to that of the taking luminous flux when the mirror is raised in response to a shutter release, camera shake detection is interrupted during film exposure. Therefore, when an optical sensor is used for the optical path switching type camera, it is desirable to dispose the optical sensor in front of the optical path splitter or to provide an optical system exclusively used for camera shake detection separately from the taking and finder optical systems.

<<Control Arrangement of Camera (FIGS. 56 and 57)>>

Figure 56:
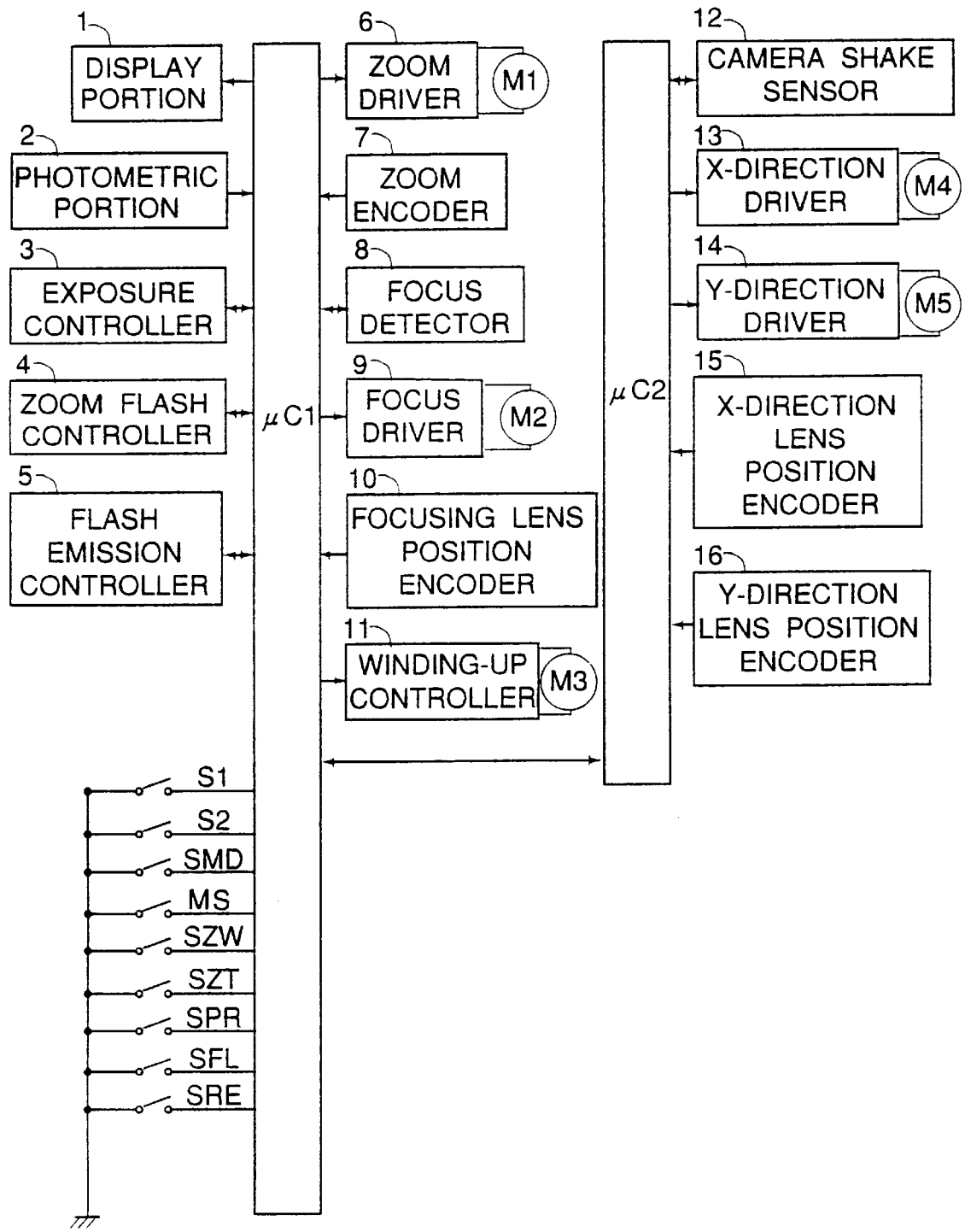
FIG. 56 is a block diagram showing a control arrangement of the luminous flux splitting type camera embodying the present invention.
Figure 57:
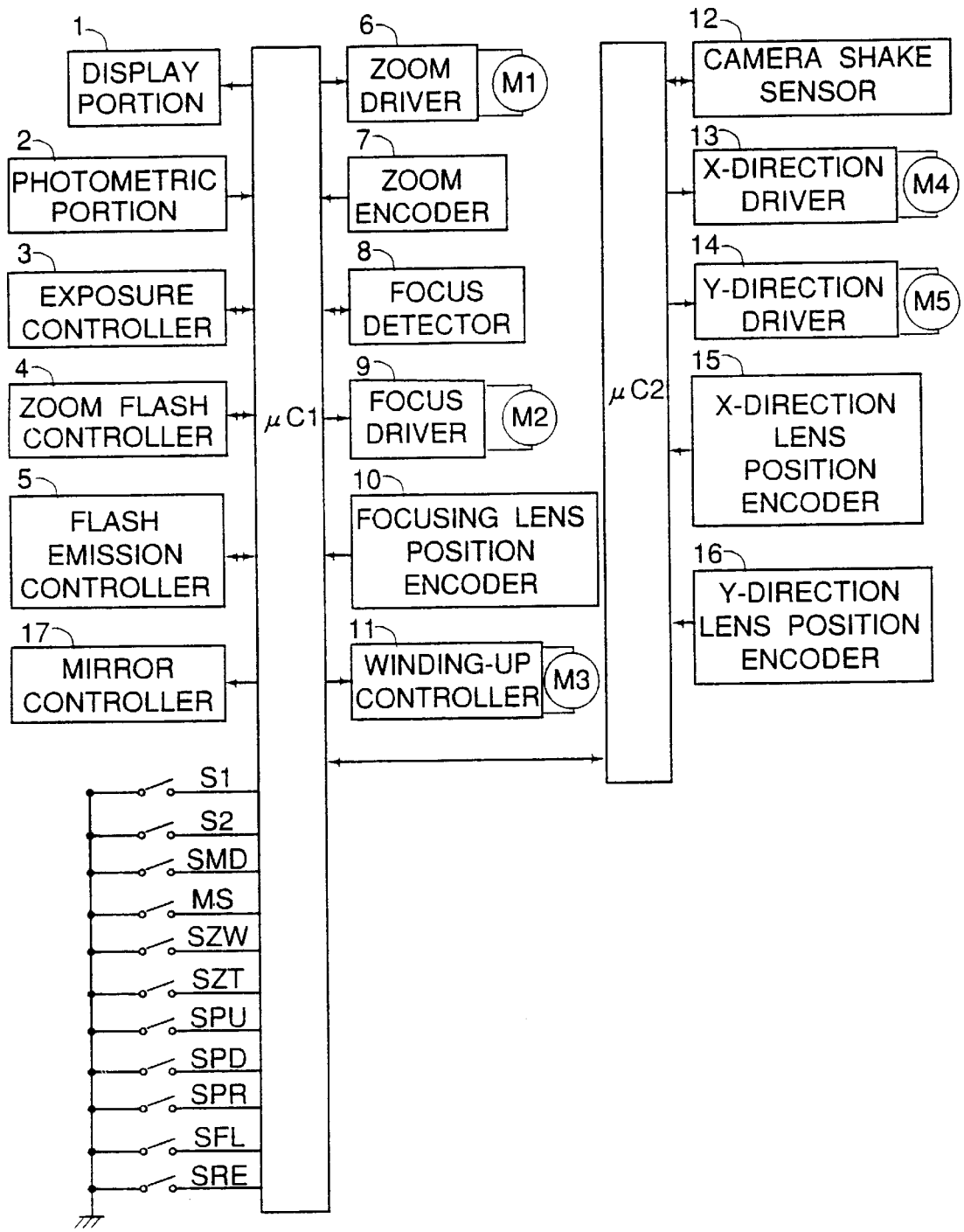
FIG. 57 is a block diagram showing a control arrangement of the optical path switching type camera embodying the present invention.

Next, the control arrangement of the camera embodying the present invention will be described based on the block diagrams of FIGS. 56 and 57. FIG. 56 shows the control arrangement of the luminous flux splitting type camera. FIG. 57 shows the control arrangement of the optical path splitting type camera. The elements of both types will be described together since the control arrangement of the luminous flux splitting type and that of the optical path switching type are the same except that a mirror controller 17, a mirror-up switch SPU and a mirror-down switch SPD are further provided in the optical path switching type.

A microcomputer μC1 is provided for controlling the entire camera system. A display portion 1 displays warning and comprises a light emitting diode (LED) or a liquid crystal display (LCD). A photometric portion 2 measures the brightness of the subject based on an output from a photometric device (e.g. corresponding to the photometric device SE of FIGS. 5 to 8) comprising a silicon photocell (SPC). In this arrangement, it is assumed that the photometric device is disposed within the finder optical system (FIGS. 5 to 8). Further, it is assumed that a photometric device for available light is used for both photometry and light adjustment of flash photography. Thereby, the photometry possible range increases for dark areas and, for example, an integrating CCD sensor for focus condition detection and camera shake detection receives a greater amount of light. An exposure controller 3 controls exposure of the film provided in the camera body to the light of the taking optical system. A zoom flash controller 4 varies the irradiation angle of the flash (corresponding to the flash portion 34 and the macro flash portion 35 of FIG. 25) according to the focal length of the optical system. A flash emission controller 5 controls the emission and the amount of emission of the flash. The controller 5 will be described later with reference to FIG. 58.

A zoom driver 6 varies the focal length by moving the elements of the optical system with a motor M1. A zoom encoder 7 is an encoder which detects the focal length of the taking optical system and the position of collapse of the lens barrel. A focus detector 8 performs focus detection according to the phase difference detection method (or the contrast detection method) based on data from a focus condition detecting device (e.g. corresponding to the focus condition detecting device SF of FIGS. 9 to 12). A focusing driver 9 drives the focusing lens (corresponding to the second lens unit 42a of FIG. 33 and the second lens unit 62a of FIG. 47) with a motor M2. A focusing lens position encoder 10 detects the amount of movement of the focusing lens from its infinity position. A winding-up controller 11 winds up the film by one frame with a motor M3.

A microcomputer μC2 is provided for controlling camera shake detection and camera shake compensation. A camera shake sensor 12 outputs data for camera shake compensation. In the luminous flux splitting type camera (FIG. 56), a CCD sensor comprising an integration-type area CCD is used as the camera shake sensor 12. In the optical path switching type camera (FIG. 57), an angular velocity sensor is used as the camera shake sensor 12. An X-direction driver 13 (corresponding to the X-direction actuator 122 of FIGS. 53 to 55) drives the camera shake compensating optical system CL (FIGS. 54 and 55) in the X-direction with a motor M4. A Y-direction driver 14 (corresponding to the Y-direction actuator 124 of FIGS. 53 to 55) drives the camera shake compensating optical system CL (FIGS. 54 and 55) in the Y-direction with a motor M5.

In the luminous flux splitting type camera (FIG. 56), the integration-type CCD for focus detection used as the focus condition detecting device may be used also as the camera shake sensor 12. In that case, however, it is necessary to use an area sensor or a cross sensor. By using the focus detecting sensor also as the camera shake sensor as described above, the cost is reduced. Furthermore, since the effect of the reduction in light quantity caused by splitting the luminous flux to obtain the focus condition detection luminous flux and the camera shake compensation luminous flux is decreased, the integration time is reduced, so that the response improves. As a result, the AF accuracy and the camera shake compensation accuracy both improve.

Figure 77:
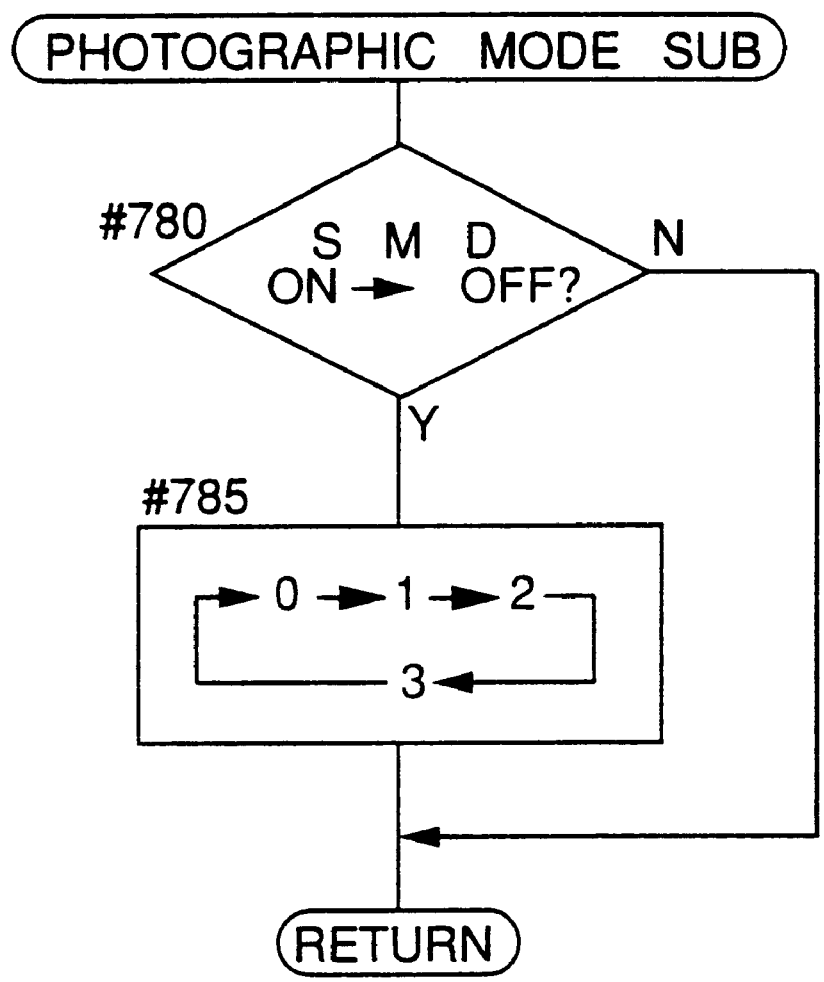
FIG. 77 is a flowchart of a photographic mode subroutine of the camera embodying the present invention.

A switch S1 is turned on by the first-stroke depression of the release button 36 (FIG. 25). A switch S2 is turned on by the second-stroke depression (farther than the first-stroke depression) of the release button 36 (FIG. 25). A switch SMD is for setting and changing photographic modes, i.e. a macro photography mode and a mode in which zooming is executed during exposure of the film (hereinafter referred to as during-exposure zooming). Control of the photographic modes will be described later (FIG. 77). A main switch MS is a toggle switch. The camera is made operable by turning on the main switch MS.

A switch SZW is for zooming to the wide angle side. A switch SZT is for zooming to the telephoto side. A switch SPR is turned on when the mirror for the luminous flux splitting or the optical path switching is in its retracted position (FIG. 27C). A switch SFL is for setting a flash emission mode. A switch SRE is for setting a red eye reduction mode to prevent red eye in flash photography.

The mirror controller 17 switches the optical path by raising the mirror from the viewing position to the taking position and by lowering it from the taking position to the viewing position. The mirror may be lowered by the winding-up controller 11 together with the winding up of the film. The mirror-up switch SPU is for starting the raising of the mirror for the optical path switching. The mirror-down switch SPD is for starting the lowering of the mirror for the optical path switching.

<Flash Emission Control Circuit (FIG. 58)>

Figure 58:
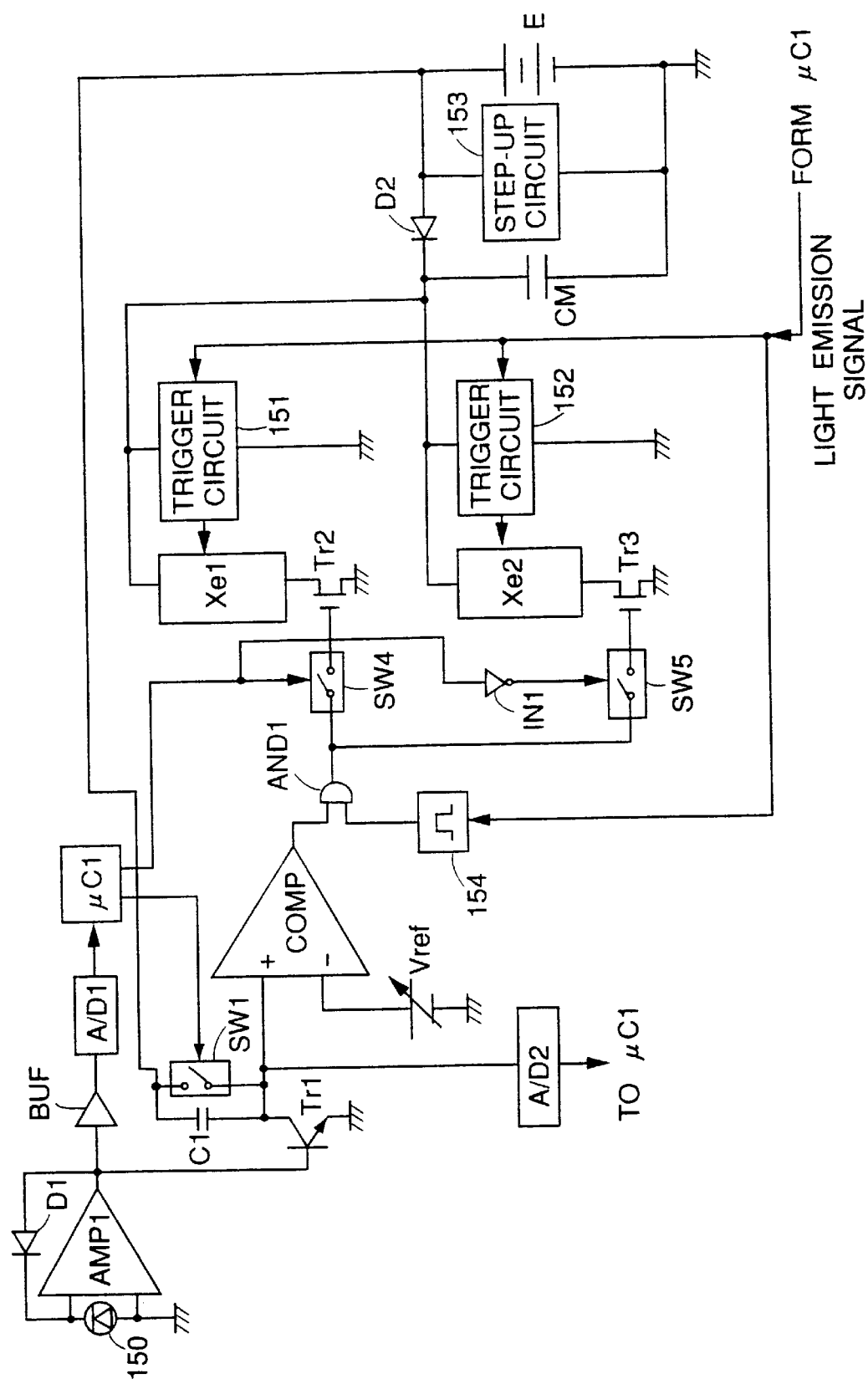
FIG. 58 is a circuit diagram of a flash emission controller of FIGS. 56 and 57.

The circuit arrangement of the flash emission controller 5 used in the above-described camera (FIGS. 56 and 57) will be described with reference to FIG. 58. A light receiving device 150, which comprises SPC, is disposed in the finder optical system and used for both available light photometry and light adjustment for flash emission control as described earlier. In the available light photometry, photometry is performed, for example, by use of the light corresponding to the spot metering area ABVSP (FIG. 24). In the photometry for flash light adjustment, in the luminous flux splitting type camera (FIG. 56), the light receiving device 150 receives the light from the subject during film exposure, whereas in the optical path switching type camera (FIG. 57), the light receiving device 150 receives the light from the subject obtained in pre-emission performed prior to the film exposure.

AMP1 is an operational amplifier which outputs a compressed voltage according to the light received by the light receiving device 150. D1 is a compressing diode. BUF is a buffer which outputs the compressed voltage to an analog-to-digital (A/D) converter A/D1. A/D1 is an A/D converting circuit which A/D converts the compressed voltage from the buffer BUF to output available light photometric data to the microcomputer μC1. Tr1 is a transistor which converts the compressed voltage into an extended current to be accumulated in a capacitor C1. C1 is a capacitor which accumulates the extended current. SW1 is an accumulation control switch which is turned off in response to the flash emission and turned on when the emission is terminated. A/D2 is an A/D converting circuit which latches the voltage accumulated in the capacitor C1 and A/D converts it to output photometric data for flash light adjustment to the microcomputer μC1. COMP is a comparator. To one input thereof is inputted a signal in accordance with the irradiated light and to the other input thereof is inputted a set voltage Vref in accordance with the amount of exposure for appropriate exposure. The output of the comparator COMP is set at "H" when the signal voltage in accordance with the irradiated light is Vref or higher, and is set at "L" when the voltage is lower than Vref.

Xe1 is a xenon tube incorporated in the flash portion 34 (FIG. 25). Xe2 is a xenon tube incorporated in the macro flash portion 35 (FIG. 25). AND1 is an AND circuit. To one terminal thereof is inputted an output of the comparator COMP and to the other terminal is inputted a signal in accordance with a light emission signal. At this time, the signal in accordance with the light emission is converted into a pulse signal at a waveform shaping circuit 154 and supplied to the AND circuit AND1. The pulse width of the signal is several milliseconds. SW4 is a switch which is turned on when the xenon tube Xe1 is used. SW5 is a switch which is turned on when the xenon tube Xe2 is used. The turning on and off of the switches SW4 and SW5 is controlled by a switching signal from the microcomputer μC1. IN1 is an invertor which inverts the switching signal and supplies the inverted signal to the switch SW5. The output of the AND circuit AND1 is coupled to a transistor Tr2 by way of the switch SW4 and to a transistor Tr3 by way of the switch SW5 to control the start and stop of the flash emission. Thereby, even in the lens-shutter camera, the amount of flash light during film exposure can be controlled. The light emission signal causes the xenon tubes Xe1 and Xe2 to emit light through trigger circuits 151 and 152, respectively. E is a power supply battery whose voltage is increased through a step-up circuit 153 to accumulate a great energy in the capacitor CM through a rectifier diode D2. The energy is used for flash emission.

<<Control Operation of Camera (FIGS. 59 to 79)>>

The control operation of the luminous flux splitting type camera (FIG. 56) and the optical path switching type camera (FIG. 57) will be described with reference to the flowcharts of FIGS. 59 to 79. The taking optical system used has focal lengths of 35 mm to 200 mm and f-numbers of F3.5 to F9. The flags used for the operation control are as follows: A flag EAF is set when the irradiation angle of the flash (i.e. the irradiation angle of the flash portion 34 of FIG. 25) corresponds to a taking optical system focal length of 100 mm or longer. A flag AFEF is set when in-focus condition is achieved. A flag LLF is set to establish the flash emission mode when the brightness is low. A flag WARNF is set when warning is to be provided.

<MS ON Interrupt (FIG. 59)>

Figure 59:
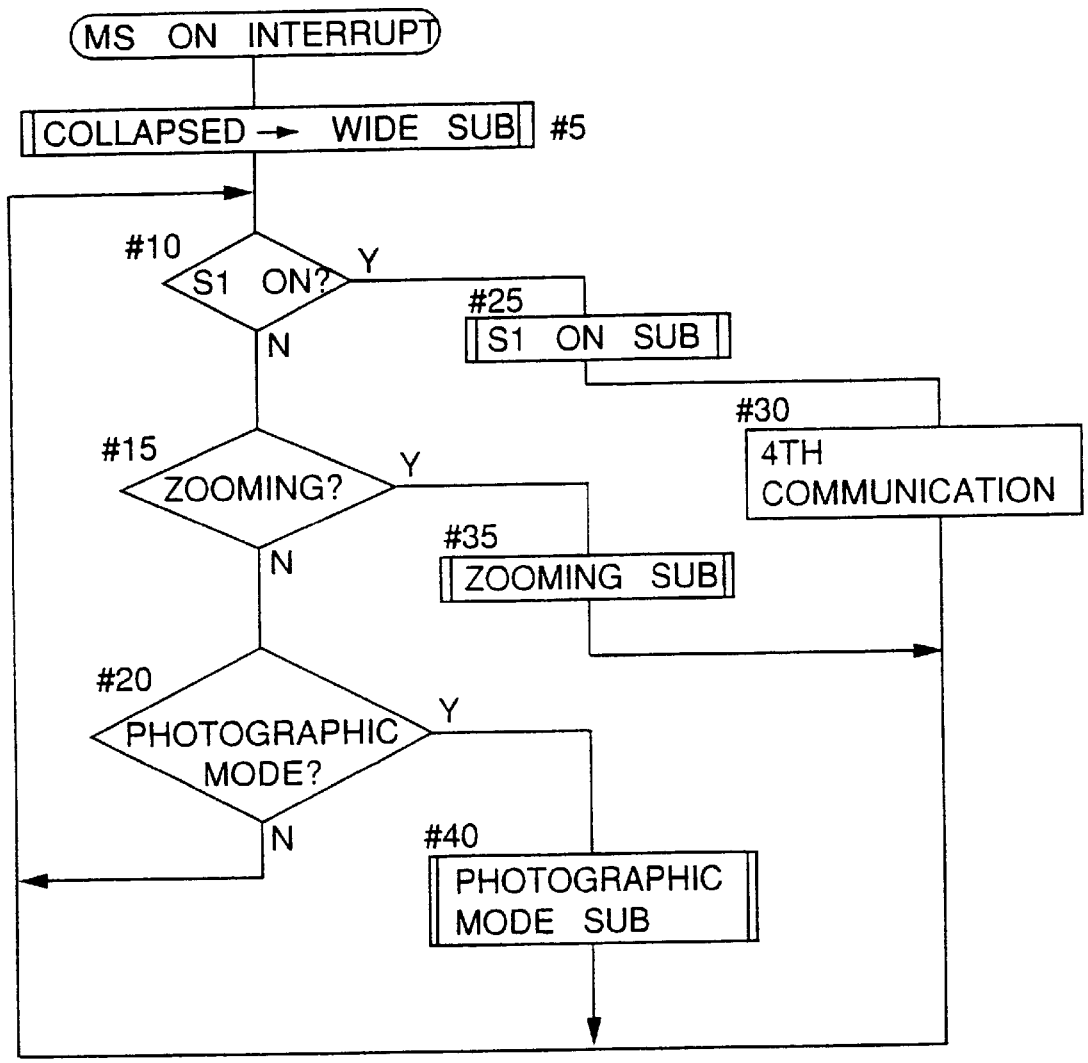
FIG. 59 is a flowchart of an interrupt generated by turning on a main switch MS of the camera embodying the present invention.

In response to the switching of the main switch MS from off to on, an interrupt is generated to execute an MS ON interrupt routine shown in FIG. 59. First, a subroutine (FIG. 61) is executed for moving out the lens barrel from the collapsed condition (i.e. the condition shown in FIGS. 26C and 27C) to the wide angle condition (the condition as shown in FIGS. 26B and 27B where the focal length is 35 mm and shortest in zooming) (#step 5).

Then, at step #10, whether the switch S1 has been turned on by the depression of the release button 36 (FIG. 25) or not is determined. When it has been turned on, an S1 ON subroutine (FIG. 63) is executed (#25), and a fourth communication (FIGS. 78 and 79) is executed to output a signal to end camera shake detection to the camera shake compensating microcomputer μC2 (#30). Then, the process returns to step #10. When the switch S1 is off, whether either of the zoom switches SZW or SZT has been operated or not is determined (#15). When either of the switches SZW and SZT has been operated, a zooming subroutine (FIG. 69) is executed (#35) and the process returns to step #10. When neither of the switches SZW and SZT has been operated, whether the photographic mode setting/changing switch SMD has been operated or not is determined (#20). When the switch SMD has been operated to change the photographic mode, a photographic mode subroutine (FIG. 77) is executed (#40) and the process returns to step #10. When the switch SMD has not been operated, the process directly returns to step #10. The subroutines will be described later.

<MS OFF Interrupt (FIG. 60)>

Figure 60:
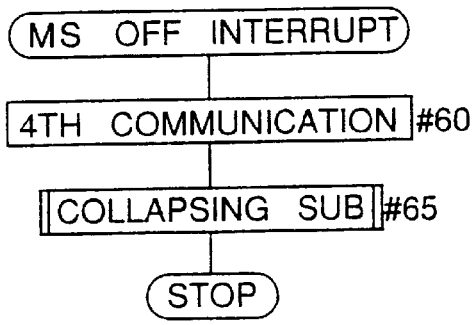
FIG. 60 is a flowchart of an interrupt generated by turning off the main switch MS of the camera embodying the present invention.

In response to the switching of the main switch MS from on to off, an interrupt is generated to execute an MS OFF interrupt routine shown in FIG. 60. First, the fourth communication (FIGS. 78 and 79) is executed to output the signal to end camera shake detection to the camera shake compensating microcomputer μC2 (#60), and a subroutine (FIG. 62) for moving in the lens barrel from the current zoom condition to the wide angle condition and farther to the collapsed condition (#65). Then, the process stops.

<Collapsed → Wide Angle Subroutine (FIG. 61)>

Figure 61:
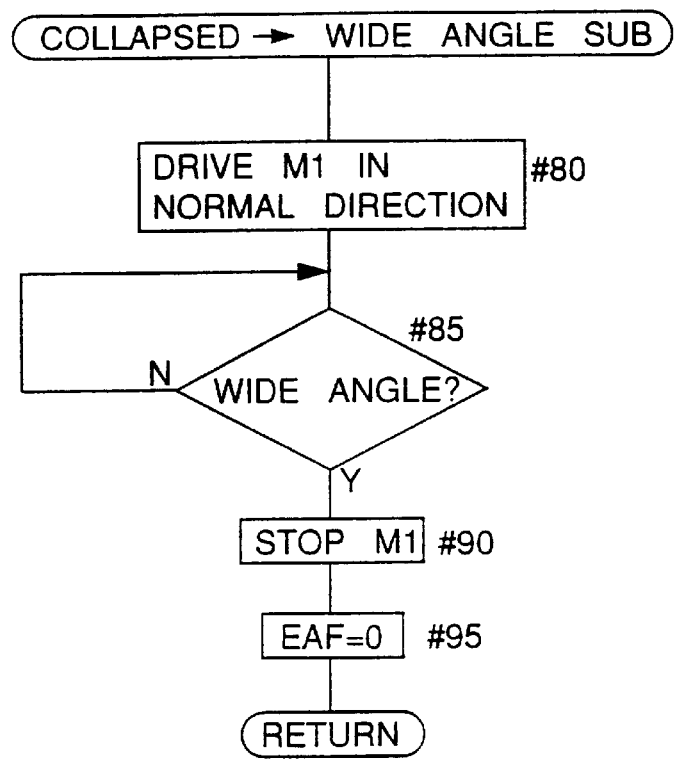
FIG. 61 is a flowchart of a subroutine to move out the lens barrel from the collapsed condition in the camera embodying the present invention.

Referring to FIG. 61, the subroutine will be described for moving out the lens barrel from the collapsed condition to the wide angle condition (step #5 of FIG. 59). In this subroutine, the zoom driver 6 which drives the lens barrier, the optical systems and the luminous flux splitting or optical path switching mirror by means of one motor M1 is controlled so that these elements are moved to predetermined taking positions.

First, the motor M1 is driven in the normal direction by the zoom driver 6 (#80). By the zoom driving and the detection of the focal length condition by the zoom encoder 7, the lens barrel is moved out to the wide angle condition (FIGS. 26B and 27B). That is, as described earlier, the lens barrier (incorporated in the lens barrier unit 54 (FIG. 33) and in the lens barrier unit 70 (FIG. 47)) is opened, the luminous flux splitting or optical path switching mirror is moved to a position where the user can view the subject, and the taking optical system is moved out so that its focal length is 35 mm. When the wide angle condition is detected by the zoom encoder 7 at step #85, the motor M1 is stopped (#90) and the flag EAF is cleared (EAF=0) so that the irradiation angle of the flash corresponds to a focal length of less than 100 mm (#95). Then, the process returns.

<Collapsing Subroutine (FIG. 62)>

Figure 62:
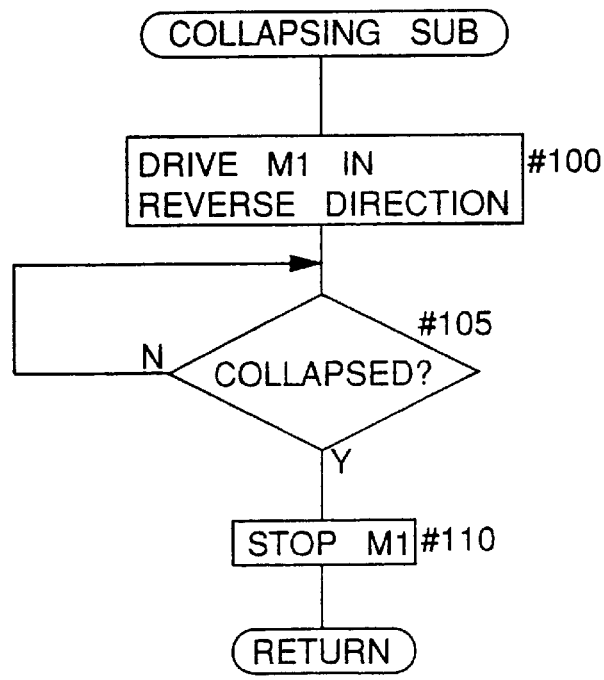
FIG. 62 is a flowchart of a subroutine to collapse the lens barrel in the camera embodying the present invention.

Referring to FIG. 62, the collapsing subroutine (step #65 of FIG. 60) will be described. Conversely to the above-described moving out of the lens barrel from the collapsed condition to the wide angle condition (FIG. 61), the motor M1 is driven in the reverse direction to move in the lens barrel (#100). By the zoom driving and the detection of the focal length condition by the zoom encoder 7, the lens barrel is moved in to the collapsed condition (FIGS. 26C and 27C). That is, as described earlier, the lens barrier is closed, the luminous flux splitting or optical path switching mirror is retracted and the taking optical system is moved in to the lens barrel collapsed position. When the collapsed condition is detected by the switch SPR at step #105, the motor M1 is stopped (#110) and the process returns.

<S1 ON Subroutine (FIG. 63)—#150 (Reset Subroutine (FIG. 64))>

Figure 63:
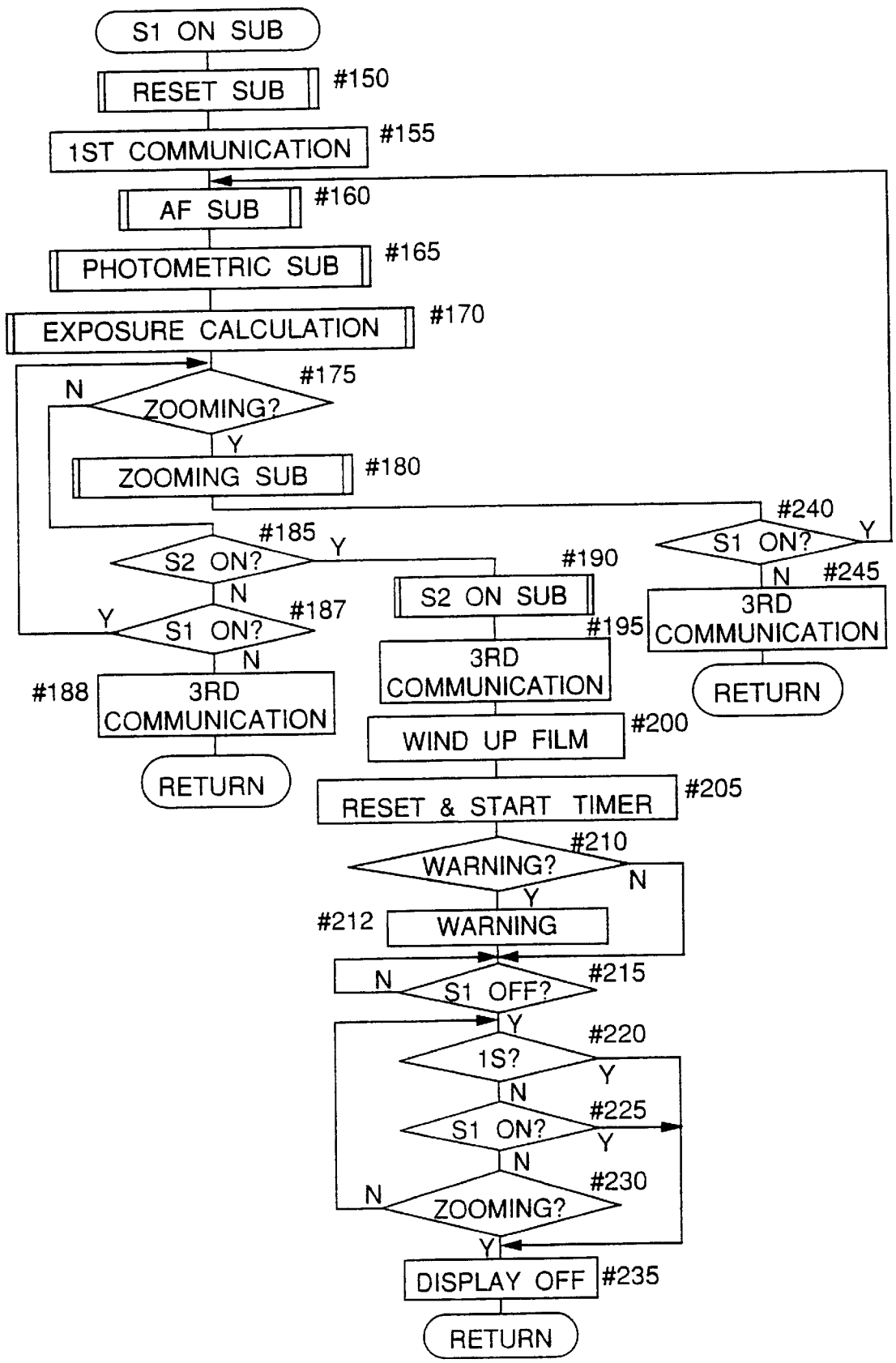
FIG. 63 is a flowchart of a subroutine started by turning on a switch S1 of the camera embodying the present invention.
Figure 64:
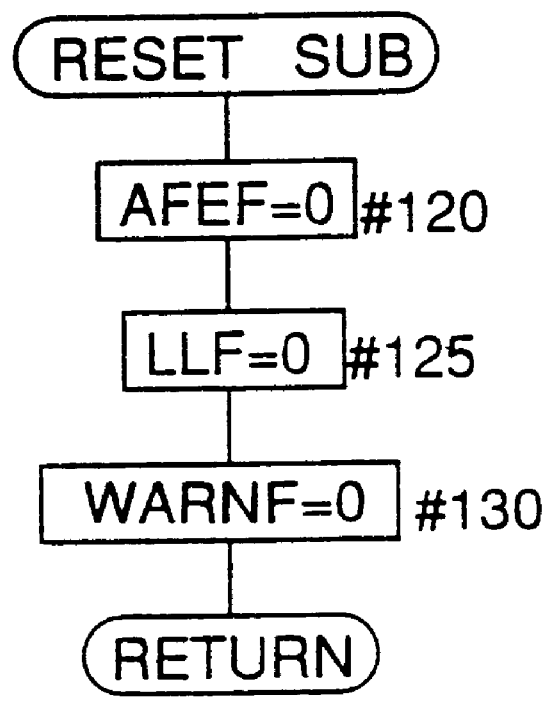
FIG. 64 is a flowchart of a subroutine to reset flags used in the control of the camera embodying the present invention.

Referring to FIG. 63, the S1 ON subroutine (step #25 of FIG. 59) will be described. First, a reset subroutine (FIG. 64) is executed to reset flags (#150). In the reset subroutine shown in FIG. 64, the flag AFEF showing whether in-focus condition has been achieved or not, the flag LLF showing whether the brightness is low or not, and the flag WARNF showing whether warning is to be provided or not are all reset and the process returns (#120, #125, #130).

<S1 ON Subroutine (FIG. 63)—#155 to #170>

Reverting to FIG. 63, a first communication (#155) is performed to output a signal to start camera shake detection to the camera shake compensating microcomputer μC2. After the start of camera shake detection is instructed at step #155, an AF subroutine (FIG. 65) is executed at step #160 and a photometric subroutine (FIG. 66) is executed at step #165. Then, an exposure calculation subroutine (FIG. 67) is executed at step #170 and the process proceeds to step #175.

<AF Subroutine (FIG. 65)—#300 to #308>

Figure 65:
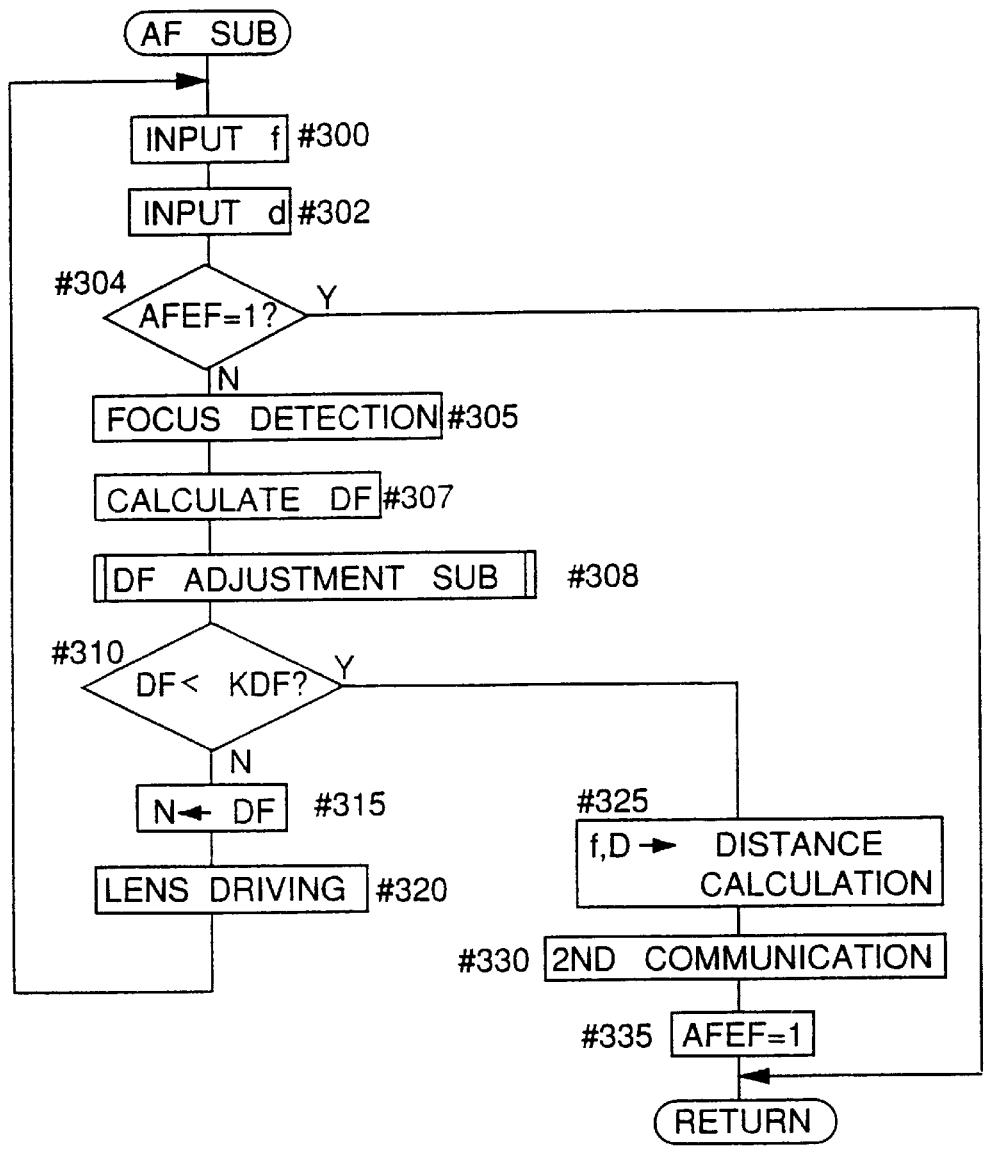
FIG. 65 is a flowchart of an AF subroutine of the camera embodying the present invention.

Now, the above-mentioned three subroutines will be described. Referring first to FIG. 65, the AF subroutine (step #160 of FIG. 63) will be described. A focal length f of the taking optical system is inputted at step #300 and a moving-out amount d from the infinity position is read out at step #302. Then, whether in-focus condition has been achieved or not is determined at step #304. When in-focus condition has been achieved (AFEF=1), the process returns without performing the AF operation starting with the focus detection. When in-focus condition has not been achieved (AFEF=0), focus detection is performed (#305). Whether in-focus condition has been achieved or not is determined based on the detected defocus amount DF, and the moving-out amount d is used only for distance calculation (used for flashmatic and automatic exposure (AE) algorithm). After focus detection is performed by the focus detector 8 (#305), the defocus amount DF is calculated from the detection result (#307) and a defocus adjustment (FIG. 66) is performed (#308).

<Defocus Adjustment Subroutine (FIG. 66)>

Figure 66:
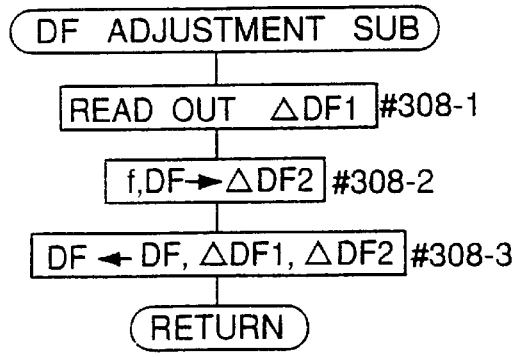
FIG. 66 is a flowchart of a defocus adjustment subroutine of the camera embodying the present invention.

Referring now to FIG. 66, the defocus adjustment subroutine (step #308 of FIG. 65) will be described. First, a correction value ΔDF1 is read out from a non-illustrated electrically erasable programmable read only memory (EEPROM) in the microcomputer μC1 (#308-1). ΔDF1 is a correction value to correct an error of the defocus amount DF caused between the in-focus condition on the detecting surface of the focus condition detecting device and the in-focus condition on the film surface. In the EEPROM is stored the correction value ΔDF1 obtained at the longest focal length of 200 mm in zooming. Then, a correction value ΔDF2 calculated based on the focal length f and the defocus amount DF to correct an error caused every focal length f and every defocus amount DF is read out from the EEPROM (#308-2).

The correction values ΔDF1 and ΔDF2 will be described. A focus detecting optical system (not shown) used in the focus condition detecting device is moved during zooming to interlock with the zooming of the taking optical system. The mechanical structure for the zooming driving has some manufacturing/assembly errors that cannot be mechanically corrected. The errors appear as errors of the defocus amount DF caused between the focal plane in the focus detecting optical system and the focal plane in the taking optical system. The errors are functions of the focal length f and the defocus amount DF.

In this embodiment, the errors are corrected by using the correction value ΔDF1 obtained when the focal length is 200 mm and the correction value ΔDF2 obtained from the focal length f and the defocus amount DF. The correction value ΔDF2 is previously stored in the EEPROM in the following manner: The defocus amount DF on the focal plane is varied every focal length f to measure how different the defocus amount DF on the focal plane in the focus detecting optical system is from the defocus amount DF on the focal plane in the taking optical system every defocus amount DF. The result of the measurement is stored in the EEPROM as the correction value ΔDF2 of the detected defocus amount DF.

At step #308-3, the correction values ΔDF1 and ΔDF2 are added to the detected defocus amount DF to calculate a new defocus amount DF. Then, the process returns. While the amount of error (i.e. the amount of correction) is controlled by two parameters, the focal length f and the defocus amount DF in this embodiment, if the amount of error with respect to the defocus amount DF is linear, the correction value may be stored as a correction coefficient for every focal length f.

<AF Subroutine (FIG. 65)—#310 to #335>

Reverting to FIG. 65, at step #310, the defocus amount DF and a predetermined value KDF are compared to determine whether in-focus condition has been achieved or not. When in-focus condition has been achieved (DF<KDF), the distance to the subject is calculated from the inputted focal length f and the moving-out amount d (#325) and a second communication is performed to output a signal to start camera shake compensation to the camera shake compensating microcomputer μC2 (#330). Then, after the flag AFEF showing in-focus condition is set (AFEF=1) at step #335, the process returns. With this process, since camera shake is detected under in-focus condition, camera shake detection is accurately performed. Moreover, since the actuator is driven in time sequence, the burden on the power source is light, so that the compensation is smoothly made. On the other hand, when it is determined at step #310 that in-focus condition has not been achieved (DF≧KDF), a lens driving amount N is calculated from the defocus amount DF (#315), and after lens driving is performed based on the lens driving amount N (#320), the process returns to step #300.

<Photometric Subroutine (FIG. 67)>

Figure 67:
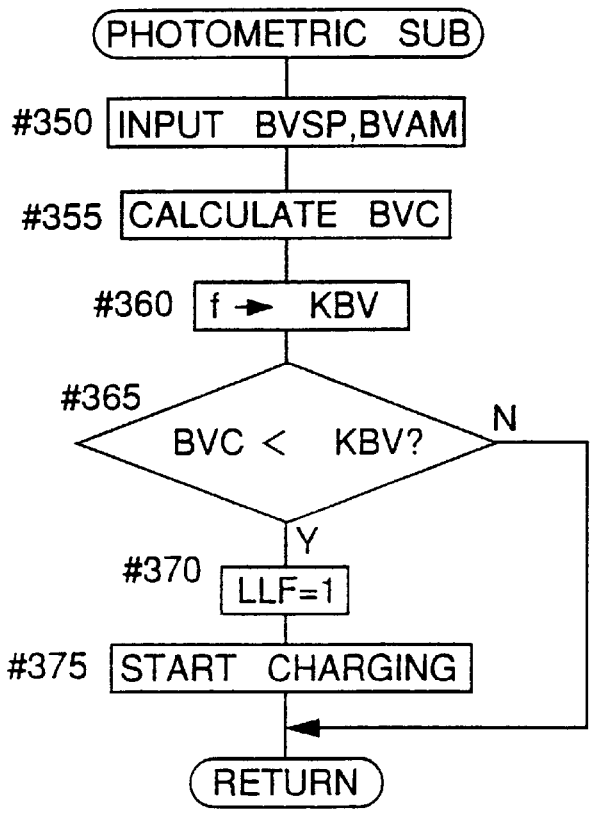
FIG. 67 is a flowchart of a metering subroutine of the camera embodying the present invention.

Referring next to FIG. 67, the photometric subroutine (step #165 of FIG. 63) will be described. First, a photometric value BVSP of the spot metering area ABVSP (FIG. 24) in the center of the image plane and a photometric value BVAM of the averaging metering area ABVAM (FIG. 24) including the area ABVSP are inputted (#350). Then, a control brightness BVC is calculated (#355) and a brightness KBV for camera shake detection is calculated from the focal length f data (#360). Then, the control brightness BVC and the brightness KBV for camera shake detection are compared (#365). When BVC<KBV, the brightness is determined to be low and the flag LLF showing low brightness is set (LLF=1, #370). Then, after the charging to the flash capacitor CM (FIG. 58) is started (#375), the process returns. When BVC≧KBV, the process returns without executing any processing.

<Exposure Calculation Subroutine (FIG. 68)>

Figure 68:
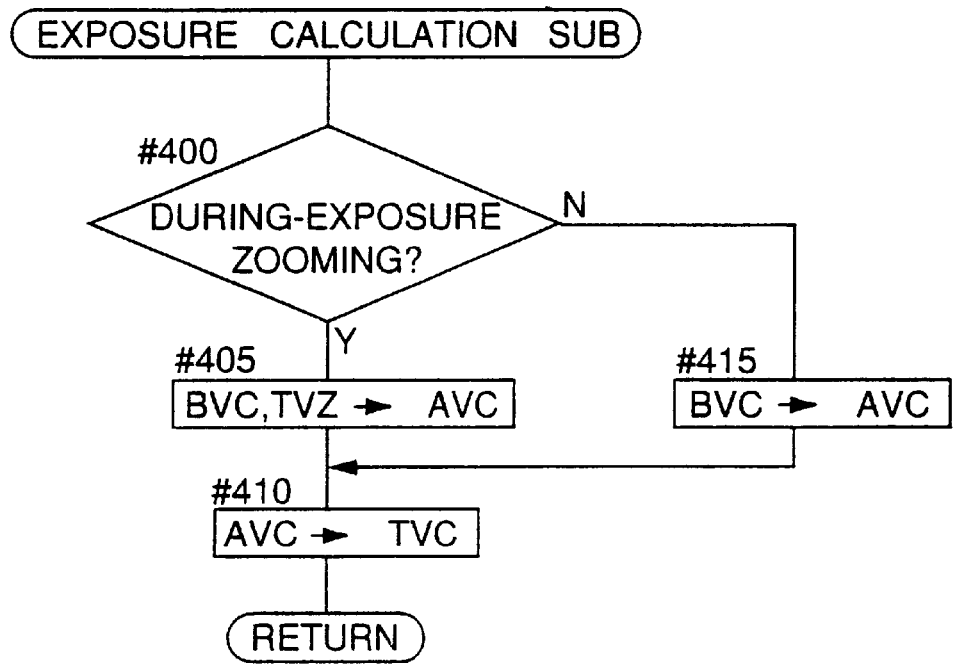
FIG. 68 is a flowchart of an exposure calculation subroutine of the camera embodying the present invention.

Referring next to FIG. 68, the exposure calculation subroutine (step #170 of FIG. 63) will be described. First, whether the during-exposure zooming mode is on or not is determined (#400). When the during-exposure zooming mode is on, a control aperture value AVC is calculated from a during-exposure zooming shutter speed (TVZ≦5, i.e. shutter speed is equal to or longer than 1/30 second) and the control brightness value BVC (#405). Then, after a control shutter speed TVC is calculated from the control aperture value AVC (#410), the process returns. When the during-exposure zooming mode is not on, the control aperture value AVC is calculated from the control brightness value BVC (#415). Then, after the control shutter speed TVC is calculated from the control aperture value AVC (#410), the process returns. The during-exposure zooming shutter speed TVZ is a shutter speed at which zoom driving is possible, and may be manually set when it is 1/30 or longer as described above.

<S1 ON Subroutine (FIG. 63)—#175 to #245>

Reverting to FIG. 63, the description of the S1 ON subroutine will be continued. The conditions of the switches SZW and SZT are detected to determine whether a zooming operation has been performed or not with the switch S1 on (#175). When a zooming operation has been performed, the zooming subroutine (FIG. 69) is executed to perform zooming (#180). Then, the process proceeds to step #240 to determine whether the switch S1 is on or not. When the switch S1 is on, the process returns to step #160. When the switch S1 is off, a third communication is performed to output a signal to end camera shake compensation to the camera shake compensating microcomputer μC2 (#245). Then, the process returns.

<Zooming Subroutine (FIG. 69)—#440 to #452>

Figure 69:
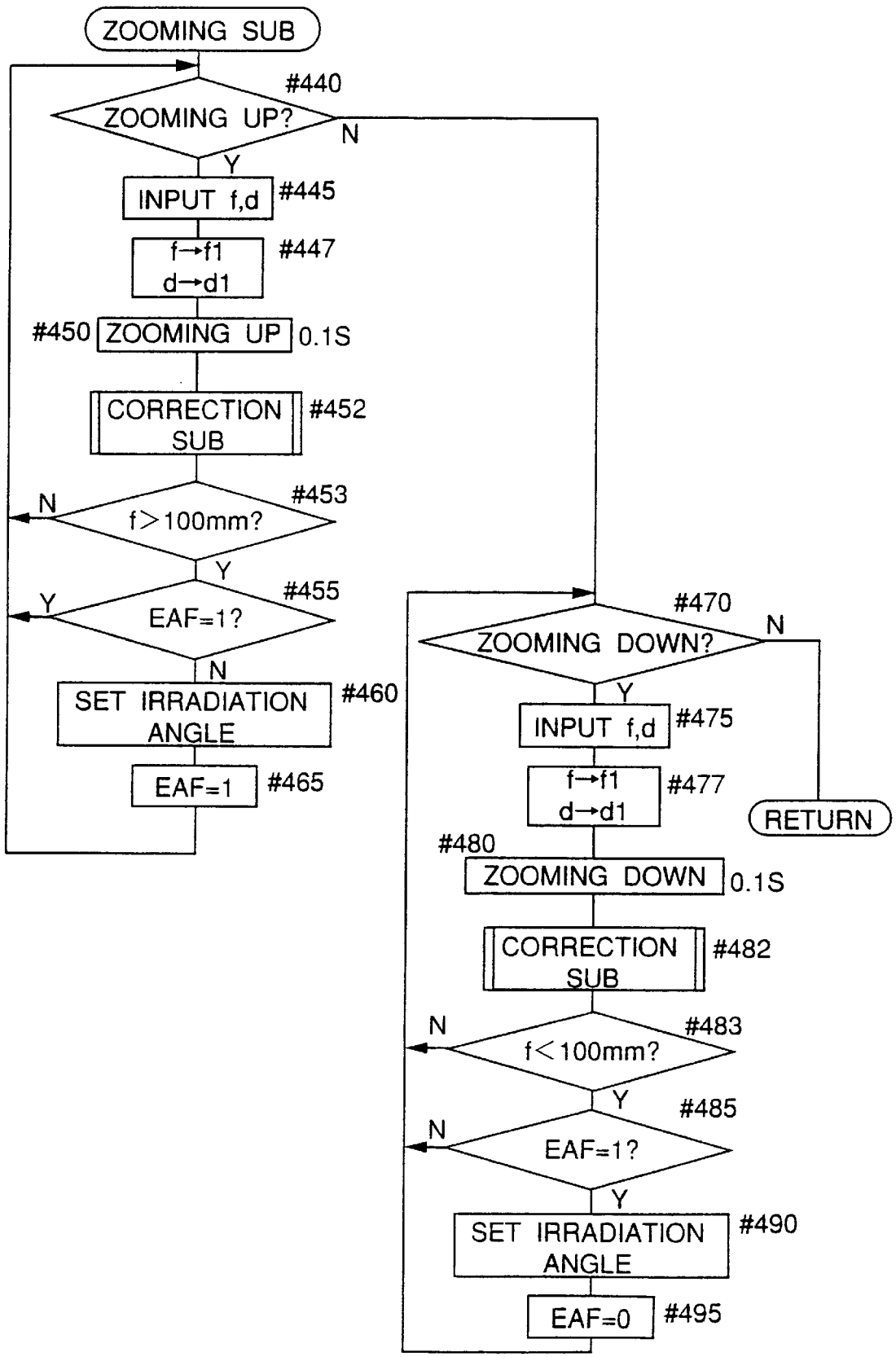
FIG. 69 is a flowchart of a zooming subroutine of the camera embodying the present invention.

Referring now to FIG. 69, the zooming subroutine (step #35 of FIG. 59, step #180 of FIG. 63) will be described. First, whether a zooming up operation has been performed or not is determined by detecting whether the switch SZT is on or not (#440). When a zooming up operation has been performed, the focal length f and the moving-out amount d are inputted (#445) and stored as f1 and d1 (#447).

Then, zooming up based on the zooming up operation is performed for 0.1 second (#450) and a correction subroutine (FIG. 70) is executed to correct the out-of-focus condition caused by zooming (#452). The optical system used in this embodiment is a so-called varifocal lens in which the subject image becomes out of focus by performing zooming. Therefore, if zooming is performed under in-focus condition, the subject image becomes out of focus through the zooming. The out-of-focus condition is unpleasant for the user looking through the finder, and if taking is performed under this condition, an out-of-focus picture is obtained. Therefore, to correct the out-of-focus condition caused by zooming, the amount of out-of-focus is calculated and corrected during zooming, and after zooming is finished, focus detection is performed again. If the out-of-focus amount is great, the lens is driven to correct it.

<Correction Subroutine (FIG. 70)>

Figure 70:
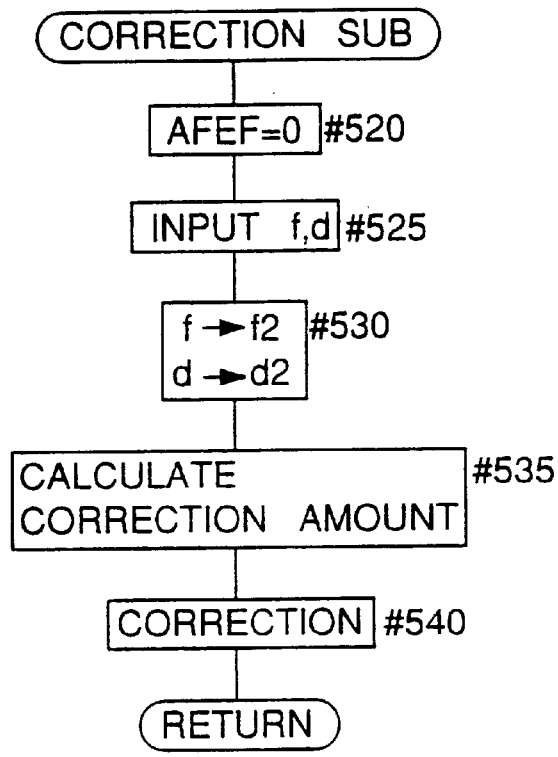
FIG. 70 is a flowchart of a correction subroutine to correct out-of-focus condition caused by zooming in the camera embodying the present invention.

Referring to FIG. 70, the correction subroutine (step #452 of FIG. 69) will be described in more detail. First, at step #520, the flag AFEF showing in-focus condition is reset (AFEF=0) so that focus detection may be performed again. Then, the focal length f and the moving-out amount d at this time are inputted (#525) and stored as f2 and d2 (#530). Then, the correction amount is calculated from these data (#535) and the focusing lens for AF is driven (#540). Then, the process returns.

<Zooming Subroutine (FIG. 69)—#453 to #495>

Reverting to FIG. 69, the description of the zooming subroutine will be continued. At step #453, whether the focal length f is longer than 100 mm or not is determined. When the focal length f is 100 mm or shorter, the process returns to step #440. When the focal length f is longer than 100 mm, the process proceeds to step #455 to determine whether the flag EAF has been set or not. When the flag EAF has been set (EAF=1), the process returns to step #440. This is because when the flag EAF has been set (EAF=1), a flash panel (not shown) has been set so that the irradiation angle of the flash covers the angle of view of a focal length of 100 mm or longer. When the flag EAF has not been set (EAF=0), the flash panel is moved by the zoom flash controller 4 to set an irradiation angle corresponding to a focal length of 100 mm (#460). Then, after the flag EAF is set (EAF=1, #465), the process returns to step #440.

When it is determined at step #440 that no zooming up operation has been performed, the process proceeds to step #470. The processing of #470 to #495 will not be described since they are the same as that of steps #440 to #465 except that zooming up is replaced by zooming down and that a part of the processing is changed in accordance therewith. When it is determined that no zooming up operation nor zooming down operation has been performed (steps #440 and #470), since the operation has been finished, the process returns.

The irradiation angle changing mechanism employed in this embodiment is capable of zooming of two irradiation angles respectively corresponding to a focal length of 35 mm and to a focal length of 100 mm. Assuming that, for example, the irradiation angle is changed to correspond to the focal lengths of 35 mm to 200 mm and the f-numbers of F3.5 to F9 of the taking optical system, the flash panel must be moved by a large amount, which increases the size of the flash portion 34 (FIG. 25). In contrast, the irradiation intensity is smaller by three EV when the irradiation angle is set to an angle corresponding to a focal length of 35 mm than when the irradiation angle is set to one corresponding to a focal length of 200 mm. Thus, if the irradiation angle is fixed to the angle corresponding to a focal length of 35 mm, the reach of the flash light is shorter.

Therefore, when the focal length of the taking optical system is longer than 100 mm, the flash panel is moved to set the irradiation angle to correspond to a focal length of 100 mm as described above. Consequently, since the flash light is condensed, if GN (guide number) is 11 at the irradiation angle corresponding to a focal length of 35 mm, GN can be increased to 16 (twice the light quantity at the irradiation angle corresponding to a focal length of 35 mm). As a result, the reach of the flash light is increased without the size of the flash portion 34 being increased.

<S1 ON Subroutine (FIG. 63)—#175 to #190>

Reverting to FIG. 63, the description of the S1 ON subroutine will be continued. When it is determined at step

175 that no zooming operation has been performed, whether the switch S2, which is turned on by the second-stroke depression of the release button 36 (FIG. 25), is on or not is determined (#185). When the switch S2 is off, whether the switch S1 is on or not is determined (#187). When the switch S1 is on, the process returns to step #175. When the switch S1 is off, the third communication is performed to output the signal to end camera shake compensation (#188). Then, the process returns. When the switch S2 is on at step #185, an S2 ON subroutine (FIG. 71) is executed (#190).

<S2 ON Subroutine (FIG. 71)>

Figure 71:
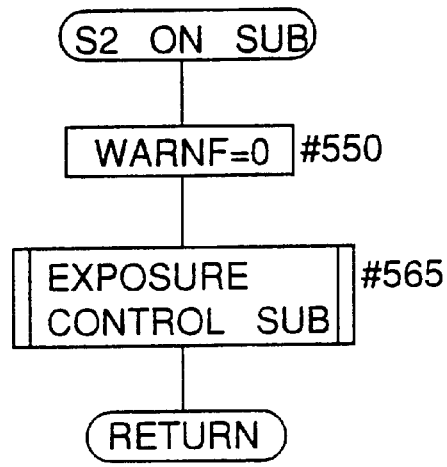
FIG. 71 is a flowchart of a subroutine started by turning on a switch S2 of the camera embodying the present invention.

Referring now to FIG. 71, the S2 ON subroutine (step #190 of FIG. 63) will be described. First, the flag WARNF for providing warning is reset (WARNF=0, #550). Then, an exposure control subroutine (FIG. 72) is executed (#565) and the process returns.

<Exposure Control Subroutine (FIG. 72)>

Figure 72:
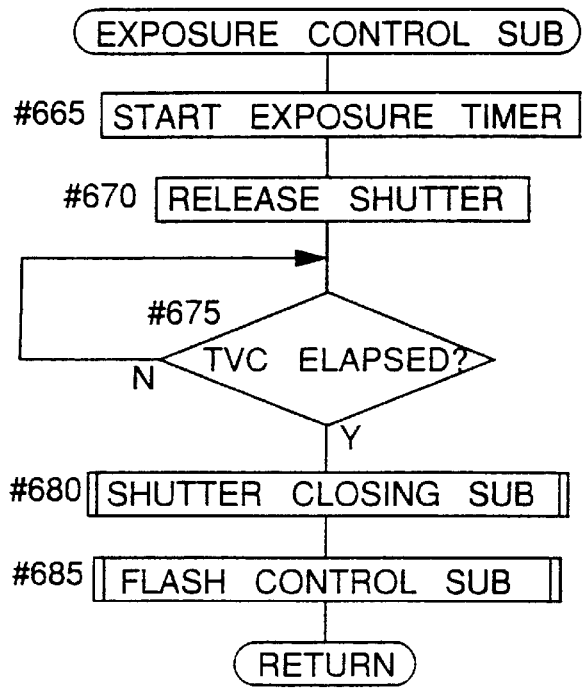
FIG. 72 is a flowchart of an exposure control subroutine of the camera embodying the present invention.

Referring now to FIG. 72, the exposure control subroutine (step #565 of FIG. 71) will be described. First, an exposure timer (comprising the microcomputer $\mu$C1) is started (#665) and the shutter is released (#670). The process waits until the exposure timer counts to an exposure time (i.e. the actual time of the control shutter speed TVC) (#675), and when the exposure time has elapsed, a shutter closing subroutine (FIG. 73) is executed (#680), and a flash control subroutine (FIGS. 74 and 75) is executed to control the flash emission at the instant of closing the shutter (#685). Then, the process returns.

<Shutter Closing Subroutine (FIG. 73)>

Figure 73:
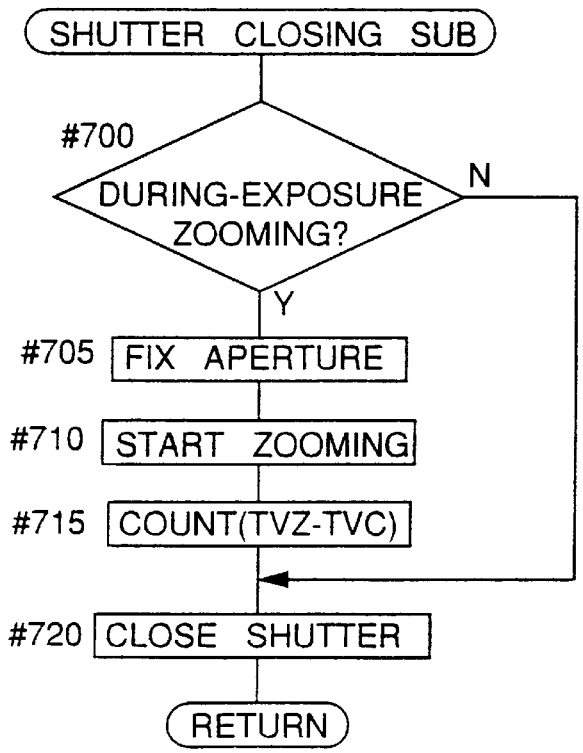
FIG. 73 is a flowchart of a shutter closing subroutine of the camera embodying the present invention.

Referring now to FIG. 73, the shutter closing subroutine (step #680 of FIG. 72) will be described. First, whether the during-exposure zooming mode is on or not is determined (#700). When the during-exposure zooming mode is not on, the shutter is immediately closed (#720) and the process returns. When the during-exposure zooming mode is on, the aperture is fixed (#705), zooming from the wide angle side to the telephoto side is started (#710), and the actual time of TVZ-TVC is counted (#715). After the counting, the shutter is closed (#720) and the process returns. Since the shutter is released even during the during-exposure zooming, exposure is performed for TVZ-TVC (#715) as described above in consideration of the during-exposure zooming shutter speed TVZ for the exposure time TVC.

<Flash Control (FIGS. 74 and 75)>

Next, the flash control will be described both for the luminous flux splitting type camera (FIG. 56) and for the optical path switching type camera (FIG. 57). Prior to the description, the reason will be explained that the flash controls for the two types of the cameras are different.

In the known typical single-lens reflex camera, since the optical path is switched between the taking optical system and the film surface, the photometry for light adjustment cannot be performed in the finder optical system. For this reason, the light receiving device which directly meters light on the film surface is disposed at the bottom of the mirror box provided in the camera body. In the lens-shutter camera, since there is no mirror box, the space for providing the light receiving device cannot be secured within the camera body. Therefore, in this embodiment, the photometric device disposed in the finder optical system is also used as the light receiving device as described earlier.

In the luminous flux splitting type camera, the luminous flux incident on the taking optical system is split into two even while the shutter is being released, so that light is continuously directed both to the film surface N1 and to the finder optical system. Consequently, light adjustment is automatically made by monitoring the light adjustment luminous flux with the photometric device disposed in the finder optical system as described above.

In the optical path switching type camera, however, since the light is all directed to the film surface N1 (FIGS. 7, 8, etc.) during exposure, no light is incident on the finder optical system, so that the finder image completely blacks out. Therefore, in the subsequently-described flash control subroutine, the reflected light from the subject is monitored with the photometric device through the pre-emission by the flash portion 34 or the macro flash portion 35 (FIG. 25) before the up-down total reflecting mirror AM1 (FIGS. 7, 8, etc.) is raised. The amount of light emission necessary for the actual emission during film exposure is adjusted based on the data obtained through the pre-emission.

<Flash Control Subroutine (FIG. 74)>

Figure 74:
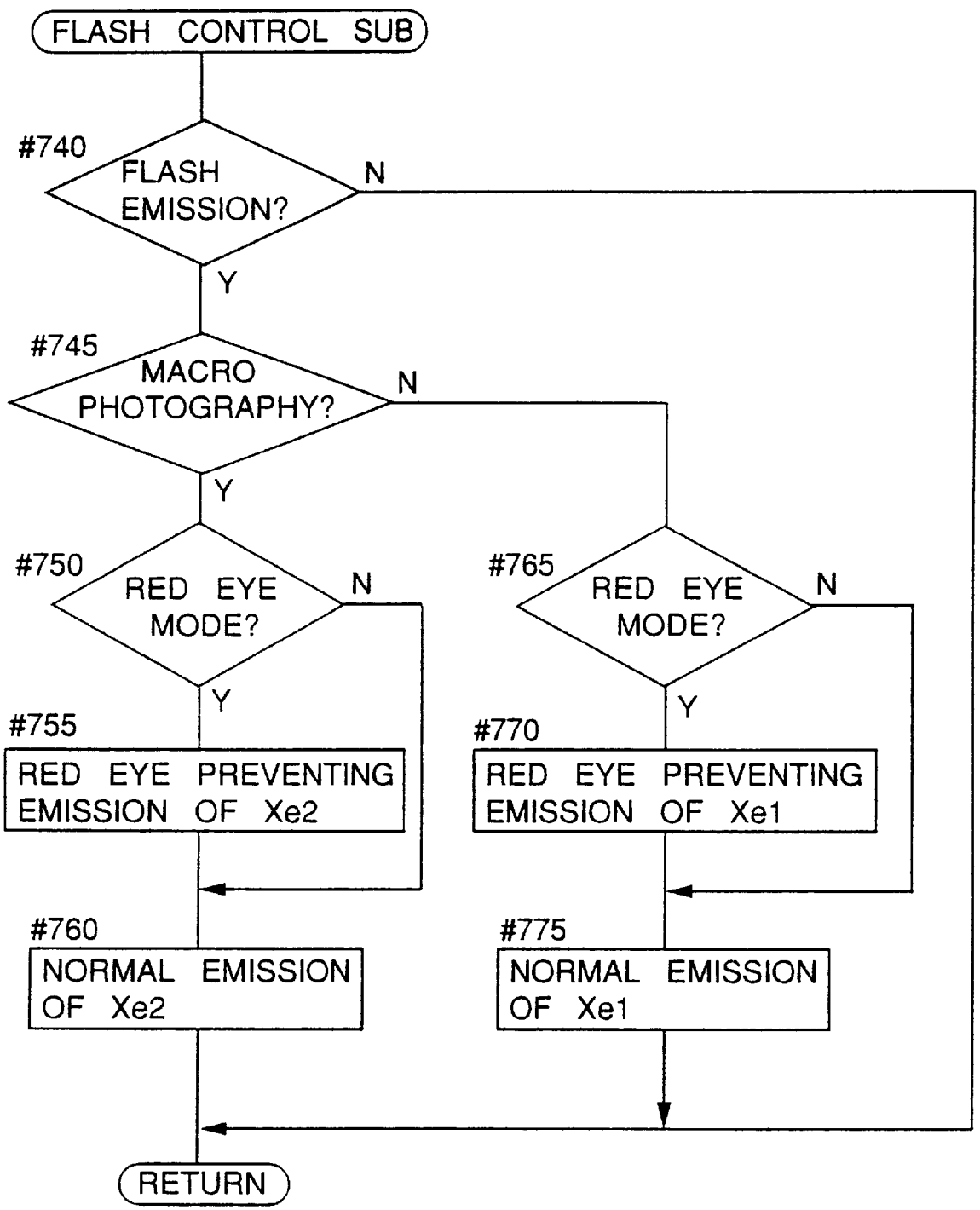
FIG. 74 is a flowchart of a flash control subroutine of the luminous flux splitting type camera embodying the present invention.

Referring to FIG. 74, the flash control subroutine (step #685 of FIG. 72) for the luminous flux splitting type camera (FIG. 56) will be described. First, whether the flash emission mode is on or not is determined (#740). When the flash emission mode is not on (LLF=0), the process returns. When the flash emission mode is on (LLF=1), whether the macro photography mode is on or not is determined (#745). When the macro photography mode is on, whether the red eye reduction mode is on or not is determined at step #750. When the macro photography mode is not on, whether the red eye reduction mode is on or not is determined at step #765.

When the red eye reduction mode is not on at step #750, the process proceeds to step #760. When the red eye reduction mode is on, the process proceeds to step #755. At step #755, an emission signal for red eye prevention is outputted to cause the red eye preventing emission of the second xenon tube Xe2 (FIG. 58). The xenon tube Xe2 is incorporated in the macro flash portion (not shown) disposed at the front of the lens barrel 32 (FIG. 25) as described earlier. The red eye preventing emission is made, for example, by blinking the flash light three or four times. At step #760, an emission signal for normal emission is outputted to cause the normal emission of the second xenon tube Xe2. After the normal emission by the second xenon tube Xe2 is finished, the process returns.

When the red eye reduction mode is not on at step #765, the process proceeds to step #775. When the red eye reduction mode is on, the process proceeds to step #770. At step #770, the emission signal for red eye prevention is outputted to cause the red eye preventing emission of the first xenon tube Xe1 (FIG. 58). The xenon tube Xe1 is incorporated in the flash portion 34 (not shown) disposed at an upper part of the camera body 30 (FIG. 25). The red eye preventing emission is made, for example, by blinking the flash light three or four times. At step #775, the emission signal for normal emission is outputted to cause the normal emission of the first xenon tube Xe1. After the normal emission of the first xenon tube Xe1 is finished, the process returns.

<Flash Control Subroutine (FIG. 75)>

Figure 75:
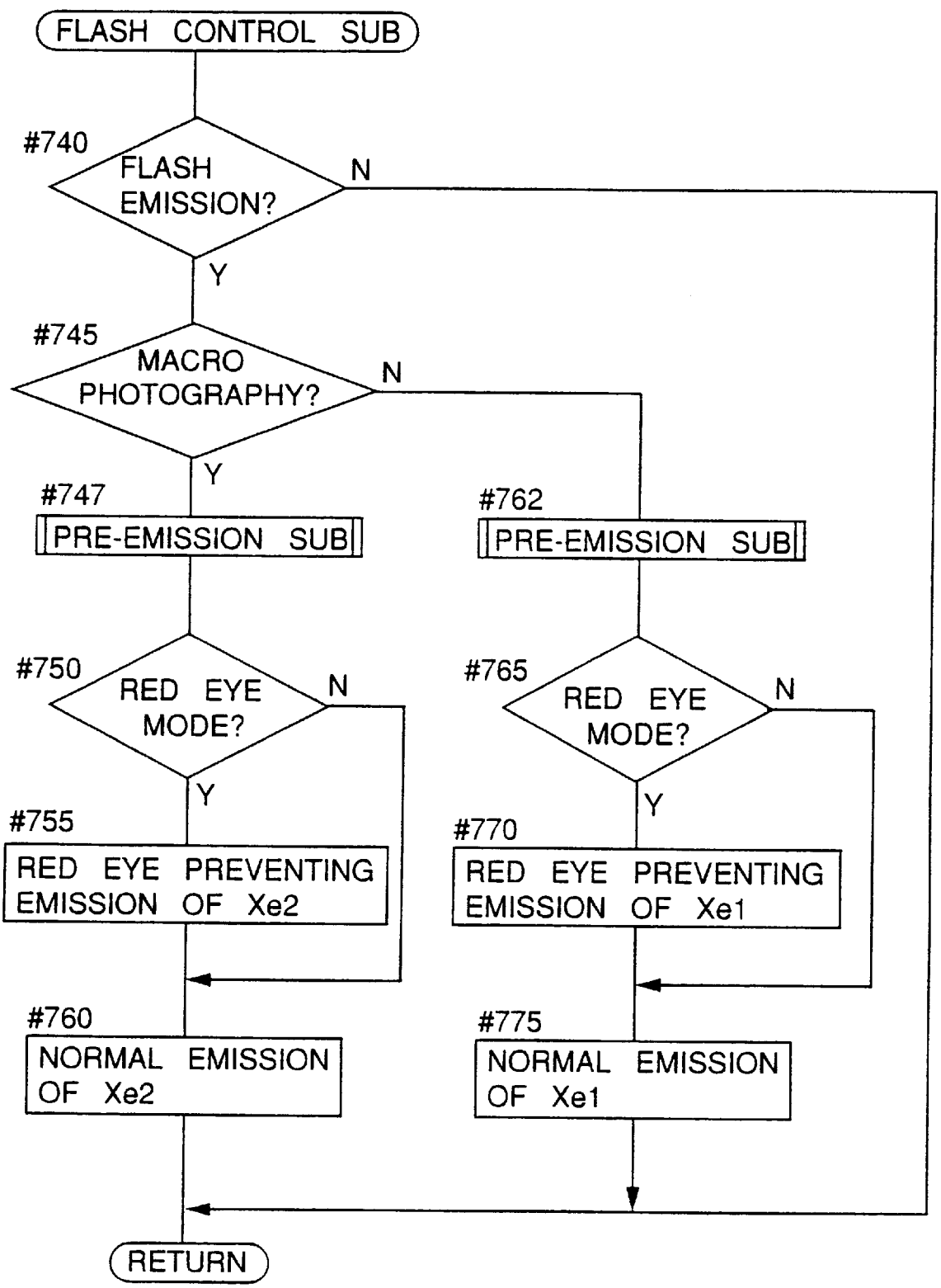
FIG. 75 is a flowchart of a flash control subroutine of the optical path switching type camera embodying the present invention.

Referring next to FIG. 75, the flash control subroutine (step #685 of FIG. 72) for the optical path switching type camera (FIG. 57) will be described. This flash control subroutine is the same as the above-described flash control subroutine (FIG. 74) for the luminous flux splitting type camera (FIG. 56) except that a pre-emission subroutine (FIG. 76) is executed between the determination of the macro photography mode (#745) and the determination of the red eye reduction mode (#750, #765). Therefore, only the pre-emission subroutine (FIG. 76) will be described and the other steps will not be described. Note, however, that the normal emission (#760, #775) is made by use of a photometry result obtained through the subsequently-described pre-emission, i.e. a control emission amount GNC. Since the subsequently-described pre-emission also prevents red eye, for example, the last blinking in the red eye preventing emission (#755 and #770 of FIG. 75) made by blinking the flash light three or four times may be used also as the pre-emission.

<Pre-emission Subroutine (FIG. 76)>

Figure 76:
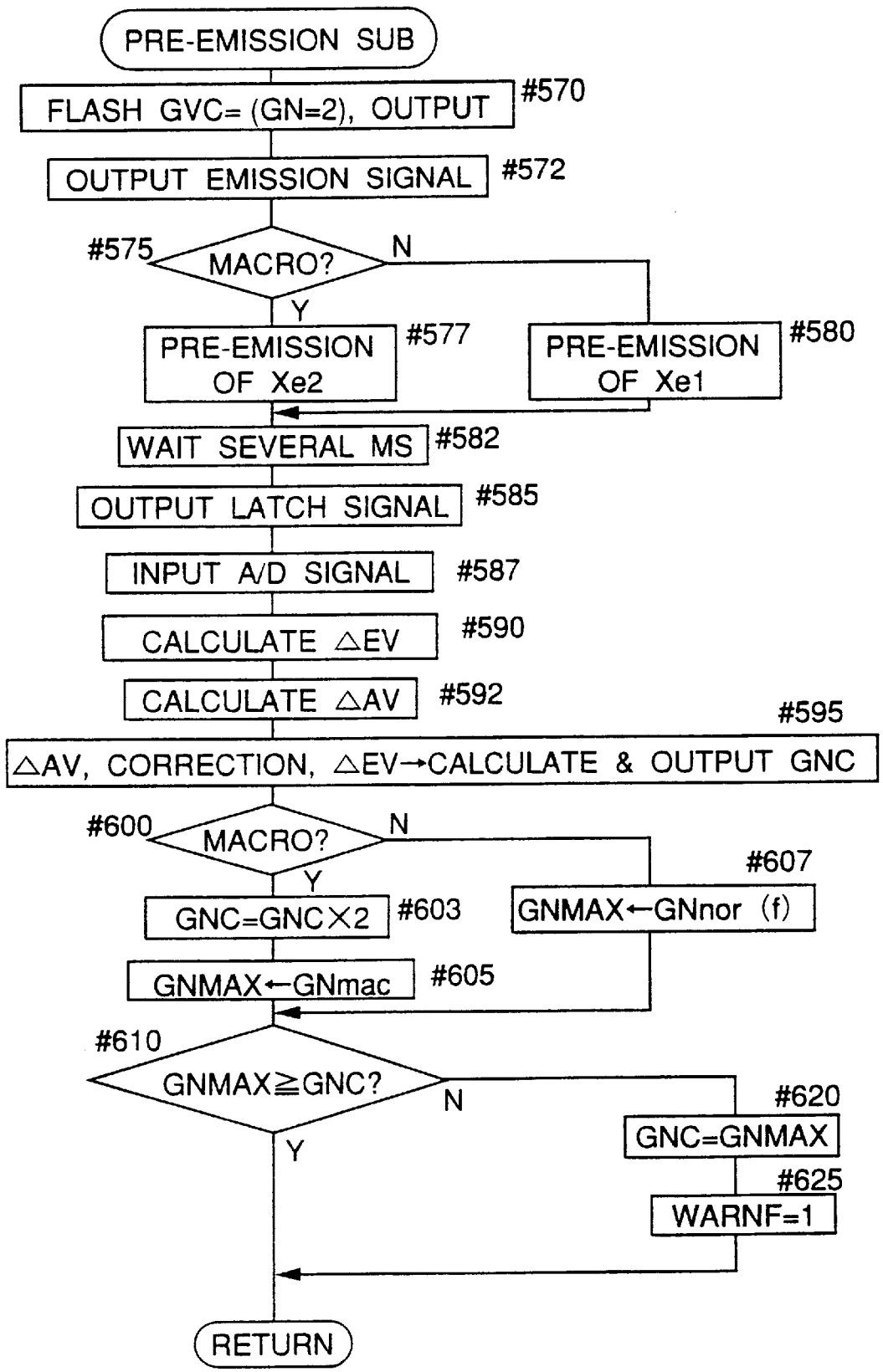
FIG. 76 is a flowchart of a pre-emission subroutine of the optical path switching type camera embodying the present invention.

Referring to FIG. 76, the pre-emission subroutine (steps #747 and #762 of FIG. 75) will be described. First, an emission amount GVC is outputted as GN=2 to control the variable voltage Vref of FIG. 58 (#570) and the emission signal is outputted (#572). Then, whether the macro photography mode is on or not is determined (#575). When the macro photography mode is on, the signal to cause the pre-emission of the second xenon tube Xe2 is outputted (#577) and the process proceeds to step #582. When the macro photography mode is not on, since normal flash photography is to be performed, the signal to cause the pre-emission of the xenon tube Xe1 is outputted (#580) and the process proceeds to step #582.

The process waits several milliseconds at step #582. The wait time of several milliseconds is the time necessary for the xenon tube Xe1 or Xe2 to emit light according to the emission signal to achieve the emission of GN=2. The wait time may be varied according to the xenon tube used since the necessary time may differ depending on the xenon tube. After the process waits several milliseconds (#582), a latch signal is outputted (#585) to cause the A/D converting circuit A/D2 (FIG. 58) to perform the A/D conversion, and the A/D converted output is inputted (#587). Based on the input data (i.e. photometric data for light adjustment obtained through the light receiving device 150 (FIG. 58)), an exposure deviation amount ΔEV from appropriate exposure is calculated (#590). Then, ΔAV is obtained from the difference (AVO−AVC) between the open aperture value AVO and the control aperture value AVC (#592), and the control exposure amount GNC is calculated from the obtained ΔAV, correction of the difference in quantity of transmitted light caused by the difference between the taking optical system and the photometry detecting system, and the exposure deviation amount ΔEV (#590). The calculated GNC is outputted (#595).

Then, whether the macro photography mode is on or not is determined (#600). The macro flash portion 35 has a diffusive panel on the front of the second xenon tube Xe2. Since the light is diffused by the panel, a double amount of emission is necessary to achieve appropriate exposure. Therefore, when the macro photography mode is on, GNC is set so that GNC=GN×2 (#603) and GNmac which is the maximum guide number in the macro photography is set as GNMAX (#605). Then, the process proceeds to step #610. When the macro photography mode is not on, GNnor(f) which is the maximum guide number in accordance with the focal length f is set as GNMAX and the process proceeds to step #610.

At step #610, GNMAX at which light emission is possible is compared with the control emission amount GNC. When GNMAX≧GNC, the process returns. When GNMAX<GNC, the control emission amount GNC is set as GNMAX (#620) and the flag WARNF is set (WARNF=1) to warn of insufficient exposure (#625). Then, the process returns.

<S1 ON Subroutine (FIG. 63)—#195 to #235>

Reverting to FIG. 63, the description of the S1 ON subroutine will be continued. After the S2 ON subroutine (FIG. 71) is executed as described above (#190), the third communication is performed to output the signal to end camera shake compensation (#195). Then, the film is wound up by the winding-up controller 11 (#200) and the timer is reset and started (#205). Then, whether warning should be displayed or not is determined based on the flag WARNF (#210). When warning is necessary (WARNF=1), warning is displayed (#212) and the process proceeds to step #215. When warning is unnecessary (WARNF=0), the process directly proceeds to step #215.

At step #215, the process waits until the switch S1 is turned off. When the switch S1 is turned off, whether the timer reset and started as described above has counted to one second or not is determined (#220). When the timer has counted to one second, the display on the display portion 1 is turned off (#235) and the process returns. By the determination of step #220, the warning of insufficient exposure is provided at least for one second after photographing is finished. When the timer has not counted to one second at step #220, if the switch S1 is operated or a zooming operation is performed again during this time (#225, #230), it is determined that an operation for the next photographing has been performed and the process proceeds to step #235 to turn off the display on the display portion 1 (#235). Then, the process returns. When the switch S1 is not operated at step #225 and a zooming operation is not performed at step #230, the process returns to step #220.

<Photographic Mode Subroutine (FIG. 77)>

Referring next to FIG. 77, the photographic mode subroutine (step #40 of FIG. 59) will be described. This routine is for setting and changing the photographic modes. First, when it is determined that the switch SMD (FIGS. 56 and 57) is turned from on to off (#780), the photographic mode is cyclically changed like 0→1→2→3→0 (#785) and the process returns. Here, 1 represents the macro photography mode, 2 represents the during-exposure zooming mode, 3 represents a mode including both the macro photography mode and the during-exposure zooming mode, and 0 represents the normal photography mode including none of these modes.

<Camera Shake Control (FIGS. 78 and 79)>

Figure 78:
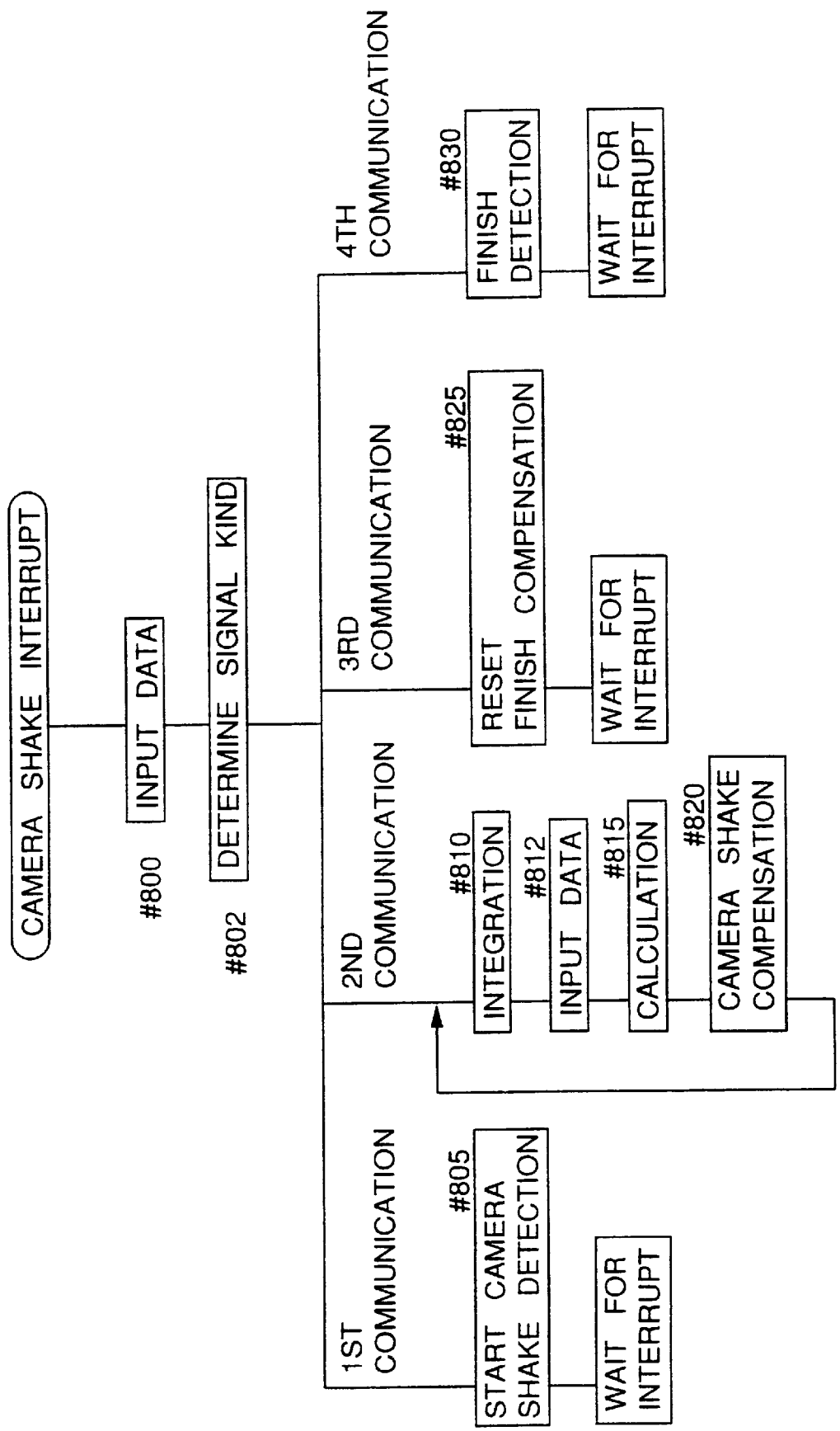
FIG. 78 is a flowchart of a camera shake interrupt of the luminous flux splitting type camera embodying the present invention.
Figure 79:
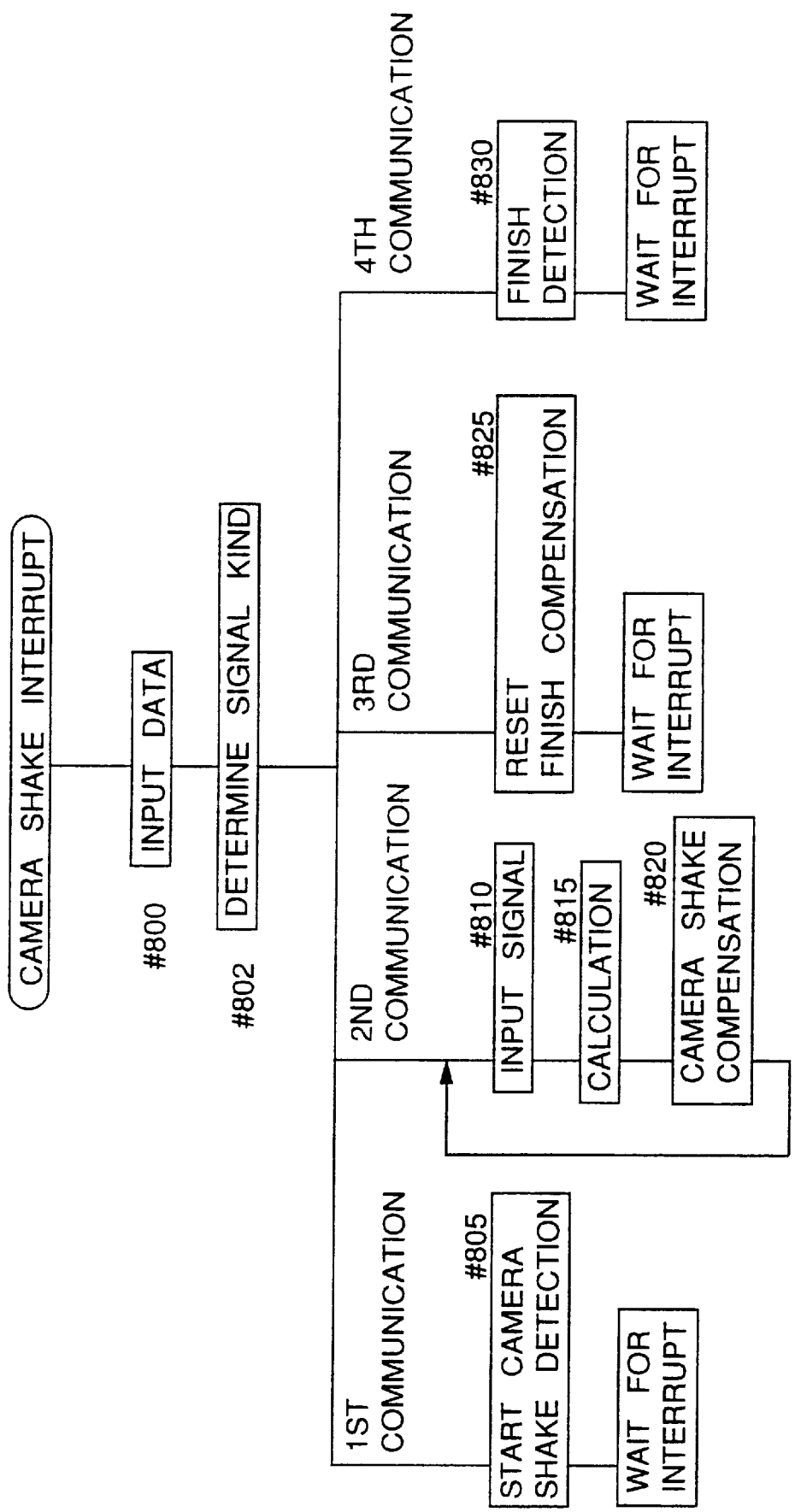
FIG. 79 is a flowchart of a camera shake interrupt of the optical path switching type camera embodying the present invention.

Referring next to FIGS. 78 and 79, a camera shake interrupt operation performed by the camera shake compensating microcomputer µC2 will be described. The microcomputer µC2 executes the subsequently-described processing for both the luminous flux splitting type camera (FIG. 56) and the optical path switching type camera (FIG. 57) through the first communication (#155 of FIG. 63), the second communication (#330 of FIG. 65), the third communication (#188, #195 and #245 of FIG. 63) and the fourth communication (#30 of FIG. 59, #60 of FIG. 60) with the microcomputer µC1.

<Camera Shake Interrupt (FIG. 78)>

In the luminous flux splitting type camera (FIG. 56), when the camera shake compensating microcomputer µC2 inputs a signal representative of a communication from the microcomputer μC1, a camera shake interrupt shown in FIG. 78 is generated. First, data is inputted (#800) and the kind of the signal is determined (#802). When the signal is representative of the first communication, the process proceeds to step #805 to start camera shake detection. Here, initialization such as the discharging of unnecessary charges from the CCD sensor (camera shake sensor 12) is performed and the process waits for the next interrupt.

When the signal is representative of the second communication, the process proceeds to step #810 to perform camera shake compensation. At step #810, the integration of the CCD sensor is performed. After the integration, data is inputted (#812) and the out-of-focus amount of the image and the lens correction amount are calculated based on the input signal (#815). Then, camera shake compensation is made by driving the motor M4 with the X-direction driver 13 and driving the motor M5 with the Y-direction driver 14 based on the calculation results (#820). After the camera shake compensation, the process returns to step #810.

When the signal is representative of the third communication, since the switch S1 has been turned off or exposure has been finished, in order to end only the camera shake compensation, the moving block 120 (FIGS. 53 to 55) is returned to its reset position (i.e. initial position) by driving the motor M4 with the X-direction driver 13 and driving the motor M5 with the Y-direction driver 14, so that the camera shake compensation is ended (#825). Then, the process waits for the next interrupt. When the signal is representative of the fourth communication, since the camera is not in preparation for taking, neither compensating nor detecting camera shake is necessary. Therefore, in order to save power, camera shake detection is ended (#830) and the process waits for the next interrupt.

<Camera Shake Interrupt <FIG. 79)>

In the optical path switching type camera (FIG. 57), when the camera shake compensating microcomputer μC2 inputs a signal representative of a communication from the microcomputer μC1, a camera shake interrupt shown in FIG. 79 is generated. First, data is inputted (#800) and the kind of the signal is determined (#802). When the signal is representative of the first communication, the process proceeds to step #805 to start camera shake detection with the angular velocity sensor (camera shake sensor 12), and waits for the next interrupt.

When the signal is representative of the second communication, the process proceeds to step #810 to make camera shake compensation. At step #810, the signal from the angular velocity sensor is inputted, and the out-of-focus amount of the image and the lens correction amount are calculated based on the input signal (#815). Then, camera shake compensation is made by driving the motor M4 with the X-direction driver 13 and driving the motor M5 with the Y-direction driver 14 based on the calculation results (#820). After the camera shake compensation, the process returns to step #810. The processing executed when the signal is representative of the third and fourth communications will not be described since it is the same as that of the luminous flux splitting type camera (FIG. 56).

<<Zooming and Focusing>>

Figure 82:
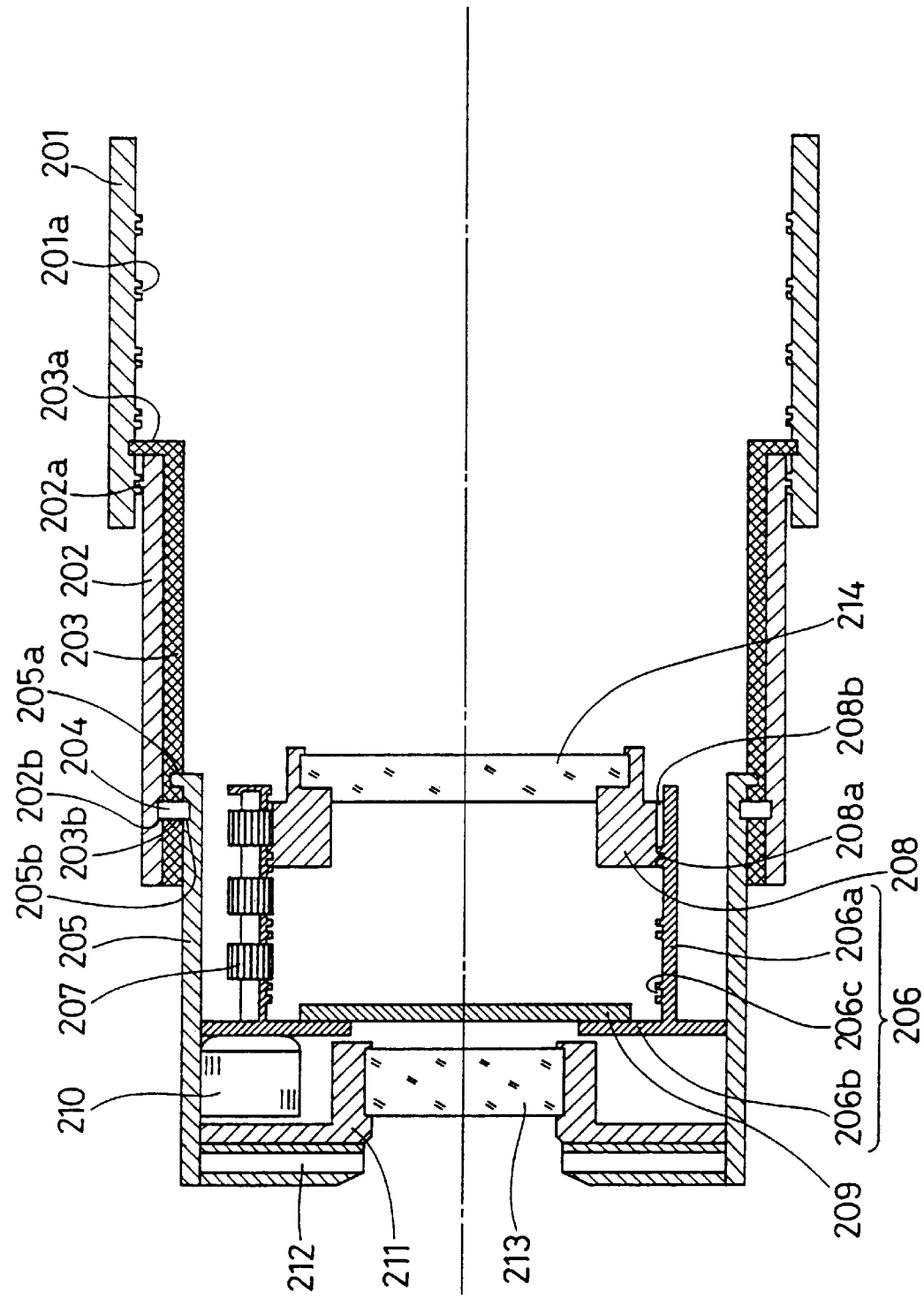
FIG. 82 is a cross-sectional view schematically showing a lens barrel which has a block including both the first and second lens units and constitutes a part of the camera embodying the present invention.
Figure 83:
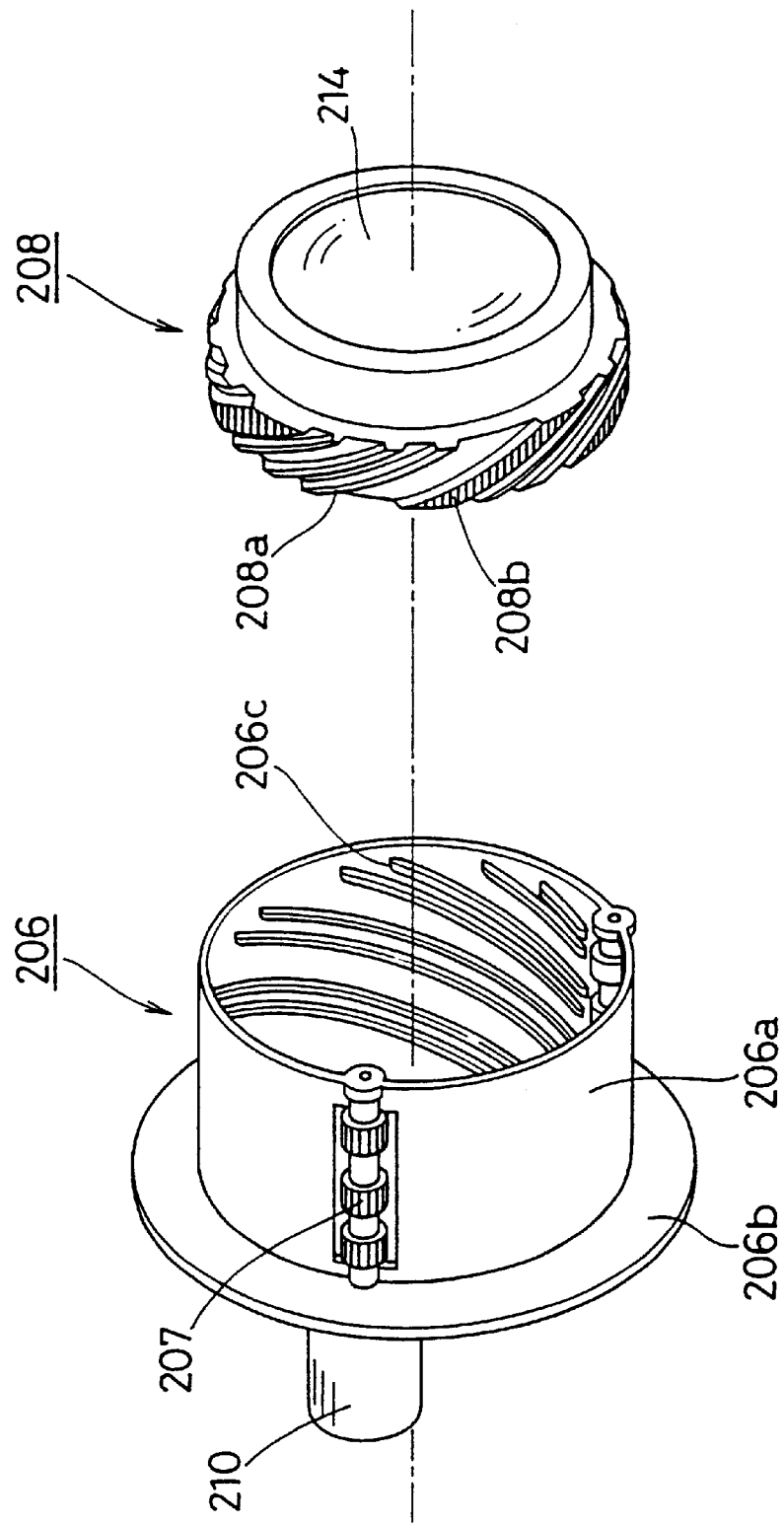
FIG. 83 is a perspective view showing a focusing portion provided in the lens barrel of FIG. 82.

Next, zooming and focusing of the camera according to the present embodiment will be described. FIG. 82 is a longitudinal cross-sectional view of a zoom lens barrel having three segments (one stationary segment and two movable segments) including two lens units. FIG. 83 is a perspective view of a focusing portion of the lens barrel for holding a second lens unit 214. In these figures, 201 is a stationary barrel secured to the camera body and having a cylindrical inner surface with a helicoid groove 201a and a straight groove (not shown) parallel to the optical axis of the lens units.

Reference numeral 202 is a rotatively movable barrel whose inner and outer surfaces are both cylindrical. The outer surface has a helicoid ridge 202a engaging with the helicoid groove 201a of the inner surface of the stationary barrel 201. The inner surface of the barrel 202 has a taper cam 202b set at a predetermined angle to the optical axis and a bayonet (now shown) formed circumferentially. The rotatively movable barrel 202 is moved along the optical axis while being rotated with respect to the stationary barrel 201 by a rotation force from a non-illustrated zoom speed reducing system.

Reference numeral 203 is a first non-rotatively movable barrel whose inner and outer surfaces are both cylindrical. The outer surface has a straight rib 203a engaging with the straight groove of the inner surface of the stationary barrel 201, and a bayonet pawl (not shown) engaging with the bayonet of the inner surface of the rotatively movable barrel 202. The inner surface of the barrel 203 has a straight groove (not shown) parallel to the optical axis. The first non-rotatively movable barrel 203 and the rotatively movable barrel 202 are capable of relative rotating around the optical axis while being integral with each other along the optical axis by the engagement between the bayonet and the bayonet pawl (so-called bayonet connection). The first non-rotatively movable barrel 203 is non-rotatively moved since the straight rib 203a is guided by the straight groove of the stationary barrel 201. The first non-rotatively movable barrel 203 has an oblong cam hole 203b which is a through hole. A pin 204 slides along the cam hole 203b.

The pin 204 is secured to a subsequently-described second non-rotatively movable barrel 205 and engaging with the taper cam 202b of the inner surface of the rotatively movable barrel 202 and with the cam hole 203b of the first non-rotatively movable barrel 203 to form a so-called cam structure. Specifically, when the rotatively movable barrel 202 and the first non-rotatively movable barrel 203 relatively rotate around the optical axis while being integral with each other along the optical axis, the second non-rotatively movable barrel 205 moves along the optical axis with respect to the barrels 202 and 203. In this case, whether the second non-rotatively movable barrel 205 is moved non-rotatively or rotatively and the angle of rotation may freely be set according to the angular relationship between the taper cam 202b of the rotatively movable barrel 202 and the cam hole 203b of the first non-rotatively movable barrel 203. In this embodiment, the second non-rotatively movable barrel 205 is non-rotatively moved.

Reference numeral 205 is the second non-rotatively movable barrel having a cylindrical outer surface with a straight rib 205a engaging with the straight groove of the inner surface of the first non-rotatively movable barrel 203, and a hole 205b for securing the pin 204. The second non-rotatively movable barrel 205 is driven by the above-described cam structure and is non-rotatively moved along the optical axis with respect to the first non-rotatively movable barrel 203 by the straight rib 205a being guided by the straight groove of the inner surface of the first non-rotatively movable barrel 203.

In the above-described structure, the straight ribs 203a and 205a for guiding the first and second non-rotatively movable barrels 202 and 205 and corresponding straight grooves, and the pin 204, the taper cam 202b and the cam hole 203b for driving the second non-rotatively movable barrel 205 are each provided in three to divide the entire circumference of the corresponding barrels into three. This will be called three-point suspension in this specification. With this arrangement, as to the lens barrels which are movable elements, their positions along the optical axis and their inclinations from the optical axis can be corrected in any positions.

In this zoom lens barrel, since the lens barrels are structured and coupled as described above, when a rotation force is transmitted from the external zoom speed reducing system to the rotatively movable barrel 202, the first non-rotatively movable barrel 203 integral with the rotatively movable barrel 202 along the optical axis is non-rotatively moved with respect to the stationary barrel 201 and the second non-rotatively movable barrel 205 is non-rotatively moved with respect to the first non-rotatively movable barrel 203. Consequently, the second non-rotatively movable barrel 205 is non-rotatively moved with respect to the camera body.

The second non-rotatively movable barrel 205 which forms the last segment of the lens barrel arrangement integrally holds: a (subsequently-described) focusing portion including a first lens unit holder 211 for holding a first lens unit 213, and a second lens unit 214; and a lens barrier unit 212. When the lens barrel is completely collapsed, the lens barrier unit 212 is driven by a non-illustrated mechanism to cover the front of the first lens unit 213 to protect its surface.

The structure of the focusing portion will be described. The focusing portion includes a second lens unit holder supporting member 206 and a second lens unit holder 208 directly holding the second lens unit 214. The second lens unit holder 208 is supported by the second lens unit holder supporting member 206. These members cooperate to serve as the focusing mechanism. The second lens unit holder supporting member 206 has a flange 206b secured to the non-rotatively movable barrel 205, and a cylinder 206a having an cylindrical inner surface with a helicoid groove 206c.

To the cylinder 206a is attached a rotatable gear 207 which receives a rotation force from the focusing unit 210 and transmits it to the second lens unit holder 208. To the flange 206b is attached a shutter unit 209. The second lens unit holder 208 has a cylindrical outer surface with a helicoid ridge 208a engaging with the helicoid groove 201a of the inner surface of the cylinder 206a of the second lens unit holder supporting member 206, and a gear 208b meshing with the gear 207.

Next, the operation of the focusing portion thus arranged will be described. When the focusing unit 210 is driven, a rotation force is transmitted to the gear 207. When the gear 207 is rotated, the gear 208b formed on the outer surface of the second lens unit holder 208 is rotated and since the helicoid groove 206c and the helicoid ridge 208a engage with each other, the second lens unit holder 208 for holding the second lens unit 214 which performs focusing is rotatively moved along the optical axis with respect to the second non-rotatively movable barrel 205.

As described above, in the zoom lens barrel of the arrangement shown in FIG. 82, focusing is performed by moving the second lens unit 214 along the optical axis. In this arrangement, since the first lens unit holder 211 and the second lens unit holder supporting member 206 are both secured to the second non-rotatively movable barrel 205, as long as a focusing motor 210 is not rotated, the first lens unit 213 and the second lens unit 214 are moved with a fixed distance therebetween during zooming. That is, in this case, the zoom curves drawn by these lens units are parallel to each other. However, since the zoom curves which the first lens unit 213 and the second lens unit 214 should draw are not parallel to each other, the difference is corrected by use of the above-described focusing mechanism in this embodiment.

Figure 84:
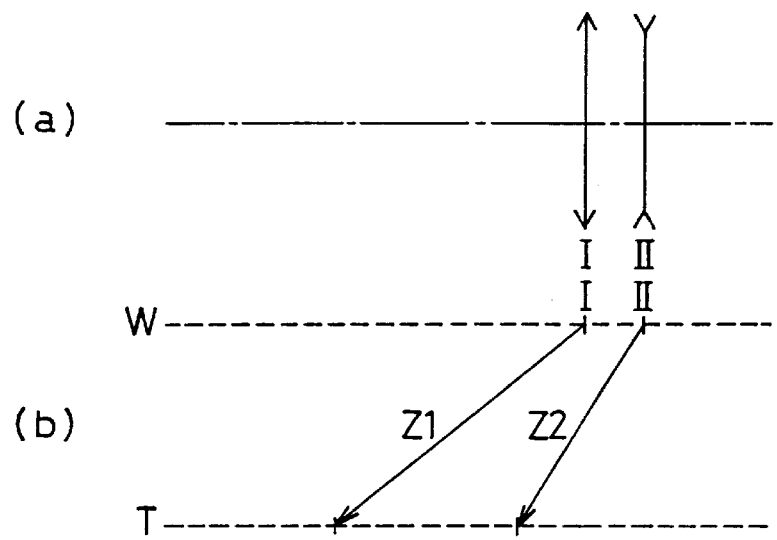
FIG. 84 schematically shows the disposition of the first and the second lens units (a) and the zoom curves which these lens units should draw (b) in a zoom lens barrel having two lens units.

FIG. 84 schematically shows the disposition of the first lens unit (I) and the second lens unit (II) (see (a)) and the zoom curves which these lens units should draw (see (b)) in the zoom lens barrel having two lens units like the one shown in FIG. 82. When zooming is performed from a short focal length set condition (hereinafter, referred to as wide angle condition and designated W) to a long focal length set condition (hereinafter, referred to as telephoto condition and designated T), the first lens unit (I) and the second lens unit (II) should both be moved forward, and as is apparent from FIG. 84, zoom curves Z1 and Z2 which these lens units should draw are not parallel to each other.

Therefore, conventionally, the first lens unit (I) and the second lens unit (II) are separately held for zooming and separate lens driving mechanisms are provided for moving the lens units to draw different zoom curves. Moreover, in order to perform focusing in addition to zooming, another lens driving mechanism is necessary for moving either of the lens units by a predetermined amount from the zoom curve Z1 or Z2. Thus, in the conventional two lens unit zoom lens barrel, a total of three (2+1) lens driving mechanisms are provided.

On the contrary, in the arrangement shown in FIG. 82, the first lens unit 213 and the second lens unit 214 are integrally held by the second non-rotatively movable barrel 205 so as to be moved along either of the zoom curves with a fixed distance therebetween and the movement of the lens unit shifted from the zoom curve which the lens unit should draw is corrected by the shift amount by use of the focusing mechanism. Thus, in this arrangement, only two ((2−1)+1) lens driving mechanisms are necessary.

Figure 85:
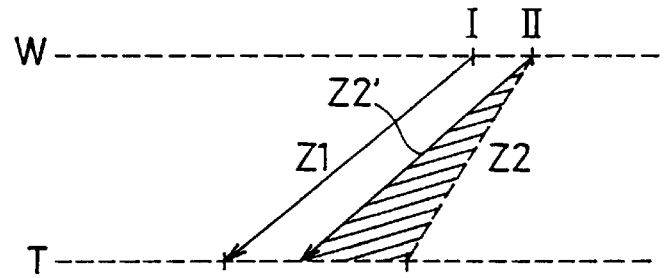
FIG. 85 schematically shows the loci of the lens units when the position of the second lens unit is adjusted during zooming in the two lens unit arrangement in which the first and second lens units are integrally held.

Specifically, as shown in FIG. 85, the first lens unit (I) 213 is moved along the zoom curve Z1 which it should draw and the second lens unit (II) 214 is moved along a zoom curve Z2' parallel to the zoom curve Z1. In this case, the zoom curve Z2' is shifted from the zoom curve Z2 which the second lens unit (II) 214 should draw. Therefore, the second lens unit (II) 214 is shifted with the focusing mechanism by an amount (hatched portion in FIG. 85) corresponding to the difference between the zoom curve Z2' and the zoom curve Z2 which the second lens unit (II) 214 should draw, so that in the above-described arrangement, the first lens unit (I) 213 and the second lens unit (II) 214 are moved for zooming as required. In photographing, it is necessary to perform focusing in addition to zooming and focusing is achieved by further moving the second lens unit (II) 214 with the same focusing mechanism.

Figure 86:
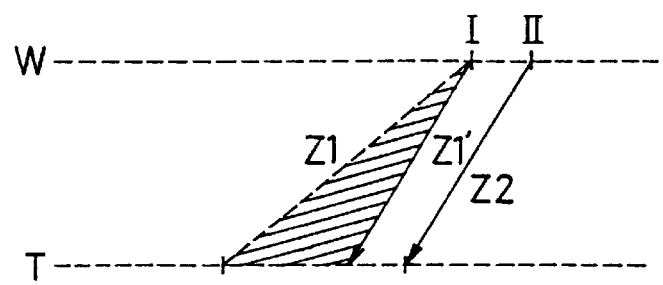
FIG. 86 schematically shows the loci of the lens units when the position of the first lens unit is adjusted during zooming in the two lens unit arrangement in which the first and second lens units are integrally held.

In the zoom lens barrel where the first and second lens units are held by one non-rotatively movable barrel, the focusing mechanism may be attached to the first lens unit 213 instead of to the second lens unit 214. In this case, zooming and focusing can also be performed with one less lens driving mechanisms than in the conventional arrangement. The structure of this arrangement will not be described in detail. FIG. 86 shows the zoom curves Z1 and Z2 which the first lens unit (I) and the second lens unit (II) should draw during zooming, and a zoom curve Z1' which the first lens unit (I) draws when no correction is made by the focusing mechanism in this arrangement.

In this arrangement, during zooming, the second lens unit (II) is moved along the zoom curve Z2 which it should draw and the first lens unit (I) is moved along the zoom curve Z1' parallel to the zoom curve Z2. In this case, the zoom curve Z1' is shifted from the zoom curve Z1 which the first lens unit (I) should draw. For this reason, the first lens unit (I) is shifted with the focusing mechanism by an amount (hatched portion in FIG. 86) corresponding to the difference between the zoom curve Z1 and the zoom curve Z1 which the first lens unit (I) should draw, so that in the above-described arrangement, the first lens unit (I) and the second lens unit (II) are moved for zooming as required. As in the arrangement of FIG. 85, it is necessary to perform focusing in addition to zooming in photographing and focusing is achieved by further moving the first lens unit (I) with the same focusing mechanism.

Next, a mechanism for performing zooming and focusing of a zoom lens barrel having four segments (one stationary segment and three movable segments) including four lens units in the camera according to the present invention will be described with reference to the previously-described FIGS. 47 and 48.

While the zoom lens barrel of this arrangement has one more segments than the zoom lens barrel of FIG. 82, the structures and operations of the lens barrels (a stationary barrel, rotatively movable barrels and non-rotatively movable barrels) are the same as those of FIG. 82. Specifically, when a rotation force is transmitted from an external zoom speed reducing system to the first rotatively movable barrel 65, the first non-rotatively movable barrel 66 integral with the first rotatively movable barrel 65 along the central axis of the lens barrel is non-rotatively moved with respect to the stationary barrel 64.

At this time, the first rotatively movable barrel 65 and the first non-rotatively movable barrel 66 are rotated with respect to each other around the central axis of the lens barrel, so that by a cam mechanism comprised of non-illustrated taper cams and cam holes of the barrels 65 and 66 and a pin secured to the second rotatively movable barrel 67, the second rotatively movable barrel 67 is moved with respect to the first non-rotatively movable barrel 66 while being rotated about the central axis of the lens barrel. Concurrently therewith, the second non-rotatively movable barrel 68 is, by its straight rib being guided, non-rotatively moved integrally with the second rotatively movable barrel 67 along the central axis of the lens barrel with respect to the first non-rotatively movable barrel 66.

Then, the second rotatively movable barrel 67 and the second non-rotatively movable barrel 68 are rotated with respect to each other about the central axis of the lens barrel, so that by a cam mechanism comprised of non-illustrated taper cams of the barrels 67 and 68 and a pin secured to the third non-rotatively movable barrel 69, the third non-rotatively movable barrel 69 is non-rotatively moved along the central axis of the lens barrel with respect to the second non-rotatively movable barrel 68.

In the zoom lens barrel structured as shown in FIGS. 47 and 48, the first lens unit 61a is integrally held in the third non-rotatively movable barrel 69, and the focusing portion including the second lens unit 62a and the second-third lens unit block holding the third lens unit 62b are integrally held in the second non-rotatively movable barrel 68. Therefore, as long as the focusing portion is not actuated, the second lens unit 62a and the third lens unit 62b are moved along the optical axes AX and AX1 with a fixed distance therebetween. Further, the fourth lens unit 63a is moved along the central axis of the lens barrel with respect to the second non-rotatively movable barrel 68 by a cam mechanism including a pin (cam follower) of the arm 63c of the fourth lens unit block 63 holding the fourth lens unit 63a. Consequently, the first to fourth lens units 61a, 62a, 62b and 63a are non-rotatively moved along the optical axes AX and AX1.

In this arrangement, the three-point suspension is also employed for the members for holding and driving the movable elements. Specifically, the straight ribs of the first and second non-rotatively movable barrels 66 and 68 and corresponding straight grooves 64a and 66a, and the pins secured to the second rotatively movable barrel 67, to the third non-rotatively movable barrel 69 and to the arm 63c and corresponding taper cams and cam holes are each provided in three to divide the entire circumference of the corresponding barrels into three.

In this zoom lens barrel, a finder optical system with the optical axis AX2 is disposed in addition to the taking optical system. Therefore, the central axis AX2 of the lens barrel and the optical axes AX1 and AX2 of the taking and finder optical systems do not coincide although they are parallel to each other. However, the relative positional relationship between the optical axes AX1 and AX2 are maintained during zooming.

Next, members held in the above-described barrels will specifically be described. The third non-rotatively movable barrel 69 which forms the last segment of the movable segments integrally holds the first lens unit holder 61b for holding the first lens unit 61a, and the lens barrier unit 70. When the lens barrel is completely collapsed, the lens barrier unit 70 is driven by a non-illustrated mechanism to cover the front of the first lens unit 61a to protect its surface.

The second non-rotatively movable barrel 226 which forms the second movable segment integrally holds, as described above, the second-third lens unit block 62 which includes the focusing portion comprising the second lens unit 62a, the third lens unit 62b, the shutter unit 62f, the up-down total reflecting mirror 62 and the total reflecting mirror 62g. The focusing portion comprises the second lens unit 62a held in the second-third lens unit block 62 to be rotatively movable along the optical axis AX, and the focusing unit 62c which rotates the gear 62i attached to the second lens unit 62a through the gear 62h. These members cooperate to serve as the focusing mechanism.

Moreover, as described above, the fourth lens unit holder 63b for holding the fourth lens unit 63a is non-rotatively moved with respect to the second non-rotatively movable barrel 68 along the central axis of the lens barrel by the cam mechanism including the pin (cam follower) of the arm 63c. Therefore, with the above-described arrangement, by setting an appropriate angular relationship between the taper groove and the cam hole of each lens barrel, the first to fourth lens units 61a, 62a, 62b and 63a are movable for zooming along predetermined zoom curves. However, as long as the above-described focusing mechanism is not actuated, the second lens unit 62a and the third lens unit 62b are integrally moved with a fixed distance therebetween.

Figure 87:
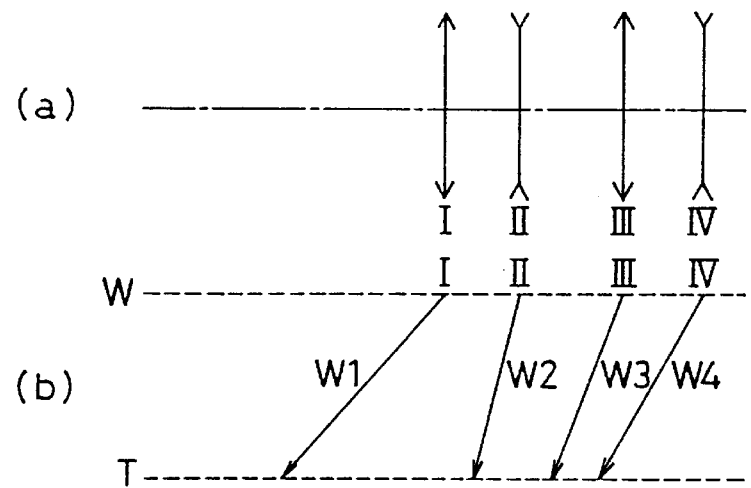
FIG. 87 schematically shows the disposition of the first to the fourth lens units (a) and the zoom curves which these lens units should draw (b) in a zoom lens barrel having four lens units.

FIG. 87 schematically shows the disposition of the first lens unit (I), the second lens unit (II), the third lens unit (III) and the fourth lens unit (IV) (see (a)) and zoom curves which these lens units should draw (see (b)) in the zoom lens barrel having four lens units like the above-described zoom lens barrel. When zooming is performed from the wide angle condition (designated W) to the telephoto condition (designated T), these lens units should all be moved forward, and as is apparent from FIG. 87, the loci along the optical axis which these lens units should draw, i.e. their zoom curves W1, W2, W3 and W4 are not parallel to one another.

Therefore, conventionally, the first to fourth lens units are separately held, for example, like in the arrangement as shown in FIG. 33, and separate lens driving mechanisms are provided to move the lens units for zooming. Moreover, in order to perform focusing in addition to zooming, another lens driving mechanism is necessary for shifting one of the lens units by a predetermined amount from its zoom curve. Thus, in the conventional four lens unit zoom lens barrel, a total of five (4+1) lens driving mechanisms are provided.

On the contrary, in the arrangement shown in FIG. 47, the second lens unit 62a and the third lens unit 62b are integrally held by the second-third lens unit block secured to the second non-rotatively movable barrel 68 so as to be moved along either of the zoom curves with a fixed distance therebetween and the movement of the lens unit shifted from the zoom curve which the lens unit should draw is corrected by the shift amount by use of the focusing mechanism. Thus, in this arrangement, only four ((4−1)+1) lens driving mechanisms are necessary.

Figure 88:
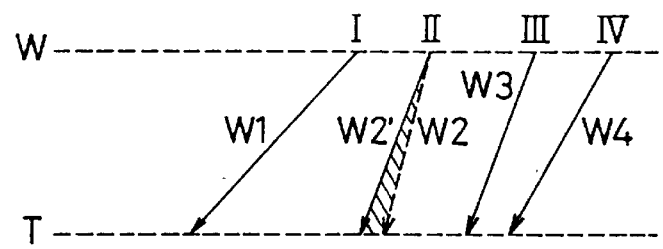
FIG. 88 schematically shows the loci of the lens units when the position of the second lens unit is adjusted during zooming in the four lens unit arrangement in which the second and third lens units are integrally held.

Specifically, as shown in FIG. 88, the first, third and fourth lens units (I), (III) and (IV) are moved along zoom curves W1, W3 and W4 which they should draw and the second lens unit (II) is moved along a zoom curve W2' parallel to the zoom curve W3 of the third lens unit (III). Then, the second lens unit (II) draws the locus W2' parallel to the zoom curve W3. Therefore, the second lens unit (II) is shifted with the focus adjusting mechanism by an amount (hatched portion in FIG. 88) corresponding to the difference between the zoom curve W2' and the zoom curve W2 which the lens unit (II) should draw, so that in the above-described arrangement, the first to fourth lens units (I) to (IV) are moved for zooming as required. In photographing, it is necessary to perform focusing in addition to zooming and focusing is achieved by further moving the second lens unit (II) with the same focusing mechanism.

In the zoom lens barrel having the first to fourth lens units (I) to (IV), the focusing mechanism including the second lens unit (II) may be held integrally with the fourth lens unit (IV) instead of with the third lens unit (III) so as to be moved along the zoom curve W4 of the fourth lens unit (IV). The structure of this arrangement will not be described in detail. In this case, zooming and focusing can also be performed with one less lens driving mechanisms than in the conventional arrangement.

In this arrangement, compared to the arrangement of FIG. 88, the lens holding mechanisms are complicated since the third lens unit (III) is disposed between the second lens unit (II) and the fourth lens unit (IV). However, when the difference between the zoom curves W2 and W4 which the second and fourth lens units (II) and (IV) should draw is small, since the amount by which the second lens unit (II) has to be shifted with the focusing mechanism during zooming is small, the space necessary for the zooming adjustment is reduced, so that the internal arrangement of the lens barrel is made compact.

Figure 89:
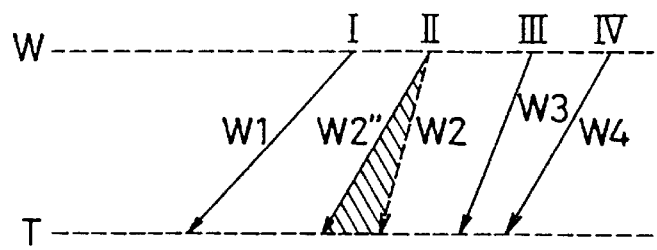
FIG. 89 schematically shows the loci of the lens units when the position of the second lens unit is adjusted during zooming in the four lens unit arrangement in which the second and fourth lens units are integrally held.

FIG. 89 shows the zoom curves W1 to W4 which the first to fourth lens units (I) to (IV) should draw during zooming, and a locus W2" which the second lens unit (II) draws when the correction with the focusing mechanism is not made in the above-described arrangement. In this arrangement, during zooming, the second lens unit (II) and the fourth lens unit (IV) are moved along the zoom curve W4 of the fourth lens unit (IV) while being held integrally with each other, and the movement of the second lens unit (II) is corrected with the focusing mechanism by an amount corresponding to the difference between the locus W2" parallel to the zoom curve W4 and the zoom curve W2 which the lens unit (II) should draw. For focusing, the second lens unit (II) is further moved with the same focusing mechanism.

While with respect to the above-described arrangements, a zooming method has been described in which after two lens units are integrally moved, the difference between the zoom curve which one of the lens units actually draws and the zoom curve which the lens unit should draw is corrected, the order of the integral movement and the difference correction is not limited thereto. For example, when the zoom value to be set is known, the amount to be corrected is determined in advance. In such a case, the difference correction for the one of the lens units with the focusing mechanism may precede the integral movement of both of the lens units.

<<Lens Holding Arrangement for Taking Optical System and Finder Optical System>>

Next, the structures of the lens barrels will be described which have both the taking optical system and the finder optical system. In the lens barrel shown in FIG. 33, the first to fourth lens units 41a, 42a, 43a and 44a constituting the taking optical system are held so as to be independently movable and the up-down total reflecting mirror provided in the taking optical system switches the optical path so that the luminous flux is directed to the finder optical system.

In the lens barrel shown in FIG. 47, the second and third lens units of the taking optical system are both held in the second-third lens unit block and the first and fourth lens units are held separately. To direct the luminous flux to the finder optical system, the up-down total reflecting mirror provided in the taking optical system switches the optical path.

In the arrangements of FIGS. 33 and 47, no parallax is caused between the taking optical system and the finder optical system since the taking optical system and the finder optical system both use the luminous flux having passed through the first and second lens units 41a and 42a (in the case of FIG. 33) or 61a and 62a (in the case of FIG. 47). These lens barrels are capable of being moved out and have the mechanisms for zooming and focusing by which the taking optical system and the finder optical system are driven.

In the arrangements of FIGS. 33 and 47, the optical axis of the taking optical system and a part of the optical axis of the finer optical system are set to be parallel to the central axis of the lens barrel, so that the space in the finder optical system necessary for the taking optical system and the finder optical system is reduced. As a result, the size of the lens barrel is reduced.

As described previously, zooming of the finder optical system is performed by moving along the optical axis AX2 the finder optical system rear lens unit block provided in the second finder block 56 or 71 (FIGS. 33 and 47). Some of the lenses included in the finer optical system rear lens unit block function in completely the same manner as the lenses included in the fourth lens unit 44a or 63a of the taking optical system. Such lenses may be held by the same member.

Figure 90:
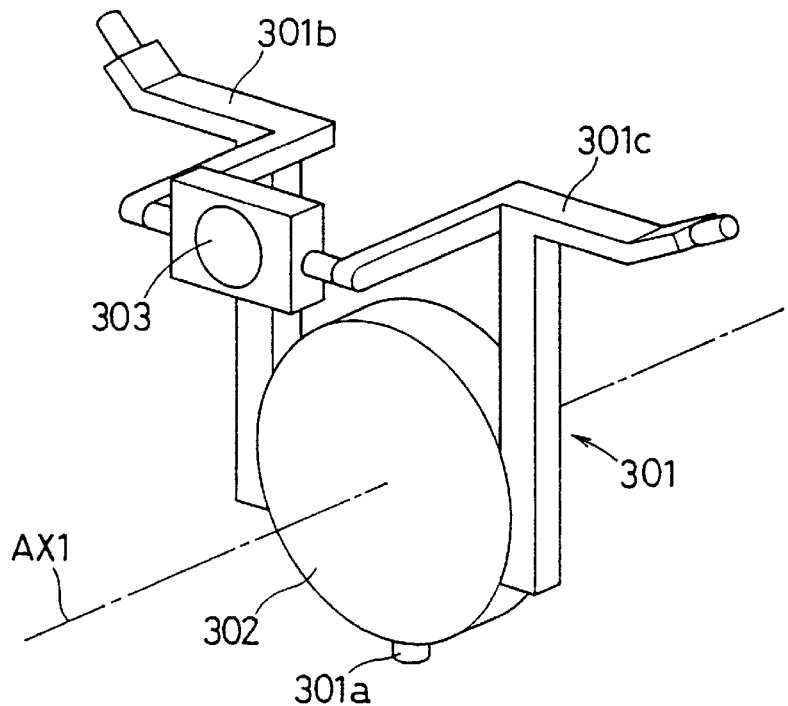
FIG. 90 is a perspective view of a holding member for integrally holding the lenses of the taking and finder optical systems.
Figure 91:
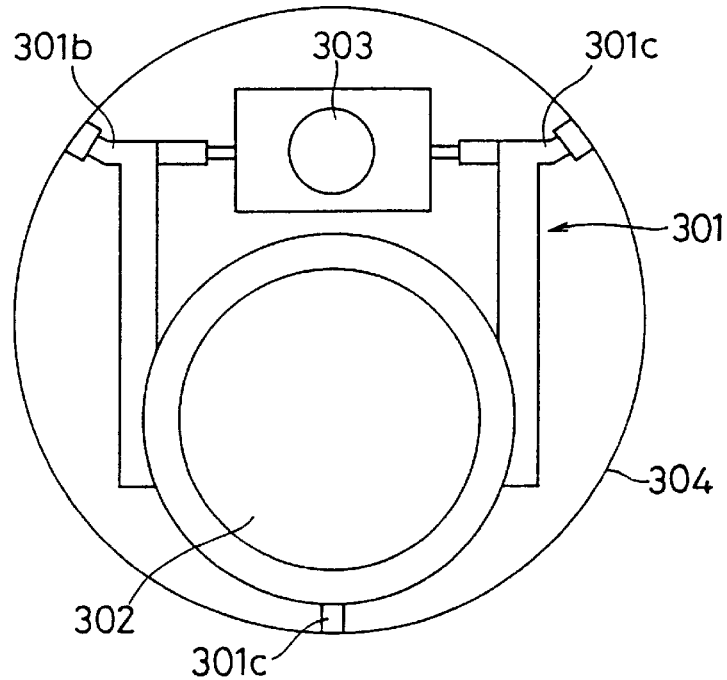
FIG. 91 is a front view showing a condition where the holding member for integrally holding the lenses of the taking and finder optical systems is disposed in the lens barrel.

FIGS. 90 and 91 are a perspective view and a front view of a holding member 301 for integrally holding a lens of the taking optical system and a lens of the finder optical system. In these figures, 302 is the lens of the taking optical system, 303 is the lens of the finder optical system, and 301a, 301b and 301c are arms of the holding member 301. In the inner wall of a lens barrel 304 are formed three grooves (not shown) parallel to the optical axis AX1 of the taking optical system for engagement with the tips of the arms 301a, 301b and 301c. The lens 302 of the taking optical system and the lens 303 of the finder optical system are in approximately intimate contact with the inner wall of the lens barrel 304. The holding member 301 is moved backward and forward along the optical axis AX1 when receiving the driving force for zooming. When the lens barrel is collapsed, the holding member 301 is moved toward the camera body.

By integrally holding the lenses of the finder optical system and of the taking optical system with the same holding member as described above, the number of parts is reduced, so that the internal arrangement of the lens barrel is simplified. Moreover, since it is unnecessary to individually set the lens position of the finder optical system and the lens position of the taking optical system, the setting of lens positions for zooming is facilitated and no error is caused in the setting of lens positions. The structure of the holding member 301 is not limited to the shown structure. It should be set according to the position of the grooves formed in the lens barrel and the relative positions of the lenses of the optical systems.

Moreover, other optical devices than the lenses of the optical systems may be held by the holding member 301. For example, in FIG. 33, the total reflecting mirror 45a on the optical axis AX1 of the taking optical system and the total reflecting mirror 55a of the finder optical system are optical devices whose relative positions should be fixed, and are preferably held by the same holding member so that their movements along the optical axis coincide with each other.

<<Positions of Camera Shake Compensating Unit and Focusing Unit>>

Figure 92:
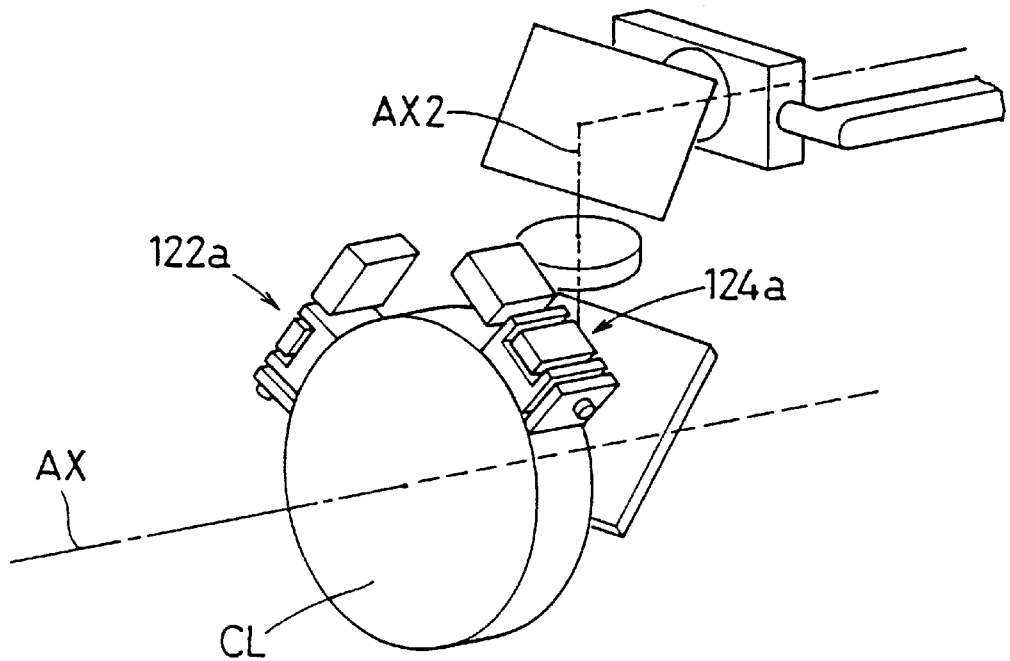
FIG. 92 is a perspective view of an arrangement where the camera shake compensating unit is disposed at an upper part in the lens barrel.

While the camera shake compensating unit is disposed at a lower part of the lens barrel in FIGS. 53 to 55, the position is not limited to the lower part of the lens barrel. Moreover, while the two actuators 122 and 124 are disposed in the horizontal and vertical directions, respectively, the directions of the actuators are not limited to the horizontal and vertical directions. FIG. 92 is a perspective view of a lens barrel in which the camera shake compensating unit is disposed at an upper part thereof. Two actuators 122a and 124a orthogonal to each other are disposed in a slanting direction above the camera shake compensating optical system CL. When the actuators are disposed in a slanting direction like this, the actuators are both driven for the horizontal camera shake, and for the vertical camera shake, the actuators are both driven as well.

Figure 93:
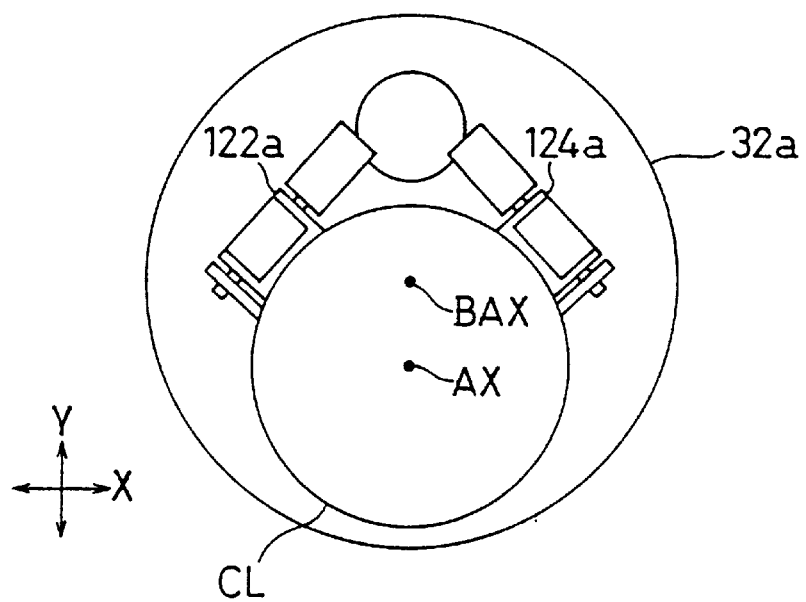
FIG. 93 is a front view of an arrangement where the camera shake compensating unit is disposed at an upper part in a cylindrical lens barrel.

FIG. 93 is a front cross-sectional view schematically showing the cylindrical lens barrel 32a of FIG. 28 combined with the above-described position of the camera shake compensating unit. BAX represents the central axis of the lens barrel 32a. The optical axis AX of the taking optical system is shifted downward from the central axis BAX. The actuators 122a and 124a are located in front of the finder optical system. In the decentered lens barrel, a large space is left at a part (upper part in the figure) within the lens barrel and the actuators are readily disposed in the space. On the opposite side of the space (lower part in the figure), the distance between the inner surface of the lens barrel and the luminous flux of the taking optical system is short.

Figure 94:
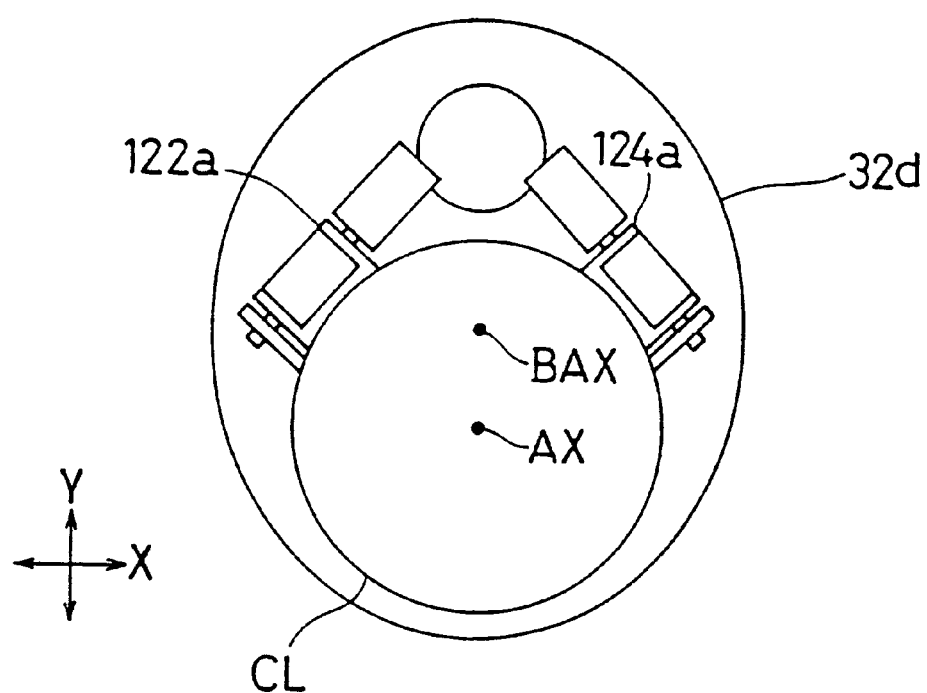
FIG. 94 is a front view of an arrangement where the camera shake compensating unit is disposed at an upper portion of a lens barrel having an oval cross section.

FIG. 94 is a front cross-sectional view of an arrangement in which a lens barrel 32d having an oval cross section is used instead of the cylindrical lens barrel 32a. The longer diameter of the oval is set in the vertical direction and the optical axis AX of the taking optical system is shifted downward from the central axis BAX of the lens barrel 32d. The distance between the luminous flux of the taking optical system and the inner surface of the lens barrel is the same as that of the lens barrel 32a with respect to the vertical direction. However, with respect to the horizontal direction which is along the shorter diameter of the oval, the distance is smaller than that of the lens barrel 32a. As is apparent from the comparison of FIG. 93 with FIG. 94, the size of the entire lens barrel is reduced by using the oval lens barrel 32d. The lens barrel 32d is moved out only by a non-rotative movement since it cannot be moved backward and forward while being rotated.

Although not shown in FIGS. 92 to 94, the focusing actuator 126 (FIGS. 54 and 55) is also disposed at the upper part of the lens barrels 32a and 32d, i.e. in front of the finder optical system together with the camera shake compensating unit.

<<Rotary Lens Barrier Unit>>

Figure 95:
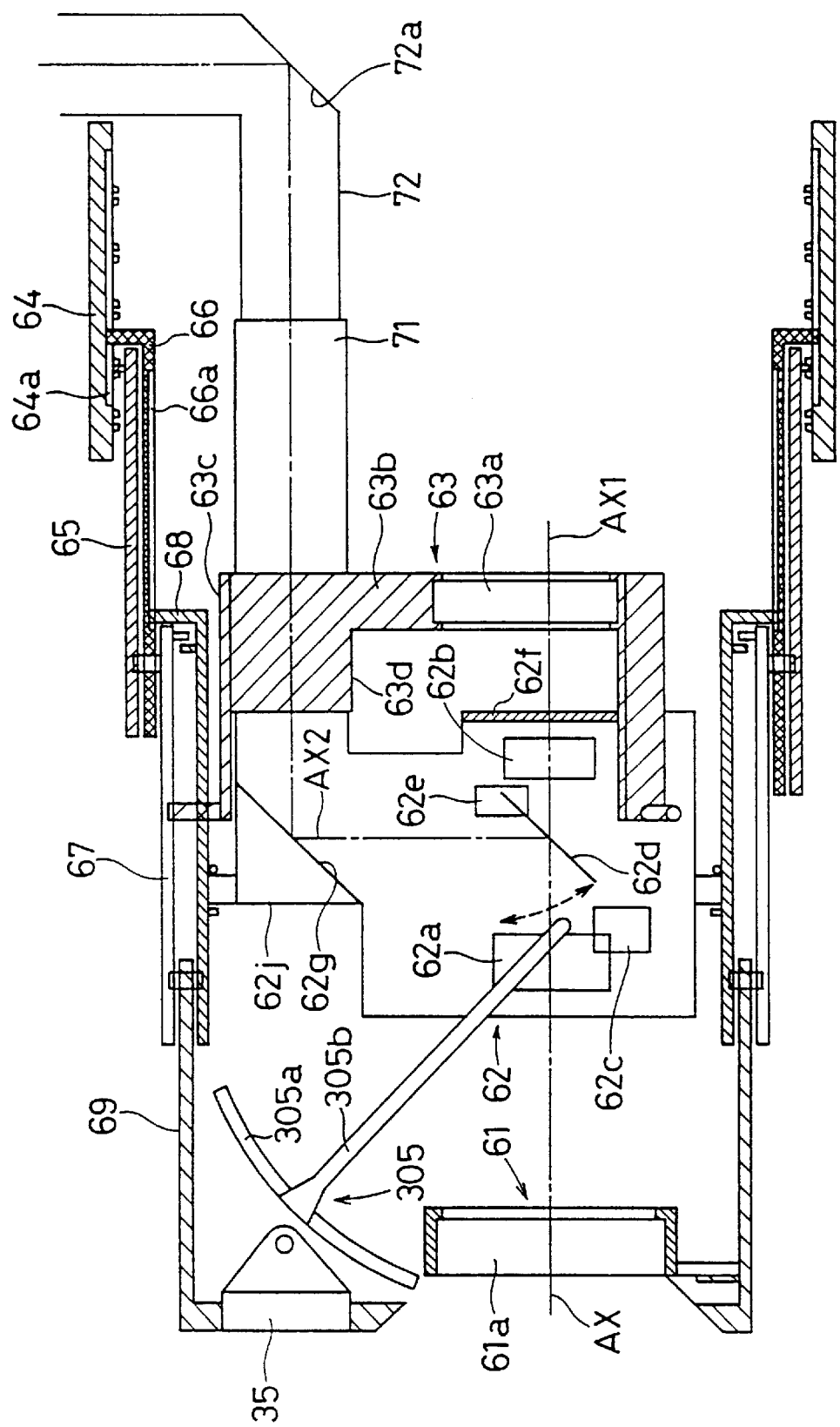
FIG. 95 is a longitudinal cross-sectional view of a lens barrel having a rotary lens barrier unit.

FIG. 95 shows a modification of the lens barrel of FIG. 47. The arrangement of the lens barrel and lens units of FIG. 95 will not be described since they are the same as that of FIG. 47. While the lens barrier unit 70 of FIG. 47 is non-rotatively moved from its retracted position to cover the front surface of the first lens unit, a lens barrier unit 305 of FIG. 95 is pivotable. The lens barrier unit 305 includes a lens barrier 305a and a barrier arm 305b. The barrier arm 305b has its end supported by a pin formed on the second-third lens unit block 62 so as to be vertically pivotable about the supported end. The end of the barrier arm 305b is connected to the focusing unit 62c through a non-illustrated transmitting mechanism having a clutch mechanism so that the barrier arm 305b receives a rotation force from the focusing unit 62c.

In FIG. 95, the lens barrier 305 is in its retracted position which is above the first lens unit 61a and in front of the mirror 62g and photographing is possible. When the barrier arm 305b pivots downward from this condition, the lens barrier 305a is moved to cover the first lens unit 61a to protect it.

Reference numeral 35 is the previously-described macro flash portion. When the macro flash portion 35 is disposed at the front end of the lens barrel like in this arrangement, the irradiated light is not intercepted by the lens barrel. Moreover, since the macro flash portion 35 is disposed in the vicinity of the optical axis AX of the taking optical system, the disagreement between the irradiated light and the optical axis AX is small, so that the center of the photographed area is illuminated in the macro photography. While in this arrangement, the light emission amount of the macro flash portion 35 is set to be small since the macro flash portion 35 is for the macro photography, it may be used for the normal flash photography by increasing the maximum light emission amount. In that case, the flash portion 34 shown in FIGS. 25 and 80 is unnecessary, so that the size of the camera is reduced. The irradiation angle of the macro flash portion 35 is set by the previously-described zoom flash controller 4 according to the focal length of the optical system.

<<Up-down Total Reflecting Mirror Stopping Mechanism>>

A mirror stopping mechanism for an arrangement where an up-down total reflecting mirror is used to switch the optical path between the taking optical system and the finder optical system will be described with reference to FIGS. 96A and 96B which are perspective views of the up-down mirror stopping mechanism. In the figures, AM1 and 62e are the total reflecting mirror and the mirror raising mechanism described previously, and 306 is a mirror stopper. The mirror AM1 has its upper end supported by the mirror raising mechanism 62e so as to be vertically pivotable about the supported end. The mirror raising mechanism 62e incorporates a spring which pushes the mirror AM1 in a downward pivoting direction at all times. During film exposure, the mirror raising mechanism 62e pivots the mirror AM1 upward against the pushing of the spring so that it retracts from the optical path of the taking optical system.

The mirror stopper 306 includes a stop bar 307, an arm 307a extending downward from the stop bar 307 and arms 307b and 307c obliquely extending upward. The position and configuration of the stop bar 307 and the arms 307a, 307b and 307c are set so as not to block the optical path of the taking optical system. The mirror AM1 pushed downward by the spring is stopped in a predetermined position on the optical path of the taking optical system at a predetermined angle by its back surface abutting the stop bar 307.

Reference numerals 308 and 309 are grooves respectively formed on the inner and outer barrels of a dual lens barrel. The inner and outer barrels correspond, for example, to the non-rotatively movable barrel 51 and the rotatively movable barrel 50 of FIG. 33. The inner barrel is non-rotatively moved backward and forward along the optical axis AX of the taking optical axis and the outer barrel is rotatively moved backward and forward together with the inner barrel along the optical axis AX of the taking optical system. The rotation of the outer barrel interlocks with the zooming operation from the telephoto condition to the wide angle condition and with the operation to collapse the lens barrel into the camera body when the camera is not in use.

The groove 308 is formed to be linear and parallel to the optical axis AX. The groove 309 is composed of a part 309a located within a plane vertical to the optical axis AX and a part 309b located within a plane obliquely intersecting the optical axis AX. The end of the arm 307a passes through the groove 308 of the inner barrel to engage with the groove 309 of the outer barrel. The movement of the arm 307a in a left-and-right direction, i.e. in a direction vertical to the optical axis AX is limited by the groove 308 of the inner barrel and the movement thereof in a back-and-forth direction is limited by the groove 309 of the outer barrel, so that the arm 307a rotates backward and forward according to the rotation of the outer barrel. The end of the groove 309a corresponds to the telephoto limit (longest focal length condition) of zooming and the bending portion corresponds to the wide angle limit (shortest focal length condition) of zooming. The end of the groove 309b corresponds to the stop position of the outer barrel when the lens barrel is collapsed. Consequently, the position where the groove 308 intersects the groove 309 varies according to the rotation of the outer barrel from the collapsed position to the wide angle limit to the telephoto limit, and in accordance therewith, the position of the arm 307a, i.e. the position of the mirror stopper 306 varies in a back-and-forth direction.

Although not shown, grooves similar to the grooves 308 and 309 are formed in positions corresponding to the ends of the arms 307b and 307c of the inner and outer barrels, so that the mirror stopper 306 is supported at three points. Please note that only one arm is necessary as long as the mirror stopper 306 is securely held without shaking within the lens barrel.

Figure 96A:
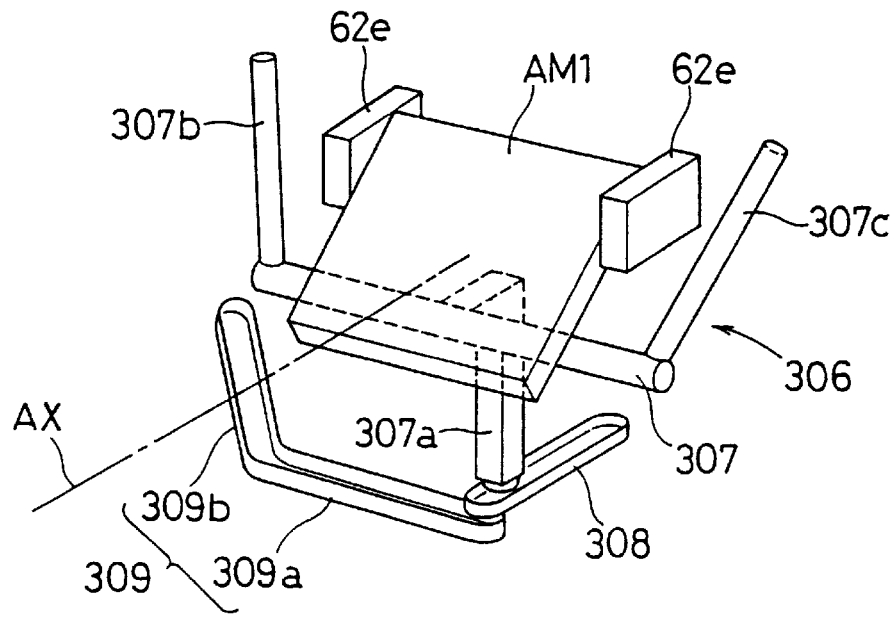
FIGS. 96A and 96B are perspective views of an up-down mirror stopping mechanism.
Figure 96B:
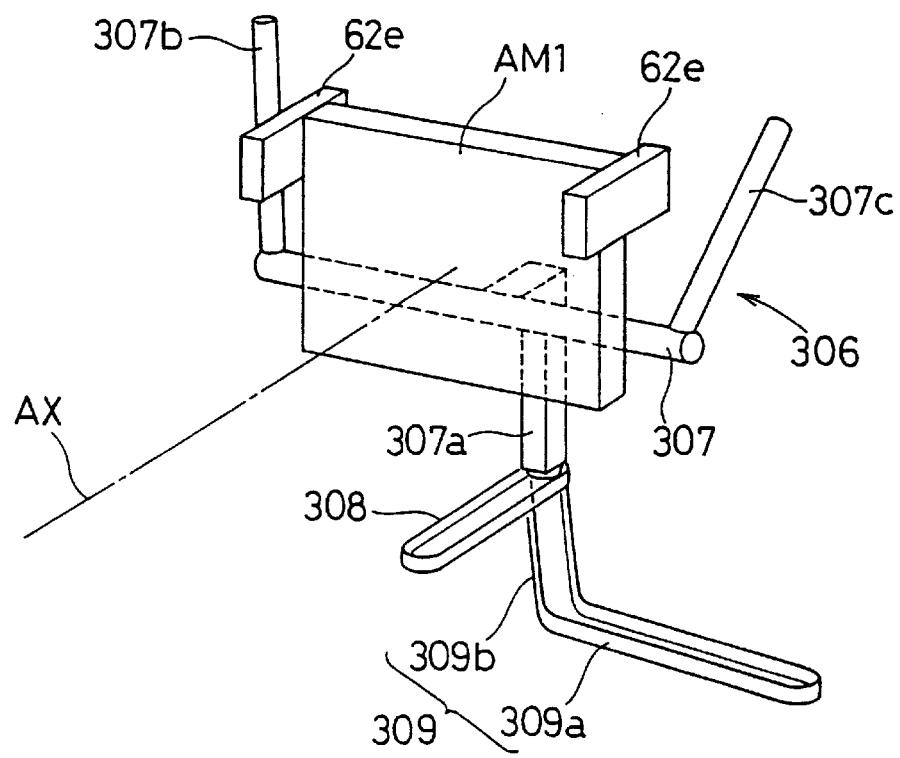

FIG. 96A shows the telephoto limit condition of zooming where the arm 307a is located at the front end of the groove 308. At this time, the mirror AM1 having its back surface supported by the stop bar 307 is inclined at 45 degrees to the optical axis AX of the taking optical system. The light of the taking optical system is reflected upward and directed to the finder optical system located outside the figure. When the mirror raising mechanism 62e raises the mirror AM1, the light of the taking optical system is directed straightly to the film located outside the figure without being intercepted by the mirror AM1.

Even if the outer barrel is rotated under this condition, the mirror stopper 306 is not moved until the bending portion of the groove 309 is located at the end of the arm 307a, i.e. until the wide angle limit condition of zooming is achieved. That is, the position of the mirror stopper 306 is fixed during zooming from the telephoto condition to the wide angle condition and the inclination of the mirror AM1 is also fixed. When the outer barrel is further rotated, the arm 307a is moved backward by being guided by the groove 309b. FIG. 96B shows a condition where the lens barrel is collapsed and the arm 307a has been moved to the rear end of the groove 308. At this time, the mirror AM1 has further been rotated downward by the pushing of the spring so as to be substantially vertical to the optical axis AX of the taking optical system.

Figure 97A:
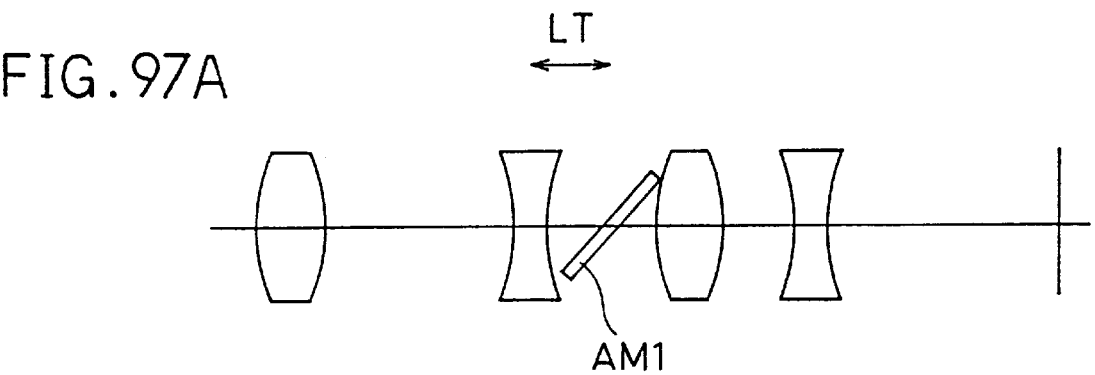
FIGS. 97A to 97C schematically show relative positions of the taking optical system employing the up-down mirror stopping mechanism.
Figure 97B:
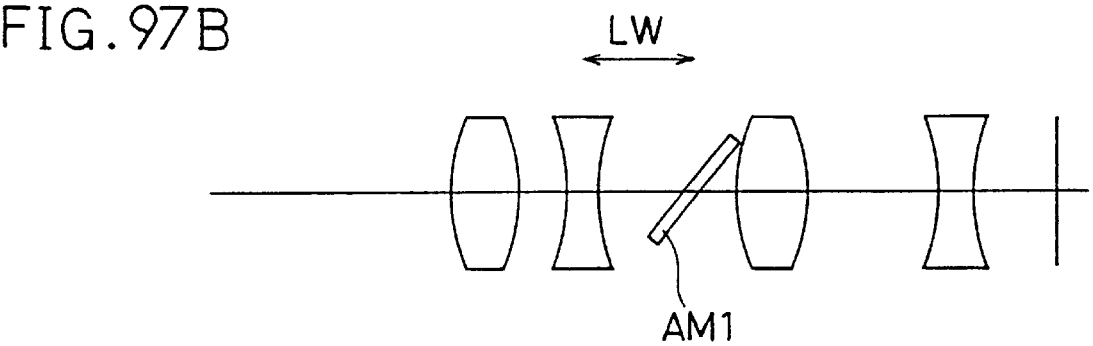
Figure 97C:
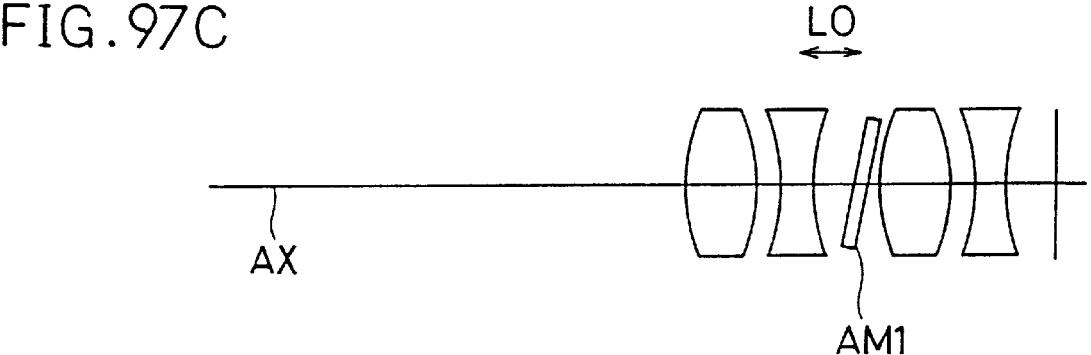

Referring to FIGS. 97A to 97C, the positional relationship among the lenses of the taking optical system which varies according to the rotation of the outer barrel is shown together with the mirror AM1. FIG. 97A shows the telephoto limit condition. FIG. 97B shows the wide angle limit condition. The lenses and the mirror AM1 are located closer to the subject at the telephoto limit condition than at the wide angle limit condition. However, the inclination of the mirror AM1 is the same. FIG. 97C shows the lens barrel collapsed condition where the distances between the lenses are short. The mirror AM1 is substantially vertical to the optical axis AX and the distance LO between the lens located directly in front of the mirror AM1 and the mirror AM1 is shorter than the distances LT and LW at the telephoto limit and wide angle limit conditions. Thus, by increasing the inclination of the mirror AM1 when the lens barrel is collapsed, the total length of the taking optical system is reduced, so that the size reduction of the entire camera is achieved.

<<Arrangement of Operation Members in Stationary Lens Barrel>>

Figure 98A:
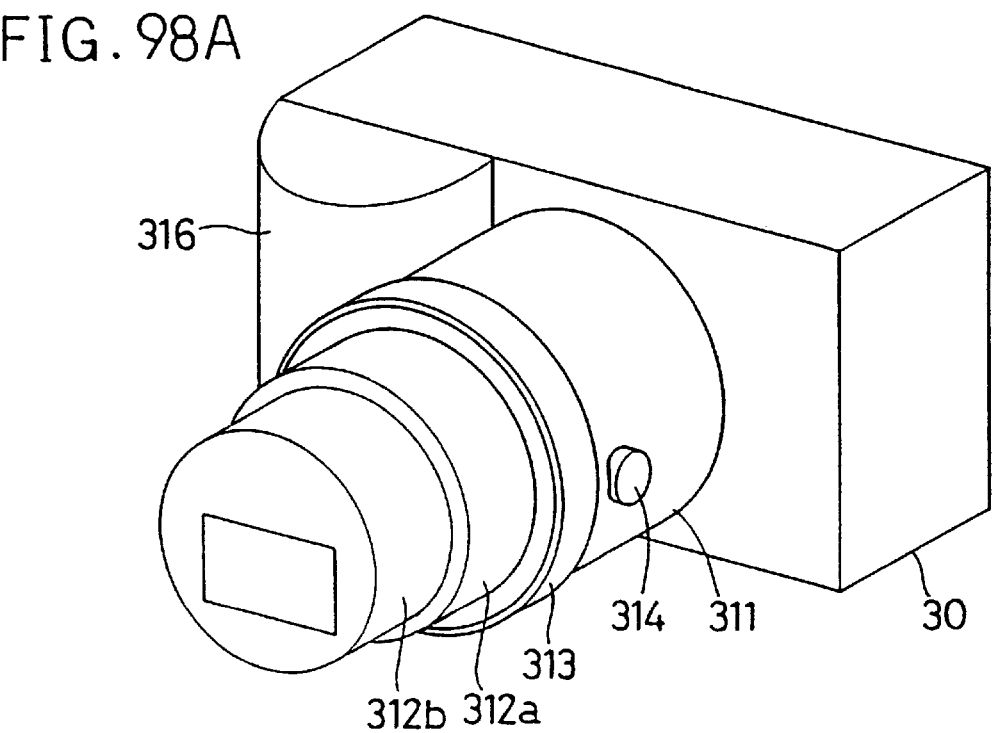
FIGS. 98A and 98B are external perspective views of a camera where operation members are provided on a cylindrical stationary barrel.
Figure 98B:
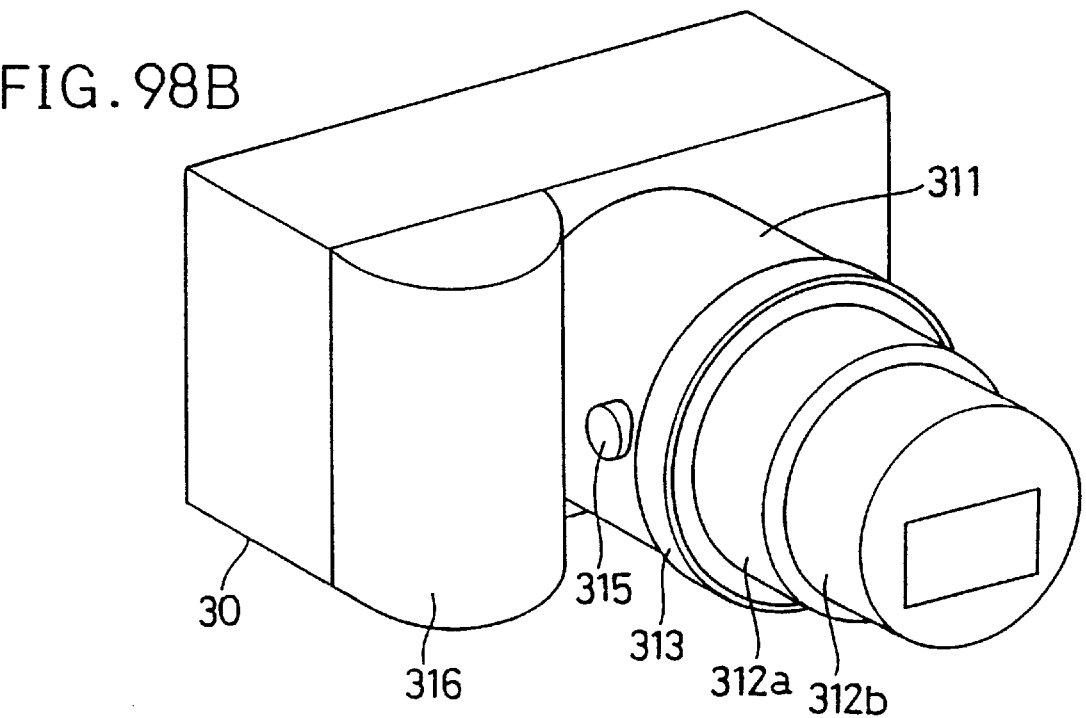

The arrangement of the operation members will be described. FIGS. 98A and 98B are external views of a camera having a cylindrical decentered lens barrel, viewed from different directions. A lens barrel 311 is secured to the front surface of the camera body 30 and lens barrels 312a and 312b which are movable backward and forward are fitted in the stationary lens barrel 311. At the front of the stationary lens barrel 311 is provided a zoom ring 313 which is rotated along the circumference of the lens barrel 311 by being manually operated by the user. The zoom ring 313 is connected to the previously-described switches SZT and SZW. For zooming, the switch SZT or SZW is closed according to the rotation direction of the zoom ring 313 so that the movable lens barrels 312a and 312b are moved backward or forward.

On one side of the stationary lens barrel 311 is provided a photometry lock button 314. While the photometry lock button 314 is depressed, photometry is not performed and exposure is controlled based on the results of the photometry performed immediately before the operation of the photometry lock button 314. On the other side of the stationary lens barrel 311 is provided a camera shake compensating button 315 in a position symmetrical with the photometry lock button 314 with respect to the central axis of the lens barrel 311. While the camera shake compensating button 315 is depressed, the camera shake compensating mechanism comprised of the camera shake sensor 12 and the actuators 122 and 124 operates to compensate vertical and horizontal camera shake.

With respect to this camera, the user holds a holding grip 316 and the body 30 with the right hand and supports the stationary lens barrel 311 with the left hand. At this time, by rotating the zoom ring 313 with the thumb and the forefinger of the left hand, the user can perform zooming in a natural holding position. Moreover, since it is possible to operate the photometry lock button 314 with the thumb of the left hand and operate the camera shake compensating button 315 with the middle finder or the forefinger of the left hand, photometry and camera shake compensation can simultaneously be performed.

Figure 99:
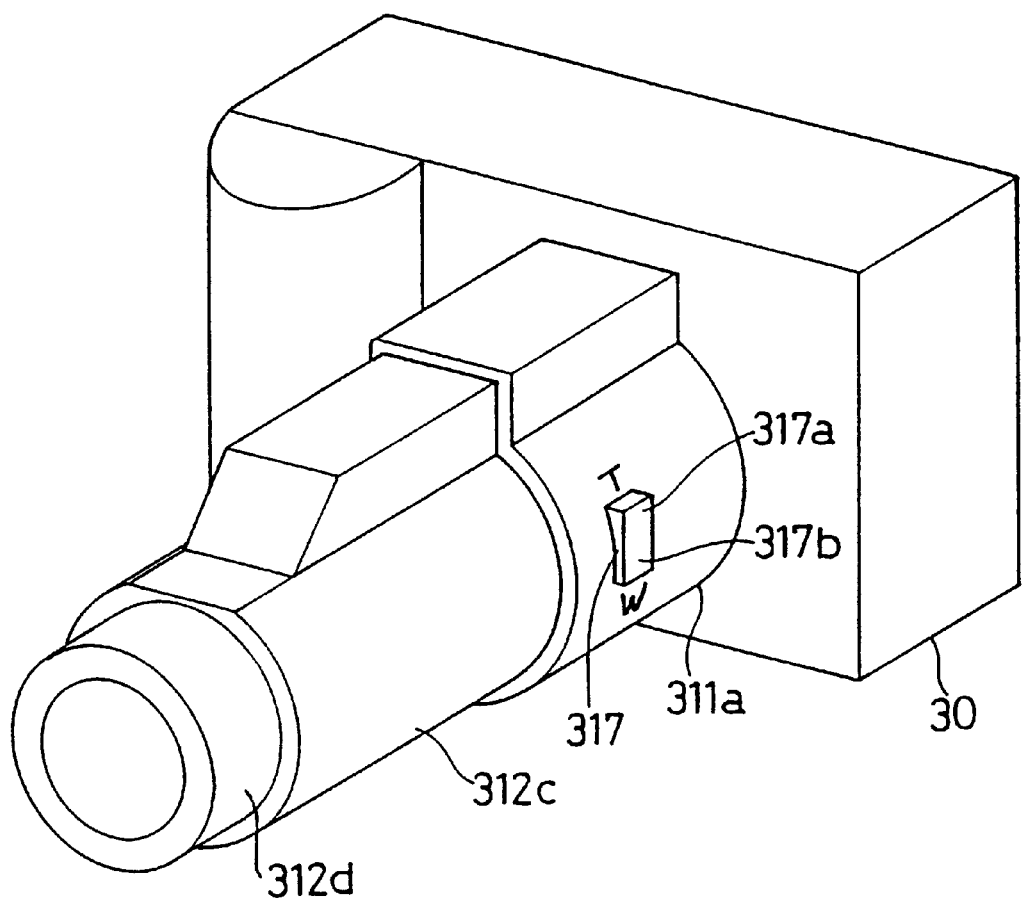
FIG. 99 is an external perspective view of a camera where operation members are provided on a projecting stationary barrel.

FIG. 99 is an external view of a projecting lens barrel type camera. A stationary lens barrel 311a is secured to the camera body 30 and movable lens barrels 312c and 312d are fitted in the stationary lens barrel 311a. Since the outer movable lens barrel 312c of this camera has a projecting portion, the lens barrel 312c is moved non-rotatively. Moreover, since the rotary zoom ring 313 shown in FIGS. 98A and 98B cannot be provided, instead of the zoom ring, an oblong zoom switch 317 is provided on a side surface of the stationary lens barrel 311a. At the vertical center of the zoom switch 317 is provided a support axis (not shown) parallel to the movement direction of the movable lens barrels 312c and 312d. The zoom switch 317 is rotatable about the support axis.

The zoom switch 317 is located where the thumb comes when the stationary lens barrel 311a is held by the left hand. The user can depress an upper portion 317a of the switch with the tip of the thumb and a lower portion 317b of the switch with the belly of the thumb close to the base. When the upper portion 317a is depressed, the switch SZT is closed, and when the lower portion 317b is depressed, the switch SZW is closed, whereby zooming is performed. Although not shown, on the opposite side outer surface of the stationary lens barrel 311a to the zoom switch 317 is provided the camera shake compensating button 315 shown in FIG. 98B, so that zooming and camera shake compensation can simultaneously be performed.

By arranging the operation members in the stationary lens barrel so that the operation direction and the position are vertical to the movement direction of the movable lens barrel as described above, the camera is surely held and the operation is facilitated. While only the photometry lock member, the camera shake compensating member and the zooming member are shown in this example, other operation members may be arranged in the stationary lens barrel in a similar manner. When a sliding operation member is provided, it is preferable to set the sliding direction to be vertical to the central axis of the stationary lens barrel.

<<Flash Photography>>

Figure 100:
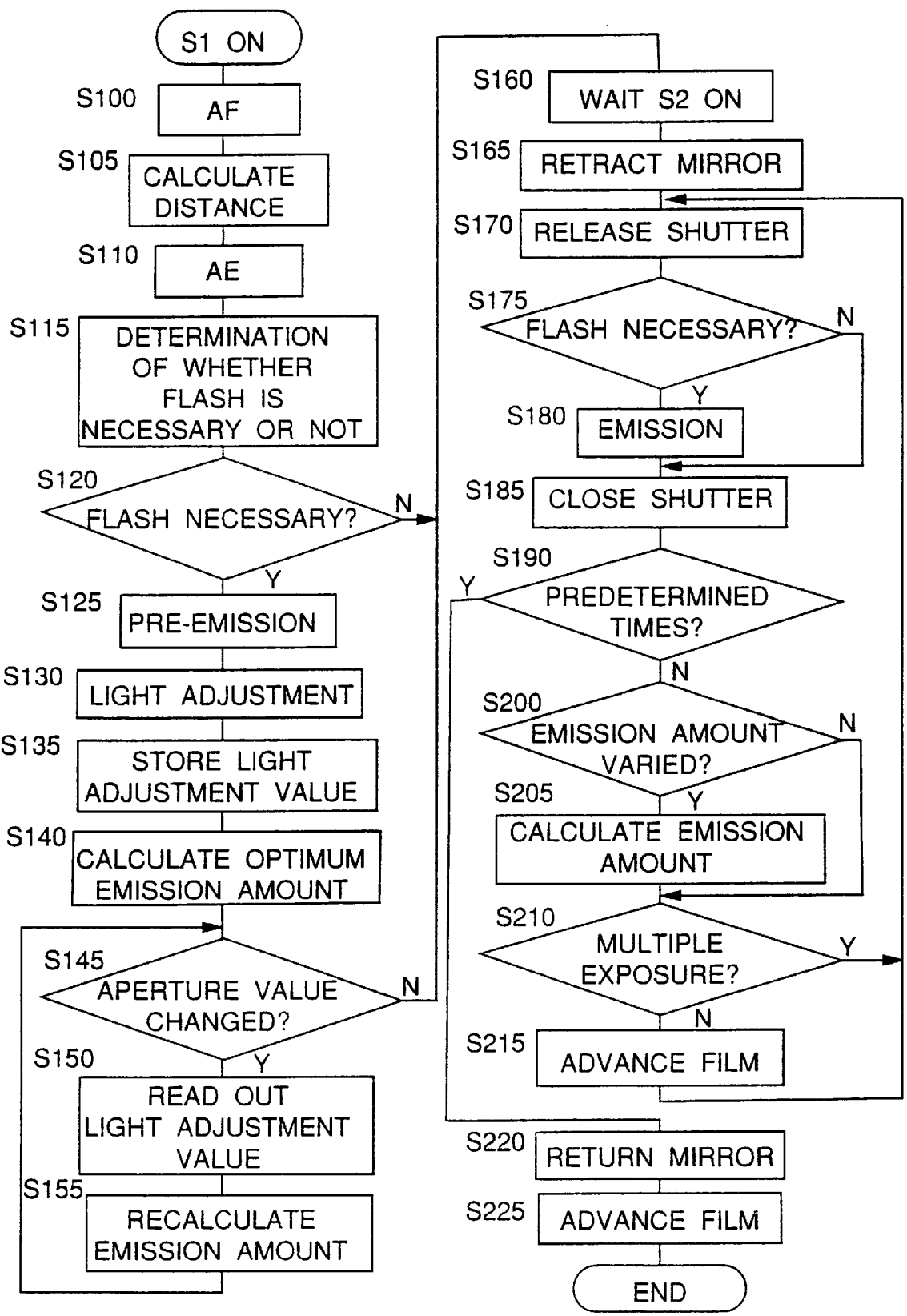
FIG. 100 is a flowchart of a flash photography processing in which the emission amount is adjusted by performing pre-emission.

Flash photography with the camera of the type in which the optical path is switched between the taking optical system and the finder optical system will be described in detail. FIG. 100 is a flowchart of a processing in which a pre-emission is performed to adjust the emission amount. The processing is started by the ON signal of the switch S1. First, focusing is performed for the subject (step S100) and the distance to the subject is calculated by use of the results of the detection by the focus condition detecting device SF or the area sensor SA (S105). Then, the shutter speed and the aperture value are set based on the results of the detection by the photometric device SE (S110) and whether flash emission is necessary or not is determined based on the photometry results (S115). When it is determined that the subject is sufficiently bright and flash emission is unnecessary (S120), the process proceeds to step S160.

When it is determined that flash emission is necessary, pre-emission is performed with the emission amount of the flash portion 34 set to be approximately one-tenth the emission amount for photographing (S125). At this time, the emission amount may be adjusted according to the distance to the subject calculated at step S105. Then, the reflected light from the subject is detected by the light receiving device SL (S130) and the detected light quantity is stored (S135). Then, from the light quantity and the aperture value set at that time, the emission amount is calculated necessary for illuminating the subject to an optimum brightness (S140).

At this time, the optimum emission amount may be set in consideration of the subject distance so that the film is slightly underexposed when the subject distance is shorter than a predetermined distance and that the film is slightly overexposed when the subject distance is longer than another predetermined distance. This is because when the optimum emission amount is calculated through pre-emission, the film tends to be overexposed for near subjects and to be underexposed for distant subjects. Moreover, for example, when an object such as a mirror having a high reflectance is present in the taking range, the amount of reflected light detected through the pre-emission is sometimes extremely great. In this case, it is determined from the subject distance that the detection value of the light receiving device SL is abnormal. In such a case, the optimum emission amount may be set based on the subject distance.

Then, whether the aperture value was changed after the pre-emission at step S125 or not is determined (S145). When the aperture value has been changed, the light adjustment value stored at step S135 is read out (S150) and the emission amount is recalculated (S155). When the aperture value has not been changed, whether it is necessary to change the aperture value or not may be determined at step S145. When the set aperture value is large (i.e. the diameter of the aperture stop is small) so that the subject is not illuminated to a sufficient brightness even if the maximum amount of emission is performed, the stored light adjustment value is read out (S150) and the aperture value is changed and the emission amount is recalculated (S155). With this processing, the flash portion 34 is ready for emission.

When the ON signal of the switch S2 instructing the start of exposure is received (S160), the mirror is raised so as to retract from the optical path of the taking optical system (S165) and the shutter is released (S170). Thereby, the exposure of the film is started. When it has been determined at step S115 that flash emission is necessary (S175), light of the optimum amount calculated at step S140 or S155 is irradiated by the flash portion 34 to illuminate the subject (S180). Then, the shutter is closed (S185). While taking of one picture is completed with this processing, the following processing is executed for continuous flash photography and multiple exposure.

It is determined whether or not taking has been performed the number of times set by the user beforehand (S190).

When taking has been performed the set number of times, the mirror is returned (S220) and the film is advanced by one frame (S225) to end the taking operation. When taking has not been performed the set number of times, the process proceeds to step S200. When only one frame is exposed without multiple exposure being performed like in the normal photography, the processing from the S200 is not executed. In the continuous flash photography, a method to set the emission amount fixed and a method to vary it are selectable. When the emission amount is set to vary (S200), the emission amount is recalculated so that the brightness of the subject slightly varies (e.g. ⅓ EV value) in the next photographing (S205).

Then, whether the setting to perform multiple exposure has been made or not is determined (S210). When multiple exposure is performed, the process directly proceeds to step S170. When multiple exposure is not performed, after the film advances by one frame (S215), the process returns to S170. Then, the processing from S170 is repeated until it is determined at step S190 that taking has been performed the predetermined number of times.

Figure 101:
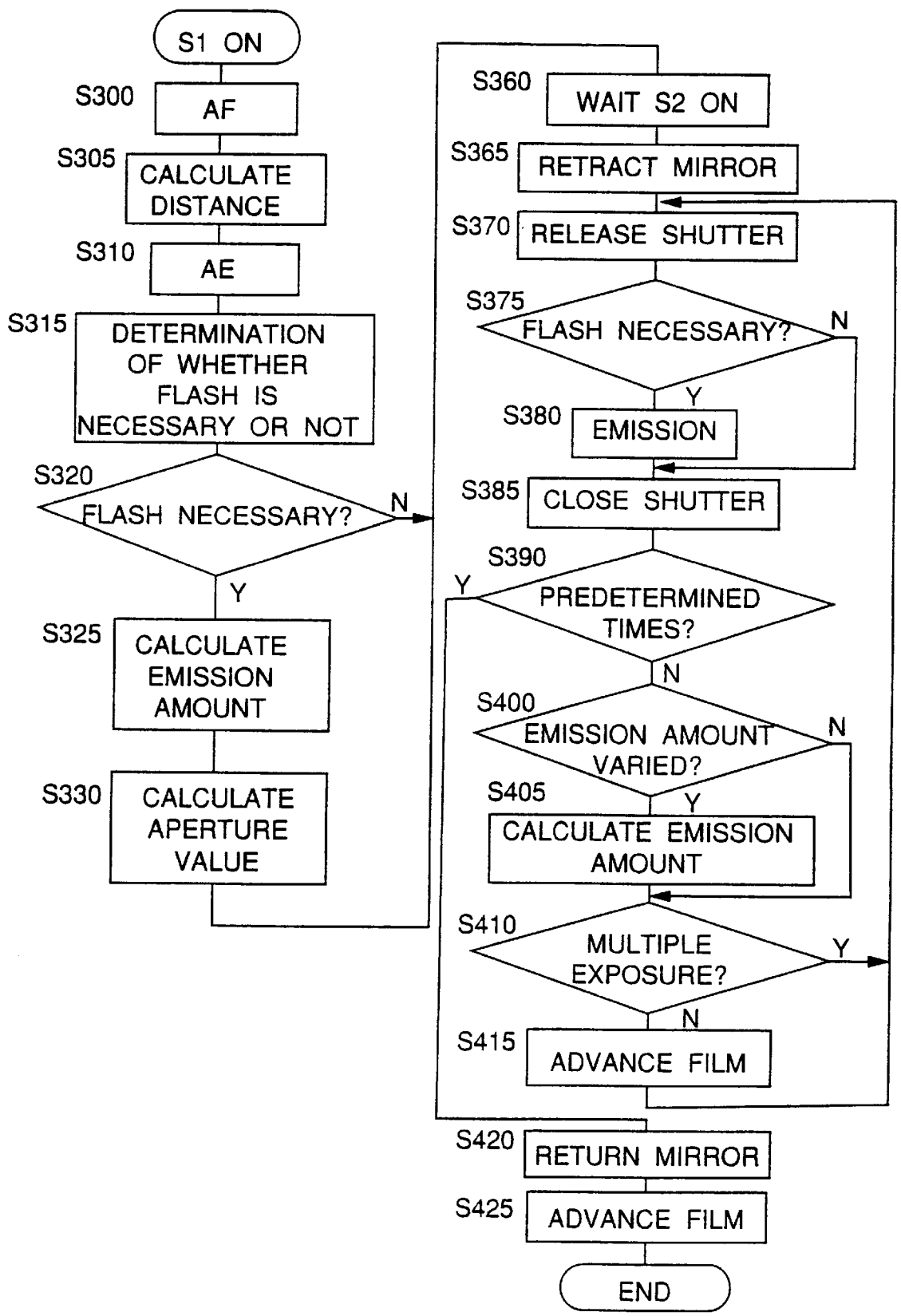
FIG. 101 is a flowchart of a flash photography processing in which the emission amount is adjusted according to the distance to the subject.

FIG. 101 is a flowchart of a processing in which the emission amount is adjusted according to the distance to the subject. The processing is started by the ON signal of the switch S1. Focusing is performed for the subject (step S300) and the distance to the subject is calculated by use of the results of the detection by the focus condition detecting device SF or the area sensor SA (S305). Then, the shutter speed and the aperture value are set based on the results of the detection by the photometric device SE (S310) and whether flash emission is necessary or not is determined based on the photometry results (S315). When it is determined that flash emission is unnecessary (S320), the process proceeds to step S360.

When it is determined that flash emission is necessary, the emission amount of the flash portion 34 is set according to the subject distance calculated at step S305 (S325) and the aperture value is set to suit the emission amount (S330). For near subjects, the emission amount is set to be small and the aperture value is set to be high. For distant subjects, the emission amount is set to be large and the aperture value is set to be low. Then, the process proceeds to step S360.

When the ON signal of the switch S2 instructing the start of exposure is received (S360), the mirror is raised so as to retract from the optical path of the taking optical system (S365) and the shutter is released (S370). Thereby, the exposure of the film is started. When it has been determined that flash emission is necessary (S375), light of the amount set at step S325 is irradiated by the flash portion 34 with the aperture stop opened at the value set at step S330 (S380). Then, the shutter is closed (S385).

The processing from steps S390 to S425 for continuous flash photography and multiple exposure will not be described since it is the same as that of steps S190 to S225 of FIG. 100.

<<During-Exposure Zooming>>

The camera according to the present invention is capable of during-exposure zooming. That is, the focal length of the taking optical system is varied to vary the taking angle of view while the shutter is released. The during-exposure zooming includes manual zooming where the focal length is varied by a manual operation by the user, and automatic zooming where the focal length is varied according to a previously set program. During the during-exposure zooming, it is possible to activate the camera shake compensating mechanism.

By activating the camera shake compensating mechanism, a good quality picture without any blur is obtained even if the shutter is released for a relatively long time. That is, by making camera shake compensation, the shutter speed can be increased.

In the manual zooming, the focal length of the taking optical system may be varied from a given length to a given length. The focal length may be varied not only in one direction such as from the wide angle side to the telephoto side or from the telephoto side to the wide angle side but also in a complicated manner such as from the wide angle side to the telephoto side and then to the wide angle side again according to the user's intention.

In the automatic zooming, the focal length is varied only in one direction, i.e. from the wide angle side to the telephoto side and from the telephoto side to the wide angle side. In the automatic zooming, the speed of the focal length variation is higher when the camera shake compensating mechanism is activated than when it is not activated. When camera shake compensation is made, the zoom start focal length and the zoom end focal length are predetermined and the shutter speed is also preset at a predetermined value (approximately ⅟30 to 2 seconds). When camera shake compensation is not made, the focal length set at that time is the zoom start focal length.

Figure 102:
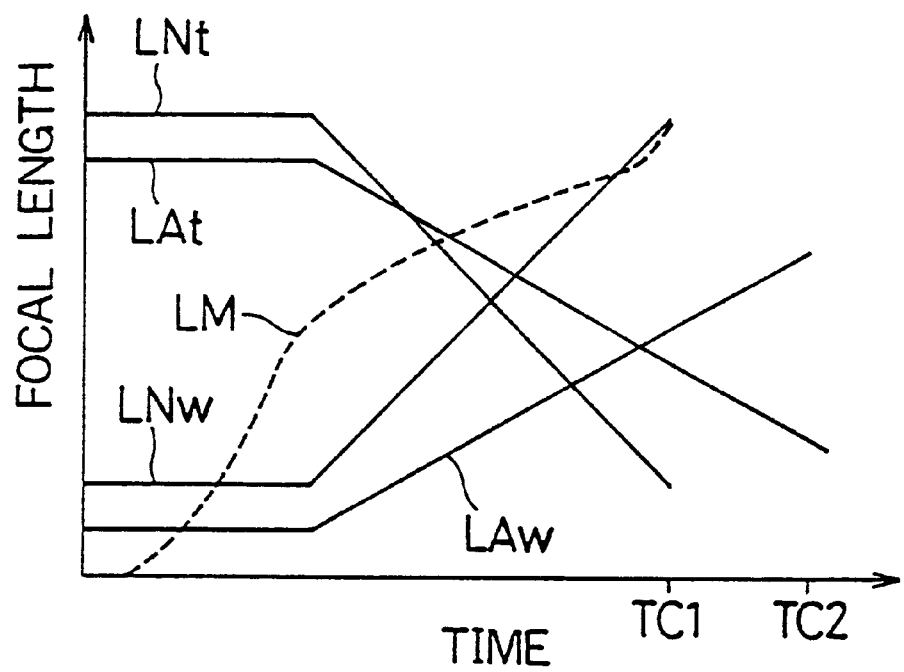
FIG. 102 shows a variation in the focal length of the taking optical system in during-exposure zooming.

FIG. 102 shows programed lines of the variation in the focal length of the taking optical system in the automatic zooming, and the variation in the focal length in the manual zooming. In FIG. 102, a dotted line LM represents an example of the focal length variation in the manual zooming. The axis of abscissas represents the time from the shutter release. The shutter is closed at a point on the axis of abscissas corresponding to the set shutter speed. When camera shake compensation is not made, the shutter speed is a predetermined value TC1. When camera shake compensation is made, the shutter speed is a predetermined value TC2.

The axis of ordinates represents the focal length of the taking optical system. LNw and LNt represent program lines used when camera shake compensation is not made. LAw and LAt represent program lines used when camera shake compensation is made. The lines LNw and LAw represent the variation from the wide angle side to the telephoto side. The lines LNt and LAt represent the variation from the telephoto side to the wide angle side. Irrespective of whether camera shake compensation is made or not, the focal length of the taking optical system is kept at the zoom start focal length for a predetermined period of time immediately after the start of the during-exposure zooming.

During the period over which the focal length is not varied, the position where light is imaged on the film surface is fixed to form a core image. While the focal length is fixed immediately after the start of the during-exposure zooming in this example, the focal length may be kept fixed just before the end of the during-exposure zooming.

The lines LNw and LNt used when camera shake compensation is not made shift upward or downward according to the zoom start focal length. The lines LAw and LAt used when camera shake compensation is made do not vary. The inclination of the program lines represents the speed of the focal length variation. The inclination of the program lines LAw and LAt is smaller than that of the lines LNw and LNt. Consequently, when camera shake compensation is made, during-exposure zooming is performed at a lower speed than when camera shake compensation is not made.

Whether camera shake compensation is made or not is determined, for example, based on whether the camera shake compensating button 315 of FIG. 98B is operated or not. Moreover, the determination of whether the focal length is varied from the wide angle side to the telephoto side or in the reverse direction, i.e. the selection between the program lines LNw and LAw and the lines LNt and LAt is made by operating a non-illustrated switch.

Camera shake compensation is made by detecting the camera shake and driving the camera shake compensating actuators 122 and 124 according to the detection results as described above and takes some time. Even if the camera shake amount is uniform, the driving amount of the actuators 122 and 124 varies according to the focal length of the taking optical system. Therefore, in order for the camera shake compensating mechanism to function correctly, the focal length of the taking optical system should not be varied at a high speed.

For this reason, in the during-exposure zooming of the camera according to the present invention, manual zooming is inhibited when camera shake compensation is made. Moreover, the speed of the focal length variation, i.e. the inclination of the program lines LAw and LAt used when camera shake compensation is made is set within a range where the camera shake compensating mechanism functions correctly. Since the inclination of the program lines LAw and LAt and the inclination of the program lines LNw and LNt are different, the taken image is different between when camera shake compensation is made and when it is not made.

While in this example, the inclination of the program lines LAw and LAt is smaller than that of the program lines LNw and LNt used when camera shake compensation is not made, the inclination of the lines LAw and LAt may be greater than that of the lines LNw and LNt as long as the camera shake compensating mechanism correctly functions according to the variation in the focal length of the taking optical system.

Although not shown, a screw hole for attaching the camera to a tripod is formed at a lower part of the camera body 30. In the vicinity thereof, a switch is provided for detecting that the camera has been attached to the tripod. When the switch detects that the camera has been attached to the tripod and during-exposure zooming is performed under that condition, automatic zooming and manual zooming are both performable irrespective of whether camera shake compensation is made or not. In this case, in automatic zooming, the shutter speed is set to be longer than the predetermined value TC2.

Figure 103:
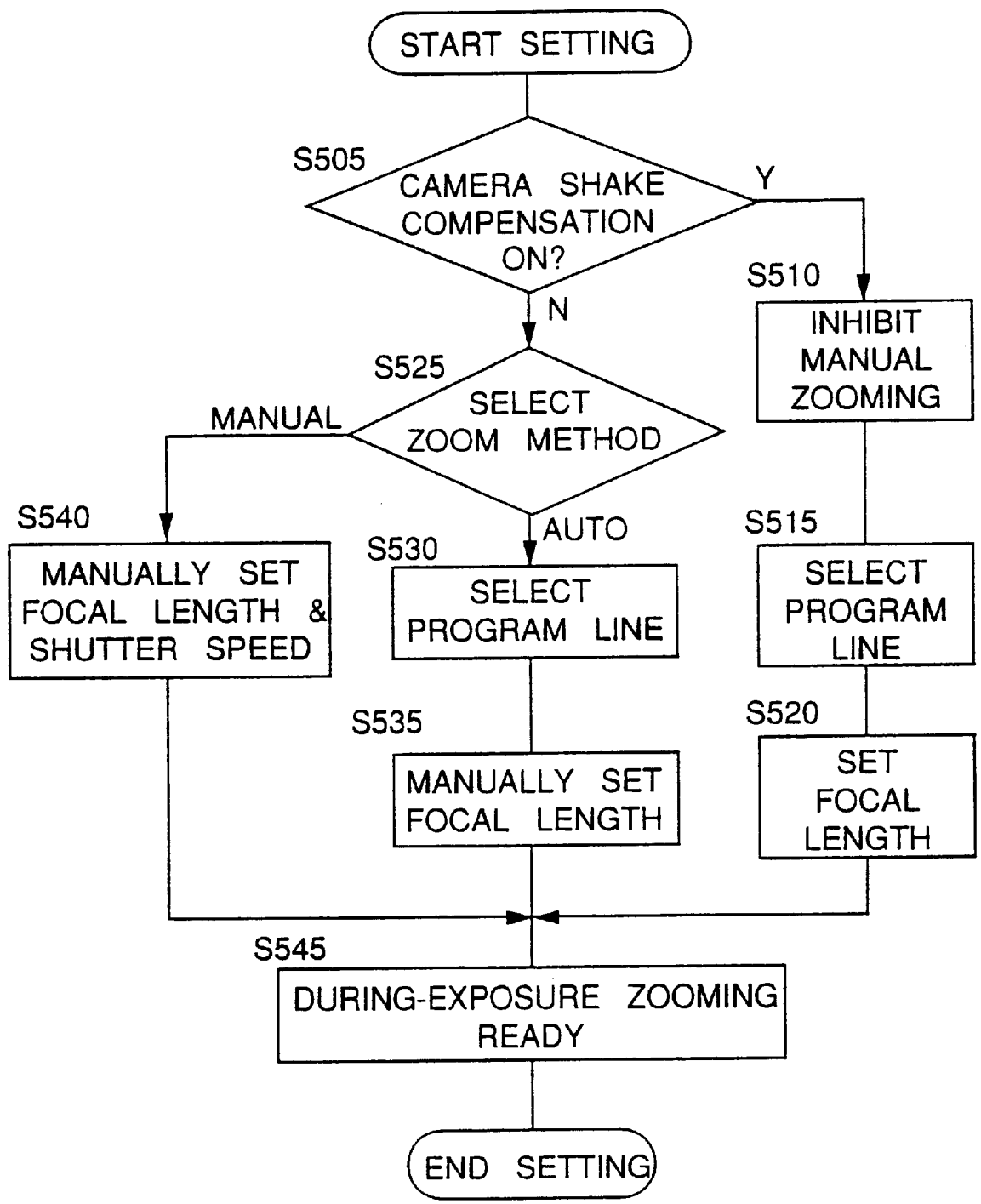
FIG. 103 is a flowchart of a setting processing for during-exposure zooming.

FIG. 103 is a flowchart of the setting for the during-exposure zooming. First, at step S505, whether camera shake compensation is made or not is determined. When camera shake compensation is made, manual zooming is inhibited at step S510 so that only automatic zooming is performed. Then, the program line is selected at step S515. Specifically, either the lines LAw or LAt is selected. At this time, the shutter speed is also selected. Then, at step S520, the focal length of the taking optical system is set to be a zoom start focal length according to the selected program line.

When camera shake compensation is not made, whether automatic zooming or manual zooming is performed is determined at step S525. When automatic zooming is performed, the program line is selected at step #530. Specifically, either the line LNw or LNt of FIG. 102 is selected. The shutter speed is also set. Then, the zoom start focal length of the taking optical system is manually set. When manual zooming is performed, the user manually sets the zoom start focal length and the shutter speed at step S540. With this processing, during-exposure zooming is made performable (S545).

FIG. 104 is a flowchart of a processing in which camera shake compensation is made during the during-exposure zooming. Steps S605 to S645 are a processing by the microcomputer $\mu C1$ which controls the entire camera. Steps S650 to S690 are a processing by the microcomputer $\mu C2$ which controls camera shake compensation. The microcomputer $\mu C1$ starts the processing for the during-exposure zooming when receiving the ON signal of the switch S1 generated by the first stroke of the release button. First, photometry is performed to set the aperture value at step S605 and automatic focusing is performed so that the subject is in focus at step S610.

Then, a command to start camera shake compensation is given to the microcomputer $\mu C2$ at step S615 and the process waits for the ON signal of the switch S2 generated by the second stroke of the release button at step S620. When the ON signal of the switch S2 is received, a command to start exposure is issued at step S625. This command is given to the microcomputer $\mu C2$ and to the exposure controller 3, so that the shutter of the shutter unit 62f is released. At step S630, the microcomputer $\mu C1$ varies the focal length of the taking optical system according to the set program line by means of the zoom driver 6.

When it is determined at step S635 that the set shutter speed time has elapsed, a command to end exposure is issued at step S640. This command is also given to the microcomputer $\mu C2$ and to the exposure controller 3 to close the shutter. Then, the film is advanced by one frame to be ready for the next photographing.

When receiving at step S650 the camera shake detection command issued at step S615, the microcomputer $\mu C2$ sets the camera shake compensating optical system CL (FIG. 55) in its initial position at step S655 to start the detection of camera shake and the calculation of the compensation amount. Specifically, the integration of the camera shake sensor 12 is performed at step S660, the output of the integration is A/D converted at step S662, and the camera shake amount is calculated at step S664. Then, the focal length of the taking optical system at that time is detected at step S666 and the compensation amount is calculated based on the calculated camera shake amount and the detected focal length at step S668. Then, the processing from S660 to S668 is repeated until it is detected at step S670 that the exposure start command is issued at step S625.

When receiving the exposure start command, at step S675, the microcomputer $\mu C2$ drives the camera shake compensating optical system CL according to the compensation amount calculated at step S668. Then, at step S680, the camera shake detection and the compensation amount calculation the same as those at steps S660 to S668 are performed and at step S685, the camera shake compensating optical system CL is driven according to the calculated compensation amount. The camera shake detection and compensation are repeated until the exposure end command is issued at step S690.

The method of during-exposure zooming shown here is employable not only for the camera using the lens shutter shown here as an example but also for the camera having a focal plane shutter. As shown in the program lines of FIG. 102, since the focal length is kept fixed for a predetermined period of time immediately after the start of automatic zooming, the focal plane shutter can be fully opened during this time, so that the effect of during-exposure zooming appears on the entire exposed surface of the film. However, when the focal length is varied immediately after the start of automatic zooming in the focal plane shutter camera, the focal length variation appears only on a part of the film, so that the effect of during-exposure zooming is not uniform.

Figure 105A:
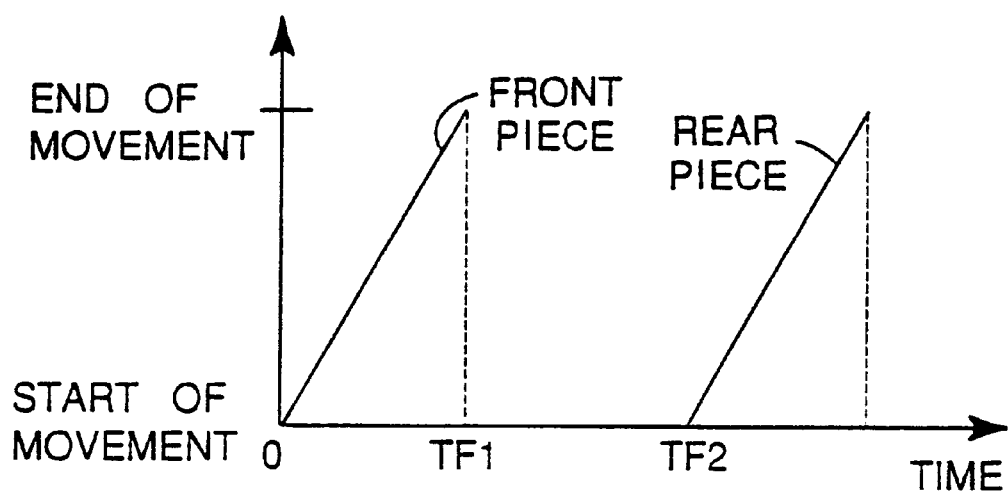
FIGS. 105A and 105B show relationships between time and the releasing and closing of the focal plane shutter and the lens shutter.
Figure 105B:
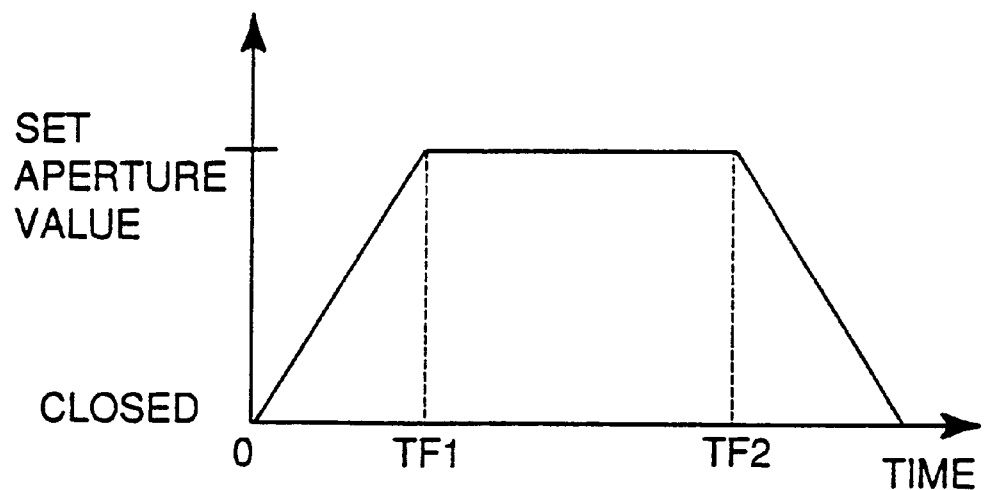

In such a case, it is preferable to start zooming at the time when the shutter is fully opened. FIGS. 105A and 105B show the relationship between the opening and closing of the focal plane shutter and the lens shutter, and time. Period TF1–TF2 is a period during which the focal plane shutter is fully open and the lens shutter is open at a set aperture value. By varying the focal length only during the period TF1–TF2, the effect of during-exposure zooming appears on the entire exposed surface of the film, so that a good quality image is taken.

Manual zooming may be performed by mechanically transmitting the amount of the user's manual operation such as the rotation amount of the zoom ring to lenses for adjusting focal length. However, the lenses must be driven by a motor in automatic zooming and therefore, it is preferable to perform manual zooming according to the power zooming method using a motor since the structure of the camera is simplified.

Obviously, many modifications and variations of the present invention are possible in light of the above teachings. It is therefore to be understood that within the scope of the appended claims, the invention may be practiced other than as specifically described.

What is claimed is:

1. A camera comprising:
   a first lens unit for focusing;
   a focusing mechanism for driving said first lens unit;
   a second lens unit;
   a third lens unit;
   a holding member which holds said first and second lens units in such a manner that said first lens unit is positioned in an object side relative to said second lens unit;
   a zooming mechanism which drives said holding member and said third lens unit; and
   a controller for performing zooming by controlling said zooming mechanism to drive said holding member and said third lens unit, and by controlling said focusing mechanism to move said first lens unit relative to said second lens unit.

2. A camera comprising:
   a first lens unit for focusing;
   a focusing mechanism for driving said first lens unit;
   a second lens unit;
   a third lens unit;
   a fourth lens unit;
   a holding member which holds said first and second lens units;
   a zooming mechanism which drives said holding member and said third and fourth lens units; and
   a controller for performing zooming by controlling said zooming mechanism to drive said holding member and said third and fourth lens units, and by controlling said focusing mechanism to move said first lens unit relative to said second lens unit.

3. A camera comprising:
   a first lens unit for focusing;
   a focusing mechanism for driving said first lens unit;
   a second lens unit;
   a third lens unit;
   an outer barrel and an inner barrel which are relatively movable for zooming and said inner barrel holds a carrying member which carries said first and second lens units; and
   a controller for performing zooming by controlling said relative movement of said outer and inner barrels to drive said carrying member together with said inner barrel and to drive said third lens unit, and by controlling said focusing mechanism to move said first lens unit relative to said second lens unit.

4. A camera comprising:
   a first lens unit for focusing;
   a focusing mechanism for driving said first lens unit;
   a second lens unit;
   a third lens unit;
   a holder which holds said first and second lens units and guides movement of said third lens unit;
   a zooming mechanism which drives said holder and said third lens unit; and
   a controller for performing zooming by controlling said zooming mechanism to drive said holder and to drive said third lens unit under the guide of said holder, and by controlling said focusing mechanism to move said first lens unit relative to said second lens unit.

5. A camera comprising:
   a first lens unit;
   a second lens unit which is positioned in an image side relative to said first lens unit;
   a third lens unit;
   a first driving mechanism for driving said first, second, and third lens units;
   a second driving mechanism for driving said first lens unit relative to said second lens unit; and
   a controller for performing zooming by actuating said first and second driving mechanisms simultaneously and for performing focusing by actuating said second driving mechanism independently.

6. A camera comprising:
   a first lens unit;
   a second lens unit;
   a third lens unit;
   a fourth lens unit;
   a first driving mechanism for driving said first, second, third, and fourth lens units;
   a second driving mechanism for driving said first lens unit relative to said second lens unit; and
   a controller for performing zooming by actuating said first and second driving mechanisms simultaneously and for performing focusing by actuating said second driving mechanism independently.

7. A camera comprising:
   a first lens unit;
   a second lens unit;
   a third lens unit;
   an outer barrel and an inner barrel which are relatively movable for zooming and said inner barrel holds a carrying member which carries said first and second lens units;
   a driving mechanism provided in said carrying member for driving said first lens unit relative to said second lens unit; and a controller for performing zooming by controlling said relative movement of said outer and inner barrels to drive said carrying member together with said inner barrel and to drive said third lens unit, and by controlling said driving mechanism to move said first lens unit relative to said second lens unit.

8. A camera comprising:

a first lens unit;

a second lens unit;

a third lens unit;

a holder which holds said first and second lens units and guides movement of said third lens unit;

a first driving mechanism for driving said holder, and for driving said third lens unit under the guide of said holder;

a second driving mechanism provided in said holder for driving said first lens unit relative to said second lens unit; and a controller for performing zooming by actuating said first and second driving mechanisms simultaneously and for performing focusing by actuating said second driving mechanism independently.

9. A camera comprising:

first, second, third, and fourth lens units which are independently movable;

a first driving power source which drives said first, second, third, and fourth lens units simultaneously; and a second driving power source which drives one of said first, second, third and fourth lens units independently of other of said lens units when said first, second, third, and fourth lens units are driven by the power of said first driving power source so that the movement of said other lens units are carried out by the sole power of said first driving power source and the movement of said one lens unit is carried out by sum of the power of the first and second driving power sources.

10. A camera comprising:

first, second, and third lens units which are independently movable;

an outer barrel and an inner barrel which are relatively movable and said inner barrel holds a carrying member which carries said first and second lens units;

a first driving power source which causes the relative movement of said outer and inner barrels to move said carrying member together with said inner barrel, and to move said third lens unit, simultaneously; and a second driving power source provided in said carrying member for driving one of said first and second lens units independently of other of said first to third lens units when said first, second, and third lens units are driven by the relative movement of said barrels so that the movement of said other lens units are carried out by the sole power of said first driving power source and the movement of said one lens unit is carried out by sum of the power of the first and second driving power sources.

11. A camera comprising:

first, second, and third lens units which are independently movable;

a holder which holds said first and second lens units and guides movement of said third lens unit;

a first driving power source which drives said holder to move said first and second lens units, and drives said third lens unit under the guide of said holder, simultaneously; and a second driving power source provided in said holder and which drives one of said first and second lens units independently of another of said first and second lens units when said holder is driven by the power of said first driving power source so that the movement of said one lens unit is carried out by the sum of the power of said first and second driving power sources and the movement of other of said first to third lens units are carried out by the sole power of the first driving power source.

* * * * *